(12) United States Patent
Ochiai et al.

(10) Patent No.: US 11,664,488 B2
(45) Date of Patent: *May 30, 2023

(54) METHOD OF MANUFACTURING POSITIVE ELECTRODE ACTIVE MATERIAL INCLUDING COATING COMPOSITE OXIDE OF LITHIUM, COBALT, MAGNESIUM, AND FLUORINE WITH TITANIUM-CONTAINING MATERIAL

(71) Applicant: SEMICONDUCTOR ENERGY LABORATORY CO., LTD., Atsugi (JP)

(72) Inventors: Teruaki Ochiai, Kanagawa (JP); Takahiro Kawakami, Kanagawa (JP); Mayumi Mikami, Kanagawa (JP); Yohei Momma, Kanagawa (JP); Masahiro Takahashi, Kanagawa (JP); Ayae Tsuruta, Kanagawa (JP)

(73) Assignee: Semiconductor Energy Laboratory Co., Ltd., Atsugi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/687,800

(22) Filed: Mar. 7, 2022

(65) Prior Publication Data

US 2022/0190313 A1 Jun. 16, 2022

Related U.S. Application Data

(63) Continuation of application No. 17/560,408, filed on Dec. 23, 2021, which is a continuation of application
(Continued)

(30) Foreign Application Priority Data

Jul. 5, 2016 (JP) .................................. 2016-133143
Jul. 6, 2016 (JP) .................................. 2016-133997
(Continued)

(51) Int. Cl.
*H01M 4/131* (2010.01)
*H01M 4/1315* (2010.01)
(Continued)

(52) U.S. Cl.
CPC ........... *H01M 4/131* (2013.01); *H01M 4/134* (2013.01); *H01M 4/1315* (2013.01);
(Continued)

(58) Field of Classification Search
CPC .... H01M 4/131; H01M 4/1315; H01M 4/134; H01M 4/1391; H01M 4/13915;
(Continued)

(56) References Cited

U.S. PATENT DOCUMENTS 4,302,518 A 11/1981 Goodenough et al.
4,668,595 A 5/1987 Yoshino et al.
(Continued)

FOREIGN PATENT DOCUMENTS

CN 001715193 A 1/2006
CN 101148263 A 3/2008
(Continued)

OTHER PUBLICATIONS

Mo et al., Enhanced high-rate capability and high voltage cycleability of Li2TiO3-coated LiNi0.5Co0.2Mn0.3O2 cathode materials, Sep. 2016, RSC advances, 6, 88713-88718 (Year: 2016).*
(Continued)

*Primary Examiner* — Sean P Cullen
(74) *Attorney, Agent, or Firm* — Fish & Richardson P.C.

(57) ABSTRACT

A positive electrode active material which can improve cycle characteristics of a secondary battery is provided. Two
(Continued)

kinds of regions are provided in a superficial portion of a positive electrode active material such as lithium cobaltate which has a layered rock-salt crystal structure. The inner region is a non-stoichiometric compound containing a transition metal such as titanium, and the outer region is a compound of representative elements such as magnesium oxide. The two kinds of regions each have a rock-salt crystal structure. The inner layered rock-salt crystal structure and the two kinds of regions in the superficial portion are topotaxy; thus, a change of the crystal structure of the positive electrode active material generated by charging and discharging can be effectively suppressed. In addition, since the outer coating layer in contact with an electrolyte solution is the compound of representative elements which is chemically stable, the secondary battery having excellent cycle characteristics can be obtained.

30 Claims, 58 Drawing Sheets

Related U.S. Application Data

No. 16/885,350, filed on May 28, 2020, which is a continuation of application No. 15/638,449, filed on Jun. 30, 2017, now Pat. No. 10,741,828.

(30) Foreign Application Priority Data

| Jan. 11, 2017 | (JP) | 2017-002831 |
| Feb. 22, 2017 | (JP) | 2017-030693 |
| Apr. 21, 2017 | (JP) | 2017-084321 |
| Jun. 19, 2017 | (JP) | 2017-119272 |

(51) Int. Cl.
  *H01M 4/1391* (2010.01)
  *H01M 4/62* (2006.01)
  *H01M 4/13915* (2010.01)
  *H01M 4/134* (2010.01)
  *H01M 4/36* (2006.01)
  *H01M 4/525* (2010.01)
  *H01M 4/86* (2006.01)
  *H01M 4/02* (2006.01)
  *H01M 10/0525* (2010.01)

(52) U.S. Cl.
  CPC ..... *H01M 4/1391* (2013.01); *H01M 4/13915* (2013.01); *H01M 4/366* (2013.01); *H01M 4/525* (2013.01); *H01M 4/625* (2013.01); *H01M 4/8657* (2013.01); *H01M 10/0525* (2013.01); *H01M 2004/021* (2013.01); *H01M 2004/028* (2013.01)

(58) Field of Classification Search
  CPC ...... H01M 4/366; H01M 4/525; H01M 4/625; H01M 4/8657
  USPC ..................................................... 429/231.3
  See application file for complete search history.

(56) References Cited

U.S. PATENT DOCUMENTS

| 5,240,794 A | 8/1993 | Thackeray et al. |
| 5,443,929 A | 8/1995 | Yamamoto et al. |
| 5,604,396 A | 2/1997 | Watanabe et al. |
| 5,705,291 A | 1/1998 | Amatucci et al. |
| 5,783,333 A | 7/1998 | Mayer |
| 5,824,278 A | 10/1998 | Yao |
| 5,834,139 A | 11/1998 | Shodai et al. |
| 5,871,866 A | 2/1999 | Barker et al. |
| 5,910,382 A | 6/1999 | Goodenough et al. |
| 6,085,015 A | 7/2000 | Armand et al. |
| 6,127,065 A | 10/2000 | Yamamoto et al. |
| 6,218,050 B1 | 4/2001 | Yoon et al. |
| 6,277,521 B1 | 8/2001 | Gao et al. |
| 6,346,348 B1 | 2/2002 | Nakajima et al. |
| 6,458,487 B1 | 10/2002 | Takeuchi et al. |
| 6,514,640 B1 | 2/2003 | Armand et al. |
| 6,582,814 B2 | 6/2003 | Swiler et al. |
| 6,589,499 B2 | 7/2003 | Gao et al. |
| 6,680,143 B2 | 1/2004 | Thackeray et al. |
| 6,737,195 B2 | 5/2004 | Kweon et al. |
| 6,753,111 B2 | 6/2004 | Kweon et al. |
| 6,846,592 B2 | 1/2005 | Kweon et al. |
| 6,878,490 B2 | 4/2005 | Gao et al. |
| 6,919,144 B2 | 7/2005 | Miyazaki et al. |
| 6,974,601 B2 | 12/2005 | Kweon et al. |
| 6,984,469 B2 | 1/2006 | Kweon et al. |
| 7,018,741 B2 | 3/2006 | Suhara et al. |
| 7,138,209 B2 | 11/2006 | Kweon et al. |
| 7,294,435 B2 | 11/2007 | Miyamoto et al. |
| 7,303,840 B2 | 12/2007 | Thackeray et al. |
| 7,309,546 B2 | 12/2007 | Kweon et al. |
| 7,368,071 B2 | 5/2008 | Dahn et al. |
| 7,393,476 B2 | 7/2008 | Shiozaki et al. |
| 7,504,180 B2 | 3/2009 | Tatsumi et al. |
| 7,635,536 B2 | 12/2009 | Johnson et al. |
| 7,709,148 B2 | 5/2010 | Kawasato et al. |
| 7,709,151 B2 | 5/2010 | Inoue et al. |
| 7,727,673 B2 | 6/2010 | Ooyama et al. |
| 7,736,807 B2 | 6/2010 | Hasegawa et al. |
| 7,790,308 B2 | 9/2010 | Johnson et al. |
| 7,892,679 B2 | 2/2011 | Shimizu et al. |
| 7,927,506 B2 | 4/2011 | Park |
| 7,935,270 B2 | 5/2011 | Park |
| 8,003,256 B2 | 8/2011 | Ohishi |
| 8,007,941 B2 | 8/2011 | Kweon et al. |
| 8,034,486 B2 | 10/2011 | Kweon et al. |
| 8,080,340 B2 | 12/2011 | Thackeray et al. |
| RE43,276 E | 3/2012 | Kweon et al. |
| 8,236,449 B2 | 8/2012 | Nakura |
| 8,470,477 B2 | 6/2013 | Miwa et al. |
| 8,476,510 B2 | 7/2013 | Swager et al. |
| 8,557,440 B2 | 10/2013 | Yu et al. |
| 8,685,569 B2 | 4/2014 | Oguni et al. |
| 8,685,570 B2 | 4/2014 | Miwa et al. |
| 8,709,654 B2 | 4/2014 | Takeuchi et al. |
| 8,753,532 B2 | 6/2014 | Levasseur et al. |
| 8,808,918 B2 | 8/2014 | Jung et al. |
| 8,877,377 B2 | 11/2014 | Hosoya |
| 8,877,381 B2 | 11/2014 | Yasuda et al. |
| 8,883,351 B2 | 11/2014 | Todoriki et al. |
| 8,906,547 B2 | 12/2014 | Taniguchi et al. |
| 8,927,148 B2 | 1/2015 | Kawakami |
| 8,945,770 B2 | 2/2015 | Koo et al. |
| 8,945,772 B2 | 2/2015 | Kawakami et al. |
| 8,951,448 B2 | 2/2015 | Toyama et al. |
| 9,105,926 B2 | 8/2015 | Fujiki et al. |
| 9,225,003 B2 | 12/2015 | Yukawa |
| 9,227,850 B2 | 1/2016 | Ooishi |
| 9,293,236 B2 | 3/2016 | Kawakami et al. |
| 9,362,557 B2 | 6/2016 | Watanabe et al. |
| 9,385,366 B2 | 7/2016 | Yamakaji et al. |
| 9,391,322 B2 | 7/2016 | Liu et al. |
| 9,478,796 B2 | 10/2016 | Li et al. |
| 9,505,631 B2 | 11/2016 | Masukuni et al. |
| 9,515,313 B2 | 12/2016 | Umeyama et al. |
| 9,586,834 B2 | 3/2017 | Yamamoto et al. |
| 9,614,225 B2 | 4/2017 | Park |
| 9,666,326 B2 | 5/2017 | Kawakami et al. |
| 9,698,420 B2 | 7/2017 | Ishizaki et al. |
| 9,774,034 B2 | 9/2017 | Kawakami et al. |
| 9,786,903 B2 | 10/2017 | Ryu et al. |
| 9,812,709 B2 | 11/2017 | Endoh et al. |
| 9,859,550 B2 | 1/2018 | Blangero et al. |
| 9,871,246 B2 | 1/2018 | Kim et al. |
| 9,899,664 B2 | 2/2018 | Yamaki et al. |
| 9,923,244 B2 | 3/2018 | Takanashi et al. |

(56) References Cited

U.S. PATENT DOCUMENTS

| | | |
|---|---|---|
| 9,929,402 B2 | 3/2018 | Kawakami |
| 9,954,221 B2 | 4/2018 | Cho et al. |
| 10,128,495 B2 | 11/2018 | Satow et al. |
| 10,141,567 B2 | 11/2018 | Choi et al. |
| 10,243,215 B2 | 3/2019 | Shitaba et al. |
| 10,361,432 B2 | 7/2019 | Takaichi et al. |
| 10,454,102 B2 | 10/2019 | Ikenuma et al. |
| 10,559,810 B2 | 2/2020 | Yanagihara et al. |
| 10,777,815 B2 | 9/2020 | Kanada et al. |
| 10,903,486 B2 | 1/2021 | Choi et al. |
| 2001/0010807 A1 | 8/2001 | Matsubara |
| 2002/0102459 A1 | 8/2002 | Hosoya et al. |
| 2002/0110736 A1 | 8/2002 | Kweon et al. |
| 2002/0164156 A1 | 11/2002 | Bilbrey |
| 2002/0195591 A1 | 12/2002 | Ravet et al. |
| 2003/0104279 A1 | 6/2003 | Miyazaki et al. |
| 2003/0108790 A1 | 6/2003 | Manthiram et al. |
| 2003/0134186 A1 | 7/2003 | Shizuki |
| 2004/0142241 A1 | 7/2004 | Nagayama |
| 2004/0229123 A1 | 11/2004 | Takahashi et al. |
| 2004/0229124 A1 | 11/2004 | Miyamoto et al. |
| 2004/0234857 A1 | 11/2004 | Shiozaki et al. |
| 2005/0019662 A1 | 1/2005 | Suhara et al. |
| 2005/0026040 A1 | 2/2005 | Thackeray et al. |
| 2006/0051671 A1 | 3/2006 | Thackeray et al. |
| 2006/0051673 A1 | 3/2006 | Johnson et al. |
| 2006/0068289 A1 | 3/2006 | Paulsen et al. |
| 2006/0121352 A1 | 6/2006 | Kejha et al. |
| 2006/0188780 A1 | 8/2006 | Fujii et al. |
| 2006/0210879 A1 | 9/2006 | Kawasato et al. |
| 2006/0263690 A1 | 11/2006 | Suhara et al. |
| 2006/0275664 A1 | 12/2006 | Ohzuku et al. |
| 2006/0286459 A1 | 12/2006 | Zhao et al. |
| 2007/0026315 A1 | 2/2007 | Lampe-Onnerud et al. |
| 2007/0099086 A1 | 5/2007 | Kang et al. |
| 2007/0117014 A1 | 5/2007 | Saito et al. |
| 2007/0122712 A1 | 5/2007 | Kang et al. |
| 2007/0148546 A1 | 6/2007 | Shimizu et al. |
| 2007/0160906 A1 | 7/2007 | Tooyama et al. |
| 2007/0212609 A1 | 9/2007 | Iwami |
| 2007/0224506 A1 | 9/2007 | Ooyama et al. |
| 2008/0003504 A1 | 1/2008 | Cho et al. |
| 2008/0131780 A1 | 6/2008 | Kawasato et al. |
| 2008/0166637 A1 | 7/2008 | Inagaki et al. |
| 2008/0241693 A1 | 10/2008 | Fukuchi et al. |
| 2009/0011335 A1 | 1/2009 | Takeda et al. |
| 2009/0017383 A1 | 1/2009 | Suhara et al. |
| 2009/0081547 A1 | 3/2009 | Nakura |
| 2009/0087731 A1 | 4/2009 | Fukui et al. |
| 2009/0104532 A1 | 4/2009 | Hosoya |
| 2009/0123813 A1 | 5/2009 | Chiang et al. |
| 2009/0123842 A1 | 5/2009 | Thackeray et al. |
| 2009/0220862 A1 | 9/2009 | Toyama et al. |
| 2010/0019194 A1 | 1/2010 | Fujiwara et al. |
| 2010/0035147 A1 | 2/2010 | Kotato et al. |
| 2010/0086854 A1 | 4/2010 | Kumar et al. |
| 2010/0129714 A1 | 5/2010 | Toyama et al. |
| 2010/0129715 A1 | 5/2010 | Saito et al. |
| 2010/0143784 A1 | 6/2010 | Johnson et al. |
| 2010/0143799 A1 | 6/2010 | Park |
| 2010/0159330 A1 | 6/2010 | Sugiura et al. |
| 2010/0178464 A1 | 7/2010 | Choi et al. |
| 2010/0193730 A1 | 8/2010 | Yamamura |
| 2010/0216024 A1 | 8/2010 | Kanno et al. |
| 2010/0233542 A1 | 9/2010 | Endo et al. |
| 2010/0247986 A1 | 9/2010 | Toyama et al. |
| 2010/0248033 A1 | 9/2010 | Kumar et al. |
| 2010/0294985 A1 | 11/2010 | Suhara et al. |
| 2011/0020708 A1 | 1/2011 | Fujiki et al. |
| 2011/0033749 A1 | 2/2011 | Uchida et al. |
| 2011/0059367 A1 | 3/2011 | Morita et al. |
| 2011/0076564 A1 | 3/2011 | Yu et al. |
| 2011/0200879 A1 | 8/2011 | Saito et al. |
| 2011/0229757 A1 | 9/2011 | Kawakami et al. |
| 2011/0256437 A1 | 10/2011 | Katsuki et al. |
| 2011/0269023 A1 | 11/2011 | Kawakami et al. |
| 2011/0297876 A1 | 12/2011 | Masukuni et al. |
| 2011/0300441 A1 | 12/2011 | Kawakami |
| 2012/0034516 A1 | 2/2012 | Koo et al. |
| 2012/0034527 A1 | 2/2012 | Yao et al. |
| 2012/0045692 A1 | 2/2012 | Takemura et al. |
| 2012/0058397 A1 | 3/2012 | Zhamu et al. |
| 2012/0064406 A1 | 3/2012 | Sato et al. |
| 2012/0064409 A1 | 3/2012 | Zhamu et al. |
| 2012/0088151 A1 | 4/2012 | Yamazaki et al. |
| 2012/0088156 A1 | 4/2012 | Nomoto et al. |
| 2012/0118149 A1 | 5/2012 | Dabrowski et al. |
| 2012/0129019 A1 | 5/2012 | Onnerud et al. |
| 2012/0244430 A1 | 9/2012 | Yamazaki et al. |
| 2012/0256337 A1 | 10/2012 | Yokoyama et al. |
| 2012/0258358 A1 | 10/2012 | Yura et al. |
| 2012/0258365 A1 | 10/2012 | Yokoyama et al. |
| 2012/0258369 A1 | 10/2012 | Yokoyama et al. |
| 2012/0261622 A1 | 10/2012 | Honma |
| 2012/0295163 A1 | 11/2012 | Yanagita et al. |
| 2012/0308891 A1 | 12/2012 | Todoriki et al. |
| 2012/0315544 A1 | 12/2012 | Yasuda et al. |
| 2012/0328951 A1 | 12/2012 | Hirohashi et al. |
| 2012/0328956 A1 | 12/2012 | Oguni et al. |
| 2012/0330044 A1 | 12/2012 | Hou |
| 2013/0017435 A1 | 1/2013 | Sato et al. |
| 2013/0040193 A1 | 2/2013 | Tsuchida et al. |
| 2013/0045418 A1 | 2/2013 | Oguni et al. |
| 2013/0052534 A1 | 2/2013 | Fujiki et al. |
| 2013/0052547 A1 | 2/2013 | Ogino et al. |
| 2013/0065120 A1 | 3/2013 | Miwa et al. |
| 2013/0078516 A1 | 3/2013 | Taniguchi et al. |
| 2013/0084384 A1 | 4/2013 | Yamakaji |
| 2013/0089786 A1 | 4/2013 | Jeong et al. |
| 2013/0130103 A1 | 5/2013 | Kim et al. |
| 2013/0134051 A1 | 5/2013 | Takahashi et al. |
| 2013/0156683 A1 | 6/2013 | Holzapfel et al. |
| 2013/0156942 A1 | 6/2013 | Yamakaji et al. |
| 2013/0157034 A1 | 6/2013 | Choi et al. |
| 2013/0164619 A1 | 6/2013 | Yamakaji et al. |
| 2013/0177806 A1 | 7/2013 | Caldwell et al. |
| 2013/0183579 A1 | 7/2013 | Kim et al. |
| 2013/0189585 A1 | 7/2013 | Kang et al. |
| 2013/0190449 A1 | 7/2013 | Kinloch et al. |
| 2013/0202953 A1 | 8/2013 | Sharma et al. |
| 2013/0212879 A1 | 8/2013 | Ogino |
| 2013/0230770 A1 | 9/2013 | Oya et al. |
| 2013/0236785 A1 | 9/2013 | Zhou et al. |
| 2013/0266858 A1 | 10/2013 | Inoue et al. |
| 2013/0266859 A1 | 10/2013 | Todoriki et al. |
| 2013/0309576 A1 | 11/2013 | Ogata et al. |
| 2013/0313471 A1 | 11/2013 | Endo et al. |
| 2013/0316237 A1 | 11/2013 | Miki |
| 2013/0337320 A1 | 12/2013 | Yukawa |
| 2014/0004412 A1 | 1/2014 | Ogino |
| 2014/0023920 A1 | 1/2014 | Yamazaki et al. |
| 2014/0079995 A1 | 3/2014 | Wakada |
| 2014/0099554 A1 | 4/2014 | Inoue et al. |
| 2014/0127567 A1 | 5/2014 | Kuriki et al. |
| 2014/0127568 A1 | 5/2014 | Kawakami et al. |
| 2014/0131633 A1 | 5/2014 | Ito et al. |
| 2014/0162132 A1 | 6/2014 | Ishii et al. |
| 2014/0166946 A1 | 6/2014 | Miwa et al. |
| 2014/0184172 A1 | 7/2014 | Momo et al. |
| 2014/0212759 A1 | 7/2014 | Blangero et al. |
| 2014/0234700 A1 | 8/2014 | Moriwaka et al. |
| 2014/0242463 A1 | 8/2014 | Song et al. |
| 2014/0295068 A1 | 10/2014 | Nanba et al. |
| 2014/0332715 A1 | 11/2014 | Kawakami et al. |
| 2014/0335415 A1 | 11/2014 | Tamaki et al. |
| 2014/0370184 A1 | 12/2014 | Takemura et al. |
| 2015/0014581 A1 | 1/2015 | Kawakami et al. |
| 2015/0014605 A1 | 1/2015 | Kawakami et al. |
| 2015/0044556 A1 | 2/2015 | Wang et al. |
| 2015/0064565 A1 | 3/2015 | Todoriki et al. |
| 2015/0093648 A1 | 4/2015 | Son et al. |
| 2015/0099178 A1 | 4/2015 | Kawakami et al. |
| 2015/0099179 A1 | 4/2015 | Ikenuma et al. |
| 2015/0123050 A1 | 5/2015 | Yamazaki et al. |

(56) References Cited

U.S. PATENT DOCUMENTS

| | | | |
|---|---|---|---|
| 2015/0155556 A1 | 6/2015 | Kawakami et al. |
| 2015/0166348 A1 | 6/2015 | Ikenuma et al. |
| 2015/0262762 A1 | 9/2015 | Ikenuma et al. |
| 2015/0280239 A1 | 10/2015 | Hellring et al. |
| 2015/0325855 A1 | 11/2015 | Kawakami et al. |
| 2015/0333320 A1 | 11/2015 | Tamaki et al. |
| 2015/0333324 A1 | 11/2015 | Umeyama et al. |
| 2015/0357641 A1 | 12/2015 | Sugie et al. |
| 2015/0380737 A1 | 12/2015 | Kawasato et al. |
| 2016/0006032 A1 | 1/2016 | Paulsen et al. |
| 2016/0013478 A1* | 1/2016 | Satow ............... H01M 4/364 |
| | | | 429/223 |
| 2016/0028080 A1 | 1/2016 | Sugiura |
| 2016/0056469 A1 | 2/2016 | Kawakita et al. |
| 2016/0064726 A1 | 3/2016 | Ikenuma et al. |
| 2016/0087315 A1 | 3/2016 | Oyama |
| 2016/0099469 A1 | 4/2016 | Paulsen et al. |
| 2016/0104880 A1 | 4/2016 | Gao et al. |
| 2016/0118646 A1 | 4/2016 | Ikenuma |
| 2016/0118658 A1 | 4/2016 | Kawakami et al. |
| 2016/0118666 A1 | 4/2016 | Ikenuma et al. |
| 2016/0156012 A1 | 6/2016 | Takahashi et al. |
| 2016/0156030 A1 | 6/2016 | Sun et al. |
| 2016/0164089 A1 | 6/2016 | Kawakami et al. |
| 2016/0268601 A1 | 9/2016 | Paulsen et al. |
| 2016/0276658 A1 | 9/2016 | Choi et al. |
| 2016/0276659 A1 | 9/2016 | Choi et al. |
| 2016/0285102 A1 | 9/2016 | Shitaba et al. |
| 2016/0329533 A1 | 11/2016 | Tajima |
| 2016/0336595 A1 | 11/2016 | Choi et al. |
| 2016/0349905 A1 | 12/2016 | Momma et al. |
| 2016/0380271 A1 | 12/2016 | Ochiai et al. |
| 2017/0005364 A1 | 1/2017 | Yamazaki et al. |
| 2017/0018767 A1 | 1/2017 | Park et al. |
| 2017/0018768 A1 | 1/2017 | Yushin et al. |
| 2017/0018772 A1 | 1/2017 | Satow et al. |
| 2017/0040594 A1 | 2/2017 | Yamaki et al. |
| 2017/0062819 A1 | 3/2017 | Ikenuma |
| 2017/0069907 A1 | 3/2017 | Zhu et al. |
| 2017/0117589 A1 | 4/2017 | Tajima et al. |
| 2017/0187035 A1 | 6/2017 | Yanagihara et al. |
| 2017/0207444 A1 | 7/2017 | Yanagihara et al. |
| 2017/0256817 A1 | 9/2017 | Kadoma et al. |
| 2017/0309910 A1 | 10/2017 | Jo et al. |
| 2018/0019462 A1 | 1/2018 | Kadoma et al. |
| 2018/0034045 A1 | 2/2018 | Xia et al. |
| 2018/0040888 A1 | 2/2018 | Park et al. |
| 2018/0040897 A1 | 2/2018 | Park et al. |
| 2018/0076489 A1 | 3/2018 | Mikami et al. |
| 2018/0102536 A1 | 4/2018 | Kawakami et al. |
| 2018/0108944 A1 | 4/2018 | Yamakaji |
| 2018/0145317 A1 | 5/2018 | Momma et al. |
| 2018/0145368 A1 | 5/2018 | Ochiai et al. |
| 2018/0190976 A1 | 7/2018 | Blangero et al. |
| 2018/0254477 A1 | 9/2018 | Horikawa et al. |
| 2018/0366729 A1 | 12/2018 | Yanagita et al. |
| 2020/0144601 A1 | 5/2020 | Takahashi et al. |
| 2020/0152961 A1 | 5/2020 | Momma et al. |
| 2020/0176770 A1 | 6/2020 | Takahashi et al. |

FOREIGN PATENT DOCUMENTS

| | | |
|---|---|---|
| CN | 101208269 A | 6/2008 |
| CN | 101675547 A | 3/2010 |
| CN | 102210045 A | 10/2011 |
| CN | 102339998 A | 2/2012 |
| CN | 102376949 A | 3/2012 |
| CN | 102447107 A | 5/2012 |
| CN | 102569775 A | 7/2012 |
| CN | 102610806 A | 7/2012 |
| CN | 102623694 A | 8/2012 |
| CN | 102694201 A | 9/2012 |
| CN | 102779976 A | 11/2012 |
| CN | 102918686 A | 2/2013 |
| CN | 103022502 A | 4/2013 |
| CN | 103189316 A | 7/2013 |
| CN | 103460456 A | 12/2013 |
| CN | 103490060 A | 1/2014 |
| CN | 103594683 A | 2/2014 |
| CN | 103606674 A | 2/2014 |
| CN | 102610806 B | 11/2014 |
| CN | 104319364 A | 1/2015 |
| CN | 104393282 A | 3/2015 |
| CN | 104505500 A | 4/2015 |
| CN | 104701534 A | 6/2015 |
| CN | 105024047 A | 11/2015 |
| CN | 105024047 A * | 11/2015 |
| CN | 105470517 A | 4/2016 |
| CN | 105594028 A | 5/2016 |
| CN | 106025212 A | 10/2016 |
| CN | 106099098 A | 11/2016 |
| CN | 102569775 B | 1/2017 |
| EP | 0638625 A | 2/1995 |
| EP | 1195825 A | 4/2002 |
| EP | 2352190 A | 8/2011 |
| EP | 2693535 A | 2/2014 |
| EP | 2763218 A | 8/2014 |
| JP | 05-314965 A | 11/1993 |
| JP | 05-314995 A | 11/1993 |
| JP | 07-316551 A | 12/1995 |
| JP | 08-037007 A | 2/1996 |
| JP | 08-100107 A | 4/1996 |
| JP | 08-236114 A | 9/1996 |
| JP | 11-025983 A | 1/1999 |
| JP | 11-096993 A | 4/1999 |
| JP | 3031546 | 4/2000 |
| JP | 2000-203842 A | 7/2000 |
| JP | 3172388 | 6/2001 |
| JP | 2001-319692 A | 11/2001 |
| JP | 2002-164053 A | 6/2002 |
| JP | 2002-216760 A | 8/2002 |
| JP | 2002-352802 A | 12/2002 |
| JP | 2003-068306 A | 3/2003 |
| JP | 2003-221235 A | 8/2003 |
| JP | 2003-331824 A | 11/2003 |
| JP | 2004-014381 A | 1/2004 |
| JP | 2004-103566 A | 4/2004 |
| JP | 2004-196604 A | 7/2004 |
| JP | 2004-288579 A | 10/2004 |
| JP | 2004-342554 A | 12/2004 |
| JP | 2005-158612 A | 6/2005 |
| JP | 2005-225734 A | 8/2005 |
| JP | 2005-302510 A | 10/2005 |
| JP | 2005-332629 A | 12/2005 |
| JP | 2006-164758 A | 6/2006 |
| JP | 2006-261132 A | 9/2006 |
| JP | 2006-318928 A | 11/2006 |
| JP | 2006-318929 A | 11/2006 |
| JP | 2007-066745 A | 3/2007 |
| JP | 2007-128714 A | 5/2007 |
| JP | 2007-213866 A | 8/2007 |
| JP | 3959333 | 8/2007 |
| JP | 2007-258095 A | 10/2007 |
| JP | 2008-060033 A | 3/2008 |
| JP | 2008-166156 A | 7/2008 |
| JP | 2009-179501 A | 8/2009 |
| JP | 2010-080407 A | 4/2010 |
| JP | 2010-102895 A | 5/2010 |
| JP | 2010-244847 A | 10/2010 |
| JP | 2010-272239 A | 12/2010 |
| JP | 2011-082133 A | 4/2011 |
| JP | 2011-138718 A | 7/2011 |
| JP | 4739780 | 8/2011 |
| JP | 2011-181527 A | 9/2011 |
| JP | 2011-210694 A | 10/2011 |
| JP | 2012-018914 A | 1/2012 |
| JP | 2012-043794 A | 3/2012 |
| JP | 2012-066944 A | 4/2012 |
| JP | 2012-074366 A | 4/2012 |
| JP | 2012-084257 A | 4/2012 |
| JP | 2012-508444 | 4/2012 |
| JP | 2012-169217 A | 9/2012 |
| JP | 2012-209077 A | 10/2012 |

(56) References Cited

FOREIGN PATENT DOCUMENTS

| | | |
|---|---|---|
| JP | 2013-012410 A | 1/2013 |
| JP | 2013-062082 A | 4/2013 |
| JP | 2013-087040 A | 5/2013 |
| JP | 2013-091581 A | 5/2013 |
| JP | 2013-100197 A | 5/2013 |
| JP | 2013-246936 A | 12/2013 |
| JP | 2014-049239 A | 3/2014 |
| JP | 2014-063707 A | 4/2014 |
| JP | 2014-063708 A | 4/2014 |
| JP | 2014-116111 A | 6/2014 |
| JP | 2015-069958 A | 4/2015 |
| JP | 2015-082374 A | 4/2015 |
| JP | 2015-088450 A | 5/2015 |
| JP | 2015-099722 A | 5/2015 |
| JP | 2015-156363 A | 8/2015 |
| JP | 2015-527707 | 9/2015 |
| JP | 2015-201432 A | 11/2015 |
| JP | 2016-033902 A | 3/2016 |
| JP | 2016-506596 | 3/2016 |
| JP | 2016-054151 A | 4/2016 |
| JP | 2016-076454 A | 5/2016 |
| JP | 2017-021942 A | 1/2017 |
| JP | 2017-091777 A | 5/2017 |
| JP | 2018-092934 A | 6/2018 |
| JP | 2018-147726 A | 9/2018 |
| KR | 2002-0087627 A | 11/2002 |
| KR | 10-0696619 | 3/2007 |
| KR | 2008-0024105 A | 3/2008 |
| KR | 2009-0086440 A | 8/2009 |
| KR | 2009-0111130 A | 10/2009 |
| KR | 10-0944137 | 2/2010 |
| KR | 2010-0052419 A | 5/2010 |
| KR | 2011-0134852 A | 12/2011 |
| KR | 2013-0033154 A | 4/2013 |
| KR | 2014-0125856 A | 10/2014 |
| KR | 2015-0062724 A | 6/2015 |
| KR | 2015-0063955 A | 6/2015 |
| KR | 2015-0063956 A | 6/2015 |
| KR | 2015-0110318 A | 10/2015 |
| KR | 2016-0043939 A | 4/2016 |
| KR | 2016-0092946 A | 8/2016 |
| KR | 2016-0128978 A | 11/2016 |
| TW | 201528595 | 7/2015 |
| WO | WO-2007/052712 | 5/2007 |
| WO | WO-2009/057722 | 5/2009 |
| WO | WO-2010/053328 | 5/2010 |
| WO | WO-2011/141486 | 11/2011 |
| WO | WO-2011/152183 | 12/2011 |
| WO | WO-2011/155781 | 12/2011 |
| WO | WO-2012/005180 | 1/2012 |
| WO | WO-2012/029729 | 3/2012 |
| WO | WO-2012/029730 | 3/2012 |
| WO | WO-2012/124242 | 9/2012 |
| WO | WO-2012/132387 | 10/2012 |
| WO | WO-2014/015139 | 1/2014 |
| WO | WO-2014/061653 | 4/2014 |
| WO | WO-2014/091331 | 6/2014 |
| WO | WO-2014/098238 | 6/2014 |
| WO | WO-2015/050176 | 4/2015 |
| WO | WO-2015/079372 | 6/2015 |
| WO | WO-2015/083901 | 6/2015 |
| WO | WO-2015/136881 | 9/2015 |
| WO | WO-2015/136892 | 9/2015 |
| WO | WO-2015/141948 | 9/2015 |
| WO | WO-2015/163356 | 10/2015 |
| WO | WO-2016/017077 | 2/2016 |
| WO | WO-2016/017079 | 2/2016 |
| WO | WO-2016/103127 | 6/2016 |
| WO | WO-2018/211375 | 11/2018 |

OTHER PUBLICATIONS

Wu et al., Solvothermal coating LiNi0.8Co0.15Al0.05O2 microspheres with nanoscale Li2TiO3 shell for long lifespan Li-ion battery cathode materials, Apr. 2016, Journal of Alloys and Compounds, 665, 48-56 (Year: 2016).*

Katsuno.H et al., "Growth modes in two-dimensional heteroepitaxy on an elasticsubstrate", J. Cryst. Growth (Journal of Crystal Growth), Feb. 15, 2005, vol. 275, No. 1-2, pp. e283-e288, Elsevier.

Taguchi.N et al., "Characterization of MgO-coated-LiCoO2 particles by analytical transmission electron microscopy", Journal of Power Sources, 2016, vol. 328, pp. 161-166, Elsevier.

Thackeray.M et al., "Li2MnO3-stabilized LiMO2(M=Mn, Ni, Co) electrodes for lithium-ion batteries", J. Mater. Chem. (Journal of Materials Chemistry), 2007, vol. 17, pp. 3112-3125.

Berbenni.V et al., "Thermogravimetry and X-Ray Diffraction Study of the Thermal Decomposition Processes in Li2CO3—MnCO3 Mixtures", Journal of Analytical and Applied Pyrolysis, 2002, vol. 62, pp. 45-62.

Johnson.C et al., "Lithium-manganese oxide electrodes with layered-spinel composite structures xLi2MnO3 • (1-x)Li1+yMn2-yO4(0<x<1,0≤y≤0.33) for lithium batteries", Electrochemistry Communications, May 1, 2005, vol. 7, No. 5, pp. 528-536, Elsevier.

Khedr.A et al., "Synthesis, Structure, and Electrochemistry of Sm-Modified LiMn2O4 Cathode Materials for Lithium-Ion Batteries", J. Electron. Mater.(Journal of Electronic Materials), Apr. 23, 2013, vol. 42, No. 6, pp. 1275-1281.

Lee.S et al., "Antiferromagnetic ordering in Li2MnO3 single crystals with a two-dimensional honeycomb lattice", Journal of Physics: Condensed Matter, Nov. 14, 2012, vol. 24, No. 45, pp. 456004-1-456004-9.

Mukai.K et al., "Magnetic properties of the chemically delithiated LixMn2O4 with 0.07≤x≤1", Journal of Solid State Chemistry, May 1, 2011, vol. 184, No. 5, pp. 1096-1104.

Wang.Z et al., "EELS analysis of cation valence states and oxygen vacancies in magnetic oxides", Micron, Oct. 1, 2000, vol. 31, No. 5, pp. 571-580, Elsevier.

Tan.H et al., "Oxidation state and chemical shift investigation in transition metal oxides by EELS", Ultramicroscopy, May 1, 2012, vol. 116, pp. 24-33, Elsevier.

McCalla.E et al., "The spinel and cubic rocksalt solid-solutions in the Li—Mn—Ni oxide pseudo-ternary system", Solid State Ionics, May 2, 2013, vol. 242, pp. 1-9, Elsevier.

Dreyer.D et al., "The Chemistry of Graphene Oxide", Chemical Society Reviews, Nov. 3, 2009, vol. 39, No. 1, pp. 228-240.

International Search Report (Application No. PCT/IB2017/053896) dated Oct. 3, 2017.

Written Opinion (Application No. PCT/IB2017/053896) dated Oct. 3, 2017.

Sun.Y et al., "High-energy cathode material for long-life and safe lithium batteries", Nature Materials, Mar. 22, 2009, vol. 8, pp. 320-324.

Joshi.T et al., "Effects of Dissolved Transition Metals on the Electrochemical Performance and SEI Growth in Lithium-Ion Batteries", J. Electrochem. Soc. (Journal of the Electrochemical Society), 2014, vol. 161, No. 12, pp. A1915-A1921.

Chung.K et al., "Structural Studies on the Effects of ZrO2 Coating on LiCoO2 during Cycling Using In Situ X-Ray Diffraction Technique", J. Electrochem. Soc. (Journal of the Electrochemical Society), 2006, vol. 153, No. 11, pp. A2152-A2157.

Liu.L et al., "Electrochemical and In Situ Synchrotron XRD Studies on Al2O3-Coated LiCoO2 Cathode Material", J. Electrochem. Soc. (Journal of the Electrochemical Society), 2004, vol. 151, No. 9, pp. A1344-A1351.

Yano.A et al., "LiCoO2 Degradation Behavior in the High-Voltage Phase Transition Region and Improved Reversibility with Surface Coating", J. Electrochem. Soc. (Journal of the Electrochemical Society), 2017, vol. 164, No. 1, pp. A6116-A6122.

Chen.Z et al., "Staging Phase Transitions in LixCoO2", J. Electrochem. Soc. (Journal of the Electrochemical Society), 2002, vol. 149, No. 12, pp. A1604-A1609.

Shim.J et al., "Characterization of Spinel LixCo2O4-Coated LiCoO2 Prepared with Post-Thermal Treatment as a Cathode Material for Lithium Ion Batteries", Chem. Mater. (Chemistry of Materials), Apr. 10, 2015, vol. 27, No. 9, pp. 3273-3279.

(56) References Cited

OTHER PUBLICATIONS

Okumura.T et al., "Correlation of lithium ion distribution and X-ray absorption near-edge structure in O3- and O2-lithium cobalt oxides from first-principle calculation", Journal of Materials Chemistry, 2012, vol. 22, pp. 17340-17348.

Motohashi.T et al., "Electronic phase diagram of the layered cobalt oxide system LixCoO2 ($0.0 \leq x \leq 1.0$)", Phys. Rev. B (Physical Review. B), Oct. 9, 2009, vol. 80, No. 16, pp. 165114-1-165114-9.

Gabrisch.H et al., "Hexagonal to Cubic Spinel Transformation in Lithiated Cobalt Oxide TEM Investigation", J. Electrochem. Soc. (Journal of the Electrochemical Society), 2004, vol. 151, No. 6, pp. A891-A897.

Counts.W et al., "Fluoride Model Systems: II, The Binary Systems CaF2—BeF2, MgF2—BeF2, and LiF—MgF2", J. Am. Ceram. Soc. (Journal of the American Ceramic Society), 1953, vol. 36, No. 1, pp. 12-17.

Liu.A et al., "Synthesis of Mg and Mn Doped LiCoO2 and Effects on High Voltage Cycling", J. Electrochem. Soc. (Journal of the Electrochemical Society), Jun. 2, 2017, vol. 164, No. 7, pp. A1655-A1664.

Tukamoto.H et al., "Electronic Conductivity of LiCoO2 and Its Enhancement by Magnesium Doping", J. Electrochem. Soc. (Journal of the Electrochemical Society), Sep. 1, 1997, vol. 144, No. 9, pp. 3164-3168.

Ohzuku.T et al., "Solid-State Redox Reactions of LiCoO2 (R-3m) for 4 Volt Secondary Lithium Cells", J. Electrochem. Soc. (Journal of the Electrochemical Society), Nov. 1, 1994, vol. 141, No. 11, pp. 2972-2977.

Amatucci.G et al., "CoO2, The End Member of the LixCoO2 Solid Solution", J. Electrochem. Soc. (Journal of the Electrochemical Society), Mar. 1, 1996, vol. 143, No. 3, pp. 1114-1123.

Wang.Z et al., "Structural and electrochemical characterizations of surface-modified LiCoO2 cathode materials for Li-ion batteries", Solid State Ionics, Jun. 2, 2002, vol. 148, No. 3-4, pp. 335-342, Elsevier.

Zou.M et al., "Synthesis and Electrochemical Performance of High Voltage Cycling LiM0.05Co0.95O2 as Cathode Material for Lithium Rechargeable Cells", Electrochemical and Solid-State Letters, 2004, vol. 7, No. 7, pp. A176-A179.

Wang.Z et al., "Improving the cycling stability of LiCoO2 at 4.5 V through co-modification by Mg doping and zirconium oxyfluoride coating", Ceramics Internationa, 2015, vol. 41, No. 1, pp. 469-474.

Cho.Y et al., "High Performance LiCoO2 Cathode Materials at 60° C. for Lithium Secondary Batteries Prepared by the Facile Nanoscale Dry-Coating Method", J. Electrochem. Soc. (Journal of the Electrochemical Society), 2010, vol. 157, No. 5, pp. A617-A624.

Wang.Z et al., "Mg doping and zirconium oxyfluoride coating co-modification to enhance the high-voltage performance of LiCoO2 for lithium ion battery", Journal of Alloys and Compounds, Feb. 5, 2015, vol. 621, pp. 212-219.

Mladenov.M et al., "Effect of Mg doping and MgO-surface modification on the cycling stability of LiCoO2 electrodes.", Electrochemistry Communications, Aug. 1, 2001, vol. 3, No. 8, pp. 410-416.

Kweon.H et al., "Effects of metal oxide coatings on the thermal stability and electrical performance of LiCoCO2 in a Li-ion cell", Journal of Power Sources, Feb. 16, 2004, vol. 126, pp. 156-162, Elsevier.

Shim.J et al., "Effects of MgO Coating on the Structural and Electrochemical Characteristics of LiCoO2 as Cathode Materials for Lithium Ion Battery", Chem. Mater. (Chemistry of Materials), Mar. 24, 2014, vol. 26, No. 8, pp. 2537-2543.

Zhao.H et al., "Improvement of electrochemical stability of LiCoO2 cathode by a nano-crystalline coating", Journal of Power Sources, May 20, 2004, vol. 132, pp. 195-200, Elsevier.

Iriyama.Y et al., "Effects of surface modification by MgO on interfacial reactions of lithium cobalt oxide thin film electrode", Journal of Power Sources, Oct. 5, 2004, vol. 137, pp. 111-116, Elsevier.

Shim.J et al., "Effects of MgO Coating on the Structural and Electrochemical Characteristics of LiCoO2 as Cathode Materials for Lithium Ion Battery", Chem. Mater. (Chemistry of Materials), [e.g. ), Suppor] Supporting Information, Mar. 24, 2014, vol. 26, No. 8, pp. 31-33.

Orikasa.Y et al., "Origin of Surface Coating Effect for MgO on LiCoO2 to Improve the Interfacial Reaction between Electrode and Electrolyte", Adv. Mater.Interfaces (Advanced Materials Interfaces), Aug. 28, 2014, vol. 1, No. 9, pp. 1400195-1-1400195-8.

Yamamoto.K et al., "Stabilization of the Electronic Structure at the Cathode/Electrolyte Interface via MgO Ultra-thin Layer during Lithium-ions Insertion/Extraction", Electrochemistry, Oct. 5, 2014, vol. 82, No. 10, pp. 891-896.

Shim.J et al., "Synergistic effects of coating and doping for lithium ion battery cathode materials: synthesis and characterization of lithium titanate-coated LiCoO2 with Mg doping", Electrochimica Acta, Dec. 20, 2015, vol. 186, pp. 201-208, Elsevier.

Yamamoto.K et al., "in situ Total-Reflection Fluorescence X-Ray Absorption Spectroscopic Study on Stability at LiFePO4 / Elecrtrolyte Interface", 224th ECS Meeting Abstract, Oct. 27, 2013, p. 923.

Wang.Z et al., "Electrochemical Evaluation and Structural Characterization of Commercial LiCoO2 Surfaces Modified with MgO for Lithium-Ion Batteries", J. Electrochem. Soc. (Journal of the Electrochemical Society), Mar. 4, 2002, vol. 149, No. 4, pp. A466-A471.

Lee.Y et al., "Phase Transition of Bare and Coated LixCoO2 (x=0.4 and 0.24) at 300° C.", J. Electrochem. Soc. (Journal of the Electrochemical Society), Jul. 28, 2005, vol. 152, No. 9, pp. A1824-A1827.

Geder.J et al., "Impact of active material surface area on thermal stability of LiCoO2 cathode", Journal of Power Sources, Jul. 1, 2014, vol. 257, pp. 286-292, Elsevier.

Benecke.M et al., "Effect of LiF on Hot-Pressing of MgO", J. Am. Ceram. Soc. (Journal of the American Ceramic Society), Jul. 1, 1967, vol. 50, No. 7, pp. 365-368.

Hart.P et al., "Densification Mechanisms in Hot-Pressing of Magnesia with a Fugitive Liquid", J. Am. Ceram. Soc. (Journal of the American Ceramic Society), Feb. 1, 1970, vol. 53, No. 2, pp. 83-86.

Belsky.A et al., "New developments in the Inorganic Crystal Structure Database (ICSD): Accessibility in support of materials research and design.", Acta. Cryst.(Acta Crystallographica Section B), Jun. 1, 2002, vol. B58, No. 3, pp. 364-369.

Alcantara.R et al., "SPES, 6Li MAS NMR, and Ni3+ EPR evidence for the formation of Co2+-containing spinel phases in LiCoO2 cycled electrode materials", Journal of Electroanalytical Chemistry, Aug. 28, 1998, vol. 454, No. 1-2, pp. 173-181.

Shi.S et al., "Enhanced cycling stability of Li[Li 0.2Mn0.54Ni0.13Co0.13]O2 by surface modification of MgO with melting impregnation method", Electrochimica Acta, Nov. 1, 2012, vol. 88, pp. 671-679.

Antaya.M et al., "Preparation and Characterization of LiCoO2 Thin Films by Laser Ablation Deposition", J. Electrochem. Soc. (Journal of the Electrochemical Society), Mar. 1, 1993, vol. 140, No. 3, pp. 575-578.

Koyama.Y et al., "Co K-edge XANES of LiCoO2 and CoO2 with a variety of structures by supercell density functional calculations with a core hole", Phys. Rev. B (Physical Review. B), Feb. 27, 2012, vol. 85, No. 7, pp. 075129-1-075129-7.

Quinlan.R et al., "XPS Investigation of the Electrolyte Induced Stabilization of LiCoO2 and "AlPO4"-Coated LiCoO2 Composite Electrodes", J. Electrochem. Soc. (Journal of the Electrochemical Society), Dec. 3, 2015, vol. 163, No. 2, pp. A300-A308.

Cho.J et al., "Comparison of Al2O3- and AlPO4-coated LiCoO2 cathode materials for a Li-ion cell", Journal of Power Sources, 2005, vol. 146, pp. 58-64, Elsevier.

Jin.Y et al., "Electrochemical Characterizations of Commercial LiCoO2 Powders with Surface Modified by Li3PO4 Nanoparticles", Electrochemical and Solid-State Letters, Apr. 3, 2006, vol. 9, No. 6, pp. A273-A276.

Hong.W et al., "Modification of LiCoO2 by Surface Coating with MgO/TiO2/SiO2 for High-Performance Lithium-Ion Battery", Electrochemical and Solid-State Letters, Dec. 20, 2005, vol. 9, No. 2, pp. A82-A85.

(56) References Cited

OTHER PUBLICATIONS

Eom.J et al., "M3(PO4)2-Nanoparticle-Coated LiCoO2 vs LiCo0.96M0.04O2(M=Mg and Zn) on Electrochemical and Storage Characteristics", J. Electrochem. Soc. (Journal of the Electrochemical Society), Jan. 8, 2008, vol. 155, No. 3, pp. A201-A205.
Kim.Y et al., "Suppression of Cobalt Dissolution from the LiCoO2 Cathodes with Various Metal-Oxide Coatings", J. Electrochem. Soc. (Journal of the Electrochemical Society), 2003, vol. 150, No. 12, pp. A1723-A1725.
Fang.T et al., "Effect of calcination temperature on the electrochemical behavior of ZnO-coated LiCoO2 cathode", Surface & Coatings Technology , Apr. 19, 2006, vol. 201, No. 3-4, pp. 1886-1893, Elsevier.
Park.S et al., "Novel Surface Modification Technique to Improve Electrochemical Performance of LiCoO2 at High Voltage", Electrochemical and Solid-State Letters, Apr. 21, 2005, vol. 8, No. 6, pp. A299-A302.
Jo.C et al., "An effective method to reduce residual lithium compounds on Ni-rich Li[Ni0.6Co0.2Mn0.2]O2 active material using a phosphoric acid derived Li3PO4 nanolayer", Nano Research, Dec. 4, 2014, vol. 8, No. 5, pp. 1464-1479, Springer.
Tebbe.J et al., "Mechanisms of LiCoO2 Cathode Degradation by Reaction with HF and Protection by Thin Oxide Coatings", ACS Applied Materials & Interfaces, Oct. 12, 2015, vol. 7, No. 43, pp. 24265-24278.
Bensalah.N et al., "Review on Synthesis, Characterizations, and Electrochemical Properties of Cathode Materials for Lithium Ion Batteries", Journal of Material Science & Engineering, 2016, vol. 5, No. 4, pp. 1000258-1-1000258-21.
Lu.Y et al., "Recent progress on lithium-ion batteries with high electrochemical performance", Science China Chemistry, Feb. 25, 2019, vol. 62, No. 5, pp. 533-548.
Xiao.B, "Surface Modifification of Electrode Materials for Lithium-Ion Batteries", Graduate Program in Mechanical and Materials Engineering, 2006, pp. 1-235.
Ohnishi.M et al., "Investigation of the surface degradation of LiCoO2 particles in the cathode materials of Li-ion batteries using FIB-TOF-SIMS", Journal of Surface Analysis, 2013, vol. 20, No. 2, pp. 99-110.
Iwaya.K et al., "Impact of Lithium-Ion Ordering on Surface Electronic States of LixCoO2", Phys. Rev. Lett. (Physical Review Letters), Sep. 20, 2013, vol. 111, No. 12, pp. 126104-1-126104-5.
Zou.M et al., "Synthesis of High-Voltage (4.5 V) Cycling Doped LiCoO2 for Use in Lithium Rechargeable Cells", Chem. Mater. (Chemistry of Materials), Dec. 16, 2003, vol. 15, No. 25, pp. 4699-4702.
Schipper.F et al., "Study of Cathode Materials for Lithium-Ion Batteries: Recent Progress and New Challenges", Inorganics, Apr. 28, 2017, vol. 5, No. 2, pp. 1-29.
Ding.Y et al., "Preparation of nano-structured LiFePO4/graphene composites by co-precipitation method", Electrochemistry Communications, 2010, vol. 12, No. 1, pp. 10-13, Elsevier.
Xia.H et al., "Phase Transitions and High-Voltage Electrochemical Behavior of LiCoO2 Thin Films Grown by Pulsed Laser Deposition", J. Electrochem. Soc. (Journal of the Electrochemical Society), Feb. 20, 2007, vol. 154, No. 4, pp. A337-A342.
Sun.Y et al., "Role of AlF3 Coating on LiCoO2 Particles during Cycling to Cutoff Voltage above 4.5 V", J. Electrochem. Soc. (Journal of the Electrochemical Society), Oct. 9, 2009, vol. 156, No. 12, pp. A1005-A1010.
Araki.K et al., "Electrochemical properties of LiNi1/3Co1/3Mn1/3O2 cathode material modified by coating with Al2O3 nanoparticles", Journal of Power Sources, Jun. 25, 2014, vol. 269, pp. 236-243.
Kim.H et al., "Capacity fading behavior of Ni-rich layered cathode materials in Li-ion full cells", Journal of Electroanalytical Chemistry, Oct. 18, 2016, vol. 782, pp. 168-173.
Lin.F et al., "Surface reconstruction and chemical evolution of stoichiometric layered cathode materials for lithium-ion batteries", Nature Communications, Mar. 27, 2014, vol. 5, pp. 3529-1-3529-9.
Yano.A et al., "Surface Structure and High-Voltage Charge/Discharge Characteristics of Al-Oxide Coated LiNi1/3Co1/3Mn1/3O2 Cathodes", J. Electrochem. Soc. (Journal of the Electrochemical Society), Jan. 17, 2015, vol. 162, No. 2, pp. A3137-A3144.
Yano.A et al., "Surface Structure and High-Voltage Charging/Discharging Performance of Low-Content Zr-Oxide-Coated LiNi1/3Co1/3Mn1/3O2", J. Electrochem. Soc. (Journal of the Electrochemical Society), Nov. 5, 2015, vol. 163, No. 2, pp. A75-A82.
Antolini.E, "LiCoO2: formation, structure, lithium and oxygen nonstoichiometry, electrochemical behaviour and transport properties", Solid State Ionics, 2004, vol. 170, No. 3-4, pp. 159-171.
Ceder.G et al., "Identification of cathode materials for lithium batteries guided by first-principles calculations", Nature, Apr. 16, 1998, vol. 392, pp. 694-696.
Gopukumar.S et al., "Synthesis and electrochemical performance of tetravalent doped LiCoO2 in lithium rechargeable cells", Solid State Ionics, Mar. 28, 2003, vol. 159, No. 3-4, pp. 223-232, Elsevier.
German Office Action (Application No. 112017007748.6) dated Mar. 2, 2021.
Chinese Office Action (Application No. 201911291482.X) dated Jun. 1, 2021.
Chinese Office Action(Application No. 201780039613.8) dated Aug. 16, 2021.
Wang.Z et al., "Infiltrative coating of LiNi0.5Co0.2Mn0.3O2 microspheres with layer-structured LiTiO2: towards superior cycling performances for Li-ion batteries", J. Mater. Chem. A(Journal of Materials Chemistry A), Sep. 30, 2014, vol. 2, No. 47, pp. 19983-19986,S3.
Chinese Office Action (Application No. 201780039613.8) dated Mar. 18, 2022.
Chinese Office Action (Application No. 201911127591.8) dated Jun. 28, 2022.
Chinese Office Action (Application No. 201911291429.X) dated Jul. 6, 2022.
Kiyoshi Kanamura, "Positive electrode material", Lithium ion batteries for vehicles, Dec. 20, 2010, pp. 58-63, The Nikkan Kogyo Shimbun.
Chinese Office Action (Application No. 202010842391.7) dated Jan. 10, 2023.
German Office Action (Application No. 112017007569.6) dated Mar. 13, 2023.

\* cited by examiner

FIG. 2A
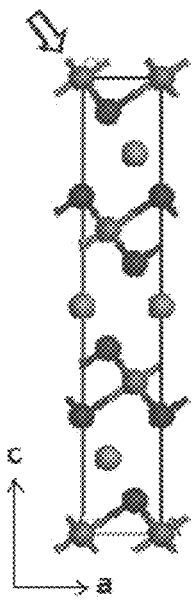
Layered rock salt type
LiCoO₂
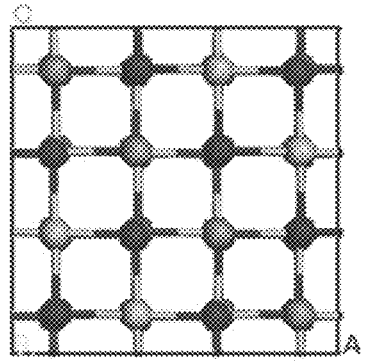
Rock salt type
LiTiO₂
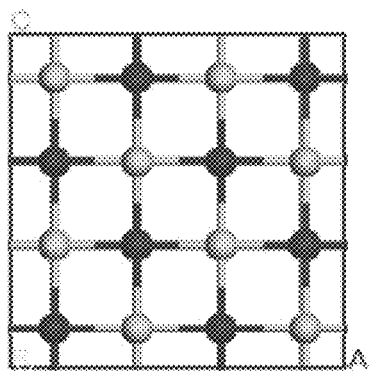
Rock salt type
MgO
FIG. 2B
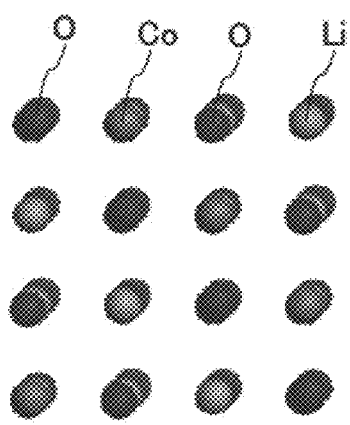
Layered rock salt type
$\langle 1\bar{1}4 \rangle$
LiCoO₂
Li–O 2.089 Å
Co–O 1.925 Å
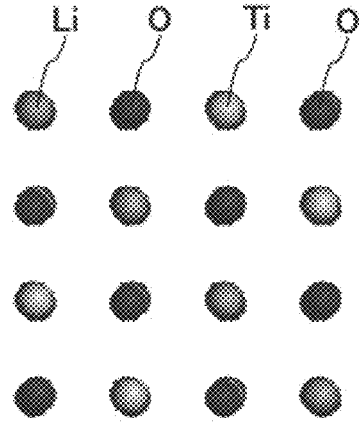
Rock salt type
$\langle 100 \rangle$
LiTiO₂
Li–O 2.138 Å
Ti–O 2.051 Å
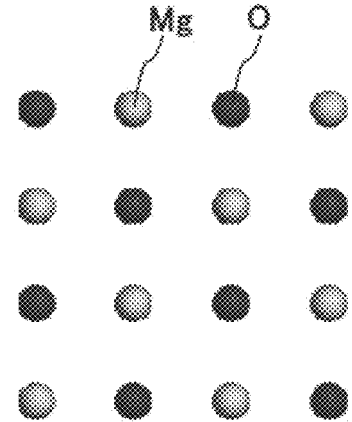
Rock salt type
$\langle 100 \rangle$
MgO
Mg–O 2.106 Å

M2(OR)₄

Ti(OR)₄

TTIP

FIG. 22A
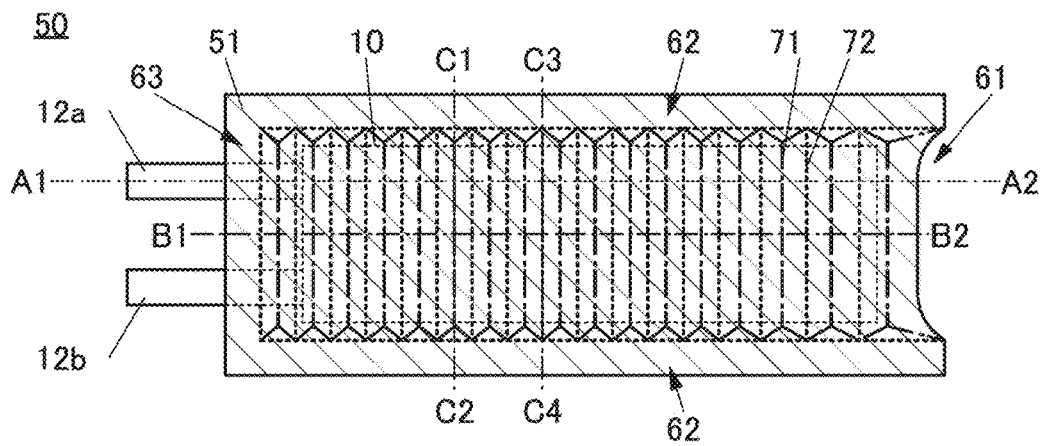
FIG. 22B1
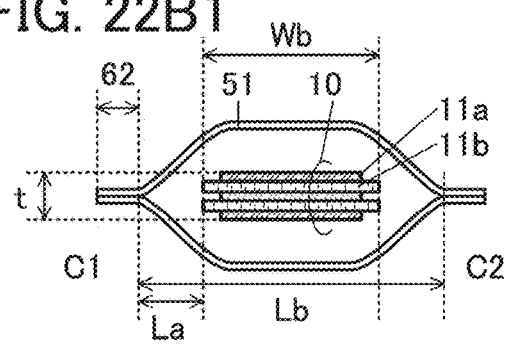
FIG. 22B2
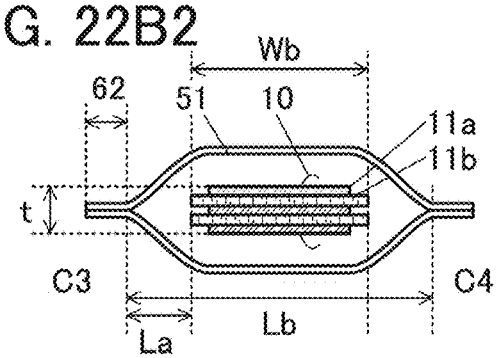
FIG. 22C
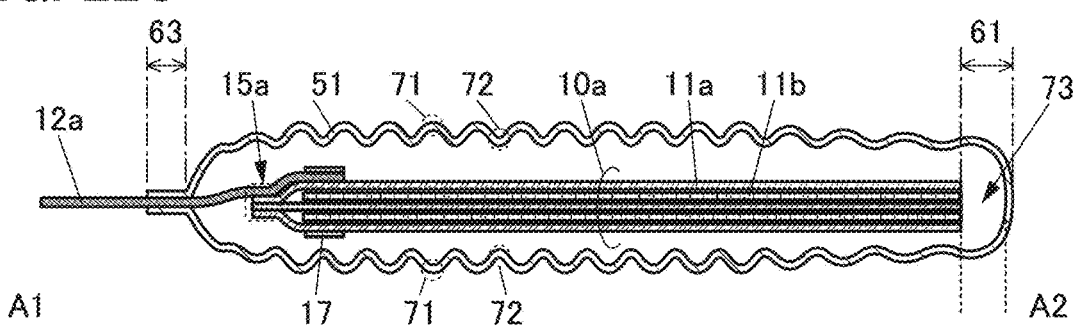
FIG. 22D
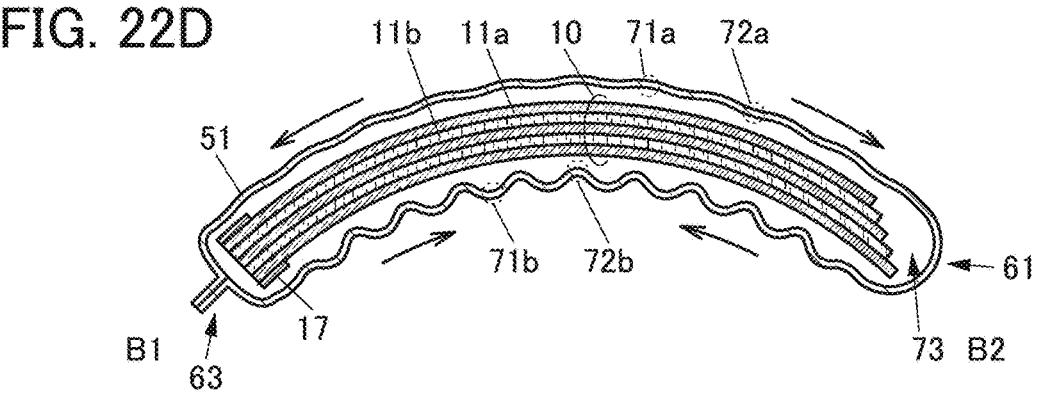

FIG. 24A
FIG. 24B
FIG. 24C
FIG. 24D
FIG. 24E
FIG. 24F
FIG. 24G
FIG. 24H
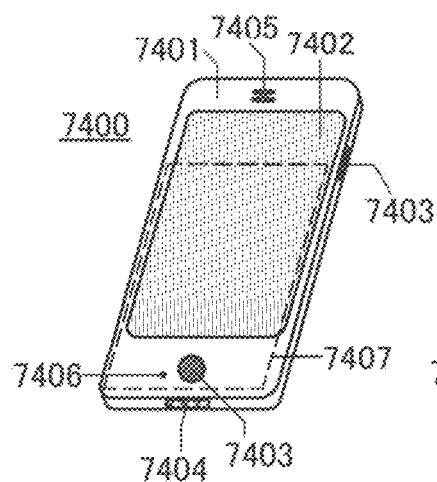
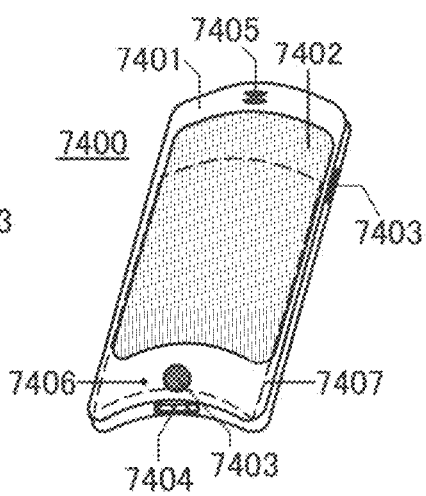
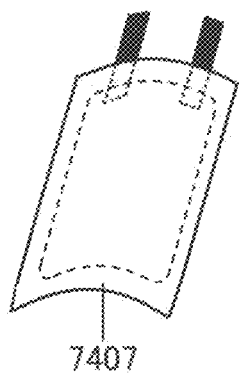
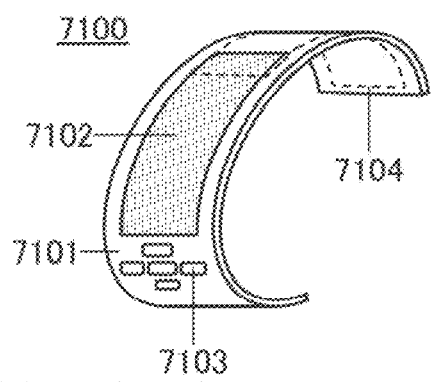
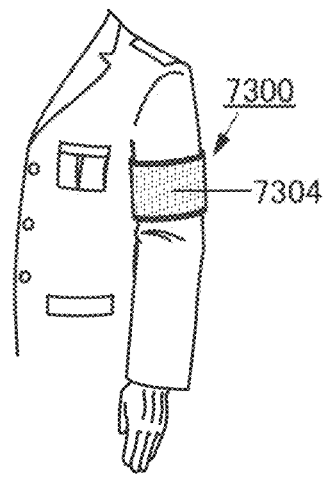
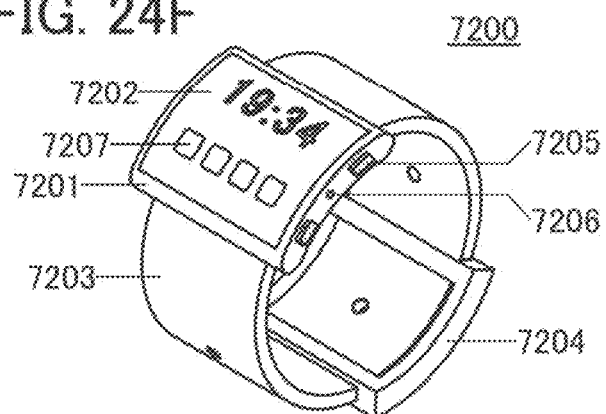
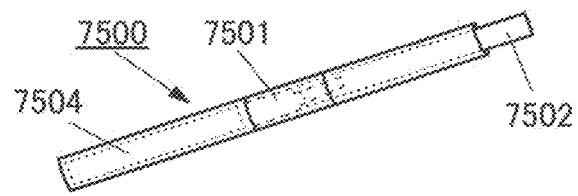

FIG. 29A1
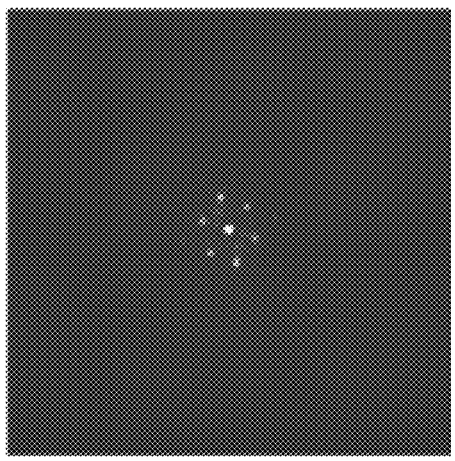
FIG. 29A2
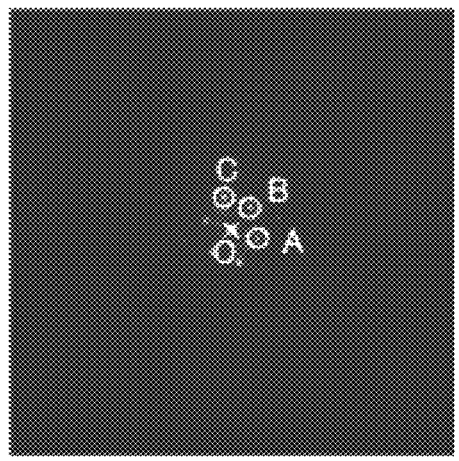
FIG. 29B1
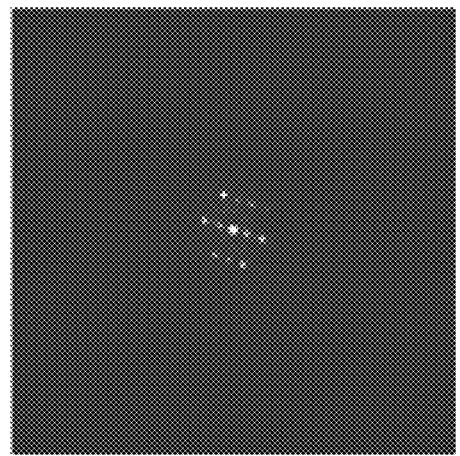
FIG. 29B2
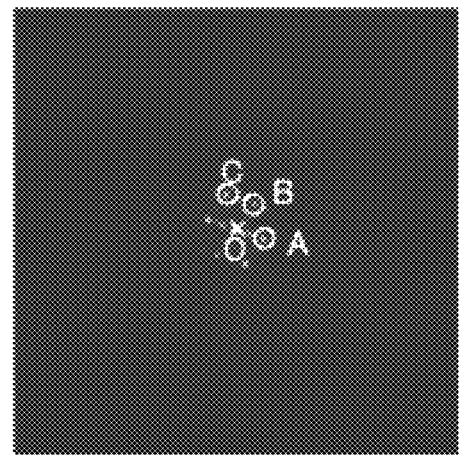
FIG. 29C1
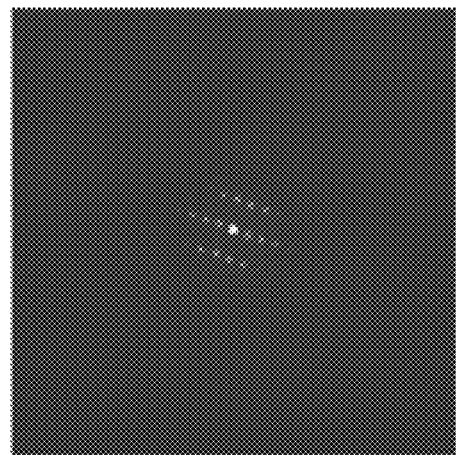
FIG. 29C2
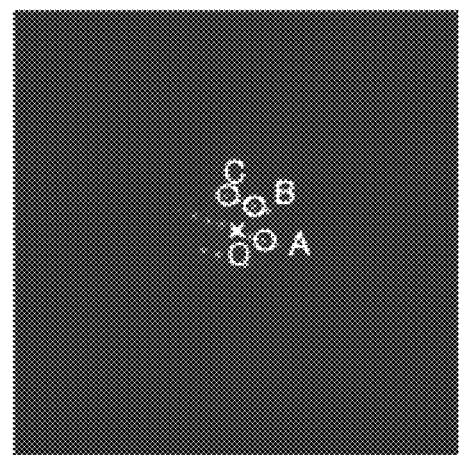

FIG. 30A1
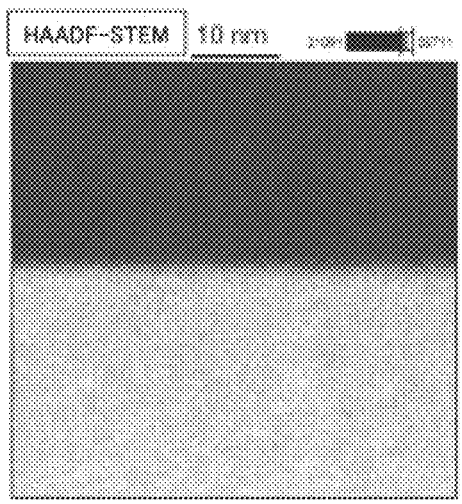
FIG. 30A2
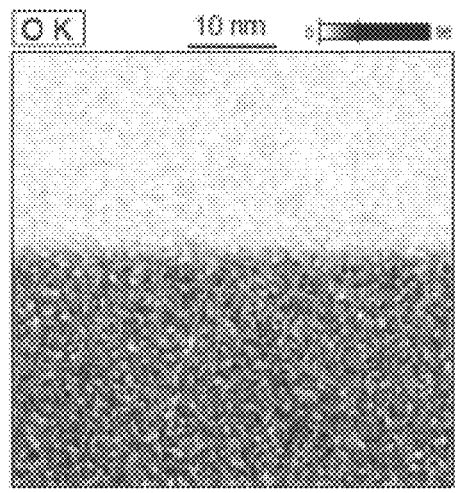
FIG. 30B1
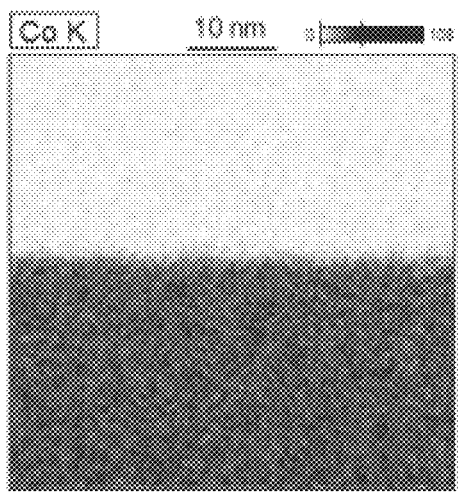
FIG. 30B2
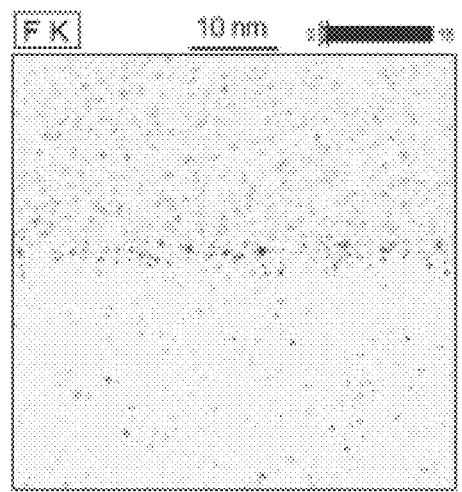
FIG. 30C1
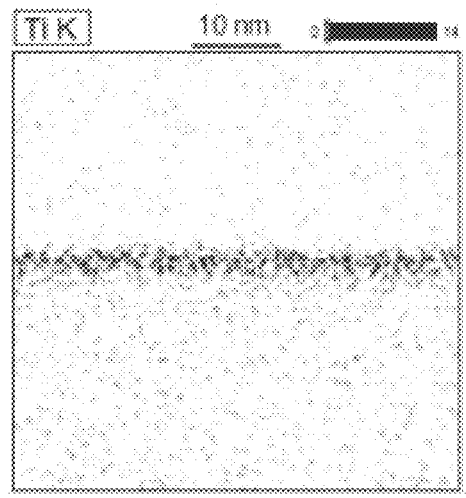
FIG. 30C2
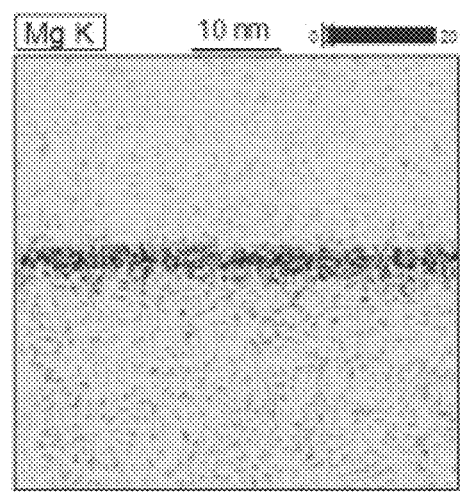

FIG. 31A1
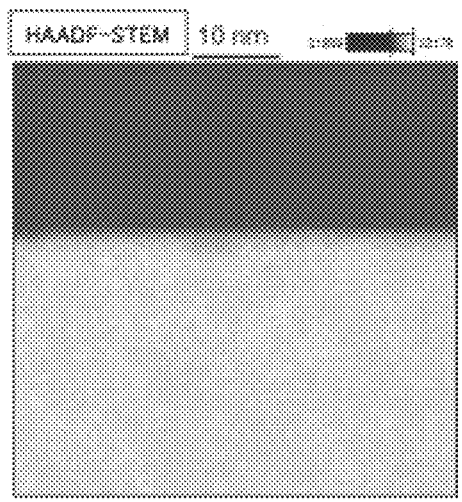
FIG. 31A2
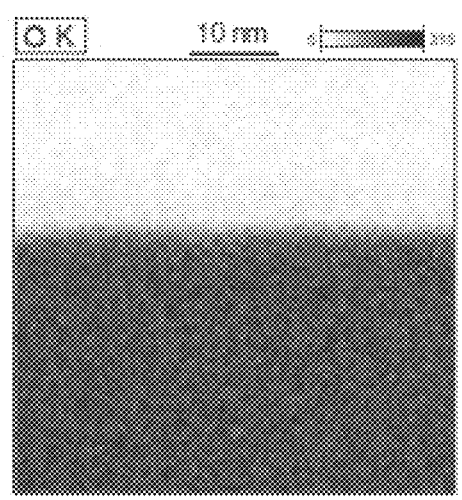
FIG. 31B1
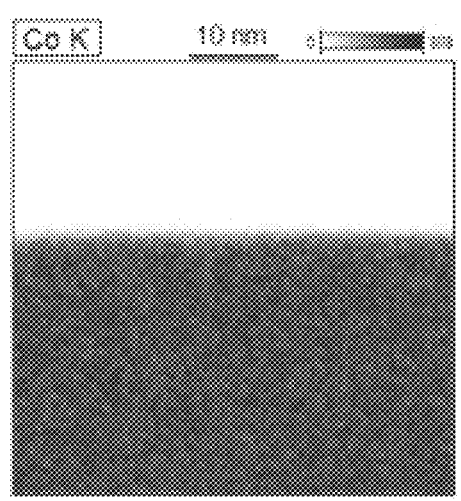
FIG. 31B2
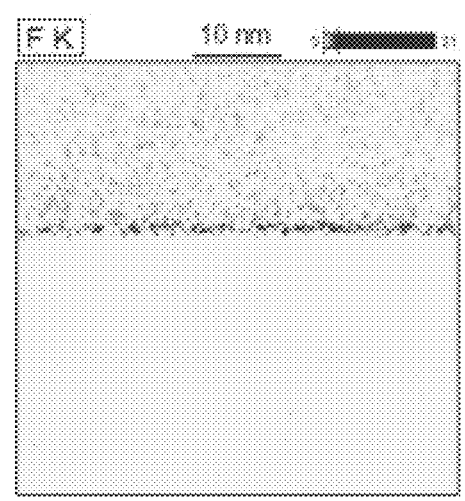
FIG. 31C1
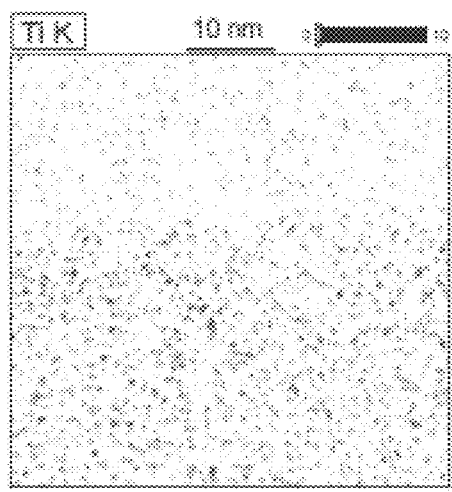
FIG. 31C2
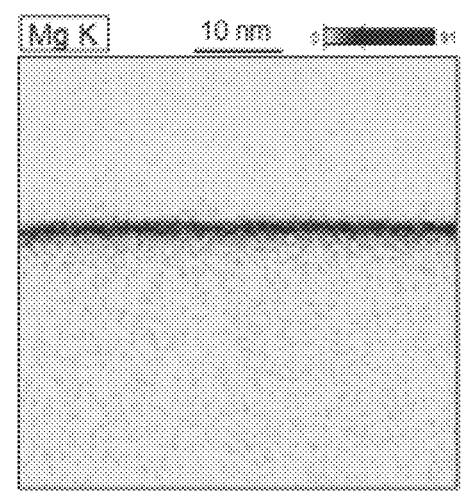

before Ti heating (Sample06)
FIG. 37A
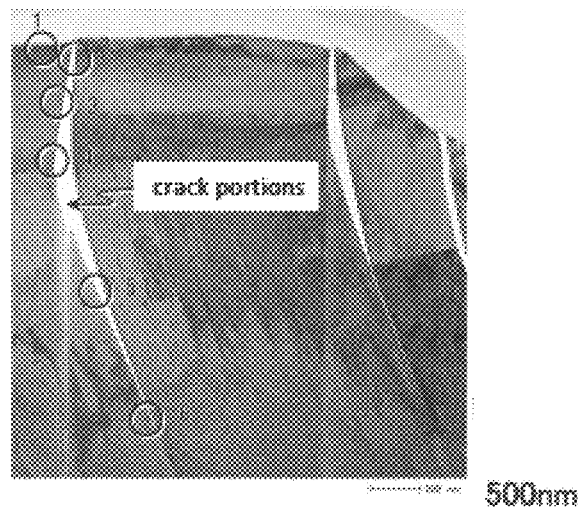
crack portions
500nm
FIG. 37B1 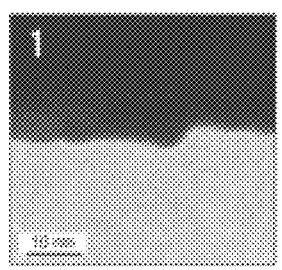   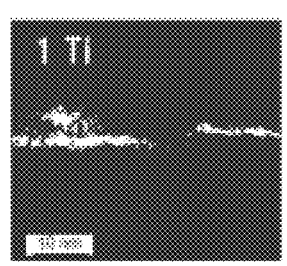 FIG. 37B2
FIG. 37C1 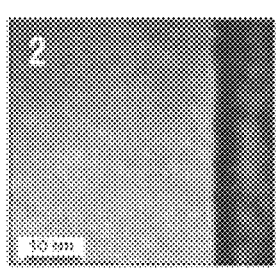   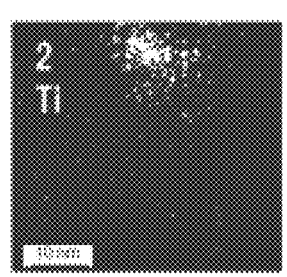 FIG. 37C2
FIG. 37D1 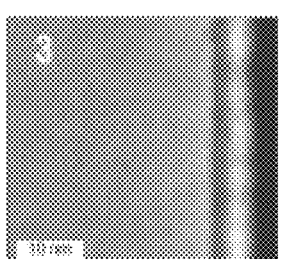   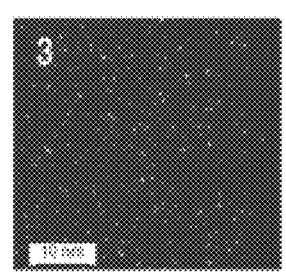 FIG. 37D2
FIG. 37E1 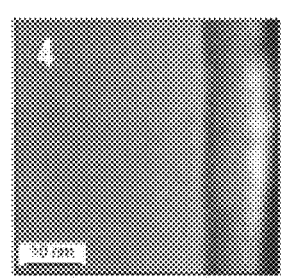   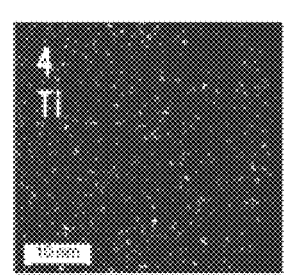 FIG. 37E2 after Ti heating (Sample07)
FIG. 38A
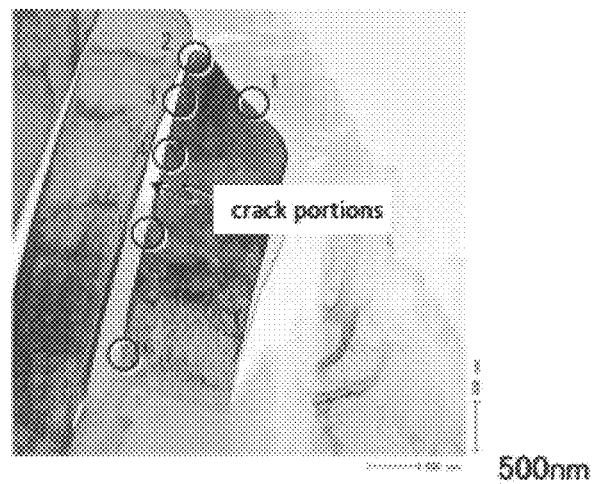
crack portions
500nm
FIG. 38B1 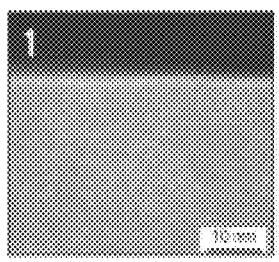   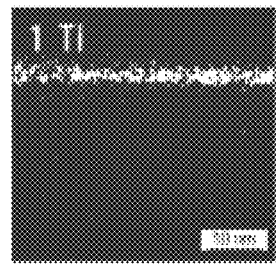 FIG. 38B2
FIG. 38C1 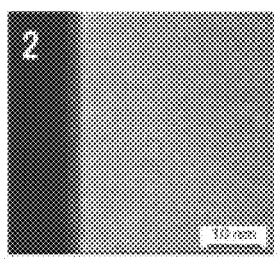   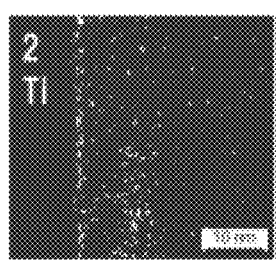 FIG. 38C2
FIG. 38D1 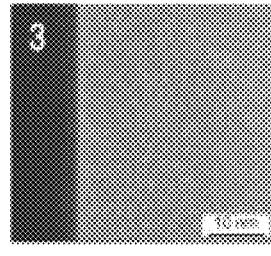   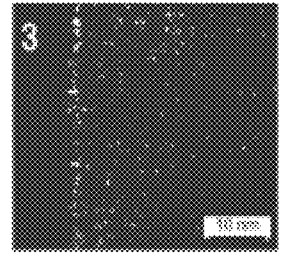 FIG. 38D2
FIG. 38E1 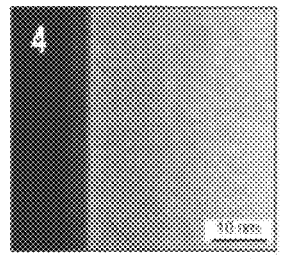   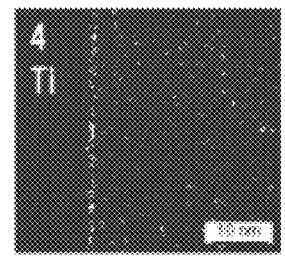 FIG. 38E2 before Mg heating (Sample06)
FIG. 39A
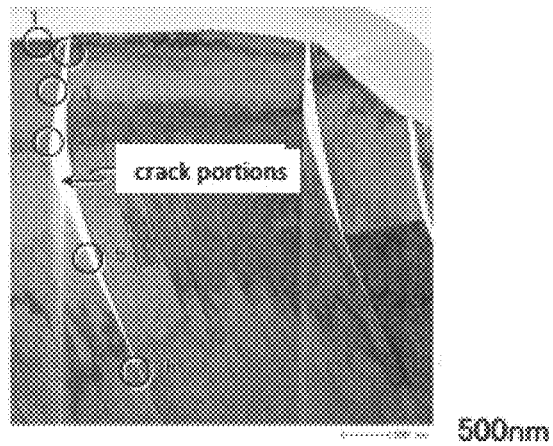
FIG. 39B1 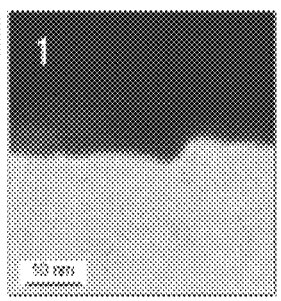  FIG. 39B2 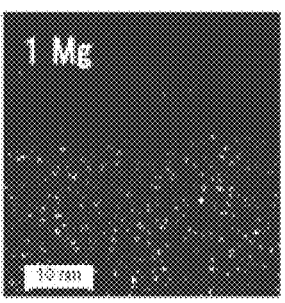
FIG. 39C1 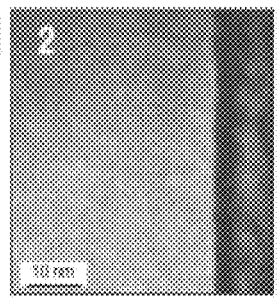  FIG. 39C2 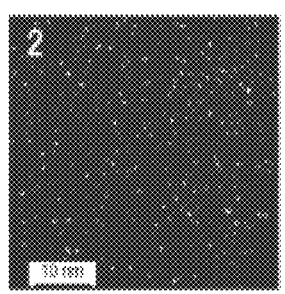
FIG. 39D1 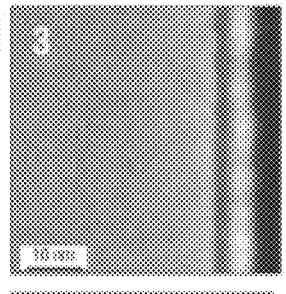  FIG. 39D2 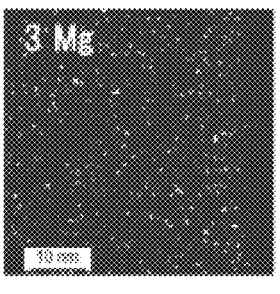
FIG. 39E1 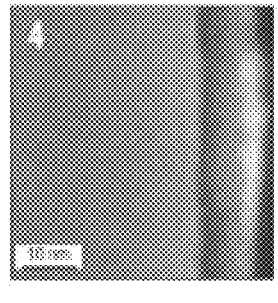  FIG. 39E2 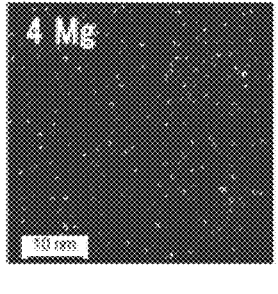

after Mg heating (Sample07)
FIG. 40A
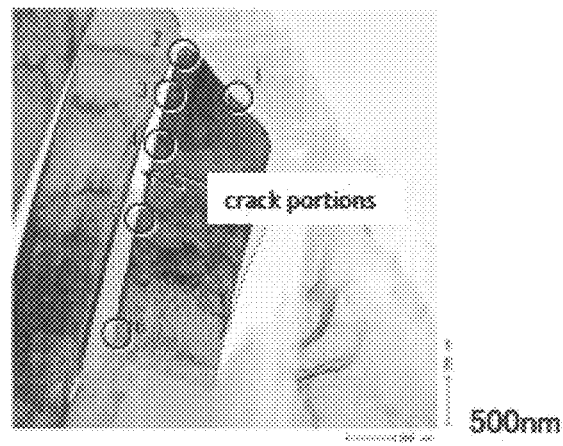
crack portions
500nm
FIG. 40B1 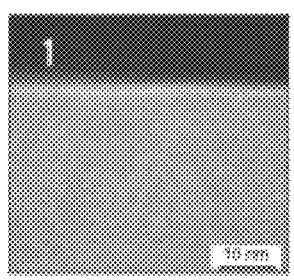   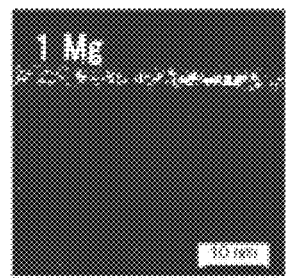 FIG. 40B2
FIG. 40C1 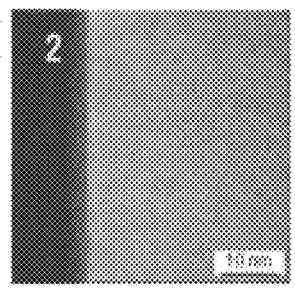   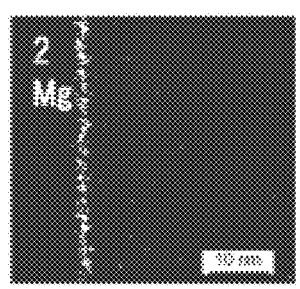 FIG. 40C2
FIG. 40D1 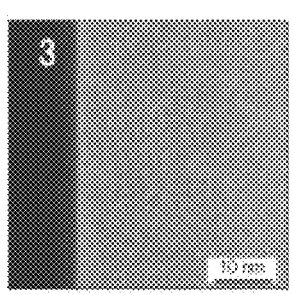   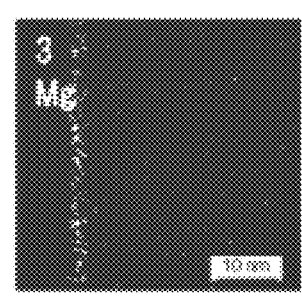 FIG. 40D2
FIG. 40E1 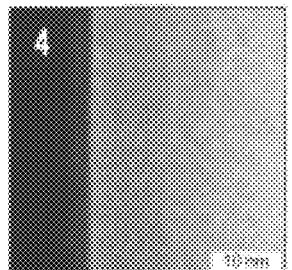   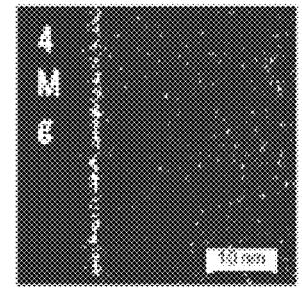 FIG. 40E2

METHOD OF MANUFACTURING POSITIVE ELECTRODE ACTIVE MATERIAL INCLUDING COATING COMPOSITE OXIDE OF LITHIUM, COBALT, MAGNESIUM, AND FLUORINE WITH TITANIUM-CONTAINING MATERIAL

CROSS-REFERENCE TO RELATED APPLICATIONS

This application is a continuation of U.S. application Ser. No. 17/560,408, filed Dec. 23, 2021, now pending, which is a continuation of U.S. application Ser. No. 16/885,350, filed May 28, 2020, now pending, which is a continuation of U.S. application Ser. No. 15/638,449, filed Jun. 30, 2017, now U.S. Pat. No. 10,741,828, which claims the benefit of foreign priority applications filed in Japan as Serial No. 2016-133143 on Jul. 5, 2016, Serial No. 2016-133997 on Jul. 6, 2016, Serial No. 2017-002831 on Jan. 11, 2017, Serial No. 2017-030693 on Feb. 22, 2017, Serial No. 2017-084321 on Apr. 21, 2017, and Serial No. 2017-119272 on Jun. 19, 2017, all of which are incorporated by reference.

TECHNICAL FIELD

One embodiment of the present invention relates to an object, a method, or a manufacturing method. The present invention relates to a process, a machine, manufacture, or a composition of matter. One embodiment of the present invention relates to a semiconductor device, a display device, a light-emitting device, a power storage device, a lighting device, an electronic device, or a manufacturing method thereof. In particular, one embodiment of the present invention relates to a positive electrode active material that can be used in a secondary battery, a secondary battery, and an electronic device including a secondary battery.

In this specification, the power storage device is a collective term describing elements and devices having a power storage function. For example, a storage battery such as a lithium-ion secondary battery (also referred to as secondary battery), a lithium-ion capacitor, and an electric double layer capacitor are included in the category of the power storage device.

Note that electronic devices in this specification mean all devices including power storage devices, and electro-optical devices including power storage devices, information terminal devices including power storage devices, and the like are all electronic devices.

BACKGROUND ART

In recent years, a variety of power storage devices such as lithium-ion secondary batteries, lithium-ion capacitors, and air batteries have been actively developed. In particular, demand for lithium-ion secondary batteries with high output and high energy density has rapidly grown with the development of the semiconductor industry, for portable information terminals such as mobile phones, smartphones, tablets, and laptop computers; portable music players; digital cameras; medical equipment; next-generation clean energy vehicles such as hybrid electric vehicles (HEV), electric vehicles (EV), and plug-in hybrid electric vehicles (PHEV); and the like. The lithium-ion secondary batteries are essential as rechargeable energy supply sources for today's information society.

The performance required for lithium-ion secondary batteries includes increased energy density, improved cycle performance, safe operation under a variety of environments, and longer-term reliability.

Thus, improvement of a positive electrode active material has been studied to increase the cycle performance and the capacity of the lithium ion secondary battery (Patent Document 1 and Patent Document 2).

REFERENCE

Patent Documents

[Patent Document 1] Japanese Published Patent Application No. 2012-018914
[Patent Document 2] Japanese Published Patent Application No. 2015-201432

DISCLOSURE OF INVENTION

Development of lithium ion secondary batteries and positive electrode active materials used therein is susceptible to improvement in terms of charge and discharge characteristics, cycle characteristics, reliability, safety, cost, and the like.

An object of one embodiment of the present invention is to provide a positive electrode active material which suppresses a reduction in capacity due to charge and discharge cycles when used in a lithium ion secondary battery. Another object of one embodiment of the present invention is to provide a high-capacity secondary battery. Another object of one embodiment of the present invention is to provide a secondary battery with excellent charge and discharge characteristics. Another object of one embodiment of the present invention is to provide a highly safe or highly reliable secondary battery.

Another object of one embodiment of the present invention is to provide a novel material, a novel active material particle, a novel secondary battery, or a formation method thereof.

Note that the descriptions of these objects do not disturb the existence of other objects. In one embodiment of the present invention, there is no need to achieve all the objects. Other objects can be derived from the description of the specification, the drawings, and the claims.

To achieve the above objects, in one embodiment of the present invention, two kinds of regions which are different from a region inside the positive electrode active material are provided in a superficial portion of the positive electrode active material. It is preferable that the inner region contain a non-stoichiometric compound and the outer region contain a stoichiometric compound.

In addition, it is preferable that the inner region contain titanium and the outer region contain magnesium. Furthermore, these two kinds of regions may overlap.

In addition, it is preferable that the inner region be formed through a coating process such as a sol-gel method and the outer region be formed by segregation due to heating.

One embodiment of the present invention is a positive electrode active material including a first region, a second region, and a third region. The first region is present inside the positive electrode active material. The second region and the third region are present in a superficial portion of the positive electrode active material. The third region is present in a region closer to a surface of the positive electrode active material than the second region is. The first region contains an oxide of lithium and a first transition metal and has a layered rock-salt crystal structure. The second region contains a non-stoichiometric compound containing an oxide of a second transition metal and the non-stoichiometric compound has a rock-salt crystal structure. The third region contains a compound of representative elements and the compound of representative elements has a rock-salt crystal structure.

In the above structure, it is preferable that the first transition metal be cobalt, the second transition metal be titanium, and the compound of representative elements be magnesium oxide.

In the above structure, the third region may contain fluorine. Furthermore, the second region and the third region may each contain cobalt.

In the above structure, it is preferable that crystal orientations of the first region and the second region be partly aligned with each other and crystal orientations of the second region and the third region be partly aligned with each other.

In the above structure, a degree of a mismatch between a (1-1-4) plane of the layered rock-salt crystal structure in the first region or a plane orthogonal to the (1-1-4) plane and a {100} plane of the rock-salt crystal structure in the second region is preferably less than or equal to 0.12, and a degree of a mismatch between the {100} plane of the rock-salt crystal structure in the second region and a {100} plane of the rock-salt crystal structure in the third region is preferably less than or equal to 0.12.

Another embodiment of the present invention is a positive electrode active material containing lithium, titanium, cobalt, magnesium, oxygen, and fluorine. When the concentration of cobalt which is present in a superficial portion of the positive electrode active material and is measured by X-ray photoelectron spectroscopy is 1, the concentration of titanium is greater than or equal to 0.05 and less than or equal to 0.4, the concentration of magnesium is greater than or equal to 0.4 and less than or equal to 1.5, and the concentration of fluorine is greater than or equal to 0.05 and less than or equal to 1.5.

Another embodiment of the present invention is a method for forming a positive electrode active material including: a step of mixing a source of lithium, a source of cobalt, a source of magnesium, and a source of fluorine; a step of heating the mixture of the source of lithium, the source of cobalt, the source of magnesium, and the source of fluorine at 800° C. or higher and 1100° C. or lower for 2 hours or longer and 20 hours or shorter to obtain particles containing lithium, cobalt, magnesium, oxygen, and fluorine; a step of dissolving titanium alkoxide into alcohol; a step of mixing the particles containing lithium, cobalt, magnesium, oxygen, and fluorine into the alcohol solution of the titanium alkoxide and stirring the mixed solution in an atmosphere containing water vapor; a step of collecting precipitate from the mixed solution; and a step of heating the collected precipitate at 500° C. or higher and 1200° C. or lower in an atmosphere containing oxygen under a condition where a retention time is 50 hours or shorter.

In the above formation method, a ratio of the number of atoms of lithium in the source of lithium to the number of atoms of cobalt in the source of cobalt is preferably greater than or equal to 1.00 and less than 1.07.

In the above formation method, a ratio between the number of atoms of magnesium in the source of magnesium and the number of atoms of fluorine in the source of fluorine is preferably Mg:F=1:x (1.5≤x≤4).

In the above formation method, the number of atoms of magnesium in the source of magnesium is preferably greater than or equal to 0.5 atomic % and less than or equal to 1.5 atomic % of the number of atoms of cobalt in the source of cobalt.

In the above formation method, lithium carbonate, cobalt oxide, magnesium oxide, and lithium fluoride can be used as a source of lithium, a source of cobalt, a source of magnesium, and a source of fluorine, respectively.

When the surface of the positive electrode active material is covered with a coating film to protect the above crystal structure, a decrease in capacity due to charge and discharge cycles can be suppressed. As the coating film covering the surface of the positive electrode active material, a coating film containing carbon (a film containing a graphene compound) or a coating film containing lithium or a decomposition product of an electrolyte solution is used.

In particular, powder in which the surface of the positive electrode active material is coated with graphene oxide using a spray dry apparatus is preferably obtained. The spray dry apparatus is a manufacturing apparatus using a spray dry method by which a dispersion medium is removed by supplying a hot wind to a suspension.

When charge and discharge cycles are repeated, deformation of the particles of the positive electrode active materials, such as cracking or breaking, might occur. It is said that such deformation makes a new surface of the positive electrode active material exposed, and the surface is in contact with an electrolyte solution to cause a decomposition reaction or the like, so that the cycle characteristics and the charge and discharge characteristics of the secondary battery are degraded.

Thus, a coating film is preferably provided to prevent the deformation of the particles of the positive electrode active materials, such as cracking or breaking.

However, when suspension is formed and stirred by a rotary and revolutionary mixer to coat the surface of the positive electrode active material whose weight per unit volume is large with graphene oxide whose weight is relatively small, coating is insufficient.

Thus, to coat the surfaces of the particles of the positive electrode active materials with the graphene oxide, a method in which the graphene oxide and a polar solvent (such as water) are mixed and ultrasonic treatment is performed, the particles of the positive electrode active materials are mixed therein to prepare the suspension, and dried powder is produced with a spray dry apparatus is preferably used. The dried powder produced in this manner is referred to as a composite in some cases.

The size of one drop of spray liquid sprayed from a nozzle of the spray dry apparatus depends on a nozzle diameter.

When the particle diameter is smaller than the nozzle diameter, there are a plurality of particles in one drop of the spray liquid sprayed from the nozzle. When the surface of the particle after drying under the condition where the largest particle size is smaller than the nozzle diameter is observed, there are some portions where the surface is coated with the graphene oxide; however, the coating is insufficient.

The nozzle diameter of the spray dry apparatus is preferably substantially equal to the largest particle size of the active material because the coverage of the active material can be improved. Moreover, the largest particle size of the positive electrode active material is preferably adjusted to be substantially equal to the nozzle diameter in forming the positive electrode active material.

Since the graphene oxide is well dispersed into water, the suspension of water and the graphene oxide can be formed by stirring using ultrasonic waves. The positive electrode active material is added to the suspension, and the suspension is sprayed with the spray dry apparatus, whereby powder in which the surface of the positive electrode active material is coated with the graphene oxide can be obtained.

Note that the suspension becomes more acidic as the amount of graphene oxide is increased. Thus, part of the surface of the positive electrode active material (e.g., $LiCoO_2$ containing Mg and F) might be etched. Then, a hydrogen ion exponent (pH) of the suspension before being sprayed is preferably adjusted to be close to approximately pH7, that is, close to neutral, or higher than or equal to pH8, that is, alkaline. For the pH adjustment, a LiOH aqueous solution is preferably used. For example, in the case where $LiCoO_2$ is used for the positive electrode active material and only pure water is used as the dispersion medium of the suspension, the surface of the positive electrode active material may be damaged. Thus, a mixed solution of ethanol and water is used as the dispersion medium of the suspension, whereby damage to the surface of the active material may be reduced.

The suspension is formed in the above manner, whereby the positive electrode active material whose surface is coated with the graphene oxide can be prepared efficiently. When the surface is coated with the graphene oxide, the deformation of the particles of the positive electrode active materials, such as cracking or breaking can be prevented. Moreover, even if the positive electrode active material whose surface is coated with the graphene oxide is exposed to the air after the formation, the change of properties or degradation can be suppressed. Here, "after the formation" refers to a period from the termination of the formation of the positive electrode active material to the start of the fabrication of the secondary battery containing the positive electrode active material and includes the storing, the transporting, and the like of the positive electrode active material. In addition, when the coating film is formed, the positive electrode active material and the electrolyte solution can be prevented from being in direct contact with each other to react; thus, the secondary battery using the coating film has high reliability.

For the spray dry method, a known apparatus can be utilized, for example, a countercurrent pressure-nozzle-type spray dry apparatus and a counter-concurrent pressure-nozzle-type spray dry apparatus can be utilized.

Note that the graphene oxide coating the surface of the active material may be reduced when used in the secondary battery. The reduced graphene oxide is referred to as "RGO" in some cases. In RGO, in some cases, part of oxygen atoms remains in a state of oxygen or atomic group containing oxygen that is bonded to carbon. For example, RGO includes a functional group, e.g., an epoxy group, a carbonyl group such as a carboxyl group, or a hydroxyl group.

Another embodiment of the present invention is a secondary battery which includes a positive electrode containing the above-described positive electrode active material or the above-described positive electrode active material coated with a coating film and a negative electrode.

The secondary battery can have any of a variety of shapes to fit the form of the device to be used, for example, a cylindrical shape, a rectangular shape, a coin-type shape, and a laminated (flat plate) shape.

According to one embodiment of the present invention, a positive electrode active material which suppresses a reduction in capacity due to charge and discharge cycles when used in a lithium ion secondary battery is provided. In addition, a secondary battery with excellent charge and discharge characteristics is provided. In addition, a highly safe or highly reliable secondary battery is provided. In addition, a novel material, a novel active material particle, a novel secondary battery, or a formation method thereof is provided.

BRIEF DESCRIPTION OF DRAWINGS

In the accompanying drawings:

FIGS. 2A and 2B illustrate crystal structures of a positive electrode active material;

FIGS. 4A-1, 4A-2, 4A-3, 4B, 4C, 4D-1, and 4D-2 show a sol-gel method;

FIGS. 14A-1, 14A-2, 14B-1, and 14B-2 illustrate examples of secondary batteries;

FIGS. 22A, 22B1, 22B2, 22C, and 22D illustrate a bendable secondary battery;

FIGS. 24A to 24H illustrate examples of electronic devices;

FIGS. 29A1, 29A2, 29B1, 29B2, 29C1, and 29C2 are FFT images of transmission electron microscope images of a positive electrode active material in Example 1;

FIGS. 30A1, 30A2, 30B1, 30B2, 30C1, and 30C2 are element mapping images of a positive electrode active material in Example 1;

FIGS. 31A1, 31A2, 31B1, 31B2, 31C1, and 31C2 are element mapping images of a positive electrode active material of a comparative example in Example 1;

FIGS. 37A, 37B1, 37B2, 37C1, 37C2, 37D1, 37D2, 37E1, and 37E2 are TEM-EDX plane analysis images of a comparative example in Example 2;

FIGS. 38A, 38B1, 38B2, 38C1, 38C2, 38D1, 38D2, 38E1, and 38E2 are TEM-EDX plane analysis images of a positive electrode active material in Example 2;

FIGS. 39A, 39B1, 39B2, 39C1, 39C2, 39D1, 39D2, 39E1, and 39E2 are TEM-EDX plane analysis images of a comparative example in Example 2;

FIGS. 40A, 40B1, 40B2, 40C1, 40C2, 40D1, 40D2, 40E1, and 40E2 are TEM-EDX plane analysis images of a positive electrode active material in Example 2;

FIGS. 52A-1, 52A-2, 52B-1, 52B-2, 52C-1, and 52C-2 are SEM-EDX images of a positive electrode active material in Example 4;

BEST MODE FOR CARRYING OUT THE INVENTION

Figure 1A:
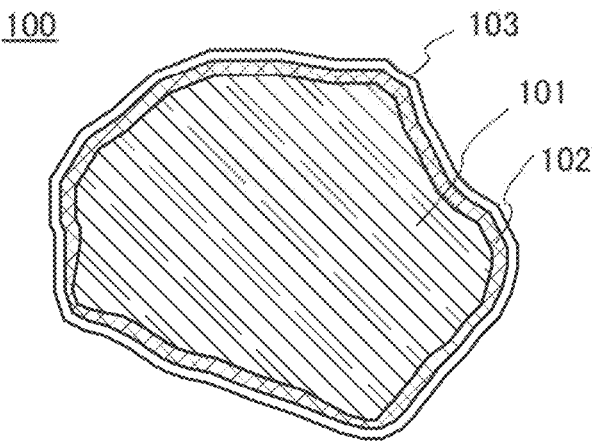
FIGS. 1A to 1C show examples of a positive electrode active material.

Embodiments of the present invention will be described below in detail with reference to the drawings. Note that the present invention is not limited to the description below, and it is easily understood by those skilled in the art that modes and details of the present invention can be modified in various ways. In addition, the present invention should not be construed as being limited to the description in the embodiments given below.

Note that in drawings used in this specification, the sizes, thicknesses, and the like of components such as a positive electrode, a negative electrode, an active material layer, a separator, and an exterior body are exaggerated for simplicity in some cases. Therefore, the sizes of the components are not limited to the sizes in the drawings and relative sizes between the components.

Note that in structures of the present invention described in this specification and the like, the same portions or portions having similar functions are denoted by common reference numerals in different drawings, and descriptions thereof are not repeated. Further, the same hatching pattern is applied to portions having similar functions, and the portions are not especially denoted by reference numerals in some cases.

In this specification and the like, the Miller index is used for the expression of crystal planes and orientations. In the crystallography, a superscript bar is placed over a number in the expression using the Miller index; however, in this specification and the like, crystal planes and orientations are expressed by placing a minus sign (−) at the front of a number instead of placing the bar over a number because of expression limitations. Furthermore, an individual direction which shows an orientation in crystal is denoted by "[ ]", a set direction which shows all of the equivalent orientations is denoted by "< >", an individual direction which shows a crystal plane is denoted by "( )", and a set plane having equivalent symmetry is denoted by "{ }". In the drawings, the crystal planes and orientations are expressed by a number with a bar placed thereover, which is an original crystallographic expression. Note that 1 Å is $10^{-10}$ m.

In this specification and the like, segregation refers to a phenomenon in which, in a solid made of a plurality of elements (e.g., A, B, and C), a certain element (for example, B) is non-uniformly distributed.

In this specification and the like, a layered rock-salt crystal structure included in a composite oxide containing lithium and a transition metal refers to a crystal structure in which a rock-salt ion arrangement where cations and anions are alternately arranged is included and the lithium and the transition metal are regularly arranged to form a two-dimensional plane, so that lithium can be two-dimensionally diffused. Note that a defect such as a cation or anion vacancy can exist. In the layered rock-salt crystal structure, strictly, a lattice of a rock-salt crystal is distorted in some cases.

In this specification and the like, a rock-salt crystal structure refers to a structure in which cations and anions are alternately arranged. Note that a cation or anion vacancy may exist.

Anions of a layered rock-salt crystal and anions of a rock-salt crystal each form a cubic closest packed structure (face-centered cubic lattice structure). When a layered rock-salt crystal and a rock-salt crystal are in contact with each other, there is a crystal plane at which directions of cubic closest packed structures formed of anions are aligned with each other. A space group of the layered rock-salt crystal is R-3m, which is different from a space group Fm-3m of a general rock-salt crystal and a space group Fd-3m of a rock-salt crystal having the simplest symmetry; thus, the Miller index of the crystal plane satisfying the above conditions in the layered rock-salt crystal is different from that in the rock-salt crystal. In this specification, in the layered rock-salt crystal and the rock-salt crystal, a state where the directions of the cubic closest packed structures formed of anions are aligned with each other is referred to as a state where crystal orientations are substantially aligned with each other.

Whether the crystal orientations in two regions are aligned with each other or not can be judged by a transmission electron microscope (TEM) image, a scanning transmission electron microscope (STEM) image, a high-angle annular dark field scanning transmission electron microscopy (HAADF-STEM) image, an annular bright-field scan transmission electron microscopy (ABF-STEM) image, and the like. X-ray diffraction, electron diffraction, neutron diffraction, and the like can be used for judging. In the TEM image and the like, alignment of cations and anions can be observed as repetition of bright lines and dark lines. When the orientations of cubic closest packed structures of the layered rock-salt crystal and the rock-salt crystal are aligned with each other, a state where an angle between the repetition of bright lines and dark lines in the layered rock-salt crystal and the repetition of bright lines and dark lines in the rock-salt crystal is less than or equal to 5°, preferably less than or equal to 2.5° is observed. Note that, in the TEM image and the like, a light element such as oxygen or fluorine is not clearly observed in some cases; however, in such a case, alignment of orientations can be judged by arrangement of metal elements.

Furthermore, in this specification and the like, a state where structures of two-dimensional interfaces have similarity is referred to as "epitaxy". Crystal growth in which structures of two-dimensional interfaces have similarity is referred to as "epitaxial growth". In addition, a state where three-dimensional structures have similarity or orientations are crystallographically the same is referred to as "topotaxy". Thus, in the case of topotaxy, when part of a cross section is observed, orientations of crystals in two regions (e.g., a region serving as a base and a region formed through growth) are substantially aligned with each other.

Embodiment 1

[Structure of Positive Electrode Active Material]

First, a positive electrode active material 100, which is one embodiment of the present invention, is described with reference to FIGS. 1A to 1C. The positive electrode active material 100 refers to a substance containing a transition metal which can receive and release lithium ion electrochemically. As illustrated in FIG. 1A, the positive electrode active material 100 includes a first region 101 inside and a second region 102 and a third region 103 in a superficial portion.

Figure 1B:
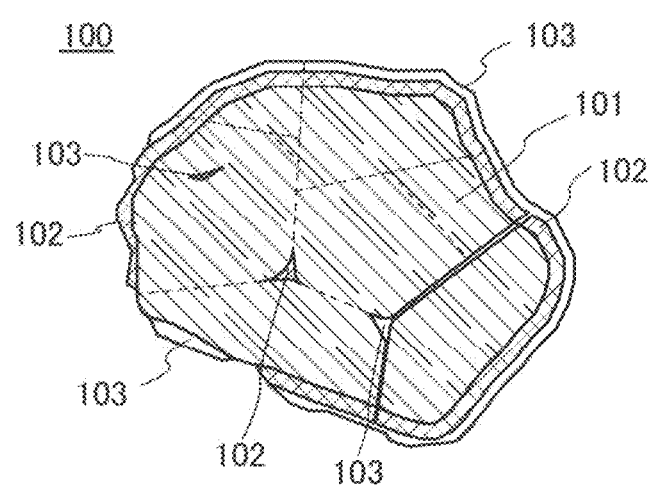

As illustrated in FIG. 1B, the second region 102 does not necessarily cover the entire first region 101. Similarly, the third region 103 does not necessarily cover the entire second region 102. In addition, the third region 103 may be present in contact with the first region 101.

The thicknesses of the second region 102 and the third region 103 may each differ depending on the positions.

Furthermore, the third region 103 may be present inside the positive electrode active material 100. For example, in the case where the first region 101 is a polycrystal, the third region 103 may be present in the vicinity of a grain boundary. Furthermore, the third region 103 may be present in a portion which includes crystal defects or a crack portion in the positive electrode active material 100 or in the vicinity thereof. In FIG. 1B, parts of grain boundaries are shown by dotted lines. In this specification and the like, crystal defects refer to defects which can be observed from a TEM image and the like, that is, a structure in which another element enters crystal, a cavity, and the like. In addition, a crack portion refers to a crack or a break formed in a particle like a crack portion 106 illustrated in FIG. 1C, for example.

Similarly, as illustrated in FIG. 1B, the second region 102 may be present inside the positive electrode active material 100. For example, in the case where the first region 101 is a polycrystal, the second region 102 may be present in the vicinity of a grain boundary. Furthermore, the second region 102 may be present in a portion which includes crystal defects or a crack portion in the positive electrode active material 100 or in the vicinity thereof. Moreover, the third region 103 and the second region 102 inside the positive electrode active material 100 may overlap.

<First Region 101>

The first region 101 contains a composite oxide of lithium and a first transition metal. In other words, the first region 101 contains lithium, a first transition metal, and oxygen.

The composite oxide of lithium and a first transition metal preferably has a layered rock-salt crystal structure.

As the first transition metal, only cobalt may be used, cobalt and manganese may be used, or cobalt, manganese, and nickel may be used.

That is, the first region can include lithium cobalt oxide, lithium manganese oxide, lithium nickel oxide, lithium cobalt oxide in which manganese is substituted for part of cobalt, lithium nickel-manganese-cobalt oxide, or the like. In addition to the transition metal, the first region 101 may include a metal other than the transition metal, such as aluminum.

The first region 101 serves as a region which particularly contributes to a charge and discharge reaction in the positive electrode active material 100. To increase capacity of a secondary battery containing the positive electrode active material 100, the volume of the first region 101 is preferably larger than those of the second region and the third region.

A material having a layered rock-salt crystal structure has features such as high discharge capacity and low resistance due to lithium that can be diffused two-dimensionally, which is preferably used for the first region 101. In addition, in the case where the first region 101 has a layered rock-salt crystal structure, a segregation of a representative element such as magnesium, which is described later, tends to occur unexpectedly.

Note that the first region 101 may be a single crystal or a polycrystal. For example, the first region 101 may be a polycrystal in which an average crystallite size is greater than or equal to 280 nm and less than or equal to 630 nm. In the case of a polycrystal, a grain boundary can be observed from the TEM or the like in some cases. In addition, the average of crystal grain sizes can be calculated from the half width of XRD.

The polycrystal has a clear crystal structure; thus, a two-dimensional diffusion path of lithium ions can be sufficiently ensured. In addition, a polycrystal is easily produced as compared with a single crystal; thus, a polycrystal is preferably used for the first region 101.

Furthermore, the entire first region 101 does not necessarily have a layered rock-salt crystal structure. For example, part of the first region 101 may be amorphous or has another crystal structure.

<Second Region 102>

The second region 102 contains an oxide of a second transition metal. In other words, the second region 102 contains a second transition metal and oxygen.

As the second transition metal, a non-stoichiometric metal is preferably used. In other words, the second region 102 preferably includes a non-stoichiometric compound. For example, as the second transition metal, at least one of titanium, vanadium, manganese, iron, chromium, niobium, cobalt, zinc, zirconium, nickel, and the like can be used. Note that the second transition metal is preferably an element different from that of the first transition metal.

In this specification and the like, a non-stoichiometric metal refers to a metal that can have a plurality of valences. In addition, a non-stoichiometric compound refers to a compound of a metal that can have a plurality of valences and another element.

The second region 102 preferably has a rock-salt crystal structure.

The second region 102 serves as a buffer region which connects the first region 101 to the third region 103 which is described later. In the non-stoichiometric compound, an interatomic distance can be changed in accordance with a change in valence of a metal contained in the non-stoichiometric compound. In addition, in the non-stoichiometric compound, a cation or anion vacancy and dislocation (what is called Magneli phase) are often formed. Thus, the second region 102, which serves as a buffer region, can absorb a strain generated between the first region 101 and the third region 103.

Furthermore, the second region 102 may contain lithium in addition to the second transition metal and oxygen. For example, lithium titanate or lithium manganite may be contained. Moreover, the second region 102 may contain a representative element contained in the third region 103 which is described later. The second region 102 that contains an element contained in the first region 101, such as lithium, and an element contained in the third region 103 is preferable because the second region 102 serves as a buffer region.

That is, the second region 102 can contain lithium titanate, titanium oxide, vanadium oxide, manganese oxide, iron oxide, copper oxide, chromium oxide, niobium oxide, cobalt oxide, zinc oxide, or the like.

In addition, the second region 102 may contain the first transition metal. For example, the second transition metal may be present in part of a first transition metal site of the composite oxide including the first transition metal.

For example, in the case where the second transition metal is titanium, titanium may be present as titanium oxide ($TiO_2$) or lithium titanate ($LiTiO_2$) in the second region 102. Alternatively, in the second region 102, titanium may be substituted for part of the first transition metal site of the composite oxide of lithium and the first transition metal.

Moreover, the second region 102 may contain fluorine.

The second region 102 preferably has a crystal structure which is the same as that of the third region 103 which is described later. In this case, orientations of crystals of the second region 102 and the third region 103 are likely to be aligned with each other.

The second region 102 preferably has a rock-salt crystal structure; however, the entire second region 102 does not necessarily have a rock-salt crystal structure. For example, the second region 102 may have another crystal structure such as a spinel crystal structure, an olivine crystal structure, a corundum crystal structure, or a rutile crystal structure.

Furthermore, a crystal structure may have a strain as long as a structure where six oxygen atoms are adjacent to cations is kept. In addition, a cation vacancy may be present in part of the second region 102.

Moreover, part of the second region 102 may be amorphous.

When the thickness of the second region 102 is too small, the function as the buffer region is degraded; however, when the thickness of the second region 102 is too large, the capacity might be decreased. Thus, the second region 102 is preferably provided in a range from the surface of the positive electrode active material 100 to a depth of 20 nm, preferably a depth of 10 nm, in a depth direction. The second transition metal may have a concentration gradient.

<Third Region 103>

The third region 103 contains a compound of representative elements. A compound of representative elements is a stoichiometric compound. As the compound of representative elements, a compound made of representative elements which are electrochemically stable is preferable, and at least one of magnesium oxide, calcium oxide, beryllium oxide, lithium fluoride, and sodium fluoride can be used, for example.

The third region 103 is in contact with an electrolyte solution when the positive electrode active material 100 is used in a secondary battery. Thus, for the third region 103, a material which is hardly changed electrochemically in the process of charging and discharging and is not easily transformed by contact with the electrolyte solution is preferably used. The compound of representative elements which is a stoichiometric compound and electrochemically stable is preferably used for the third region 103. The positive electrode active material 100 includes the third region 103 in a superficial portion to improve stability in charging and discharging of the secondary battery. Here, a state where stability of a secondary battery is high refers to a state where the crystal structure of the composite oxide of lithium and the first transition metal contained in the first region 101 is more stable. Alternatively, it refers to a state where a change in capacity of the secondary battery is small even if charging and discharging are repeated or a state where a change in valence of a metal contained in the positive electrode active material 100 is suppressed even after charging and discharging are repeated.

The third region 103 may contain fluorine. In the case where the third region 103 contains fluorine, fluorine may be substituted for some anions in the compound of the representative elements.

Fluorine is substituted for some anions in the compound of the representative elements, whereby diffusion properties of lithium can be improved. Thus, the third region 103 is less likely to prevent charging and discharging. In addition, when fluorine is present in a superficial portion of a positive electrode active material particle, corrosion resistance against a hydrofluoric acid generated by decomposition of an electrolyte solution is increased in some cases.

Moreover, the third region 103 may include lithium, the first transition metal, and the second transition metal.

The compound of the representative elements contained in the third region 103 preferably has a rock-salt crystal structure. When the third region 103 has a rock-salt crystal structure, orientations of crystals are likely to be aligned with those of the second region 102. The orientations of crystals of the first region 101, the second region 102, and the third region 103 are substantially aligned with each other, whereby the second region 102 and the third region 103 can serve as a more stable coating layer.

However, the entire third region 103 does not necessarily have a rock-salt crystal structure. For example, the third region 103 may have another crystal structure such as a spinel crystal structure, an olivine crystal structure, a corundum crystal structure, or a rutile crystal structure.

Furthermore, a crystal structure may have a strain as long as a structure where six oxygen atoms are adjacent to cations is kept. In addition, a cation vacancy may be present in part of the third region 103.

Moreover, part of the third region 103 may be amorphous.

When the thickness of the third region 103 is too small, the function of increasing stability in charging and discharging is degraded; however, when the thickness of the third region 103 is too large, the capacity might be decreased. Thus, the thickness of the third region 103 is preferably greater than or equal to 0.5 nm and less than or equal to 50 nm, further preferably greater than or equal to 0.5 nm and less than or equal to 2 nm.

In the case where the third region 103 contains fluorine, fluorine is preferably present in a bonding state other than magnesium fluoride ($MgF_2$), lithium fluoride (LiF), and cobalt fluoride ($CoF_2$). Specifically, when an XPS analysis is performed on the vicinity of the surface of the positive electrode active material 100, a peak position of bonding energy with fluorine is preferably higher than or equal to 682 eV and lower than or equal to 685 eV, further preferably approximately 684.3 eV. The bonding energy does not correspond to those of $MgF_2$, LiF, and $CoF_2$.

In this specification and the like, a peak position of bonding energy with an element in an XPS analysis refers to a value of bonding energy at which the maximum intensity of an energy spectrum is obtained in a range corresponding to bonding energy of the element.

In general, when charging and discharging are repeated, a side reaction occurs in a positive electrode active material, for example, a first transition metal such as manganese, cobalt, or nickel is dissolved in an electrolyte solution, oxygen is released, and a crystal structure becomes unstable, so that the positive electrode active material deteriorates. However, the positive electrode active material 100 of one embodiment of the present invention includes the second region 102 serving as a buffer region and the third region 103 which is electrochemically stable. Thus, the dissolution of the first transition metal can be effectively suppressed, and the crystal structure of the composite oxide of lithium and the transition metal contained in the first region 101 can be more stable. As a result, the cycle characteristics of the secondary battery including the positive electrode active material 100 can be significantly improved. In addition, in the case where charging and discharging are performed at a voltage higher than 4.3 V (vs. $Li/Li^+$), in particular, a high voltage of 4.5 V (vs. Li/Li') or more, the structure of one embodiment of the present invention is significantly effective.

<Heteroepitaxial Growth and Topotaxy>

The second region 102 is preferably formed by heteroepitaxial growth from the first region 101. Furthermore, the third region 103 is preferably formed by heteroepitaxial growth from the second region 102. A region formed by heteroepitaxial growth becomes topotaxy which has crystal orientations substantially three-dimensionally aligned with those of a region serving as a base. Thus, the first region 101, the second region 102, and the third region 103 can be topotaxy.

When the crystal orientations of the first region 101, the second region 102, and the third region 103 are substantially aligned with each other, the second region 102 and the third region 103 serve as a coating layer which has a stable bond with the first region 101. As a result, the positive electrode active material 100 including a strong coating layer can be provided.

Since the second region 102 and the third region 103 have a stable bond with the first region 101, when the positive electrode active material 100 is used for the secondary battery, a change of the crystal structure in the first region 101 which is caused by charging and discharging can be effectively suppressed. Even when lithium is released from the first region 101 due to charging, the coating layer having a stable bond can suppress release of cobalt and oxygen from the first region 101. Furthermore, a chemically stable material can be used for a region in contact with the electrolyte solution. Thus, a secondary battery having excellent cycle characteristics can be provided.

<Degree of Mismatch Between Regions>

To perform heteroepitaxial growth, the degree of a mismatch between crystals in a region serving as a base and crystals on which crystal growth is performed is important.

In this specification and the like, the degree of a mismatch f is defined by the following Formula 1. The average of the nearest neighbor distances between oxygen and cations of the crystals in the region serving as a base is represented by a, and the average of the natural nearest neighbor distances between anions and cations of the crystals on which crystal growth is performed is represented by b.

[Formula 1]

$$f = \left| \frac{b-a}{a} \right| \qquad \text{(Formula 1)}$$

To perform heteroepitaxial growth, the degree of a mismatch f between crystals in a region serving as a base and crystals on which crystal growth is performed needs to be less than or equal to 0.12. To perform more stable heteroepitaxial growth to form a layered shape, the degree of a mismatch f is preferably less than or equal to 0.08, further preferably less than or equal to 0.04.

Thus, materials of the first region 101 and the second region 102 are preferably selected so that the degree of a mismatch f between the layered rock-salt crystal structure in the first region 101 and the rock-salt crystal structure in the second region 102 is less than or equal to 0.12.

Furthermore, materials of the second region 102 and the third region 103 are preferably selected so that the degree of a mismatch f between the rock-salt crystal structure in the second region 102 and the rock-salt crystal structure in the third region 103 is less than or equal to 0.12.

Examples of materials and crystal planes of the first region 101, the second region 102, and the third region 103 are shown below, which satisfy the above-described conditions: the degree of a mismatch f between the layered rock-salt crystal structure in the first region 101 and the rock-salt crystal structure in the second region 102 is less than or equal to 0.12; and the degree of a mismatch f between the rock-salt crystal structure in the second region 102 and the rock-salt crystal structure in the third region 103 is less than or equal to 0.12.

Example 1: Lithium Cobaltate, Lithium Titanate, and Magnesium Oxide

Figure 3:
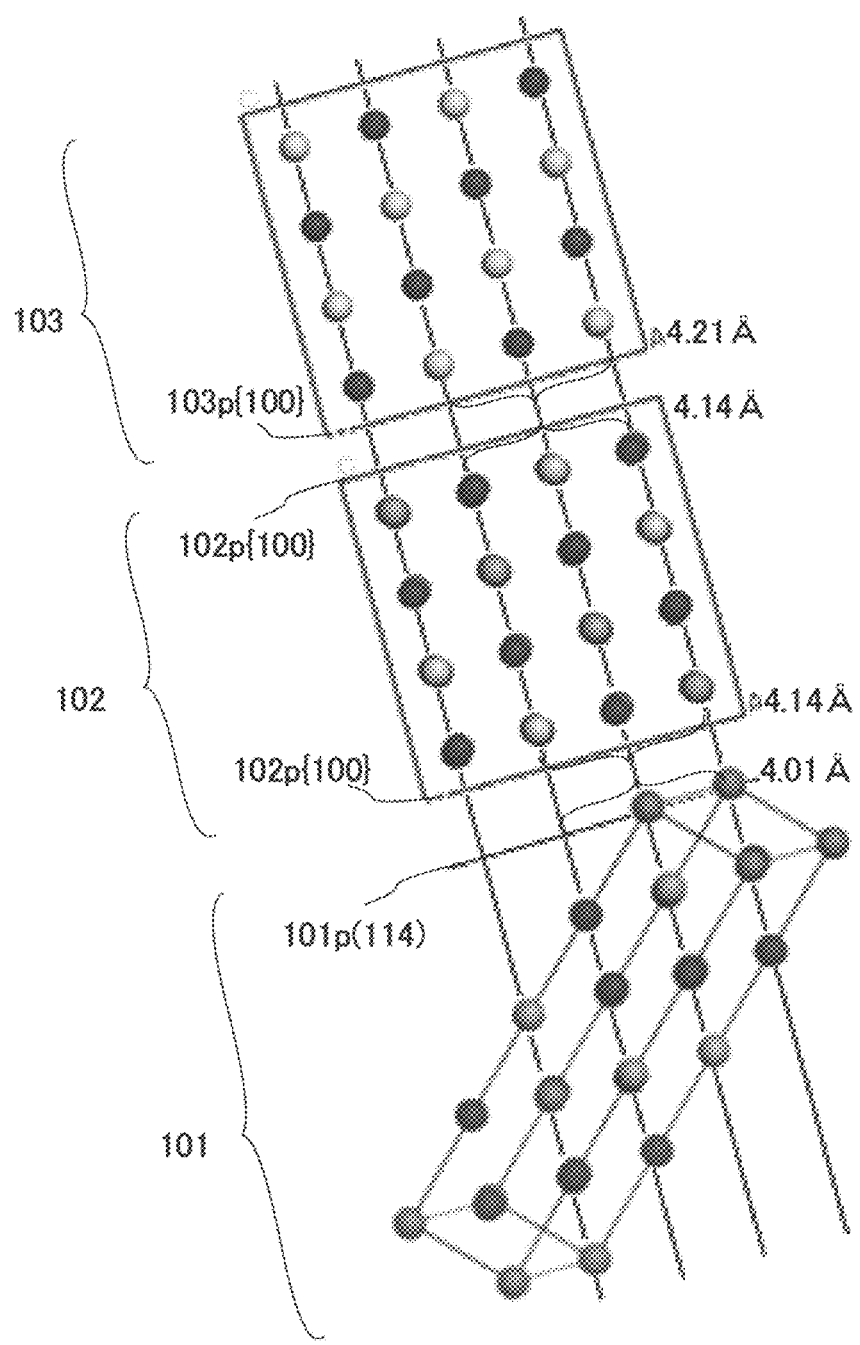
FIG. 3 illustrates crystal structures of a positive electrode active material.

First, FIGS. 2A and 2B and FIG. 3 show an example in which the first transition metal is cobalt, the first region 101 contains lithium cobaltate having a layered rock-salt crystal structure, the second transition metal is titanium, the second region 102 contains lithium titanate having a rock-salt crystal structure, and the compound of the representative elements in the third region 103 is magnesium oxide having a rock-salt crystal structure.

FIG. 2A illustrates a model of a layered rock-salt crystal structure (a space group R-3mH) of lithium cobaltate (LiCoO$_2$), a model of a rock-salt crystal structure (a space group Fd-3mZ) of lithium titanate (LiTiO$_2$), and a model of a rock-salt crystal structure (a space group Fd-3mZ) of magnesium oxide. FIG. 2A illustrates models each of which is seen from the b-axis direction.

From FIG. 2A, it is not seen that the layered rock-salt crystals and the rock-salt crystals make topotaxy. Then, here, the layered rock-salt crystals are seen from a different direction (e.g., a direction indicated by an arrow in FIG. 2A). FIG. 2B illustrates a model of the layered rock-salt crystals seen from the <1-1-4> plane direction and models of the rock-salt crystals seen from the <100> plane direction.

As illustrated in FIG. 2B, when the layered rock-salt crystals are seen from the <1-1-4> plane direction, atomic arrangement of the layered rock-salt crystals is highly similar to those of the rock-salt crystals seen from the <100> plane direction. In addition, the nearest neighbor distances between metal and oxygen have similar values. For example, in the layered rock-salt lithium cobaltate, a distance between Li and O is 2.089 Å and a distance between Co and O is 1.925 Å. In the rock-salt lithium titanate, a distance between Li and O is 2.138 Å and a distance between Ti and O is 2.051 Å. In the rock-salt magnesium oxide, a distance between Mg and O is 2.106 Å.

Then, with reference to FIG. 3, the degree of a mismatch between the regions when the (1-1-4) crystal plane of the layered rock-salt crystal and the {100} crystal plane of the rock-salt crystal are in contact with each other is described.

As illustrated in FIG. 3, a distance between metals through oxygen in a (1-1-4) crystal plane 101p (1-1-4) of lithium cobaltate having the layered rock-salt crystal structure in the first region 101 is 4.01 Å. Furthermore, a distance between metals through oxygen in a {100} crystal plane 102p {100} of lithium titanate having the rock-salt crystal structure in the second region 102 is 4.19 Å. Thus, the degree of a mismatch f between the crystal plane 101p (1-1-4) and the crystal plane 102p {100} is 0.04.

In addition, a distance between metals through oxygen in a {100} crystal plane 103p {100} of magnesium oxide having the rock-salt crystal structure in the third region 103 is 4.21 Å. Thus, the degree of a mismatch f between the crystal plane 102p {100} and the crystal plane 103p {100} is 0.02.

In this manner, the degree of a mismatch between the first region 101 and the second region 102 and the degree of a mismatch between the second region 102 and the third region 103 are sufficiently small; thus, the first region 101, the second region 102, and the third region 103 can be topotaxy.

Although not illustrated in FIG. 3, if the crystal plane 101p (1-1-4) in the first region 101 and the crystal plane 103p {100} in the third region 103 are in contact with each other, the degree of a mismatch f is 0.05. That is, owing to the second region 102, the degree of a mismatch can be small. Moreover, with the second region 102 that is a non-stoichiometric transition metal oxide, the first region 101, the second region 102, and the third region 103 can be more stable topotaxy. Thus, the second region 102 and the third region 103 can serve as a coating layer having a stable bond with the first region 101.

In this embodiment, the (1-1-4) plane of the layered rock-salt crystal and the {100} plane of the rock-salt crystal are in contact with each other; however, one embodiment of the present invention is not limited thereto as long as crystal planes which can be topotaxy are in contact with each other.

Example 2: Lithium Cobaltate, Manganese Oxide, and Calcium Oxide

Next, an example in which the first transition metal is cobalt, the first region 101 contains lithium cobaltate having a layered rock-salt crystal structure, the second transition metal is manganese, the second region 102 contains manganese oxide having a rock-salt crystal structure, and the compound of the representative elements in the third region 103 is calcium oxide having a rock-salt crystal structure is shown.

Also in this case, as in FIGS. 2A and 2B and FIG. 3, when the layered rock-salt crystals are seen from the <1-1-4> plane direction, atomic arrangement of the layered rock-salt crystals in the first region 101 is highly similar to those of the rock-salt crystals in the second region 102 and the third region 103 seen from the <100> plane direction.

The degree of a mismatch between the regions when the (1-1-4) crystal plane of the layered rock-salt crystal and the {100} crystal plane of the rock-salt crystal are in contact with each other is described. A distance between metals through oxygen in a crystal plane (1-1-4) of lithium cobaltate having the layered rock-salt crystal structure in the first region 101 is 4.01 Å. Furthermore, a distance between metals through oxygen in a crystal plane {100} of manganese oxide having the rock-salt crystal structure in the second region 102 is 4.45 Å. Thus, the degree of a mismatch f between the crystal plane (1-1-4) in the first region 101 and the crystal plane {100} in the second region 102 is 0.11.

In addition, a distance between metals through oxygen in a crystal plane {100} of calcium oxide having the rock-salt crystal structure in the third region 103 is 4.82 Å. Thus, the degree of a mismatch f between the crystal plane {100} in the second region 102 and the crystal plane {100} in the third region 103 is 0.08.

In this manner, the degree of a mismatch between the first region 101 and the second region 102 and the degree of a mismatch between the second region 102 and the third region 103 are sufficiently small; thus, the first region 101, the second region 102, and the third region 103 can be topotaxy.

If the crystal plane (1-1-4) in the first region 101 and the crystal plane {100} in the third region 103 are in contact with each other, the degree of a mismatch f is 0.20; thus, it is difficult to perform the heteroepitaxial growth. That is, owing to the second region 102, the heteroepitaxial growth from the first region to the third region can be performed. Thus, the second region 102 and the third region 103 can serve as a coating layer having a stable bond with the first region 101.

Example 3: Lithium Nickel-Manganese-Cobalt Oxide, Manganese Oxide, and Calcium Oxide Next, an example in which the first transition metals are nickel, manganese, and cobalt, the first region 101 contains lithium nickel-manganese-cobalt oxide (LiNi$_{0.33}$Co$_{0.33}$Mn$_{0.33}$O$_2$) having a layered rock-salt crystal structure, the second transition metal is manganese, the second region 102 contains manganese oxide having a rock-salt crystal structure, and the compound of the representative elements in the third region 103 is calcium oxide having a rock-salt crystal structure is shown.

Also in this case, as illustrated in FIGS. 2A and 2B and FIG. 3, when the layered rock-salt crystals are seen from the <1-1-4> plane direction, atomic arrangement of the layered rock-salt crystals is highly similar to those of the rock-salt crystals seen from the <100> plane direction. The degree of a mismatch between the regions when the (1-1-4) crystal plane of the layered rock-salt crystal and the {100} crystal plane of the rock-salt crystal are in contact with each other is described.

A distance between metals through oxygen in a crystal plane (1-1-4) of lithium nickel-manganese-cobalt oxide having the layered rock-salt crystal structure in the first region 101 is 4.07 Å. Furthermore, a distance between metals through oxygen in a crystal plane {100} of manganese oxide having the rock-salt crystal structure in the second region 102 is 4.45 Å. Thus, the degree of a mismatch f between the crystal plane (1-1-4) in the first region 101 and the crystal plane {100} in the second region 102 is 0.09.

In addition, a distance between metals through oxygen in a crystal plane {100} of calcium oxide having the rock-salt crystal structure in the third region 103 is 4.82 Å. Thus, the degree of a mismatch f between the crystal plane {100} in the second region 102 and the crystal plane {100} in the third region 103 is 0.08.

In this manner, the degree of a mismatch between the first region 101 and the second region 102 and the degree of a mismatch between the second region 102 and the third region 103 are sufficiently small; thus, the first region 101, the second region 102, and the third region 103 can be topotaxy.

If the crystal plane (1-1-4) in the first region 101 and the crystal plane {100} in the third region 103 are in contact with each other, the degree of a mismatch f is 0.18; thus, it is difficult to perform the heteroepitaxial growth. That is, the second region 102 is provided, whereby the heteroepitaxial growth from the first region to the third region can be performed. Thus, the second region 102 and the third region 103 can serve as a coating layer having a stable bond with the first region 101.

<Boundaries Between Regions>

As described above, the first region 101, the second region 102, and the third region 103 have different compositions. The element contained in each region has a concentration gradient in some cases. For example, the second transition metal in the second region 102 may have a concentration gradient. In addition, the third region 103 may have a concentration gradient of a representative element because a representative element preferably segregates in the third region 103 as described later. Thus, the boundaries between the regions are not clear in some cases.

The difference of compositions of the first region 101, the second region 102, and the third region 103 can be observed using a TEM image, a STEM image, fast Fourier transform (FFT) analysis, energy dispersive X-ray spectrometry (EDX), an analysis in the depth direction by time-of-flight secondary ion mass spectrometry (ToF-SIMS), X-ray photoelectron spectroscopy (XPS), Auger electron spectroscopy, thermal desorption spectroscopy (TDS), or the like.

For example, in the TEM image and the STEM image, difference of constituent elements is observed as difference of brightness; thus, difference of constituent elements of the first region 101, the second region 102, and the third region 103 can be observed. Furthermore, also in plane analysis of EDX (e.g., element mapping), it can be observed that the first region 101, the second region 102, and the third region 103 contain different elements.

By line analysis of EDX and analysis in the depth direction using ToF-SIMS, a peak of concentration of each element contained in the first region 101, the second region 102, and the third region 103 can be detected.

However, clear boundaries between the first region 101, the second region 102, and the third region 103 are not necessarily observed by the analyses.

In this specification and the like, the third region 103 that is present in a superficial portion of the positive electrode active material 100 refers to a region from the surface of the positive electrode active material 100 to a region where a concentration of a representative element such as magnesium which is detected by analysis in the depth direction is ⅕ of a peak. As the analysis in the depth direction, the line analysis of EDX, analysis in the depth direction using ToF-SIMS, or the like, which is described above, can be used.

Furthermore, a peak of a concentration of a representative element is preferably present in a region from the surface of the positive electrode active material 100 to a depth of 3 nm toward the center, further preferably to a depth of 1 nm, and still further preferably to a depth of 0.5 nm.

Although the depth at which the concentration of the representative element becomes ⅕ of the peak is different depending on the manufacturing method, in the case of a manufacturing method described later, the depth is approximately 2 nm to 5 nm from the surface of the positive electrode active material.

The third region 103 that is present inside the first region 101 in the vicinity of a grain boundary, a crystal defect, or the like also refers to a region where a concentration of a representative element which is detected by analysis in the depth direction is higher than or equal to ⅕ of a peak.

A distribution of fluorine in the positive electrode active material 100 preferably overlaps with a distribution of the representative element. Thus, fluorine also has a concentration gradient, and a peak of a concentration of fluorine is preferably present in a region from the surface of the positive electrode active material 100 to a depth of 3 nm toward the center, further preferably to a depth of 1 nm, and still further preferably to a depth of 0.5 nm.

In this specification and the like, the second region 102 that is present in a superficial portion of the positive electrode active material 100 refers to a region where a concentration of the second transition metal which is detected by analysis in the depth direction is higher than or equal to ½ of a peak. The second region 102 that is present inside the first region 101 in the vicinity of a grain boundary, a crystal defect, or the like also refers to a region where a concentration of the second transition metal which is detected by analysis in the depth direction is higher than or equal to ½ of a peak. As the analysis method, the line analysis of EDX, analysis in the depth direction using ToF-SIMS, or the like, which is described above, can be used.

Thus, the third region 103 and the second region 102 overlap in some cases. Note that the third region 103 is preferably present in a region closer to the surface of the positive electrode active material particle than the second region 102 is. In addition, the peak of the concentration of the representative element is preferably present in a region closer to the surface of the positive electrode active material particle than the peak of the concentration of the second transition metal is.

The peak of the second transition metal is preferably present in a region from a depth of 0.2 nm or more to a depth of 10 nm or less from the surface of the positive electrode active material 100 toward the center, further preferably in a region from a depth of 0.5 nm or more to a depth of 3 nm or less.

The measurement range of the XPS is from the surface of the particle of the positive electrode active material 100 to a region at a depth of approximately 5 nm. Thus, a concentration of an element present at a depth of approximately 5 nm from the surface can be analyzed quantitatively. Thus, the concentration of elements in the third region 103 and the second region 102 present at a depth of approximately 5 nm from the surface can be analyzed quantitatively.

When the surface of the positive electrode active material 100 is subjected to the XPS analysis and the concentration of the first transition metal is defined as 1, a relative value of the concentration of the second transition metal is preferably greater than or equal to 0.05 and less than or equal to 0.4, further preferably greater than or equal to 0.1 and less than or equal to 0.3. In addition, a relative value of the concentration of the representative element is preferably greater than or equal to 0.4 and less than or equal to 1.5, further preferably greater than or equal to 0.45 and less than or equal to 1.00. Furthermore, a relative value of the concentration of fluorine is preferably greater than or equal to 0.05 and less than or equal to 1.5, further preferably greater than or equal to 0.3 and less than or equal to 1.00.

Note that, as described above, elements contained in the first region 101, the second region 102, and the third region 103 may each have a concentration gradient; thus, the first region 101 may contain the element in the second region 102 or the third region 103, such as fluorine. Similarly, the third region 103 may contain the element in the first region 101 or the second region 102. In addition, the first region 101, the second region 102, and the third region 103 may each contain another element such as carbon, sulfur, silicon, sodium, calcium, chlorine, or zirconium.

[Particle Diameter]

If the particle diameter of the positive electrode active material 100 is too large, diffusion of lithium is difficult, whereas if the particle diameter is too small, it is difficult to maintain a crystal structure described later. Thus, D50 (also referred to as a median diameter) is preferably 5 μm or more and 100 μm or less, and further preferably 10 μm or more and 70 μm or less. In the case where the coating film is formed on the surface of the positive electrode active material 100 by a spray dry apparatus in a later step, it is preferable that the nozzle diameter and the maximum particle diameter of the positive electrode active material 100 be substantially the same. When the particle diameter is less than 5 μm and a spray dry apparatus having a nozzle diameter of 20 μm is used, secondary particles are covered collectively, which leads to a decrease in coverage.

To increase the density of the positive electrode active material layer, it is effective to mix large particles (the longest portion is approximately 20 μm or more and 40 μm or less) and small particles (the longest portion is approximately 1 μm) and embed spaces between the large particles with the small particles. Thus, there may be two peaks of particle size distribution.

The particle size of the positive electrode active material is influenced not only by the particle sizes of starting materials but also by a ratio between lithium and the first transition metal (hereinafter expressed as a ratio of Li to the first transition metal) which are contained in the starting material.

In the case where the particle size of the starting material is small, the grain growth needs to be performed at the time of baking so that the grain size of the positive electrode active material is in the above-described preferred range.

To promote the grain growth at the time of baking, it is effective to make the ratio of Li to the first transition metal of the starting material larger than 1, that is, to make the amount of lithium a little larger. For example, when the ratio of Li to the first transition metal is approximately 1.06, a positive electrode active material in which D50 is larger than or equal to 15 μm is easily obtained. Note that, as described later, lithium may be lost to the outside of a system in the formation process of the positive electrode active material; thus, the ratio between lithium and the first transition metal of the obtained positive electrode active material does not agree with the ratio between lithium and the first transition metal of the starting material in some cases.

However, if the amount of lithium is too large to make the particle size be in the preferred range, the capacity retention rate of a secondary battery containing the positive electrode active material might be decreased.

Then, the present inventors found that with the second region 102 containing the second transition metal in the superficial portion, the particle size can be in the preferred range by control of the ratio of Li to the first transition metal and a positive electrode active material having high capacity retention rate can be formed.

In the positive electrode active material of one embodiment of the present invention including a region containing the second transition metal in the superficial portion, the ratio of Li to the first transition metal in the starting material is preferably greater than or equal to 1.00 and less than or equal to 1.07, further preferably greater than or equal to 1.03 and less than or equal to 1.06.

[Formation of Second Region]

The second region 102 can be formed by coating particles of the composite oxide of lithium and the first transition metal with a material containing the second transition metal.

As the coating method of the material containing the second transition metal, a liquid phase method such as a sol-gel method, a solid phase method, a sputtering method, an evaporation method, a chemical vapor deposition (CVD) method, a pulsed laser deposition (PLD) method, or the like can be used. In this embodiment, the case where the sol-gel method which can be performed with a uniform coverage under an atmospheric pressure is used is described.

<Sol-Gel Method>

A method for forming a material containing the second transition metal using a sol-gel method is described with reference to FIGS. 4A-1, 4A-2, 4A-3, 4B, 4C, 4D-1, and 4D-2.

First, an alkoxide of the second transition metal is dissolved in alcohol.

Figures 1, 4A:
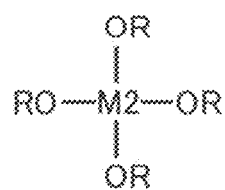

FIG. 4A-1 shows a general formula of the alkoxide of the second transition metal. In the formula of FIG. 4A-1, M2 indicates the alkoxide of the second transition metal. R represents an alkyl group having 1 to 18 carbon atoms or a substituted or unsubstituted aryl group having 6 to 13 carbon atoms. Although FIG. 4A-1 shows the general formula in which the second transition metal has a valence of 4, one embodiment of the present invention is not limited thereto. The second transition metal may have a valence of 2, a valence of 3, a valence of 5, a valence of 6, or a valence of 7. In this case, the alkoxide of the second transition metal includes an alkoxy group corresponding to the valence of the second transition metal.

Figures 2, 4A:
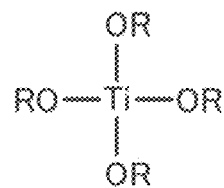
Figures 3, 4A:
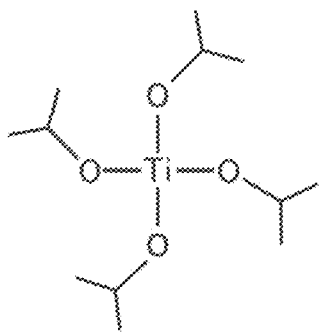

FIG. 4A-2 shows a general formula of the titanium alkoxide used when titanium is used as the second transition metal. R in FIG. 4A-2 represents an alkyl group having 1 to 18 carbon atoms or a substituted or unsubstituted aryl group having 6 to 13 carbon atoms.

As the titanium alkoxide, tetramethoxytitanium, tetraethoxytitanium, tetra-n-propoxytitanium, tetra-i-propoxytitanium (also referred to as tetraisopropyl orthotitanate, titanium (IV) isopropoxide, titanium tetraisopropoxide (IV), TTIP, and the like), tetra-n-butoxytitanium, tetra-i-butoxytitanium, tetra-sec-butoxytitanium, tetra-t-butoxytitanium, or the like can be used.

FIG. 4A-3 shows a chemical formula of titanium (IV) isopropoxide (TTIP) described in a formation method below, which is a kind of titanium alkoxide.

As a solvent in which the alkoxide of the second transition metal is dissolved, an alcohol such as methanol, ethanol, propanol, 2-propanol, butanol, or 2-butanol is preferably used.

Next, particles of composite oxide of lithium, a transition metal, magnesium, and fluorine are mixed into the alcohol solution of the alkoxide of the second transition metal and stirred in an atmosphere containing water vapor.

Figure 4B:
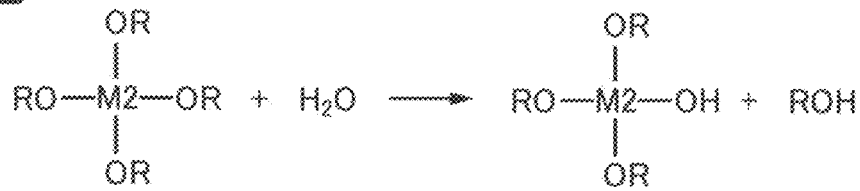
Figure 4C:
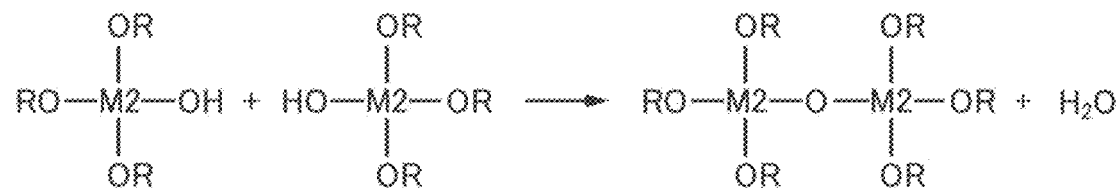
Figures 1, 4D:
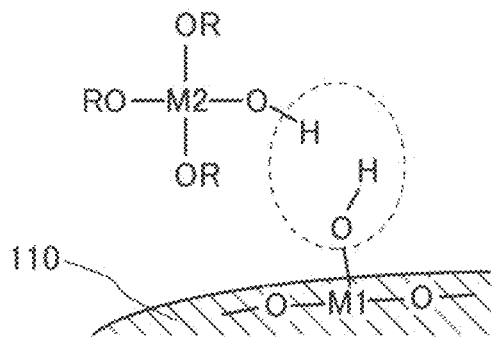
Figures 2, 4D:
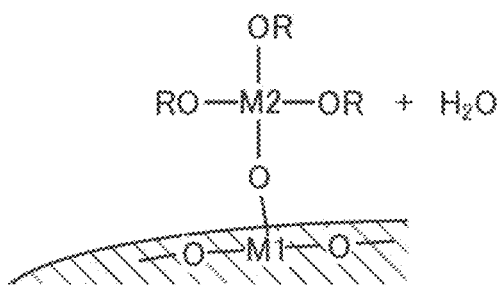

When the solution is put in an atmosphere containing $H_2O$, hydrolysis of water and an alkoxide of the second transition metal occurs as in FIG. 4B. Then, as in FIG. 4C, dehydration condensation occurs between the products of FIG. 4B. When the hydrolysis of FIG. 4B and the condensation reaction of FIG. 4C occur repeatedly, a sol of an oxide of the second transition metal is generated. This reaction also occurs on a particle 110 of the composite oxide as in FIGS. 4D-1 and 4D-2, and a layer containing the second transition metal is formed on the surface of the particle 110.

After that, the particle 110 is collected, and the alcohol is vaporized. The details of the formation method are described later.

Note that in this embodiment, an example in which the particles of the composite oxide of lithium, the first transition metal, the representative element, and fluorine are coated with the material containing the second transition metal before the particles are applied to a positive electrode current collector is described; however, one embodiment of the present invention is not limited thereto. After the positive electrode active material layer including the particles of the composite oxide of lithium, the first transition metal, the representative element, and fluorine is formed on the positive electrode current collector, the positive electrode current collector and the positive electrode active material layer may be both soaked into an alkoxide solution of the second transition metal to be coated with the material containing the second transition metal.

[Segregation of Third Region]

The third region 103 can be formed by a sputtering method, a solid phase method, a liquid phase method such as a sol-gel method, or the like. However, the present inventors found that when a source of a representative element such as magnesium and a source of fluorine are mixed with a material of the first region 101 and then the mixture is heated, the representative element is segregated on a superficial portion of the positive electrode active material particle to form the third region 103. In addition, they found that with the third region 103 formed in this manner, the positive electrode active material 100 has excellent cycle characteristics.

In the case where the third region 103 is formed through the heating as described above, the heating is preferably performed after the particle of the composite oxide is coated with the material containing the second transition metal. This is because even after the particle is coated with the material containing the second transition metal, the representative element such as magnesium is unexpectedly segregated on the surface of the particle when the heating is performed.

Segregation models of the representative element are described with reference to FIGS. 5A to 5C and FIGS. 6A to 6D. It is probable that the segregation model of the representative element such as magnesium is slightly different in accordance with the ratio between lithium and the first transition metal contained in a starting material. Then, a segregation model in which the ratio of Li to the first transition metal in the starting material is less than 1.03, that is, the amount of lithium is small, is described with reference to FIGS. 5A to 5C. In addition, a segregation model in which the ratio of Li to the first transition metal in the starting material is greater than or equal to 1.03, that is, the amount of lithium is large, is described with reference to FIGS. 6A to 6D. In these segregation models in FIGS. 5A to 5C and FIGS. 6A to 6D, the first transition metal is cobalt, the second transition metal is titanium, and the representative element is magnesium.

Figure 5A:
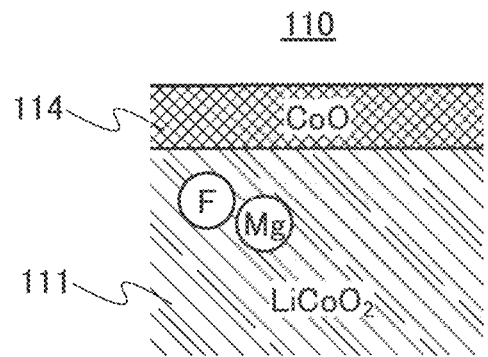
FIGS. 5A to 5C illustrate a segregation model of elements contained in a positive electrode active material.

FIG. 5A illustrates a model diagram of the vicinity of the surface of the particle 110 of the composite oxide containing lithium, cobalt, magnesium, and fluorine, which is formed at a ratio of Li to Co in the starting material of less than 1.03. A region 111 in the drawings contains lithium, cobalt, magnesium, and fluorine, and lithium cobaltate ($LiCoO_2$) is a main component of the region 111. Lithium cobaltate has a layered rock-salt structure.

It is generally known that, at the time of synthesizing particles of the composite oxide containing lithium, cobalt, magnesium, and fluorine, lithium partly moves outside a system (a particle on which lithium is formed). This is because lithium is volatilized at the time of baking, lithium is eluted to a solvent at the time of mixing the starting material, and the like. Thus, the ratio of Li to Co in the particle 110 of the composite oxide containing lithium, cobalt, magnesium, and fluorine becomes smaller than the ratio of Li to Co in the starting material in some cases.

When the ratio of Li to Co in the starting material is less than 1.03, on the surface of the particle 110, lithium is released from the lithium cobaltate and cobalt oxide is easily generated. Thus, as illustrated in FIG. 5A, the surface of the particle 110 of the composite oxide is covered with a cobalt oxide (CoO) layer 114 in some cases.

The cobalt oxide has a rock-salt crystal structure. Thus, in the particle 110 in FIG. 5A, the cobalt oxide layer 114 having a rock-salt crystal structure is provided over and in contact with the region 111 containing lithium cobaltate having a layered rock-salt crystal structure in some cases.

Figure 5B:
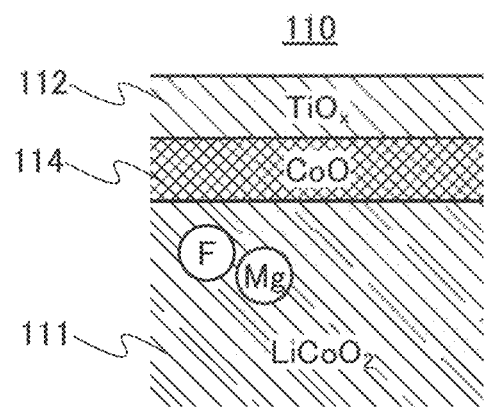

The particle 110 is coated with a material containing titanium by a sol-gel method or the like. FIG. 5B illustrates a state where the particle 110 is coated with a layer 112 containing titanium by a sol-gel method. At the stage of FIG. 5B, the layer 112 containing titanium is a gel of titanium oxide; thus, the crystallinity is low.

Figure 5C:
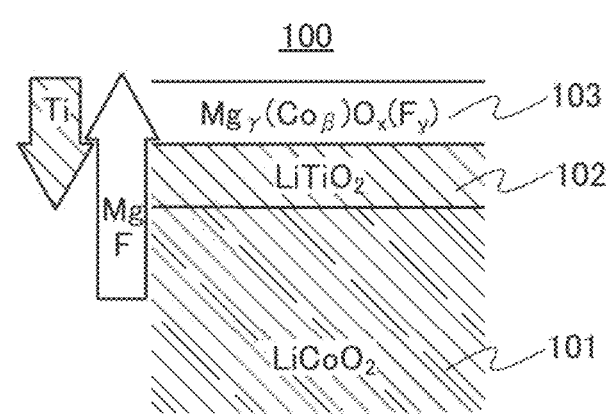

Next, the particle 110 coated with the layer 112 containing titanium is heated. Although the details of the heating conditions are described later, for example, FIG. 5C illustrates a state where the particle 110 is heated in an oxygen atmosphere at 800° C. for two hours to form the positive electrode active material 100, which is one embodiment of the present invention. By heating, titanium in the layer 112 containing titanium is diffused into the inside of the particle 110. At the same time, magnesium and fluorine contained in the region 111 are segregated on the surface of the particle 110.

As described above, on the surface of the particle 110, cobalt oxide having a rock-salt structure is present. In addition, magnesium oxide also has a rock-salt crystal structure. Thus, it is probable that magnesium is more stable in the state of being present as magnesium oxide on the surface of the particle 110 as compared with the state of being present inside the particle 110. That could be why magnesium is segregated on the surface of the particle 110 when the particle 110 is heated.

Moreover, it is considered that fluorine contained in the starting material promotes the segregation of magnesium.

Fluorine has higher electronegativity than oxygen. Thus, it is probable that even in a stable compound such as magnesium oxide, when fluorine is added, uneven charge distribution occurs and a bond between magnesium and oxygen is weakened. Furthermore, it is probable that fluorine is substituted for oxygen in the magnesium oxide, whereby magnesium easily moves around the substituted fluorine.

Moreover, this can also be described from a phenomenon in which a melting point of a mixture decreases. When magnesium oxide (melting point: 2852° C.) and lithium fluoride (melting point: 848° C.) are added at the same time, the melting point of the magnesium oxide is lowered. It is considered that the melting point is lowered, whereby magnesium easily moves at the time of heating, and the segregation of magnesium easily occurs.

Lastly, the third region 103 becomes a solid solution of cobalt oxide and magnesium oxide which has a rock-salt crystal structure. Furthermore, fluorine is probably substituted for part of oxygen contained in the cobalt oxide and the magnesium oxide.

Cobalt sites of lithium cobaltate are substituted for part of the diffused titanium and lithium titanate is substituted for another part of the diffused titanium. The second region 102 after the heating contains lithium titanate having a rock-salt crystal structure.

The first region 101 after the heating contains lithium cobaltate having a layered rock-salt crystal structure.

Figure 6A:
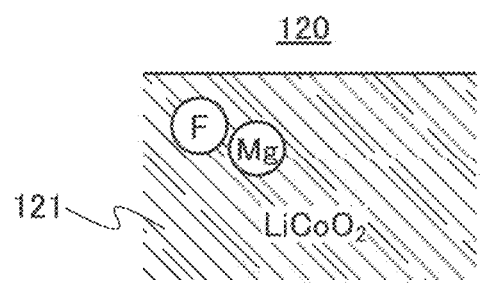
FIGS. 6A to 6D illustrate a segregation model of elements contained in a positive electrode active material.

Next, the case where the ratio of Li to Co in the starting material is larger than or equal to 1.03 is described with reference to FIGS. 6A to 6D. FIG. 6A illustrates a model diagram of the vicinity of the surface of the particle 120 of the composite oxide containing lithium, cobalt, magnesium, and fluorine, which is formed at a ratio of Li to Co in the starting material of greater than or equal to 1.03. A region 121 in the drawings contains lithium, cobalt, magnesium, and fluorine.

Since the particle 120 in FIG. 6A contains a sufficient amount of lithium, even when lithium is released from the particle 120 at the time of baking the particle 120 of the composite oxide of lithium, cobalt, magnesium, and fluorine or the like, lithium is diffused from the inside of the particle 120 to the surface thereof to compensate; as a result, a cobalt oxide layer is not easily formed on the surface.

Figure 6B:
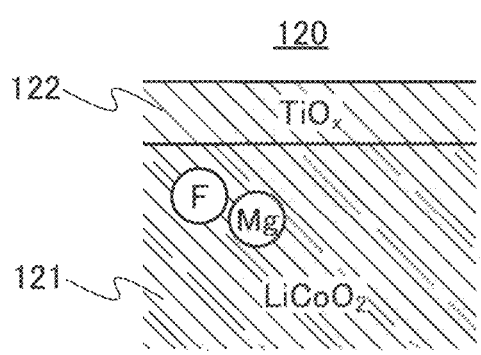

FIG. 6B illustrates a state where the particle 120 in FIG. 6A is coated with a layer 122 containing titanium by a sol-gel method. At the stage of FIG. 6B, the layer 122 containing titanium is a gel of titanium oxide; thus, the crystallinity is low.

Figure 6C:
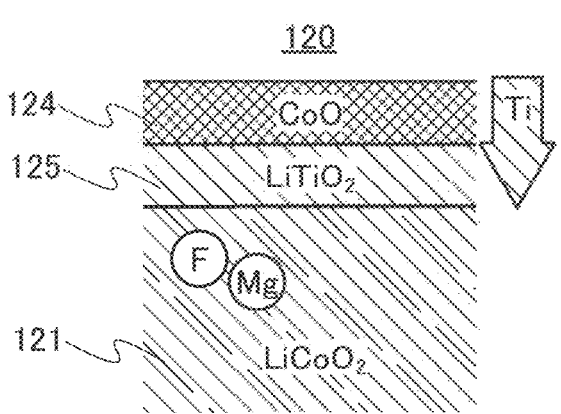

FIG. 6C illustrates the state where the particle 120 coated with the layer 122 containing titanium in FIG. 6B starts to be heated. By heating, titanium in the layer 122 containing titanium is diffused into the inside of the particle 110. The diffused titanium is bonded with lithium contained in the region 121 to become lithium titanate, and a layer 125 containing the lithium titanate is formed.

Since lithium is bonded with titanium to form lithium titanate, the amount of lithium is relatively insufficient at the surface of the particle 120. Thus, it is probable that, as illustrated in FIG. 6C, a cobalt oxide layer 124 is temporarily formed on the surface of the particle 120.

Figure 6D:
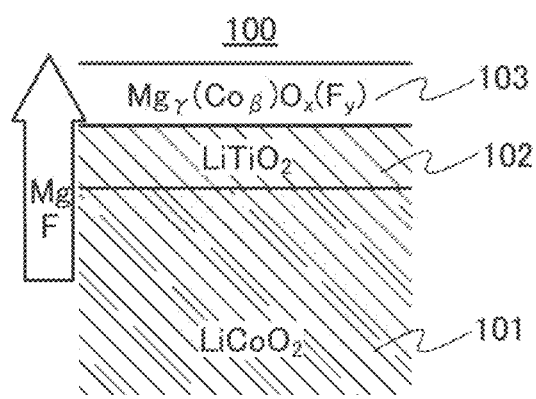

FIG. 6D illustrates the state where the state of FIG. 6C is sufficiently heated to form the positive electrode active material 100, which is one embodiment of the present invention. It is considered that, since the cobalt oxide layer 124 having a rock-salt crystal structure is present on the surface, magnesium is more stable in the state of being present as magnesium oxide on the surface of the particle 120 as compared with the state of being present inside the particle 120. As in the case of FIGS. 5A to 5C, fluorine promotes the segregation of magnesium.

Thus, as illustrated in FIG. 6D, magnesium and fluorine contained in the region 121 are segregated on the surface to be the third region 103 with the cobalt oxide.

In this manner, the positive electrode active material 100, which includes the third region 103 containing magnesium oxide and cobalt oxide, the second region 102 containing lithium titanate, and the first region 101 containing lithium cobaltate, is formed.

Note that in the case where the representative element is segregated by heating, when the composite oxide containing lithium and the first transition metal included in the first region 101 is a polycrystal or has crystal defects, the representative element can be segregated not only in the superficial portion but also in the vicinity of a grain boundary of the composite oxide containing lithium and the first transition metal or in the vicinity of crystal defects thereof. The representative element segregated in the vicinity of a grain boundary or in the vicinity of crystal defects can contribute to further improvement in stability of the crystal structure of the composite oxide containing lithium and the first transition metal included in the first region 101.

When the composite oxide containing lithium and the first transition metal included in the first region 101 includes a crack portion, the representative element is also segregated in the crack portion by heating. In addition, not only the representative element but also the second transition metal can be segregated. The crack portion is in contact with the electrolyte solution like the surface of the particle. Thus, the representative element and the second transition metal are segregated in the crack portion, and the third region 103 and the second region 102 are generated, whereby a chemically stable material can be used for the region in contact with the electrolyte solution. As a result, a secondary battery having excellent cycle characteristics can be provided.

The ratio between a representative element (T) and fluorine (F) in a starting material is preferably in a range of T:F=1:x ($1.5 \leq x \leq 4$) (atomic ratio) because the segregation of the representative element effectively occurs. Further preferably, the ratio between T and F is approximately 1:2 (atomic ratio).

Since the third region 103 formed by segregation is formed by epitaxial growth, orientations of crystals in the second region 102 and the third region 103 are partly and substantially aligned with each other in some cases. That is, the second region 102 and the third region 103 become topotaxy in some cases. When the orientations of crystals in the second region 102 and the third region 103 are substantially aligned with each other, these regions can serve as a more favorable coating layer.

However, not all of the representative elements such as magnesium which is added as a starting material need not be segregated in the third region 103. For example, the first region 101 may contain a small amount of representative element such as magnesium.

<Fourth Region 104>

Figure 1C:
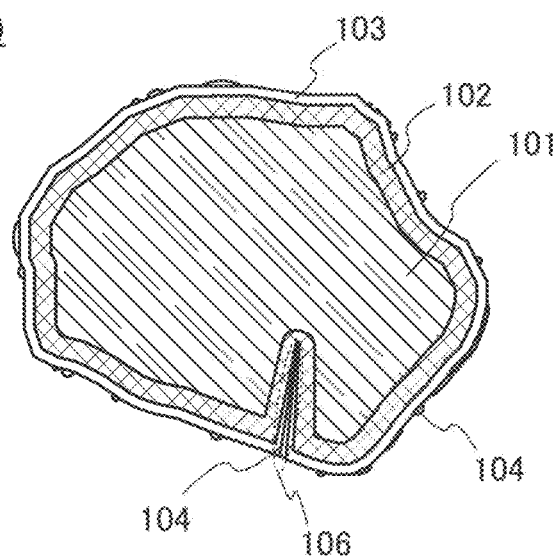

In addition, as illustrated in FIG. 1C, the positive electrode active material 100 may include a fourth region 104 on the third region 103. Furthermore, when the positive electrode active material 100 contains a defect such as a crack portion 106, the fourth region 104 may be present to embed the defect such as the crack portion 106.

The fourth region 104 contains some elements contained in the second region 102 and the third region 103. For example, the fourth region 104 contains the second transition metal and the representative element.

The fourth region 104 may have a projection, a stripe shape, or a layered shape. The fourth region 104 is formed using the second transition metal and the representative element not contained in the second region 102 or the third region 103 of the second transition metals and the representative elements contained in the starting material and the like. That is, with the fourth region 104, the amount of the second transition metal and the representative element contained in the second region 102 and the third region 103 can be kept in an appropriate range and the crystal structures of the second region 102 and the third region 103 can be stabilized in some cases. Moreover, with the fourth region 104, the defect such as the crack portion 106 included in the positive electrode active material 100 can be repaired.

The presence of the fourth region 104 and the shape of the fourth region 104 can be observed by a scanning electron microscope (SEM) or the like. Elements contained in the fourth region 104 can be analyzed by SEM-EDX or the like.

[Method for Forming Positive Electrode Active Material]

Next, an example of a method for forming the positive electrode active material 100, which is one embodiment of the present invention, is described.

<Step 11: Preparation of Starting Materials>

First, starting materials are prepared. From the starting materials prepared in this process, the first region 101 and the third region 103 are formed finally.

As materials of lithium and the first transition metal contained in the first region 101, a source of lithium and a source of the first transition metal are prepared. In addition, as materials of the compound of the representative elements contained in the third region 103, a source of the representative element is prepared.

In addition to these sources, a source of fluorine is preferably prepared. Fluorine used for the materials has an effect of segregating the representative elements contained in the third region 103 on the surface of the positive electrode active material 100 in a later step.

As the source of lithium, for example, lithium carbonate and lithium fluoride can be used. As the source of the first transition metal, for example, an oxide of the first transition metal can be used. As the source of the representative element, for example, an oxide of the representative element contained in the third region and fluoride of the representative element contained in the third region can be used.

As the source of fluorine, for example, lithium fluoride and fluoride of the representative element contained in the third region can be used. That is, lithium fluoride can be used as either the source of lithium or the source of fluorine.

The amount of fluorine contained in the source of fluorine is preferably 1.0 time to 4 times (atomic ratio), further preferably 1.5 times to 3 times (atomic ratio) the amount of representative element contained in the source of the representative element.

<Step 12: Mixing of Starting Materials>

Next, the source of lithium, the source of the first transition metal, and the source of the representative element are mixed. In addition, the source of fluorine is preferably added. For example, a ball mill and a bead mill can be used for the mixing.

<Step 13: First Heating>

Next, the materials mixed in Step 12 are heated. In this step, the heating is referred to as baking or first heating in some cases. The heating is preferably performed at higher than or equal to 800° C. and lower than or equal to 1100° C., further preferably at higher than or equal to 900° C. and lower than or equal to 1000° C. The heating time is preferably greater than or equal to 2 hours and less than or equal to 20 hours. The baking is preferably performed in a dried atmosphere such as dry air. In the dried atmosphere, for example, the dew point is preferably lower than or equal to −50° C., further preferably lower than or equal to −100° C. In this embodiment, the heating is performed at 1000° C. for 10 hours, the temperature rising rate is 200° C./h, and dry air whose dew point is −109° C. flows at 10 L/min After that, the heated materials are cooled to room temperature.

By the heating in Step 13, the composite oxide of lithium and the first transition metal having a layered rock-salt crystal structure can be synthesized. At this time, the representative element and fluorine contained in the starting materials form a solid solution in the composite oxide. However, some representative elements have been already segregated on the surface of the composite oxide in some cases.

In addition, as the starting materials, particles of the composite oxide containing lithium, cobalt, fluorine, and magnesium which are synthesized in advance may be used. In this case, Step 12 and Step 13 can be omitted. For example, lithium cobalt oxide particles (C-20F, produced by NIPPON CHEMICAL INDUSTRIAL CO., LTD.) can be used as one of the starting materials. The lithium cobalt oxide particle has a diameter of approximately 20 μm and contains fluorine, magnesium, calcium, sodium, silicon, sulfur, and phosphorus in a region which can be analyzed by XPS from the surface.

<Step 14: Coating with Second Transition Metal>

Next, the composite oxide of lithium and the first transition metal is cooled to room temperature. Then, the surface of the composite oxide particle of lithium and the first transition metal is coated with a material containing the second transition metal. In the formation method example, a sol-gel method is used.

First, the alkoxide of the second transition metal which is dissolved in alcohol and the composite oxide particles of lithium and the first transition metal are mixed.

For example, in the case where titanium is used as the second transition metal, TTIP can be used as the alkoxide of the second transition metal. As alcohol, isopropanol can be used, for example.

Next, the above mixed solution is stirred in an atmosphere containing water vapor. The stirring can be performed with a magnetic stirrer, for example. The stirring time is not limited as long as water and TTIP in an atmosphere cause hydrolysis and polycondensation reaction. For example, the stirring can be performed at 25° C. and a humidity of 90% RH (Relative Humidity) for 4 hours.

As described above, when water and TTIP in an atmosphere are reacted, a sol-gel reaction can proceed more slowly as compared with the case where liquid water is added. Alternatively, when titanium alkoxide and water are reacted at room temperature, a sol-gel reaction can proceed more slowly as compared with the case where heating is performed at a temperature higher than the boiling point of alcohol which is a solvent, for example. A sol-gel reaction proceeds slowly, whereby a high-quality coating layer containing titanium with a uniform thickness can be formed.

After the above process, precipitate is collected from the mixed solution. As the collection method, filtration, centrifugation, evaporation and drying, or the like can be used. In this embodiment, filtration is used. For the filtration, a paper filter is used, and the residue is washed by alcohol which is the same as the solvent in which titanium alkoxide is dissolved.

Then, the collected residue is dried. In this embodiment, vacuum drying is performed at 70° C. for one hour.

<Step 15: Second Heating>

Next, the composite oxide particle coated with the material containing the second transition metal, which is formed in Step 14, is heated. This step is referred to as second heating in some cases. In the heating, the retention time within a specified temperature range is preferably shorter than or equal to 50 hours, further preferably longer than or equal to 2 hours and shorter than or equal to 10 hours, still further preferably longer than or equal to 1 hour and shorter than or equal to 3 hours. If the heating time is too short, there is concern that the segregation of the representative elements does not occur; however, if the heating time is too long, there is concern that the favorable second region 102 is not formed because diffusion of the second transition metal proceeds too much.

The specified temperature is preferably higher than or equal to 500° C. and lower than or equal to 1200° C., further preferably higher than or equal to 800° C. and lower than or equal to 1000° C. If the specified temperature is too low, there is concern that the segregation of the representative elements and the second transition metal does not occur. However, if the specified temperature is too high, there is concern that the first transition metal in the composite oxide particle is reduced to decompose the composite oxide particle, that a layered structure of lithium and the first transition metal in the composite oxide particle cannot be kept, and the like.

In this embodiment, the specified temperature is 800° C. and kept for 2 hours, the temperature rising rate is 200° C./h, and the flow rate of dry air is 10 L/min.

By the heating in Step 15, the composite oxide of lithium and the first transition metal and the oxide of the second transition metal covering the composite oxide become topotaxy. In other words, the first region 101 and the second region 102 become topotaxy.

By the heating in Step 15, the representative elements which form a solid solution inside the composite oxide particle of lithium and the first transition metal are unevenly distributed on the surface to form a solid solution, that is, the representative elements are segregated, the compound of the representative elements is formed, and the third region 103 is formed. At this time, the compound of the representative elements is formed by heteroepitaxial growth from the second region 102. That is, the second region 102 and the third region 103 become topotaxy.

Since the second region 102 and the third region 103 contain crystals whose orientations are substantially aligned with each other and have a stable bond with the first region 101, when the positive electrode active material 100 is used for the secondary battery, a change of the crystal structure in the first region 101 which is caused by charging and discharging can be effectively suppressed. Even when lithium is released from the first region 101 due to charging, the superficial portion having a stable bond can suppress release of oxygen and the first transition metal such as cobalt from the first region 101. Furthermore, a chemically stable material can be used for a region in contact with the electrolyte solution. Thus, a secondary battery having excellent cycle characteristics can be provided.

Note that the entire first region 101 and second region 102 does not need to become topotaxy as long as part of the first region 101 and second region 102 becomes topotaxy. Furthermore, the entire second region 102 and third region 103 does not need to become topotaxy as long as part of the second region 102 and third region 103 becomes topotaxy.

In the case where the compound of the representative elements contained in the third region contains oxygen, the heating in Step 15 is preferably performed in an atmosphere containing oxygen. Heating in an atmosphere containing oxygen promotes the formation of the third region 103.

Furthermore, fluorine contained in the starting materials promotes the segregation of the representative elements.

In this manner, in the method for forming the positive electrode active material of one embodiment of the present invention, after the elements forming the second region 102 are coated, heating is performed to form the third region 103, and two kinds of regions can be formed on the surface of the positive electrode active material 100. That is, in general, two coating steps are necessary for providing two kinds of regions in a superficial portion; however, in the method for forming the positive electrode active material of one embodiment of the present invention, only one coating step (sol-gel process) is needed, which is a formation method with high productivity.

<Step 16: Cooling>

Next, the particles heated in Step 15 are cooled to room temperature. The time of decreasing temperature is preferably long because topotaxy is easily generated. For example, the time of decreasing temperature from retention temperature to room temperature is preferably the same as the time of increasing temperature or longer, specifically longer than or equal to 10 hours and shorter than or equal to 50 hours.

<Step 17: Collecting>

Next, the cooled particles are collected. Moreover, the particles are preferably made to pass through a sieve. Through the above process, the positive electrode active material 100 including the first region 101, the second region 102, and the third region 103 can be formed.

This embodiment can be implemented in appropriate combination with any of the other embodiments.

Embodiment 2

In this embodiment, examples of materials which can be used for a secondary battery containing the positive electrode active material 100 described in the above embodiment are described. In this embodiment, a secondary battery in which a positive electrode, a negative electrode, and an electrolyte solution are wrapped in an exterior body is described as an example

[Positive Electrode]

The positive electrode includes a positive electrode active material layer and a positive electrode current collector.

<Positive Electrode Active Material Layer>

The positive electrode active material layer contains at least a positive electrode active material. The positive electrode active material layer may contain, in addition to the positive electrode active material, other materials such as a coating film of the active material surface, a conductive additive, and a binder.

As the positive electrode active material, the positive electrode active material 100 described in the above embodiment can be used. When the above-described positive electrode active material 100 is used, a secondary battery with high capacity and excellent cycle characteristics can be obtained.

Examples of the conductive additive include a carbon material, a metal material, and a conductive ceramic material. Alternatively, a fiber material may be used as the conductive additive. The content of the conductive additive with respect to the total amount of the active material layer is preferably greater than or equal to 1 wt % and less than or equal to 10 wt %, more preferably greater than or equal to 1 wt % and less than or equal to 5 wt %.

A network for electric conduction can be formed in the active material layer by the conductive additive. The conductive additive also allows maintaining of a path for electric conduction between the positive electrode active material particles. The addition of the conductive additive to the active material layer increases the electric conductivity of the active material layer.

Examples of the conductive additive include natural graphite, artificial graphite such as mesocarbon microbeads, and carbon fiber. Examples of carbon fiber include mesophase pitch-based carbon fiber, isotropic pitch-based carbon fiber, carbon nanofiber, and carbon nanotube. Carbon nanotube can be formed by, for example, a vapor deposition method. Other examples of the conductive additive include carbon materials such as carbon black (e.g., acetylene black (AB)), graphite (black lead) particles, graphene, and fullerene. Alternatively, metal powder or metal fibers of copper, nickel, aluminum, silver, gold, or the like, a conductive ceramic material, or the like can be used.

Alternatively, a graphene compound may be used as the conductive additive.

A graphene compound has excellent electrical characteristics of high conductivity and excellent physical properties of high flexibility and high mechanical strength. Furthermore, a graphene compound has a planar shape. A graphene compound enables low-resistance surface contact. Furthermore, a graphene compound has extremely high conductivity even with a small thickness in some cases and thus allows a conductive path to be formed in an active material layer efficiently even with a small amount. For this reason, it is preferable to use a graphene compound as the conductive additive because the area where the active material and the conductive additive are in contact with each other can be increased. It is preferable to form the graphene compound serving as a conductive additive as a coating film to cover the entire surface of the active material with a spray dry apparatus, in which case the electrical resistance may be reduced. Here, it is particularly preferable to use, for example, graphene, multilayer graphene, or RGO as a graphene compound. Note that RGO refers to a compound obtained by reducing graphene oxide (GO), for example.

In the case where an active material with a small particle diameter (e.g., 1 µm or less) is used, the specific surface area of the active material is large and thus more conductive paths for the active material particles are needed. Thus, the amount of conductive additive tends to increase and the supported amount of active material tends to decrease relatively. When the supported amount of active material decreases, the capacity of the secondary battery also decreases. In such a case, a graphene compound that can efficiently form a conductive path even in a small amount is particularly preferably used as the conductive additive because the supported amount of active material does not decrease.

A cross-sectional structure example of an active material layer 200 containing a graphene compound as a conductive additive is described below.

Figure 7A:
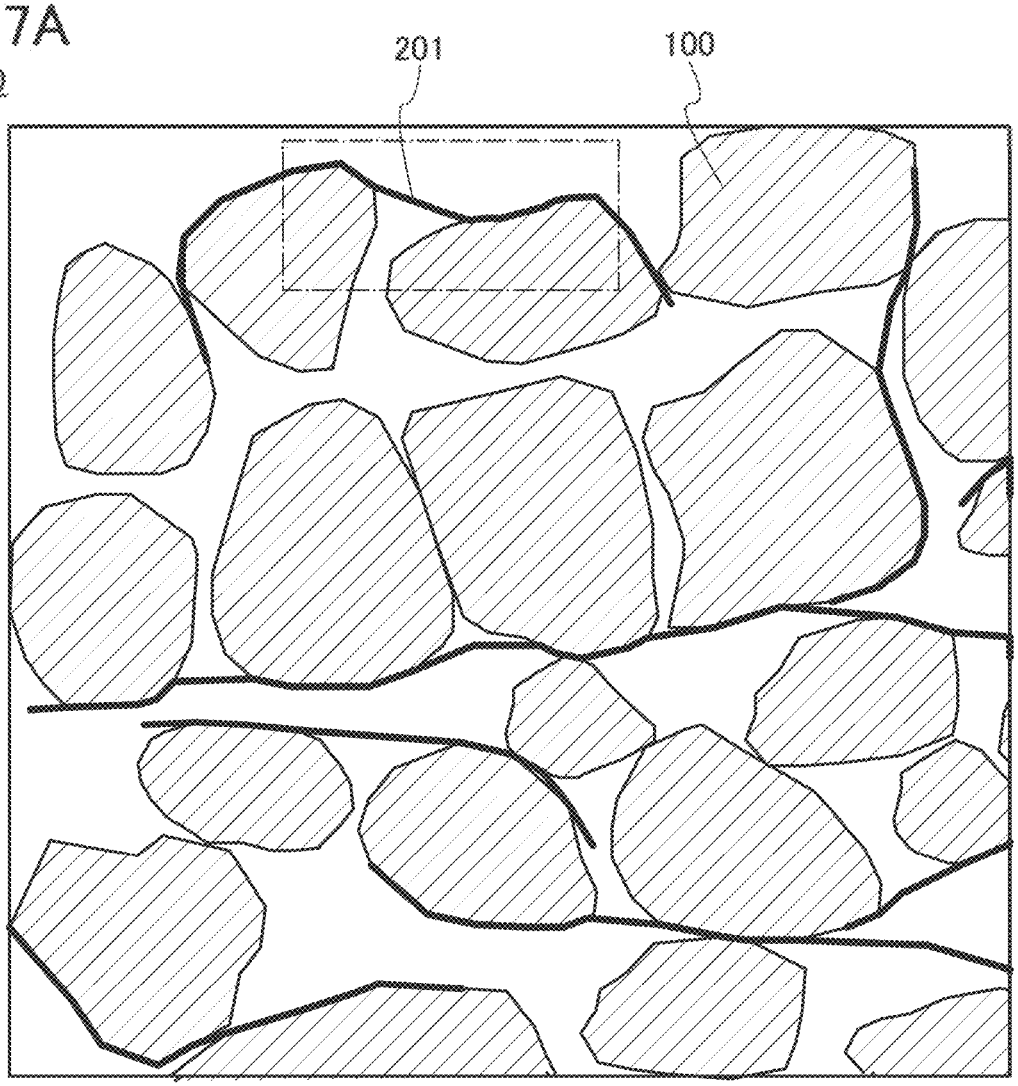
FIGS. 7A and 7B are cross-sectional views of an active material layer containing a graphene compound as a conductive additive.

FIG. 7A shows a longitudinal cross-sectional view of the active material layer 200. The active material layer 200 includes positive electrode active material particles 100, a graphene compound 201 serving as a conductive additive, and a binder (not illustrated). Here, graphene or multilayer graphene may be used as the graphene compound 201, for example. The graphene compound 201 preferably has a sheet-like shape. The graphene compound 201 may have a sheet-like shape formed of a plurality of sheets of multilayer graphene and/or a plurality of sheets of graphene that partly overlap with each other.

Figure 7B:
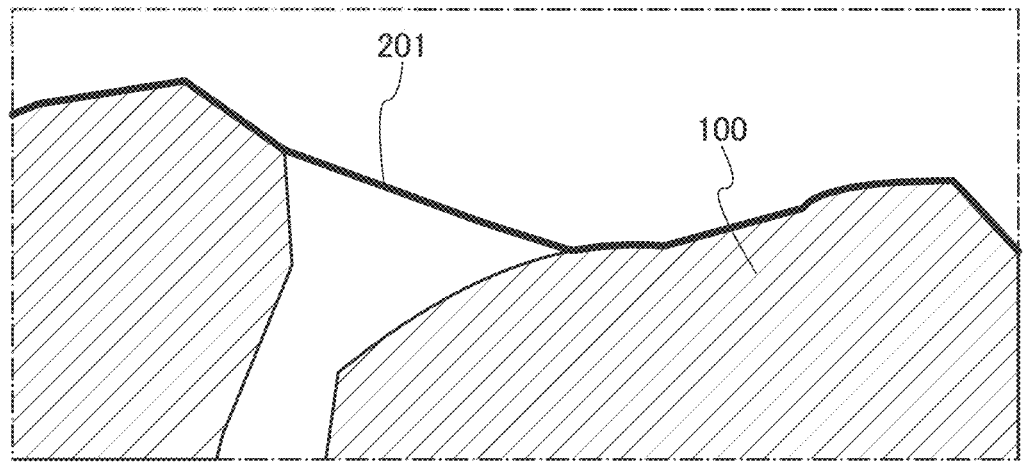

The longitudinal cross section of the active material layer 200 in FIG. 7B shows substantially uniform dispersion of the sheet-like graphene compounds 201 in the active material layer 200. The graphene compounds 201 are schematically shown by thick lines in FIG. 7B but are actually thin films each having a thickness corresponding to the thickness of a single layer or a multi-layer of carbon molecules. The plurality of graphene compounds 201 are formed in such a way as to partly coat or adhere to the surfaces of the plurality of positive electrode active material particles 100, so that the graphene compounds 201 make surface contact with the positive electrode active material particles 100.

Here, the plurality of graphene compounds are bonded to each other to form a net-like graphene compound sheet (hereinafter referred to as a graphene compound net or a graphene net). The graphene net covering the active material can function as a binder for bonding active materials. The amount of a binder can thus be reduced, or the binder does not have to be used. This can increase the proportion of the active material in the electrode volume or weight. That is to say, the capacity of the secondary battery can be increased.

Here, it is preferable to perform reduction after a layer to be the active material layer 200 is formed in such a manner that graphene oxide is used as the graphene compound 201 and mixed with an active material. When graphene oxide with extremely high dispersibility in a polar solvent is used for the formation of the graphene compounds 201, the graphene compounds 201 can be substantially uniformly dispersed in the active material layer 200. The solvent is removed by volatilization from a dispersion medium in which graphene oxide is uniformly dispersed, and the graphene oxide is reduced; hence, the graphene compounds 201 remaining in the active material layer 200 partly overlap with each other and are dispersed such that surface contact is made, thereby forming a three-dimensional conduction path. Note that graphene oxide can be reduced either by heat treatment or with the use of a reducing agent, for example.

Unlike a conductive additive in the form of particles, such as acetylene black, which makes point contact with an active material, the graphene compound 201 is capable of making low-resistance surface contact; accordingly, the electrical conduction between the positive electrode active material particles 100 and the graphene compounds 201 can be improved with a smaller amount of the graphene compound 201 than that of a normal conductive additive. This increases the proportion of the positive electrode active material particles 100 in the active material layer 200, resulting in increased discharge capacity of the secondary battery.

Alternatively, the graphene compound may cover the entire surface of the active material in advance with a spray dry apparatus. After that, at the time of forming the positive electrode active material layer, a graphene compound can be further added to make the conductive path between the active materials more favorable.

As the binder, a rubber material such as styrene-butadiene rubber (SBR), styrene-isoprene-styrene rubber, acrylonitrile-butadiene rubber, butadiene rubber, or ethylene-propylene-diene copolymer can be used, for example. Alternatively, fluororubber can be used as the binder.

For the binder, for example, water-soluble polymers are preferably used. As the water-soluble polymers, a polysaccharide and the like can be used. As the polysaccharide, a cellulose derivative such as carboxymethyl cellulose (CMC), methyl cellulose, ethyl cellulose, hydroxypropyl cellulose, diacetyl cellulose, or regenerated cellulose, starch, or the like can be used. It is more preferred that such water-soluble polymers be used in combination with any of the above rubber materials.

Alternatively, as the binder, a material such as polystyrene, poly(methyl acrylate), poly(methyl methacrylate) (PMMA), sodium polyacrylate, polyvinyl alcohol (PVA), polyethylene oxide (PEO), polypropylene oxide, polyimide, polyvinyl chloride, polytetrafluoroethylene, polyethylene, polypropylene, polyisobutylene, polyethylene terephthalate, nylon, polyvinylidene fluoride (PVdF), polyacrylonitrile (PAN), ethylene-propylene-diene polymer, polyvinyl acetate, or nitrocellulose is preferably used.

A plurality of the above materials may be used in combination for the binder.

For example, a material having a significant viscosity modifying effect and another material may be used in combination. For example, a rubber material or the like has high adhesion or high elasticity but may have difficulty in viscosity modification when mixed in a solvent. In such a case, a rubber material or the like is preferably mixed with a material having a significant viscosity modifying effect, for example. As a material having a significant viscosity modifying effect, for example, a water-soluble polymer is preferably used. An example of a water-soluble polymer having an especially significant viscosity modifying effect is the above-mentioned polysaccharide; for example, a cellulose derivative such as carboxymethyl cellulose (CMC), methyl cellulose, ethyl cellulose, hydroxypropyl cellulose, diacetyl cellulose, or regenerated cellulose, or starch can be used.

Note that a cellulose derivative such as carboxymethyl cellulose obtains a higher solubility when converted into a salt such as a sodium salt or an ammonium salt of carboxymethyl cellulose, and accordingly, easily exerts an effect as a viscosity modifier. The high solubility can also increase the dispersibility of an active material and other components in the formation of slurry for an electrode. In this specification, cellulose and a cellulose derivative used as a binder of an electrode include salts thereof.

The water-soluble polymers stabilize viscosity by being dissolved in water and allow stable dispersion of the active material and another material combined as a binder such as styrene-butadiene rubber in an aqueous solution. Furthermore, a water-soluble polymer is expected to be easily and stably adsorbed on an active material surface because it has a functional group. Many cellulose derivatives such as carboxymethyl cellulose have functional groups such as a hydroxyl group and a carboxyl group. Because of functional groups, polymers are expected to interact with each other and cover an active material surface in a large area.

In the case where the binder covering or being in contact with the active material surface forms a film, the film is expected to serve as a passivation film to suppress the decomposition of the electrolyte solution. Here, the passivation film refers to a film without electric conductivity or a film with extremely low electric conductivity, and can inhibit the decomposition of an electrolyte solution at a potential at which a battery reaction occurs in the case where the passivation film is formed on the active material surface, for example. It is preferred that the passivation film can conduct lithium ions while suppressing electric conduction.

<Positive Electrode Current Collector>

The positive electrode current collector can be formed using a material that has high conductivity, such as a metal like stainless steel, gold, platinum, aluminum, or titanium, or an alloy thereof. It is preferred that a material used for the positive electrode current collector not dissolve at the potential of the positive electrode. Alternatively, the positive electrode current collector can be formed using an aluminum alloy to which an element that improves heat resistance, such as silicon, titanium, neodymium, scandium, or molybdenum, is added. Still alternatively, a metal element that forms silicide by reacting with silicon can be used. Examples of the metal element that forms silicide by reacting with silicon include zirconium, titanium, hafnium, vanadium, niobium, tantalum, chromium, molybdenum, tungsten, cobalt, and nickel. The current collector can have any of various shapes including a foil-like shape, a plate-like shape (sheet-like shape), a net-like shape, a punching-metal shape, and an expanded-metal shape. The current collector preferably has a thickness of 5 μm to 30 μm.

[Negative Electrode]

The negative electrode includes a negative electrode active material layer and a negative electrode current collector. The negative electrode active material layer may contain a conductive additive and a binder.

<Negative Electrode Active Material>

As a negative electrode active material, for example, an alloy-based material or a carbon-based material can be used.

For the negative electrode active material, an element which enables charge-discharge reactions by an alloying reaction and a dealloying reaction with lithium can be used. For example, a material containing at least one of silicon, tin, gallium, aluminum, germanium, lead, antimony, bismuth, silver, zinc, cadmium, indium, and the like can be used. Such elements have higher capacity than carbon. In particular, silicon has a significantly high theoretical capacity of 4200 mAh/g. For this reason, silicon is preferably used as the negative electrode active material. Alternatively, a compound containing any of the above elements may be used. Examples of the compound include SiO, $Mg_2Si$, $Mg_2Ge$, SnO, $SnO_2$, $Mg_2Sn$, $SnS_2$, $V_2Sn_3$, $FeSn_2$, $CoSn_2$, $Ni_3Sn_2$, $Cu_6Sn_5$, $Ag_3Sn$, $Ag_3Sb$, $Ni_2MnSb$, $CeSb_3$, $LaSn_3$, $La_3Co_2Sn_7$, $CoSb_3$, InSb, and SbSn. Here, an element that enables charge-discharge reactions by an alloying reaction and a dealloying reaction with lithium, a compound containing the element, and the like may be referred to as an alloy-based material.

In this specification and the like, SiO refers, for example, to silicon monoxide. SiO can alternatively be expressed as $SiO_x$. Here, x preferably has an approximate value of 1. For example, x is preferably 0.2 or more and 1.5 or less, more preferably 0.3 or more and 1.2 or less.

As the carbon-based material, graphite, graphitizing carbon (soft carbon), non-graphitizing carbon (hard carbon), a carbon nanotube, graphene, carbon black, and the like can be used.

Examples of graphite include artificial graphite and natural graphite. Examples of artificial graphite include mesocarbon microbeads (MCMB), coke-based artificial graphite, and pitch-based artificial graphite. As artificial graphite, spherical graphite having a spherical shape can be used. For example, MCMB is preferably used because it may have a spherical shape. Moreover, MCMB may preferably be used because it can relatively easily have a small surface area. Examples of natural graphite include flake graphite and spherical natural graphite.

Graphite has a low potential substantially equal to that of a lithium metal (higher than or equal to 0.05 V and lower than or equal to 0.3 V vs. Li/Li') when lithium ions are intercalated into the graphite (while a lithium-graphite intercalation compound is formed). For this reason, a lithium-ion secondary battery can have a high operating voltage. In addition, graphite is preferred because of its advantages such as a relatively high capacity per unit volume, relatively small volume expansion, low cost, and higher level of safety than that of a lithium metal.

Alternatively, for the negative electrode active material, an oxide such as titanium dioxide ($TiO_2$), lithium titanium oxide ($Li_4Ti_5O_{12}$), lithium-graphite intercalation compound ($Li_xC_6$), niobium pentoxide ($Nb_2O_5$), tungsten oxide ($WO_2$), or molybdenum oxide ($MoO_2$) can be used.

Still alternatively, for the negative electrode active material, $Li_{3-x}M_xN$ (M=Co, Ni, or Cu) with a $Li_3N$ structure, which is a nitride containing lithium and a transition metal, can be used. For example, $Li_{2.6}Co_{0.4}N_3$ is preferable because of high charge and discharge capacity (900 mAh/g and 1890 mAh/cm$^3$).

A nitride containing lithium and a transition metal is preferably used, in which case lithium ions are contained in the negative electrode active material and thus the negative electrode active material can be used in combination with a material for a positive electrode active material which does not contain lithium ions, such as $V_2O_5$ or $Cr_3O_8$. In the case of using a material containing lithium ions as a positive electrode active material, the nitride containing lithium and a transition metal can be used for the negative electrode active material by extracting the lithium ions contained in the positive electrode active material in advance.

Alternatively, a material which causes a conversion reaction can be used for the negative electrode active material; for example, a transition metal oxide which does not form an alloy with lithium, such as cobalt oxide (CoO), nickel oxide (NiO), and iron oxide (FeO), may be used. Other examples of the material which causes a conversion reaction include oxides such as $Fe_2O_3$, CuO, $Cu_2O$, $RuO_2$, and $Cr_2O_3$, sulfides such as $CoS_{0.89}$, NiS, and CuS, nitrides such as $Zn_3N_2$, $Cu_3N$, and $Ge_3N_4$, phosphides such as $NiP_2$, $FeP_2$, and $CoP_3$, and fluorides such as $FeF_3$ and $BiF_3$.

For the conductive additive and the binder that can be included in the negative electrode active material layer, materials similar to those of the conductive additive and the binder that can be included in the positive electrode active material layer can be used.

<Negative Electrode Current Collector>

For the negative electrode current collector, a material similar to that of the positive electrode current collector can be used. Note that a material which is not alloyed with a carrier ion such as lithium is preferably used for the negative electrode current collector.

[Electrolyte Solution]

The electrolyte solution contains a solvent and an electrolyte. As a solvent of the electrolyte solution, an aprotic organic solvent is preferably used. For example, one of ethylene carbonate (EC), propylene carbonate (PC), butylene carbonate, chloroethylene carbonate, vinylene carbonate, γ-butyrolactone, γ-valerolactone, dimethyl carbonate (DMC), diethyl carbonate (DEC), ethyl methyl carbonate (EMC), methyl formate, methyl acetate, ethyl acetate, methyl propionate, ethyl propionate, propyl propionate, methyl butyrate, 1,3-dioxane, 1,4-dioxane, dimethoxyethane (DME), dimethyl sulfoxide, diethyl ether, methyl diglyme, acetonitrile, benzonitrile, tetrahydrofuran, sulfolane, and sultone can be used, or two or more of these solvents can be used in an appropriate combination in an appropriate ratio.

Alternatively, when one or more kinds of ionic liquids (room temperature molten salts) which have features of non-flammability and non-volatility is used as a solvent of the electrolyte solution, a secondary battery can be prevented from exploding or catching fire even when the secondary battery internally shorts out or the internal temperature increases owing to overcharging or the like. An ionic liquid contains a cation and an anion. The ionic liquid contains an organic cation and an anion. Examples of the organic cation used for the electrolyte solution include aliphatic onium cations such as a quaternary ammonium cation, a tertiary sulfonium cation, and a quaternary phosphonium cation, and aromatic cations such as an imidazolium cation and a pyridinium cation. Examples of the anion used for the electrolyte solution include a monovalent amide-based anion, a monovalent methide-based anion, a fluorosulfonate anion, a perfluoroalkylsulfonate anion, a tetrafluoroborate anion, a perfluoroalkylborate anion, a hexafluorophosphate anion, and a perfluoroalkylphosphate anion.

As an electrolyte dissolved in the above-described solvent, one of lithium salts such as $LiPF_6$, $LiClO_4$, $LiAsF_6$, $LiBF_4$, $LiAlCl_4$, LiSCN, LiBr, LiI, $Li_2SO_4$, $Li_2B_{10}Cl_{10}$, $Li_2B_{12}Cl_{12}$, $LiCF_3SO_3$, $LiC_4F_9SO_3$, $LiC(CF_3SO_2)_3$, $LiC(C_2F_5SO_2)_3$, $LiN(CF_3SO_2)_2$, $LiN(C_4F_9SO_2)(CF_3SO_2)$, and $LiN(C_2F_5SO_2)_2$ can be used, or two or more of these lithium salts can be used in an appropriate combination in an appropriate ratio.

The electrolyte solution used for a secondary battery is preferably highly purified and contains a small amount of dust particles and elements other than the constituent elements of the electrolyte solution (hereinafter also simply referred to as impurities). Specifically, the weight ratio of impurities to the electrolyte solution is less than or equal to 1%, preferably less than or equal to 0.1%, and further preferably less than or equal to 0.01%.

Furthermore, an additive agent such as vinylene carbonate, propane sultone (PS), tert-butylbenzene (TBB), fluoroethylene carbonate (FEC), LiBOB, or a dinitrile compound such as succinonitrile or adiponitrile may be added to the electrolyte solution. The concentration of a material to be added with respect to the whole solvent is, for example, higher than or equal to 0.1 wt % and lower than or equal to 5 wt %.

Alternatively, a gelled electrolyte obtained in such a manner that a polymer is swelled with an electrolyte solution may be used.

When a polymer gel electrolyte is used, safety against liquid leakage and the like is improved. Furthermore, a secondary battery can be thinner and more lightweight.

As a polymer that undergoes gelation, a silicone gel, an acrylic gel, an acrylonitrile gel, a polyethylene oxide-based gel, a polypropylene oxide-based gel, a fluorine-based polymer gel, or the like can be used.

Examples of the polymer include a polymer having a polyalkylene oxide structure, such as polyethylene oxide (PEO); PVDF; polyacrylonitrile; and a copolymer containing any of them. For example, PVDF-HFP, which is a copolymer of PVDF and hexafluoropropylene (HFP) can be used. The formed polymer may be porous.

Instead of the electrolyte solution, a solid electrolyte including an inorganic material such as a sulfide-based inorganic material or an oxide-based inorganic material, or a solid electrolyte including a high-molecular material such as a polyethylene oxide (PEO)-based high-molecular material may alternatively be used. When the solid electrolyte is used, a separator and a spacer are not necessary. Furthermore, since the battery can be entirely solidified, there is no possibility of liquid leakage to increase the safety of the battery dramatically.

[Separator]

The secondary battery preferably includes a separator. As the separator, for example, paper; nonwoven fabric; glass fiber; ceramics; or synthetic fiber using nylon (polyamide), vinylon (polyvinyl alcohol-based fiber), polyester, acrylic, polyolefin, or polyurethane can be used. The separator is preferably formed to have an envelope-like shape to wrap one of the positive electrode and the negative electrode.

The separator may have a multilayer structure. For example, an organic material film such as polypropylene or polyethylene can be coated with a ceramic-based material, a fluorine-based material, a polyamide-based material, a mixture thereof, or the like. Examples of the ceramic-based material include aluminum oxide particles and silicon oxide particles. Examples of the fluorine-based material include PVDF and a polytetrafluoroethylene. Examples of the polyamide-based material include nylon and aramid (meta-based aramid and para-based aramid).

Deterioration of the separator in charging and discharging at high voltage can be suppressed and thus the reliability of the secondary battery can be improved because oxidation resistance is improved when the separator is coated with the ceramic-based material. In addition, when the separator is coated with the fluorine-based material, the separator is easily brought into close contact with an electrode, resulting in high output characteristics. When the separator is coated with the polyamide-based material, in particular, aramid, the safety of the secondary battery is improved because heat resistance is improved.

For example, both surfaces of a polypropylene film may be coated with a mixed material of aluminum oxide and aramid. Alternatively, a surface of the polypropylene film in contact with the positive electrode may be coated with the mixed material of aluminum oxide and aramid, and a surface of the polypropylene film in contact with the negative electrode may be coated with the fluorine-based material.

With the use of a separator having a multilayer structure, the capacity of the secondary battery per volume can be increased because the safety of the secondary battery can be maintained even when the total thickness of the separator is small.

[Exterior Body]

For an exterior body included in the secondary battery, a metal material such as aluminum and a resin material can be used, for example. An exterior body in the form of a film can also be used. As the film, for example, a film having a three-layer structure in which a highly flexible metal thin film of aluminum, stainless steel, copper, nickel, or the like is provided over a film formed of a material such as polyethylene, polypropylene, polycarbonate, ionomer, or polyamide, and an insulating synthetic resin film of a polyamide-based resin, a polyester-based resin, or the like is provided as the outer surface of the exterior body over the metal thin film can be used.

[Charging and Discharging Methods]

The secondary battery can be charged and discharged in the following manner, for example.

<<CC Charge>>

Figure 8A:
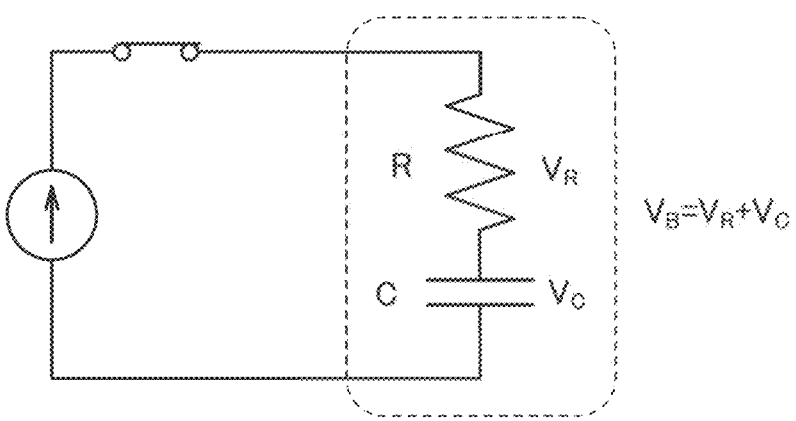
FIGS. 8A to 8C illustrate a method for charging a secondary battery.

First, CC charge, which is one of charging methods, is described. CC charge is a charging method in which a constant current is made to flow to a secondary battery in the whole charging period and charge is terminated when the voltage reaches a predetermined voltage. The secondary battery is assumed to be an equivalent circuit with internal resistance R and secondary battery capacitance C as illustrated in FIG. 8A. In that case, a secondary battery voltage $V_B$ is the sum of a voltage $V_R$ applied to the internal resistance R and a voltage $V_C$ applied to the secondary battery capacitance C.

While the CC charge is performed, a switch is on as illustrated in FIG. 8A, so that a constant current I flows to the secondary battery. During the period, the current I is constant; thus, according to the Ohm's law ($V_R = R \times I$), the voltage $V_R$ applied to the internal resistance R is also constant. In contrast, the voltage $V_C$ applied to the secondary battery capacitance C increases over time. Accordingly, the secondary battery voltage $V_B$ increases over time.

Figure 8B:
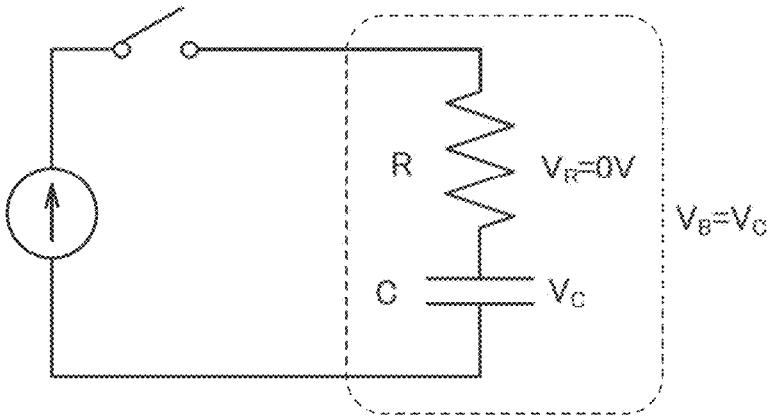

When the secondary battery voltage $V_B$ reaches a predetermined voltage, e.g., 4.3 V, the charge is terminated. On termination of the CC charge, the switch is turned off as illustrated in FIG. 8B, and the current I becomes 0. Thus, the voltage $V_R$ applied to the internal resistance R becomes 0 V. Consequently, the secondary battery voltage $V_B$ is decreased by the lost voltage drop in the internal resistance R.

Figure 8C:
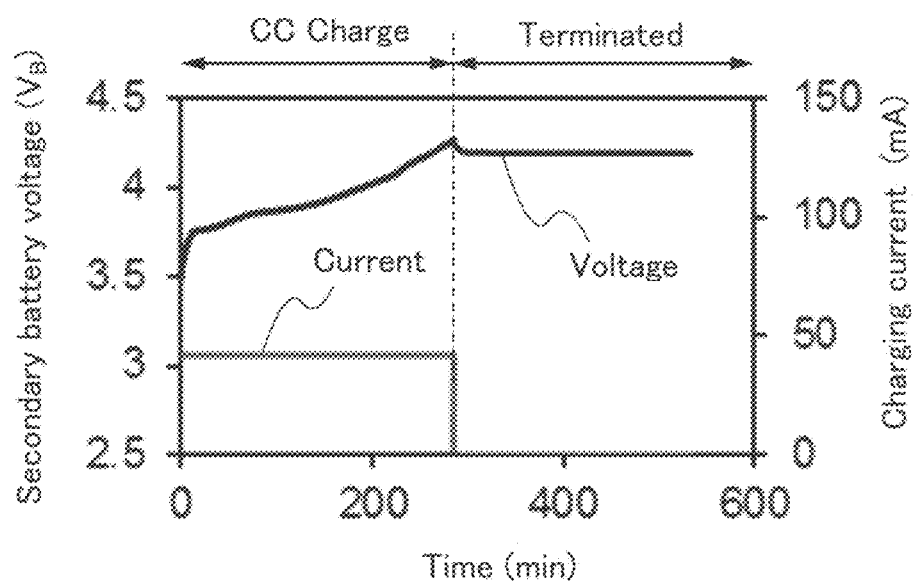

FIG. 8C shows an example of the secondary battery voltage $V_B$ and charging current during a period in which the CC charge is performed and after the CC charge is terminated. The secondary battery voltage $V_B$ increases while the CC charge is performed, and slightly decreases after the CC charge is terminated.

<<CCCV Charge>>

Next, CCCV charge, which is a charging method different from the above-described method, is described. CCCV charge is a charging method in which CC charge is performed until the voltage reaches a predetermined voltage and then constant voltage (CV) charge is performed until the amount of current flow becomes small, specifically, a termination current value.

Figure 9A:
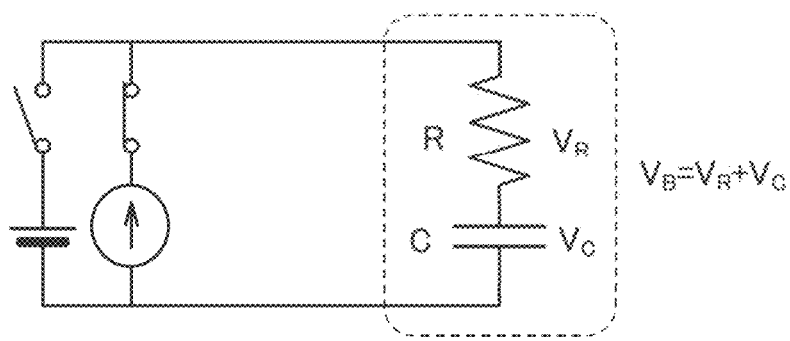
FIGS. 9A to 9D illustrate a method for charging a secondary battery.

While the CC charge is performed, a switch of a constant current power source is on and a switch of a constant voltage power source is off as illustrated in FIG. 9A, so that the constant current I flows to the secondary battery. During the period, the current I is constant; thus, according to the Ohm's law ($V_R = R \times I$), the voltage $V_R$ applied to the internal resistance R is also constant. In contrast, the voltage $V_C$ applied to the secondary battery capacitance C increases over time. Accordingly, the secondary battery voltage $V_B$ increases over time.

Figure 9B:
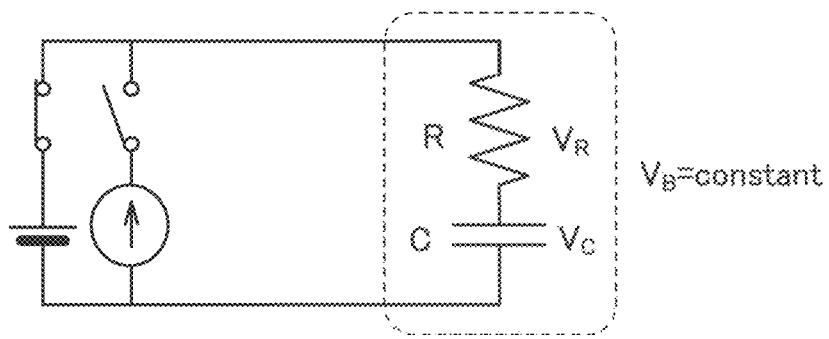

When the secondary battery voltage $V_B$ reaches a predetermined voltage, e.g., 4.3 V, switching is performed from the CC charge to the CV charge. While the CV charge is performed, the switch of the constant voltage power source is on and the switch of the constant current power source is off as illustrated in FIG. 9B; thus, the secondary battery voltage $V_B$ is constant. In contrast, the voltage $V_C$ applied to the secondary battery capacitance C increases over time.

Since $V_B=V_R V_C$ is satisfied, the voltage $V_R$ applied to the internal resistance R decreases over time. As the voltage $V_R$ applied to the internal resistance R decreases, the current I flowing to the secondary battery also decreases according to the Ohm's law ($V_R = R \times I$).

Figure 9C:
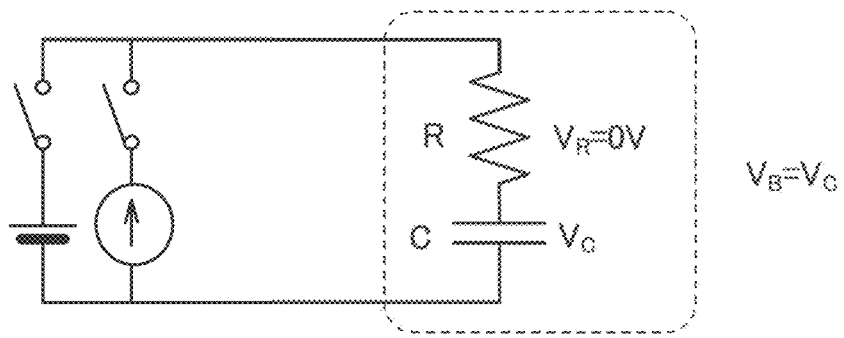

When the current I flowing to the secondary battery becomes a predetermined current, e.g., approximately 0.01 C, charge is terminated. On termination of the CCCV charge, all the switches are turned off as illustrated in FIG. 9C, so that the current I becomes 0. Thus, the voltage $V_R$ applied to the internal resistance R becomes 0 V. However, the voltage $V_R$ applied to the internal resistance R becomes sufficiently small by the CV charge; thus, even when a voltage drop no longer occurs in the internal resistance R, the secondary battery voltage $V_B$ hardly decreases.

Figure 9D:
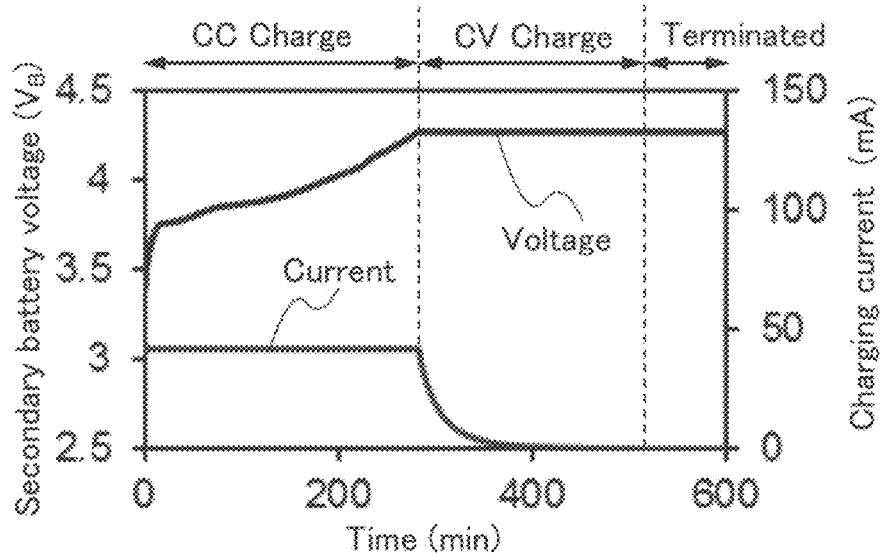

FIG. 9D shows an example of the secondary battery voltage $V_B$ and charging current while the CCCV charge is performed and after the CCCV charge is terminated. Even after the CCCV charge is terminated, the secondary battery voltage $V_B$ hardly decreases.

<<CC Discharge>>

Next, CC discharge, which is one of discharging methods, is described. CC discharge is a discharging method in which a constant current is made to flow from the secondary battery in the whole discharging period, and discharge is terminated when the secondary battery voltage $V_B$ reaches a predetermined voltage, e.g., 2.5 V.

Figure 10:
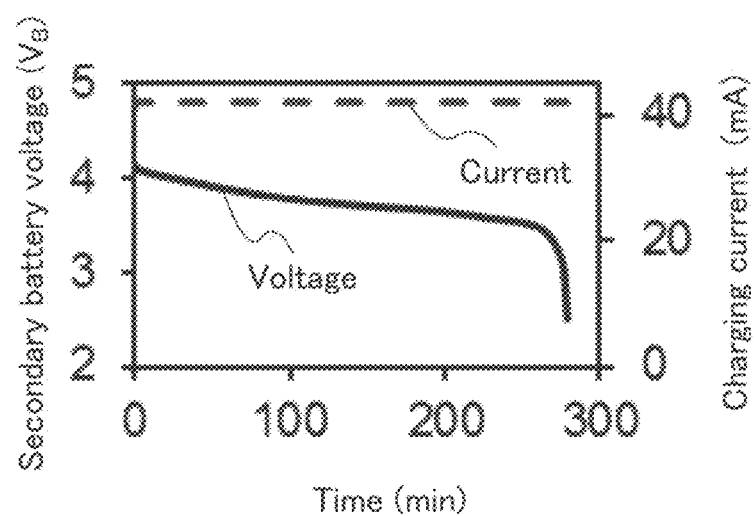
FIG. 10 illustrates a method for discharging a secondary battery.

FIG. 10 shows an example of the secondary battery voltage $V_B$ and discharging current while the CC discharge is performed. As discharge proceeds, the secondary battery voltage $V_B$ decreases.

Next, a discharge rate and a charge rate will be described. The discharge rate refers to the relative ratio of discharging current to battery capacity and is expressed in a unit C. A current of approximately 1 C in a battery with a rated capacity X (Ah) is X A. The case where discharge is performed at a current of 2 X A is rephrased as follows: discharge is performed at 2 C. The case where discharge is performed at a current of X/5 A is rephrased as follows: discharge is performed at 0.2 C. Similarly, the case where charging is performed at a current of 2 X A is rephrased as follows: charging is performed at 2 C, and the case where charging is performed at a current of X/5 A is rephrased as follows: charging is performed at 0.2 C.

Embodiment 3

In this embodiment, examples of a shape of a secondary battery containing the positive electrode active material 100 described in the above embodiment are described. For the materials used for the secondary battery described in this embodiment, the description of the above embodiment can be referred to.

[Coin-Type Secondary Battery]

Figure 11A:
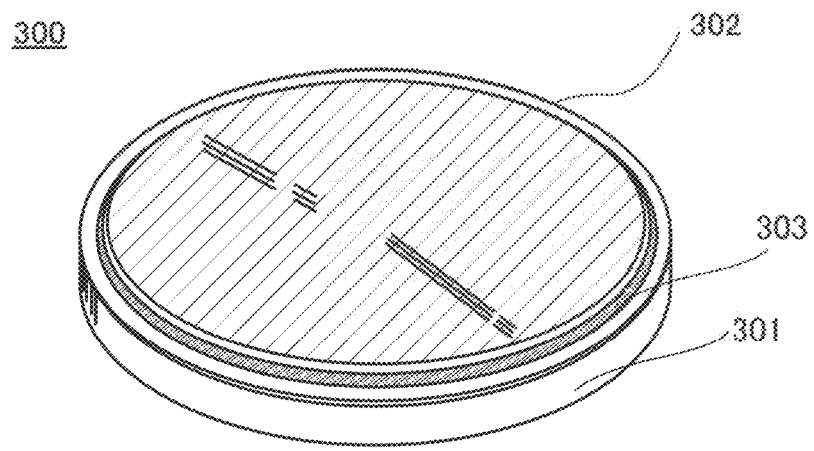
FIGS. 11A to 11C illustrate a coin-type secondary battery.
Figure 11B:
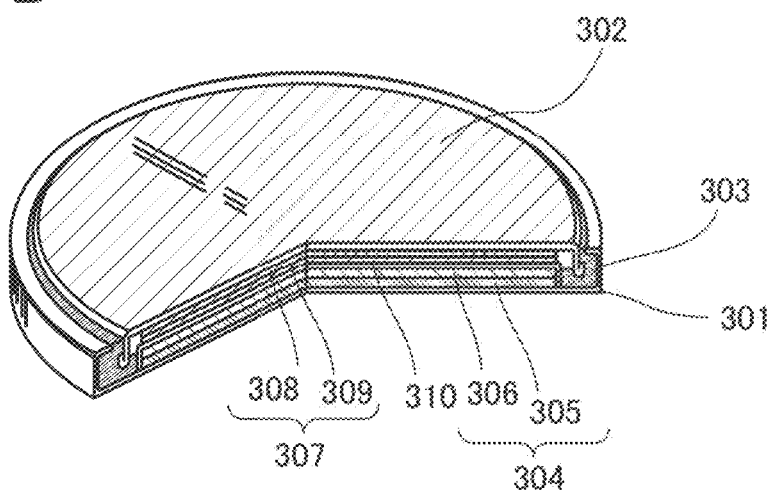

First, an example of a coin-type secondary battery is described. FIG. 11A is an external view of a coin-type (single-layer flat type) secondary battery, and FIG. 11B is a cross-sectional view thereof.

In a coin-type secondary battery 300, a positive electrode can 301 doubling as a positive electrode terminal and a negative electrode can 302 doubling as a negative electrode terminal are insulated from each other and sealed by a gasket 303 made of polypropylene or the like. A positive electrode 304 includes a positive electrode current collector 305 and a positive electrode active material layer 306 provided in contact with the positive electrode current collector 305. A negative electrode 307 includes a negative electrode current collector 308 and a negative electrode active material layer 309 provided in contact with the negative electrode current collector 308.

Note that only one surface of each of the positive electrode 304 and the negative electrode 307 used for the coin-type secondary battery 300 is provided with an active material layer.

For the positive electrode can 301 and the negative electrode can 302, a metal having a corrosion-resistant property to an electrolyte solution, such as nickel, aluminum, or titanium, an alloy of such a metal, or an alloy of such a metal and another metal (e.g., stainless steel) can be used. Alternatively, the positive electrode can 301 and the negative electrode can 302 are preferably covered with nickel, aluminum, or the like in order to prevent corrosion due to the electrolyte solution. The positive electrode can 301 and the negative electrode can 302 are electrically connected to the positive electrode 304 and the negative electrode 307, respectively.

The negative electrode 307, the positive electrode 304, and the separator 310 are immersed in the electrolyte solution. Then, as illustrated in FIG. 11B, the positive electrode 304, the separator 310, the negative electrode 307, and the negative electrode can 302 are stacked in this order with the positive electrode can 301 positioned at the bottom, and the positive electrode can 301 and the negative electrode can 302 are subjected to pressure bonding with the gasket 303 located therebetween. In such a manner, the coin-type secondary battery 300 can be manufactured.

When the positive electrode active material described in the above embodiment is used in the positive electrode 304, the coin-type secondary battery 300 with high capacity and excellent cycle characteristics can be obtained.

Here, a current flow in charging a secondary battery is described with reference to FIG. 11C. When a secondary battery using lithium is regarded as a closed circuit, lithium ions transfer and a current flows in the same direction. Note that in the secondary battery using lithium, an anode and a cathode change places in charge and discharge, and an oxidation reaction and a reduction reaction occur on the corresponding sides; hence, an electrode with a high reaction potential is called a positive electrode and an electrode with a low reaction potential is called a negative electrode. For this reason, in this specification, the positive electrode is referred to as a "positive electrode" or a "plus electrode" and the negative electrode is referred to as a "negative electrode" or a "minus electrode" in all the cases where charge is performed, discharge is performed, a reverse pulse current is supplied, and a charging current is supplied. The use of the terms "anode" and "cathode" related to an oxidation reaction and a reduction reaction might cause confusion because the anode and the cathode change places at the time of charging and discharging. Thus, the terms "anode" and "cathode" are not used in this specification. If the term "anode" or "cathode" is used, it should be mentioned that the anode or the cathode is which of the one at the time of charging or the one at the time of discharging and corresponds to which of a positive (plus) electrode or a negative (minus) electrode.

Figure 11C:
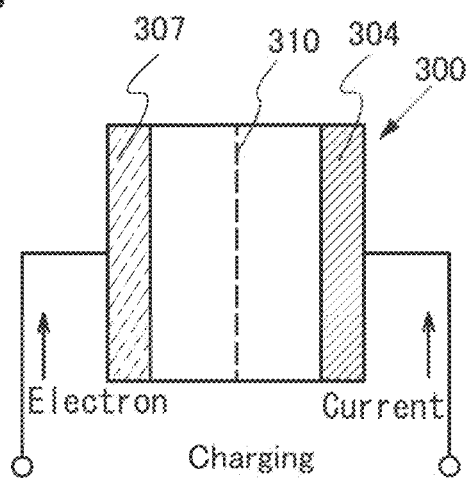

Two terminals in FIG. 11C are connected to a charger, and the coin-type secondary battery 300 is charged. As the charge of the coin-type secondary battery 300 proceeds, a potential difference between electrodes increases.

[Cylindrical Secondary Battery]

Figure 12A:
FIGS. 12A to 12D illustrate a cylindrical secondary battery.

Next, an example of a cylindrical secondary battery will be described with reference to FIGS. 12A to 12D. A cylindrical secondary battery 600 includes, as illustrated in FIG. 12A, a positive electrode cap (battery lid) 601 on the top surface and a battery can (outer can) 602 on the side and bottom surfaces. The positive electrode cap and the battery can (outer can) 602 are insulated from each other by a gasket (insulating packing) 610.

Figure 12B:
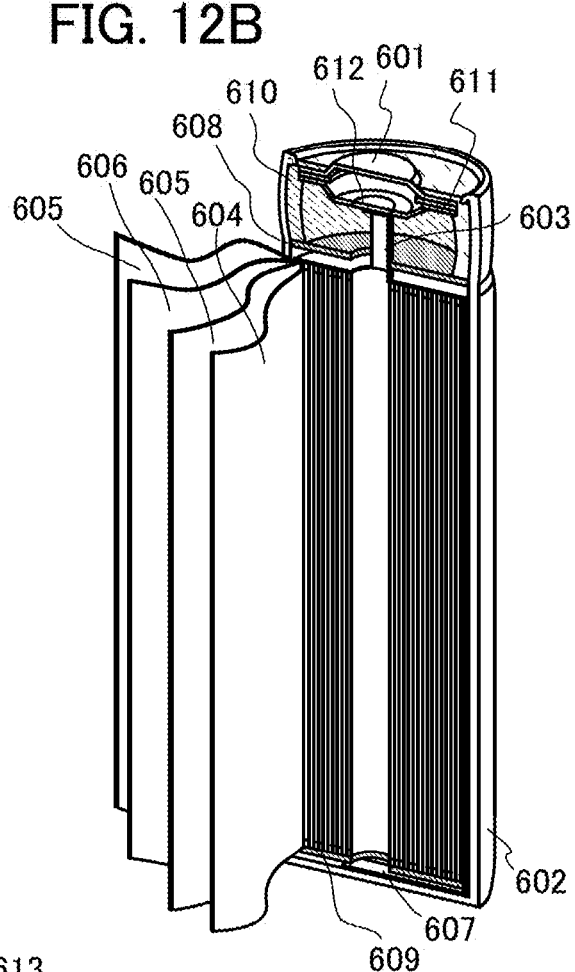

FIG. 12B is a schematic cross-sectional view of the cylindrical secondary battery. Inside the battery can 602 having a hollow cylindrical shape, a battery element in which a strip-like positive electrode 604 and a strip-like negative electrode 606 are wound with a strip-like separator 605 located therebetween is provided. Although not illustrated, the battery element is wound around a center pin. One end of the battery can 602 is close and the other end thereof is open. For the battery can 602, a metal having a corrosion-resistant property to an electrolyte solution, such as nickel, aluminum, or titanium, an alloy of such a metal, or an alloy of such a metal and another metal (e.g., stainless steel) can be used. Alternatively, the battery can 602 is preferably covered with nickel, aluminum, or the like in order to prevent corrosion due to the electrolyte solution. Inside the battery can 602, the battery element in which the positive electrode, the negative electrode, and the separator are wound is provided between a pair of insulating plates 608 and 609 that face each other. Furthermore, a nonaqueous electrolyte solution (not illustrated) is injected inside the battery can 602 provided with the battery element. As the nonaqueous electrolyte solution, a nonaqueous electrolyte solution that is similar to that of the coin-type secondary battery can be used.

Since the positive electrode and the negative electrode of the cylindrical secondary battery are wound, active materials are preferably formed on both sides of the current collectors. A positive electrode terminal (positive electrode current collecting lead) 603 is connected to the positive electrode 604, and a negative electrode terminal (negative electrode current collecting lead) 607 is connected to the negative electrode 606. Both the positive electrode terminal 603 and the negative electrode terminal 607 can be formed using a metal material such as aluminum. The positive electrode terminal 603 and the negative electrode terminal 607 are resistance-welded to a safety valve mechanism 612 and the bottom of the battery can 602, respectively. The safety valve mechanism 612 is electrically connected to the positive electrode cap 601 through a positive temperature coefficient (PTC) element 611. The safety valve mechanism 612 cuts off electrical connection between the positive electrode cap 601 and the positive electrode 604 when the internal pressure of the battery exceeds a predetermined threshold value. The PTC element 611, which serves as a thermally sensitive resistor whose resistance increases as temperature rises, limits the amount of current by increasing the resistance, in order to prevent abnormal heat generation. Barium titanate ($BaTiO_3$)-based semiconductor ceramic can be used for the PTC element.

Figure 12C:
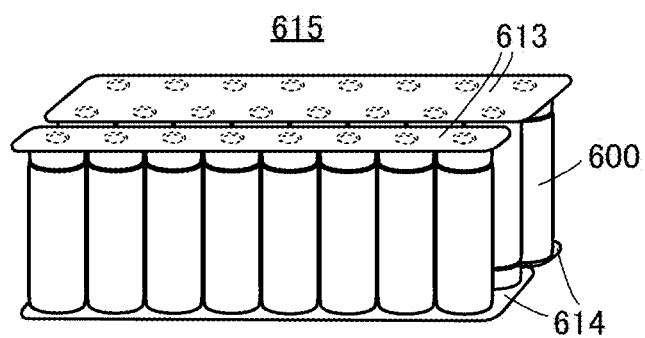

Alternatively, as illustrated in FIG. 12C, a plurality of cylindrical secondary batteries 600 may be sandwiched between a conductive plate 613 and a conductive plate 614 to form a module 615. The plurality of cylindrical secondary batteries 600 may be connected in parallel, connected in series, or connected in series after being connected in parallel. With the module 615 including the plurality of cylindrical secondary batteries 600, large electric power can be extracted.

Figure 12D:
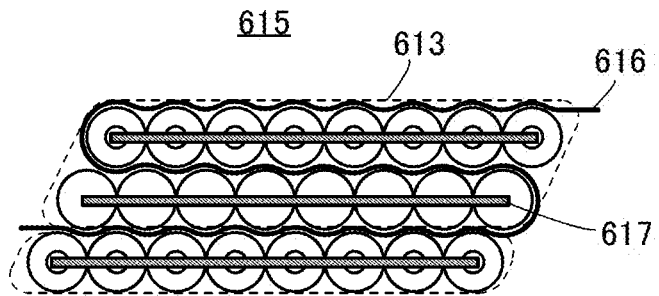

FIG. 12D is a top view of the module 615. The conductive plate 613 is shown by a dotted line for clarity of the drawing. As illustrated in FIG. 12D, the module 615 may include a wiring 616 which electrically connects the plurality of cylindrical secondary batteries 600 to each other. It is possible to provide the conductive plate 613 over the wiring 616 to overlap with each other. In addition, a temperature control device 617 may be provided between the plurality of cylindrical secondary batteries 600. When the cylindrical secondary batteries 600 are overheated, the temperature control device 617 can cool them, and when the cylindrical secondary batteries 600 are cooled too much, the temperature control device 617 can heat them. Thus, the performance of the module 615 is not easily influenced by the outside air temperature.

When the positive electrode active material described in the above embodiment is used in the positive electrode 604, the cylindrical secondary battery 600 with high capacity and excellent cycle characteristics can be obtained.

[Structural Examples of Secondary Battery]

Other structural examples of secondary batteries will be described with reference to FIGS. 13A and 13B, FIGS. 14A-1, 14A-2, 14B-1, and 14B-2, FIGS. 15A and 15B, and FIG. 16.

Figure 13A:
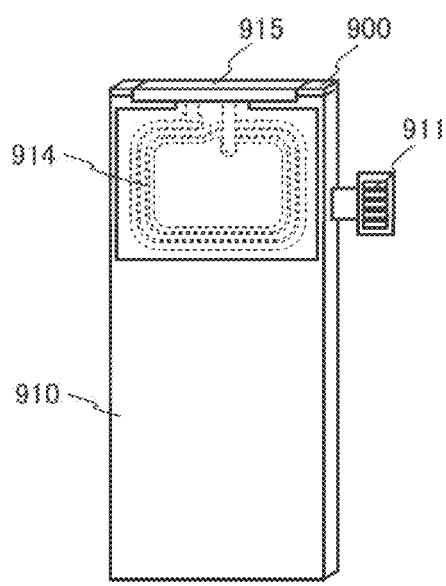
FIGS. 13A and 13B illustrate an example of a secondary battery.
Figure 13B:
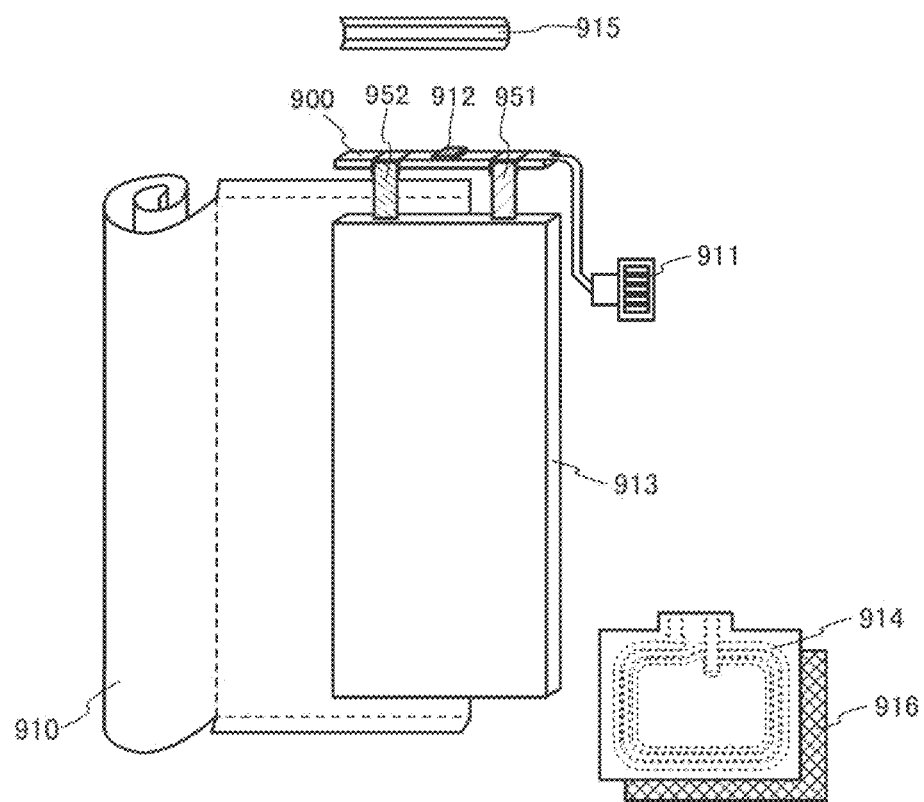

FIGS. 13A and 13B are external views of a secondary battery. The secondary battery includes a circuit board 900 and a secondary battery 913. A label 910 is attached to the secondary battery 913. As shown in FIG. 13B, the secondary battery further includes a terminal 951, a terminal 952, an antenna 914, and an antenna 915.

The circuit board 900 includes terminals 911 and a circuit 912. The terminals 911 are connected to the terminals 951 and 952, the antennas 914 and 915, and the circuit 912. Note that a plurality of terminals 911 serving as a control signal input terminal, a power supply terminal, and the like may be provided.

The circuit 912 may be provided on the rear surface of the circuit board 900. The shape of each of the antennas 914 and 915 is not limited to a coil shape and may be a linear shape or a plate shape. Furthermore, a planar antenna, an aperture antenna, a traveling-wave antenna, an EH antenna, a magnetic-field antenna, a dielectric antenna, or the like may be used. Alternatively, the antenna 914 or the antenna 915 may be a flat-plate conductor. The flat-plate conductor can serve as one of conductors for electric field coupling. That is, the antenna 914 or the antenna 915 can serve as one of two conductors of a capacitor. Thus, electric power can be transmitted and received not only by an electromagnetic field or a magnetic field but also by an electric field.

The line width of the antenna 914 is preferably larger than that of the antenna 915. This makes it possible to increase the amount of electric power received by the antenna 914.

The secondary battery includes a layer 916 between the secondary battery 913 and the antennas 914 and 915. The layer 916 has a function of blocking an electromagnetic field from the secondary battery 913, for example. As the layer 916, for example, a magnetic body can be used.

Note that the structure of the secondary battery is not limited to that shown in FIGS. 13A and 13B.

Figures 1, 14A:
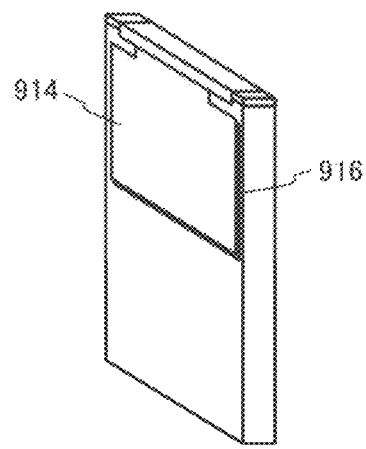
Figures 2, 14A:
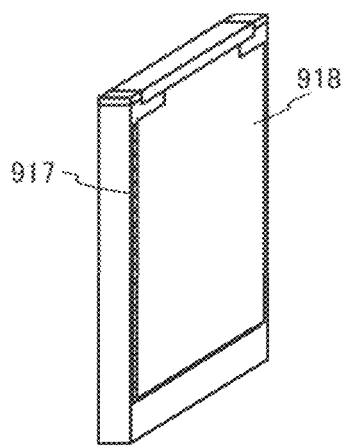

For example, as shown in FIGS. 14A-1 and 14A-2, two opposite surfaces of the secondary battery 913 in FIGS. 13A and 13B may be provided with respective antennas. FIG. 14A-1 is an external view showing one side of the opposite surfaces, and FIG. 14A-2 is an external view showing the other side of the opposite surfaces. For portions similar to those in FIGS. 13A and 13B, a description of the secondary battery illustrated in FIGS. 13A and 13B can be referred to as appropriate.

As illustrated in FIG. 14A-1, the antenna 914 is provided on one of the opposite surfaces of the secondary battery 913 with the layer 916 located therebetween, and as illustrated in FIG. 14A-2, an antenna 918 is provided on the other of the opposite surfaces of the secondary battery 913 with a layer 917 located therebetween. The layer 917 has a function of blocking an electromagnetic field from the secondary battery 913, for example. As the layer 917, for example, a magnetic body can be used.

With the above structure, both of the antennas 914 and 918 can be increased in size. The antenna 918 has a function of communicating data with an external device, for example. An antenna with a shape that can be applied to the antenna 914, for example, can be used as the antenna 918. As a system for communication using the antenna 918 between the secondary battery and another device, a response method that can be used between the secondary battery and another device, such as NFC, can be employed.

Figures 1, 14B:
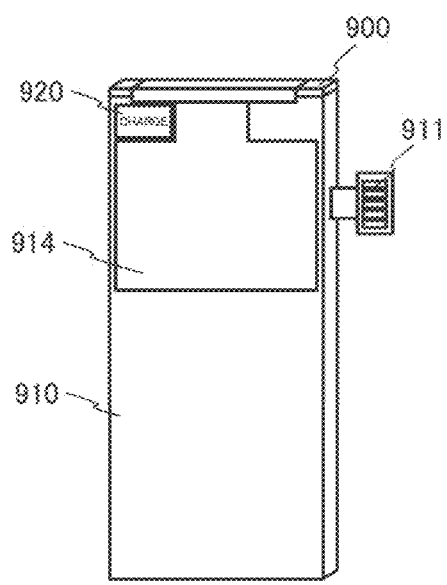
Figures 2, 14B:
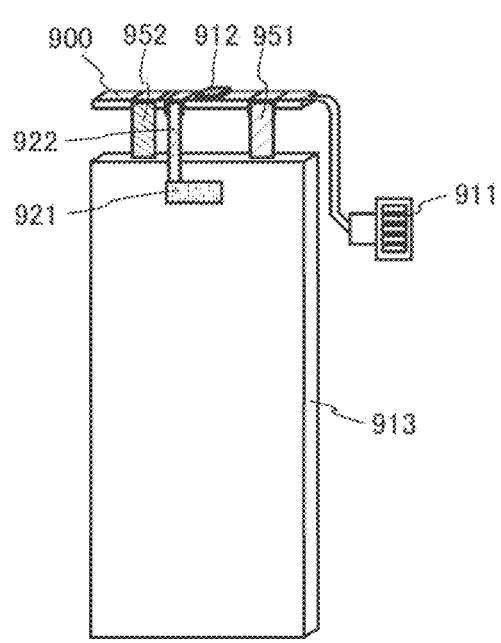

Alternatively, as illustrated in FIG. 14B-1, the secondary battery 913 in FIGS. 13A and 13B may be provided with a display device 920. The display device 920 is electrically connected to the terminal 911. It is possible that the label 910 is not provided in a portion where the display device 920 is provided. For portions similar to those in FIGS. 13A and 13B, a description of the secondary battery illustrated in FIGS. 13A and 13B can be referred to as appropriate.

The display device 920 can display, for example, an image showing whether charge is being carried out, an image showing the amount of stored power, or the like. As the display device 920, electronic paper, a liquid crystal display device, an electroluminescent (EL) display device, or the like can be used. For example, the use of electronic paper can reduce power consumption of the display device 920.

Alternatively, as illustrated in FIG. 14B-2, the secondary battery 913 illustrated in FIGS. 13A and 13B may be provided with a sensor 921. The sensor 921 is electrically connected to the terminal 911 via a terminal 922. For portions similar to those in FIGS. 13A and 13B, a description of the secondary battery illustrated in FIGS. 13A and 13B can be referred to as appropriate.

The sensor 921 has a function of measuring, for example, displacement, position, speed, acceleration, angular velocity, rotational frequency, distance, light, liquid, magnetism, temperature, chemical substance, sound, time, hardness, electric field, electric current, voltage, electric power, radiation, flow rate, humidity, gradient, oscillation, odor, or infrared rays. With the sensor 921, for example, data on an environment (e.g., temperature) where the secondary battery is placed can be determined and stored in a memory inside the circuit 912.

Furthermore, structural examples of the secondary battery 913 will be described with reference to FIGS. 15A and 15B and FIG. 16.

Figure 15A:
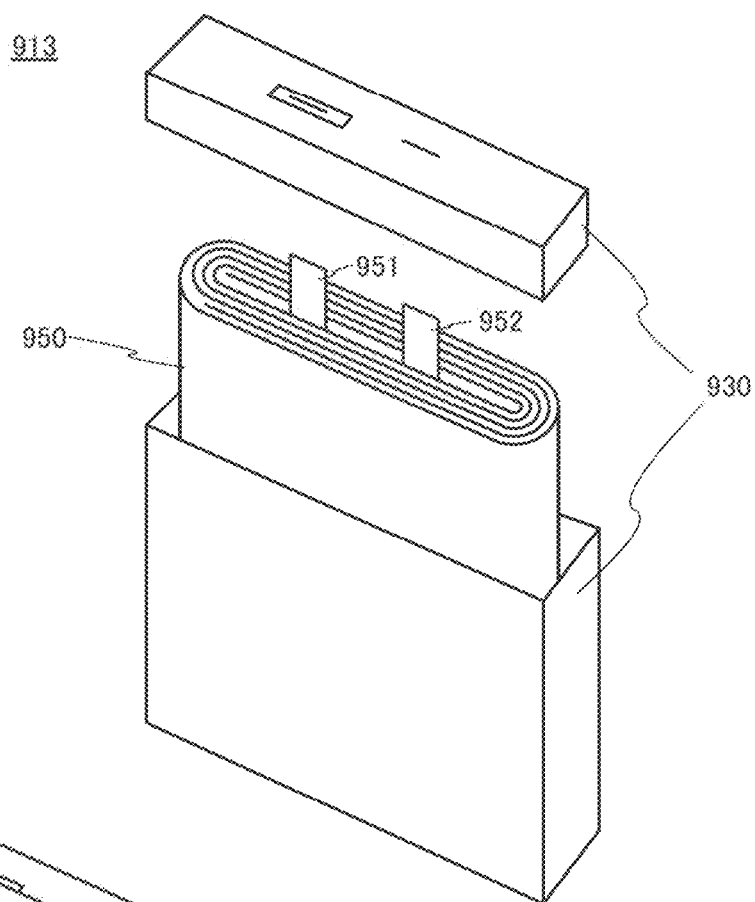
FIGS. 15A and 15B illustrate examples of secondary batteries.

The secondary battery 913 illustrated in FIG. 15A includes a wound body 950 provided with the terminals 951 and 952 inside a housing 930. The wound body 950 is soaked in an electrolyte solution inside the housing 930. The terminal 952 is in contact with the housing 930. An insulator or the like inhibits contact between the terminal 951 and the housing 930. Note that in FIG. 15A, the housing 930 divided into two pieces is illustrated for convenience; however, in the actual structure, the wound body 950 is covered with the housing 930 and the terminals 951 and 952 extend to the outside of the housing 930. For the housing 930, a metal material (such as aluminum) or a resin material can be used.

Figure 15B:
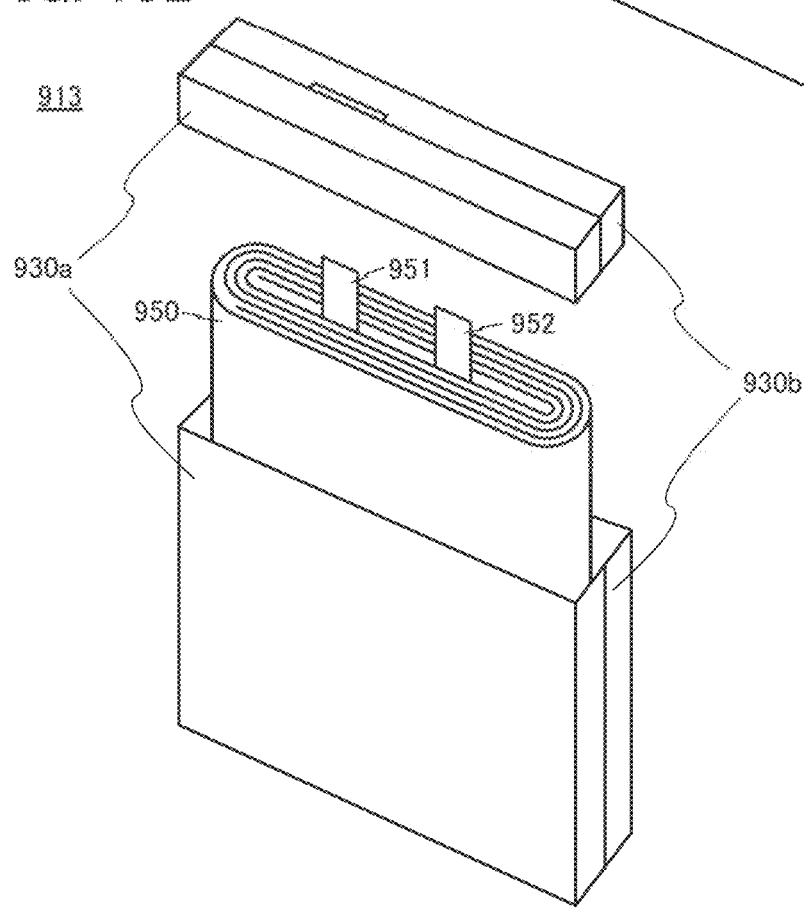

Note that as illustrated in FIG. 15B, the housing 930 in FIG. 15A may be formed using a plurality of materials. For example, in the secondary battery 913 in FIG. 15B, a housing 930*a* and a housing 930*b* are bonded to each other, and the wound body 950 is provided in a region surrounded by the housing 930*a* and the housing 930*b*.

For the housing 930*a*, an insulating material such as an organic resin can be used. In particular, when a material such as an organic resin is used for the side on which an antenna is formed, blocking of an electric field from the secondary battery 913 can be inhibited. When an electric field is not significantly blocked by the housing 930*a*, an antenna such as the antennas 914 and 915 may be provided inside the housing 930*a*. For the housing 930*b*, a metal material can be used, for example.

Figure 16:
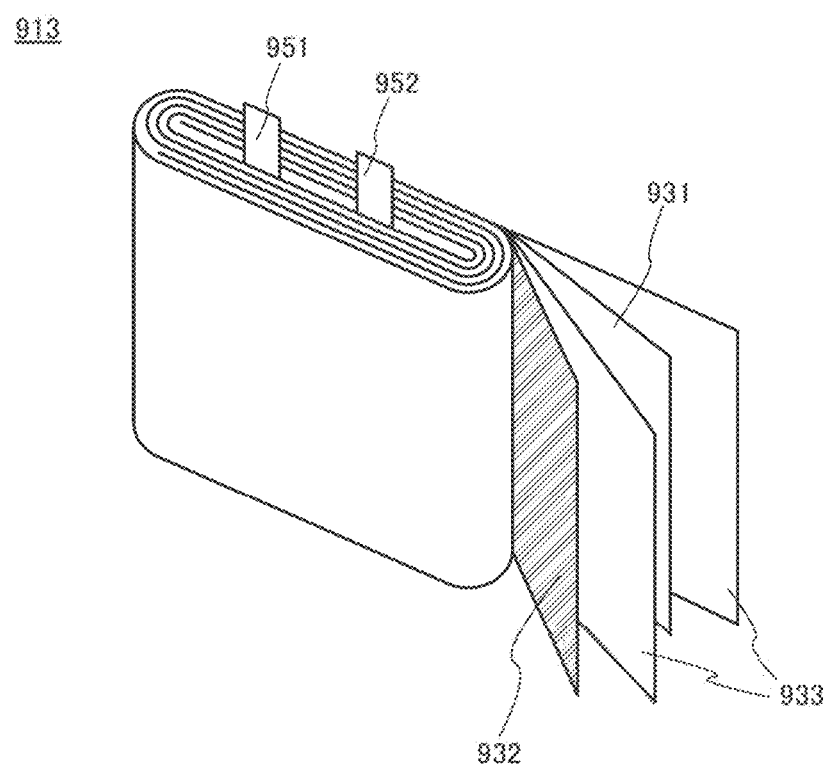
FIG. 16 illustrates an example of a secondary battery.

FIG. 16 illustrates the structure of the wound body 950. The wound body 950 includes a negative electrode 931, a positive electrode 932, and separators 933. The wound body 950 is obtained by winding a sheet of a stack in which the negative electrode 931 overlaps with the positive electrode 932 with the separator 933 provided therebetween. Note that a plurality of stacks each including the negative electrode 931, the positive electrode 932, and the separator 933 may be stacked.

The negative electrode 931 is connected to the terminal 911 in FIGS. 13A and 13B via one of the terminals 951 and 952. The positive electrode 932 is connected to the terminal 911 in FIGS. 13A and 13B via the other of the terminals 951 and 952.

When the positive electrode active material described in the above embodiment is used in the positive electrode 932, the secondary battery 913 with high capacity and excellent cycle characteristics can be obtained.

[Laminated Secondary Battery]

Next, an example of a laminated secondary battery will be described with reference to FIGS. 17A to 17C, FIGS. 18A and 18B, FIG. 19, FIG. 20, FIGS. 21A to 21C, FIGS. 22A, 22B1, 22B2, 22C, and 22D, and FIGS. 23A and 23B. When the laminated secondary battery has flexibility and is used in an electronic device at least part of which is flexible, the secondary battery can be bent as the electronic device is bent.

A laminated secondary battery 980 is described with reference to FIGS. 17A to 17C. The laminated secondary battery 980 includes a wound body 993 illustrated in FIG. 17A. The wound body 993 includes a negative electrode 994, a positive electrode 995, and a separator 996. The wound body 993 is, like the wound body 950 illustrated in FIG. 16, obtained by winding a sheet of a stack in which the negative electrode 994 overlaps with the positive electrode 995 with the separator 996 therebetween.

Note that the number of stacks each including the negative electrode 994, the positive electrode 995, and the separator 996 may be determined as appropriate depending on capacity and an element volume which are required. The negative electrode 994 is connected to a negative electrode current collector (not illustrated) via one of a lead electrode 997 and a lead electrode 998. The positive electrode 995 is connected to a positive electrode current collector (not illustrated) via the other of the lead electrode 997 and the lead electrode 998.

Figure 17A:
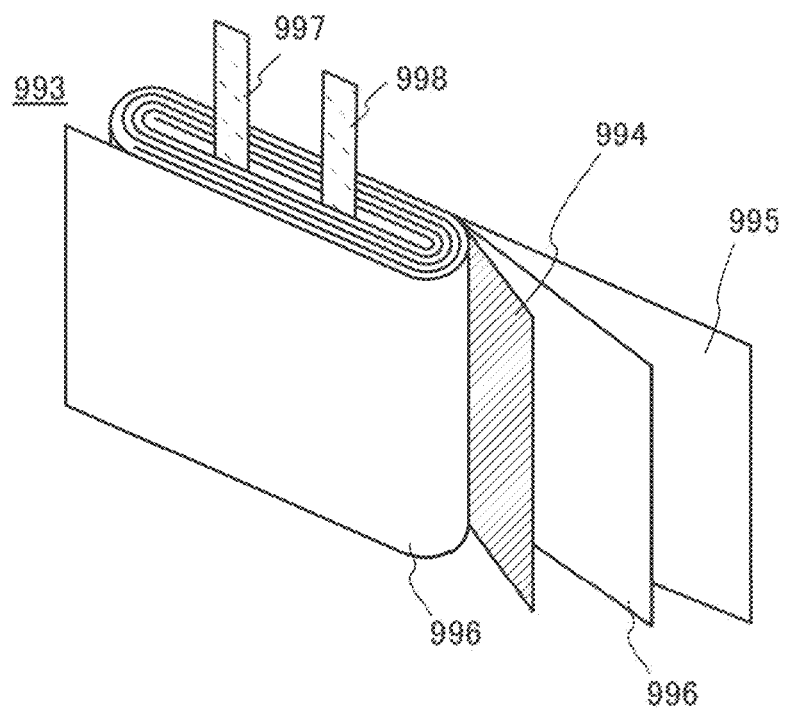
FIGS. 17A to 17C illustrate a laminated secondary battery.
Figure 17B:
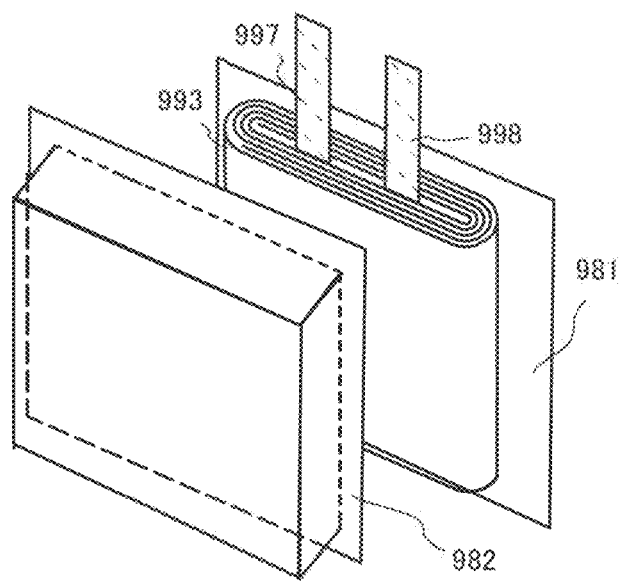
Figure 17C:
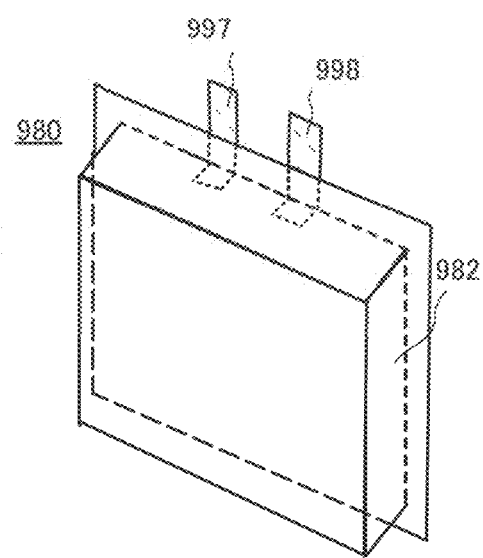

As illustrated in FIG. 17B, the wound body 993 is packed in a space formed by bonding a film 981 and a film 982 having a depressed portion that serve as exterior bodies by thermocompression bonding or the like, whereby the laminated secondary battery 980 can be formed as illustrated in FIG. 17C. The wound body 993 includes the lead electrode 997 and the lead electrode 998, and is soaked in an electrolyte solution inside a space surrounded by the film 981 and the film 982 having a depressed portion.

For the film 981 and the film 982 having a depressed portion, a metal material such as aluminum or a resin material can be used, for example With the use of a resin material for the film 981 and the film 982 having a depressed portion, the film 981 and the film 982 having a depressed portion can be changed in their forms when external force is applied; thus, a flexible secondary battery can be fabricated.

Although FIGS. 17B and 17C illustrate an example where a space is formed by two films, the wound body 993 may be placed in a space formed by bending one film.

When the positive electrode active material described in the above embodiment is used in the positive electrode 995, the laminated secondary battery 980 with high capacity and excellent cycle characteristics can be obtained.

Figure 18A:
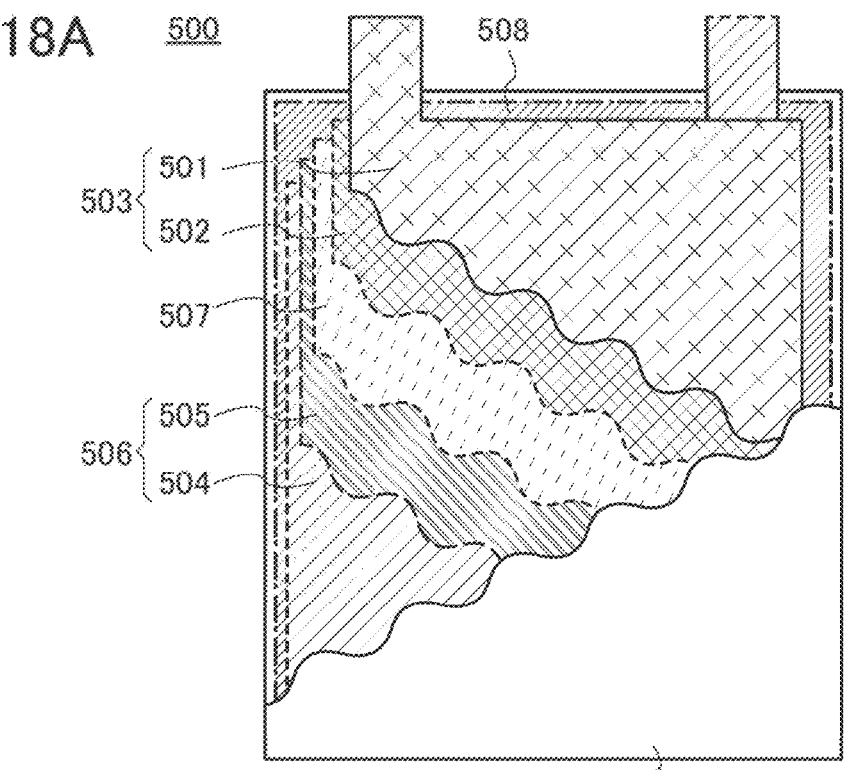
FIGS. 18A and 18B illustrate a laminated secondary battery.
Figure 18B:
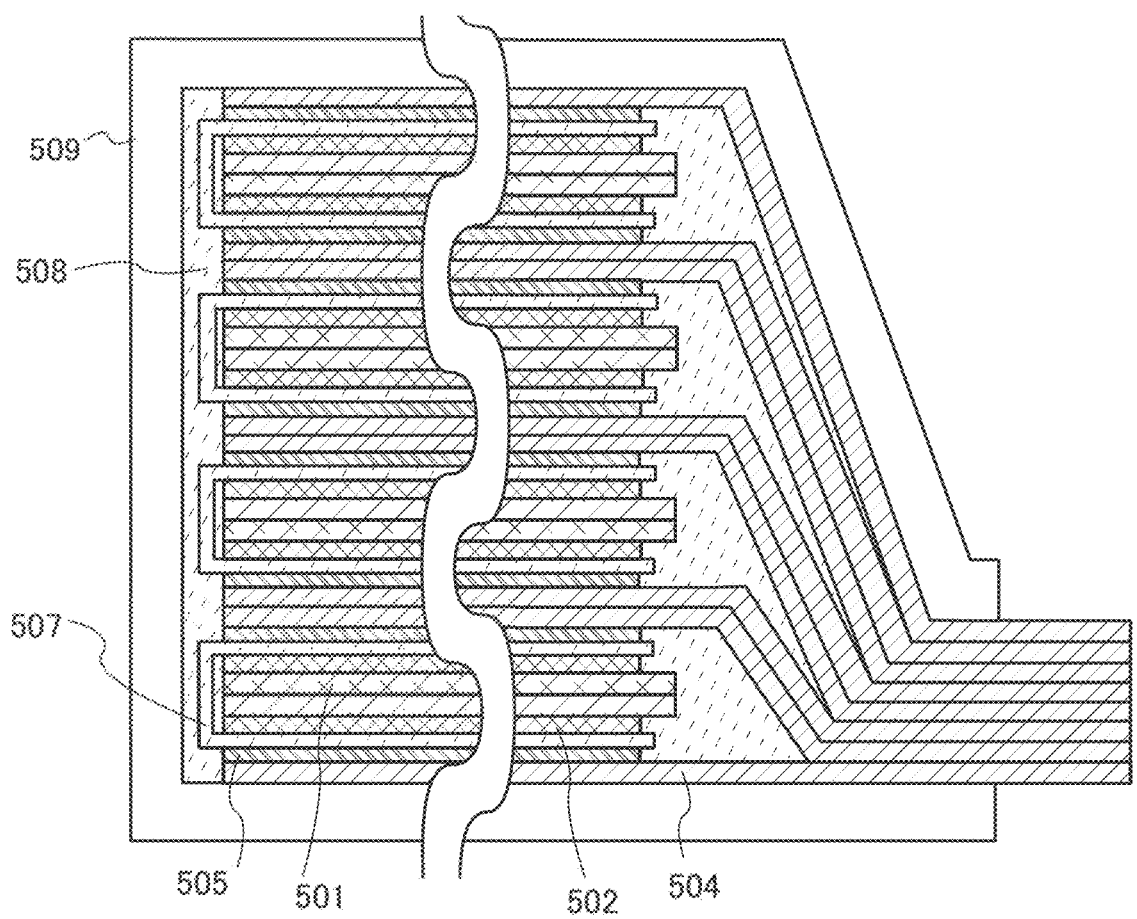

In FIGS. 17A to 17C, an example in which the laminated secondary battery 980 includes a wound body in a space formed by films serving as exterior bodies is described; however, as illustrated in FIGS. 18A and 18B, a secondary battery may include a plurality of strip-shaped positive electrodes, a plurality of strip-shaped separators, and a plurality of strip-shaped negative electrodes in a space formed by films serving as exterior bodies, for example.

A laminated secondary battery 500 illustrated in FIG. 18A includes a positive electrode 503 including a positive electrode current collector 501 and a positive electrode active material layer 502, a negative electrode 506 including a negative electrode current collector 504 and a negative electrode active material layer 505, a separator 507, an electrolyte solution 508, and an exterior body 509. The separator 507 is provided between the positive electrode 503 and the negative electrode 506 in the exterior body 509. The exterior body 509 is filled with the electrolyte solution 508. The electrolyte solution described in Embodiment 2 can be used for the electrolyte solution 508.

In the laminated secondary battery 500 illustrated in FIG. 18A, the positive electrode current collector 501 and the negative electrode current collector 504 also serve as terminals for an electrical contact with an external portion. For this reason, the positive electrode current collector 501 and the negative electrode current collector 504 may be arranged so as to be partly exposed to the outside of the exterior body 509. Alternatively, a lead electrode and the positive electrode current collector 501 or the negative electrode current collector 504 may be bonded to each other by ultrasonic welding, and instead of the positive electrode current collector 501 and the negative electrode current collector 504, the lead electrode may be exposed to the outside of the exterior body 509.

As the exterior body 509 of the laminated secondary battery 500, for example, a laminate film having a three-layer structure can be employed in which a highly flexible metal thin film of aluminum, stainless steel, copper, nickel, or the like is provided over a film formed of a material such as polyethylene, polypropylene, polycarbonate, ionomer, or polyamide, and an insulating synthetic resin film of a polyamide-based resin, a polyester-based resin, or the like is provided over the metal thin film as the outer surface of the exterior body.

FIG. 18B illustrates an example of a cross-sectional structure of the laminated secondary battery 500. Although FIG. 18A illustrates an example including only two current collectors for simplicity, an actual battery includes a plurality of electrode layers.

The example in FIG. 18B includes 16 electrode layers. The laminated secondary battery 500 has flexibility even though including 16 electrode layers. FIG. 18B illustrates a structure including 8 layers of negative electrode current collectors 504 and 8 layers of positive electrode current collectors 501, i.e., 16 layers in total. Note that FIG. 18B illustrates a cross section of the lead portion of the negative electrode, and the 8 negative electrode current collectors 504 are bonded to each other by ultrasonic welding. It is needless to say that the number of electrode layers is not limited to 16, and may be more than 16 or less than 16. With a large number of electrode layers, the secondary battery can have high capacity. In contrast, with a small number of electrode layers, the secondary battery can have small thickness and high flexibility.

Figure 19:
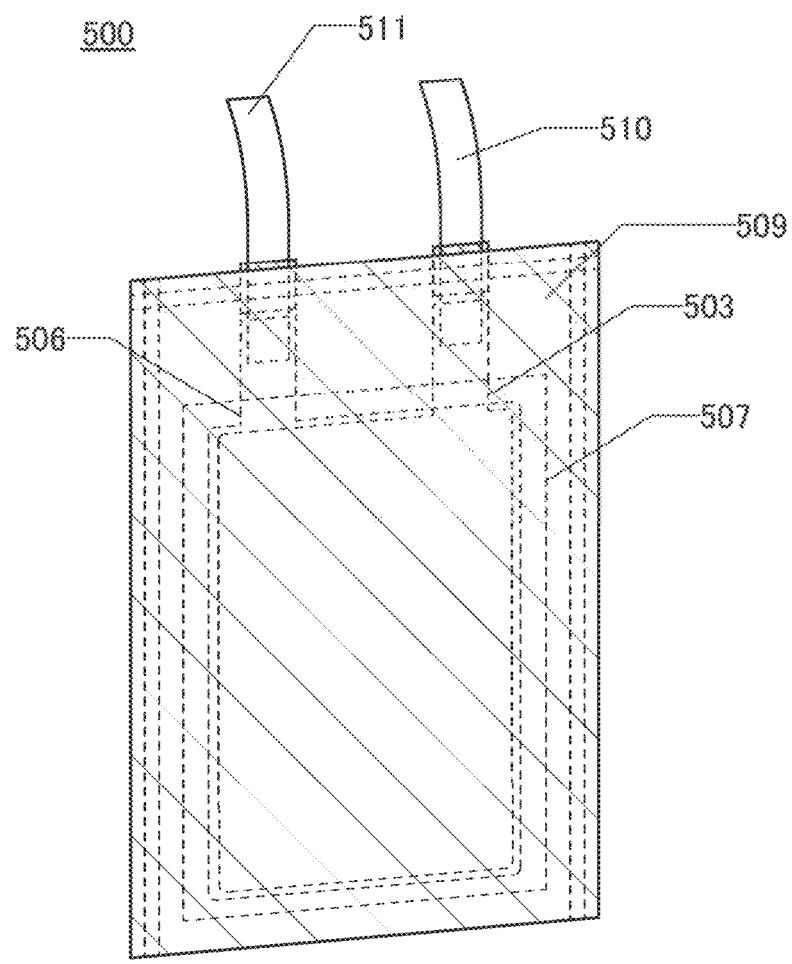
FIG. 19 is an external view of a secondary battery.
Figure 20:
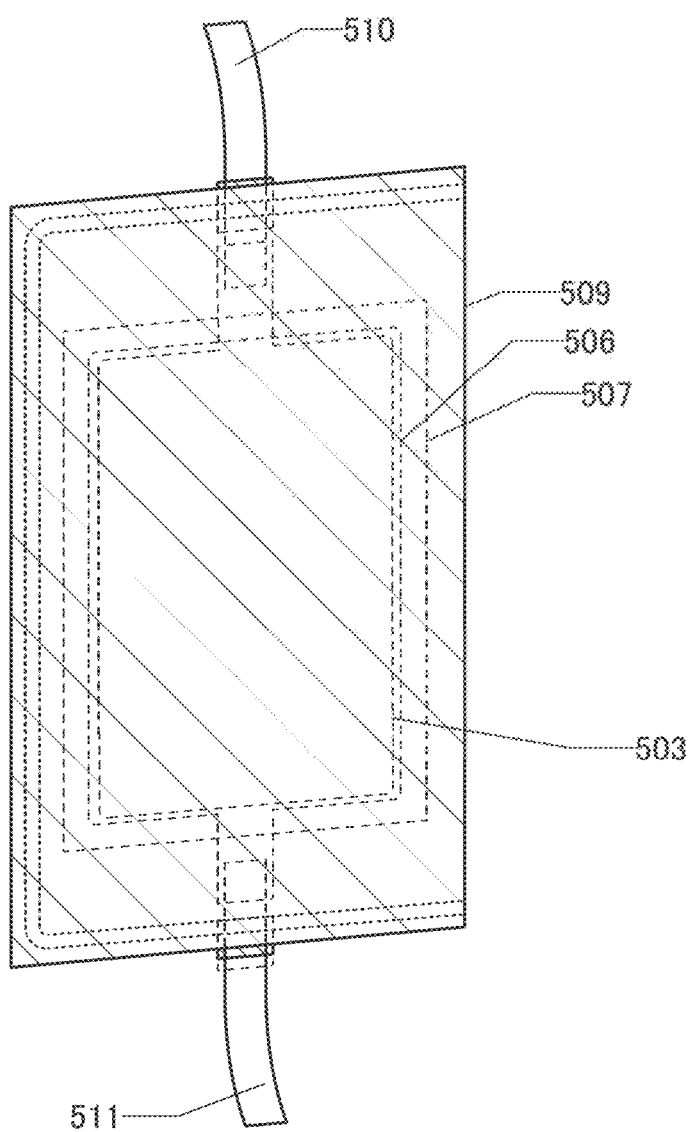
FIG. 20 is an external view of a secondary battery.

FIGS. 19 and 20 each illustrate an example of the external view of the laminated secondary battery 500. In FIGS. 19 and 20, the positive electrode 503, the negative electrode 506, the separator 507, the exterior body 509, a positive electrode lead electrode 510, and a negative electrode lead electrode 511 are included.

Figure 21A:
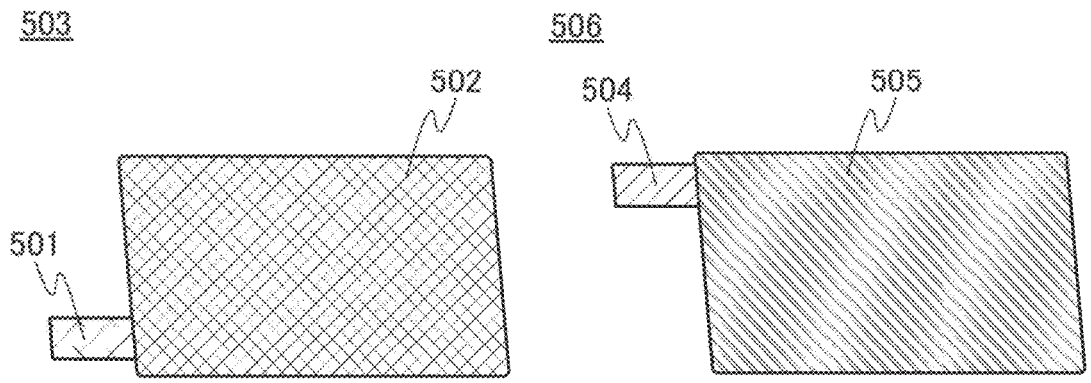
FIGS. 21A to 21C illustrate a formation method of a secondary battery.

FIG. 21A illustrates external views of the positive electrode 503 and the negative electrode 506. The positive electrode 503 includes the positive electrode current collector 501, and the positive electrode active material layer 502 is formed on a surface of the positive electrode current collector 501. The positive electrode 503 also includes a region where the positive electrode current collector 501 is partly exposed (hereinafter referred to as a tab region). The negative electrode 506 includes the negative electrode current collector 504, and the negative electrode active material layer 505 is formed on a surface of the negative electrode current collector 504. The negative electrode 506 also includes a region where the negative electrode current collector 504 is partly exposed, that is, a tab region. The areas and the shapes of the tab regions included in the positive electrode and the negative electrode are not limited to those illustrated in FIG. 21A.

[Method for Manufacturing Laminated Secondary Battery]

Figure 21B:
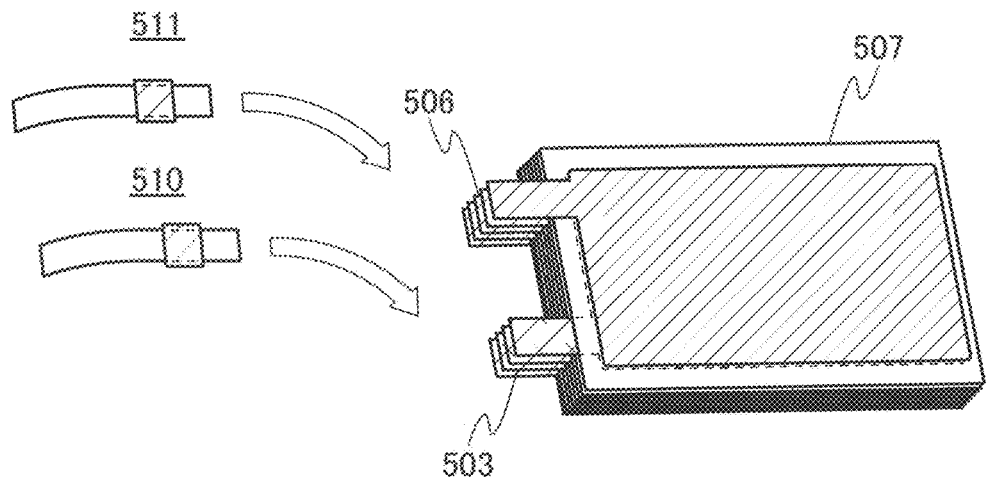

Here, an example of a method for manufacturing the laminated secondary battery whose external view is illustrated in FIG. 19 will be described with reference to FIGS. 21B and 21C.

First, the negative electrode 506, the separator 507, and the positive electrode 503 are stacked. FIG. 21B illustrates a stack including the negative electrode 506, the separator 507, and the positive electrode 503. The secondary battery described here as an example includes 5 negative electrodes and 4 positive electrodes. Next, the tab regions of the positive electrodes 503 are bonded to each other, and the tab region of the positive electrode on the outermost surface and the positive electrode lead electrode 510 are bonded to each other. The bonding can be performed by ultrasonic welding, for example. In a similar manner, the tab regions of the negative electrodes 506 are bonded to each other, and the negative electrode lead electrode 511 is bonded to the tab region of the negative electrode on the outermost surface.

After that, the negative electrode 506, the separator 507, and the positive electrode 503 are placed over the exterior body 509.

Figure 21C:
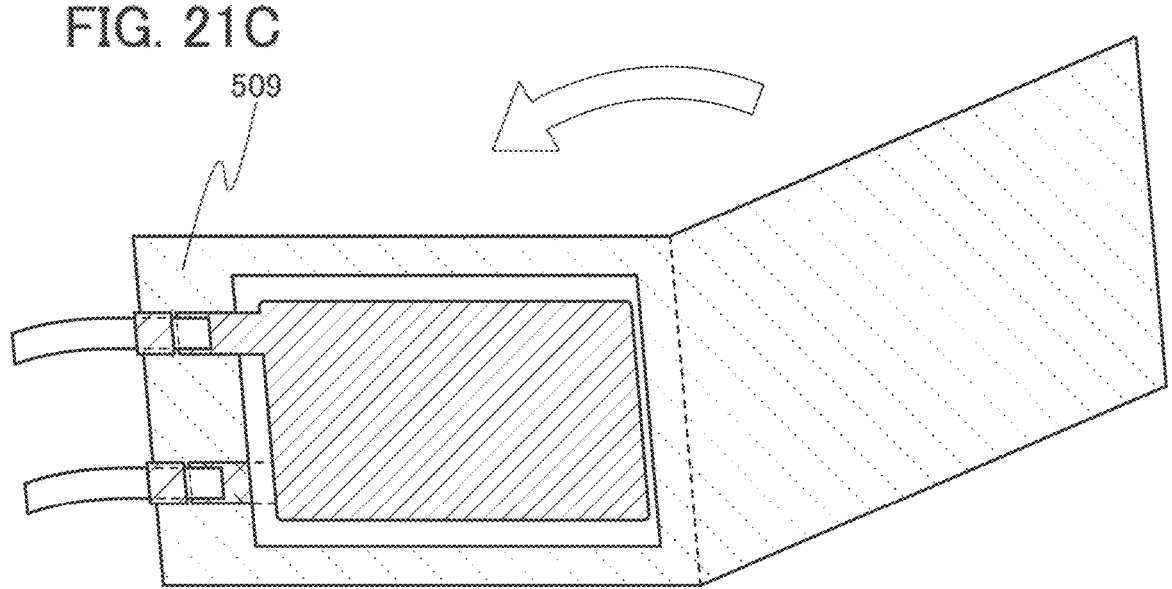

Subsequently, the exterior body 509 is folded along a dashed line as illustrated in FIG. 21C. Then, the outer edge of the exterior body 509 is bonded. The bonding can be performed by thermocompression bonding, for example. At this time, a part (or one side) of the exterior body 509 is left unbonded (to provide an inlet) so that the electrolyte solution 508 can be introduced later.

Next, the electrolyte solution 508 is introduced into the exterior body 509 from the inlet of the exterior body 509. The electrolyte solution 508 is preferably introduced in a reduced pressure atmosphere or in an inert gas atmosphere. Lastly, the inlet is bonded. In the above manner, the laminated secondary battery 500 can be manufactured.

When the positive electrode active material described in the above embodiment is used in the positive electrode 503, the laminated secondary battery 500 with high capacity and excellent cycle characteristics can be obtained.

[Bendable Secondary Battery]

Next, an example of a bendable secondary battery is described with reference to FIGS. 22A, 22B1, 22B2, 22C and 22D and FIGS. 23A and 23B.

FIG. 22A is a schematic top view of a bendable secondary battery 50. FIGS. 22B1, 22B2, and 22C are schematic cross-sectional views taken along cutting line C1-C2, cutting line C3-C4, and cutting line A1-A2, respectively, in FIG. 22A. The battery 50 includes an exterior body 51 and a positive electrode 11a, and a negative electrode 11b held in the exterior body 51. A lead 12a electrically connected to the positive electrode 11a and a lead 12b electrically connected to the negative electrode 11b are extended to the outside of the exterior body 51. In addition to the positive electrode 11a and the negative electrode 11b, an electrolyte solution (not illustrated) is enclosed in a region surrounded by the exterior body 51.

Figure 23A:
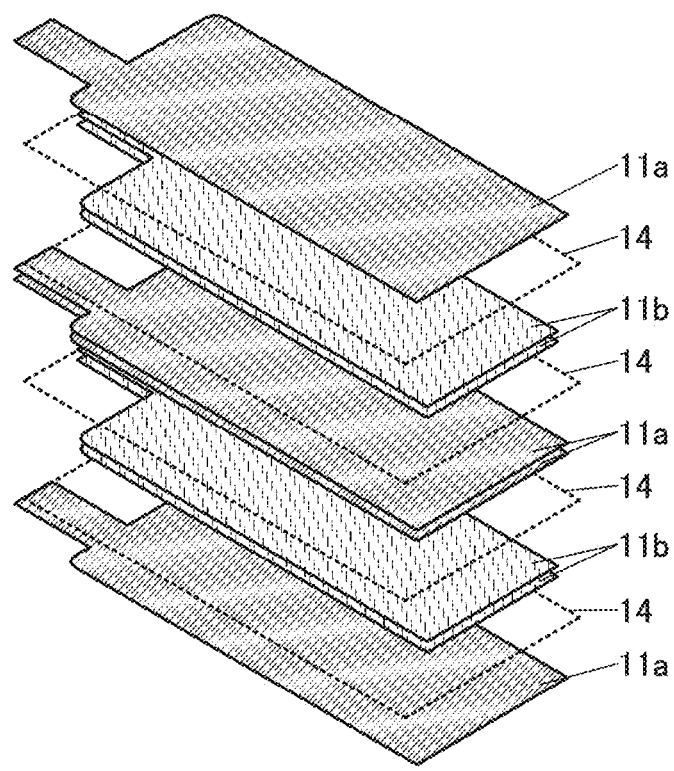
FIGS. 23A and 23B illustrate a bendable secondary battery.
Figure 23B:
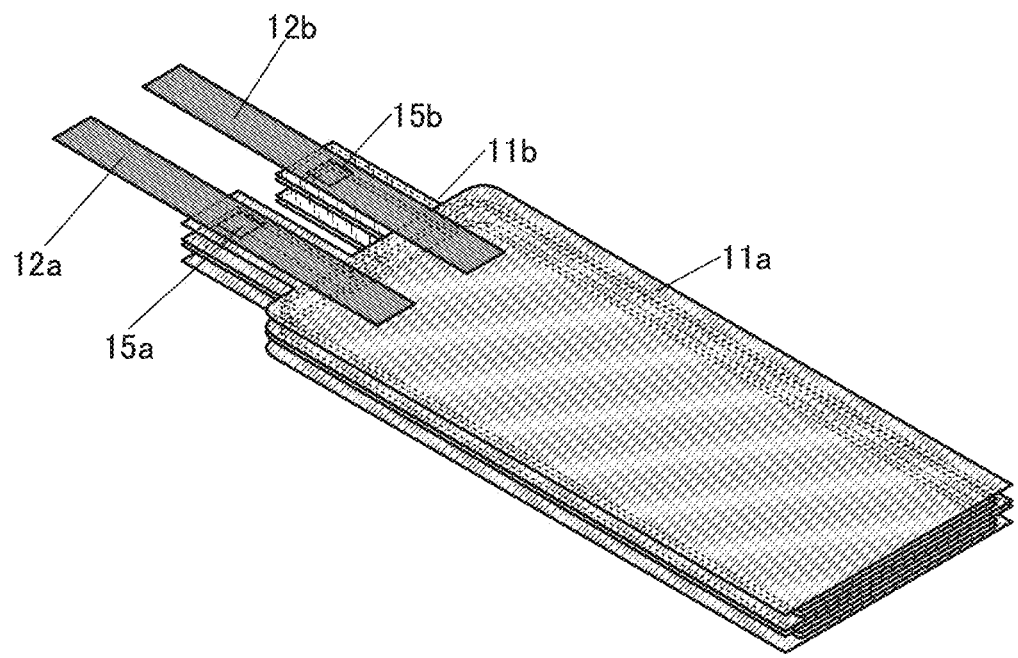

FIGS. 23A and 23B illustrate the positive electrode 11a and the negative electrode 11b included in the battery 50. FIG. 23A is a perspective view illustrating the stacking order of the positive electrode 11a, the negative electrode 11b, and the separator 14. FIG. 23B is a perspective view illustrating the lead 12a and the lead 12b in addition to the positive electrode 11a and the negative electrode 11b.

As illustrated in FIG. 23A, the battery 50 includes a plurality of strip-shaped positive electrodes 11a, a plurality of strip-shaped negative electrodes 11b, and a plurality of separators 14. The positive electrode 11a and the negative electrode 11b each include a projected tab portion and a portion other than the tab. A positive electrode active material layer is formed on one surface of the positive electrode 11a other than the tab portion, and a negative electrode active material layer is formed on one surface of the negative electrode 11b other than the tab portion.

The positive electrodes 11a and the negative electrodes 11b are stacked so that surfaces of the positive electrodes 11a on each of which the positive electrode active material layer is not formed are in contact with each other and that surfaces of the negative electrodes 11b on each of which the negative electrode active material layer is not formed are in contact with each other.

Furthermore, the separator 14 is provided between the surface of the positive electrode 11a on which the positive electrode active material is formed and the surface of the negative electrode 11b on which the negative electrode active material is formed. In FIG. 23A, the separator 14 is shown by a dotted line for easy viewing.

In addition, as illustrated in FIG. 23B, the plurality of positive electrodes 11a are electrically connected to the lead 12a in a bonding portion 15a. The plurality of negative electrodes 11b are electrically connected to the lead 12b in a bonding portion 15b.

Next, the exterior body 51 is described with reference to FIGS. 22B1, 22B2, 22C, and 22D.

The exterior body 51 has a film-like shape and is folded in half with the positive electrodes 11a and the negative electrodes 11b between facing portions of the exterior body 51. The exterior body 51 includes a folded portion 61, a pair of seal portions 62, and a seal portion 63. The pair of seal portions 62 is provided with the positive electrodes 11a and the negative electrodes 11b positioned therebetween and thus can also be referred to as side seals. The seal portion 63 has portions overlapping with the lead 12a and the lead 12b and can also be referred to as a top seal.

Part of the exterior body 51 that overlaps with the positive electrodes 11a and the negative electrodes 11b preferably has a wave shape in which crest lines 71 and trough lines 72 are alternately arranged. The seal portions 62 and the seal portion 63 of the exterior body 51 are preferably flat.

FIG. 22B1 shows a cross section cut along the part overlapping with the crest line 71. FIG. 22B2 shows a cross section cut along the part overlapping with the trough line 72. FIGS. 22B1 and 22B2 correspond to cross sections of the battery 50, the positive electrodes 11a, and the negative electrodes 11b in the width direction.

The distance between an end portion of the negative electrode 11b in the width direction and the seal portion 62 is referred to as a distance La. When the battery 50 changes in shape, for example, is bent, the positive electrode 11a and the negative electrode 11b change in shape such that the positions thereof are shifted from each other in the length direction as described later. At the time, if the distance La is too short, the exterior body 51 and the positive electrode 11a and the negative electrode 11b are rubbed hard against each other, so that the exterior body 51 is damaged in some cases. In particular, when a metal film of the exterior body 51 is exposed, there is concern that the metal film is corroded by the electrolyte solution. Thus, the distance La is preferably set as long as possible. However, if the distance La is too long, the volume of the battery 50 is increased.

The distance La between the end portion of the negative electrode 11b and the seal portion 62 is preferably increased as the total thickness of the stacked positive electrodes 11a and negative electrodes 11b is increased.

Specifically, when the total thickness of the stacked positive electrodes 11a and negative electrodes 11b and the separators 14 is referred to as a thickness t, the distance La is preferably 0.8 times or more and 3.0 times or less, further preferably 0.9 times or more and 2.5 times or less, still further preferably 1.0 times or more and 2.0 times or less as large as the thickness t. When the distance La is in the above-described range, a compact battery which is highly reliable for bending can be obtained.

Furthermore, when a distance between the pair of seal portions 62 is referred to as a distance Lb, it is preferable that the distance Lb be sufficiently longer than a width Wb of the negative electrode 11b. In this case, even when the positive electrode 11a and the negative electrode 11b come into contact with the exterior body 51 by change in the shape of the battery 50 such as repeated bending, the position of part of the positive electrode 11a and the negative electrode 11b can be shifted in the width direction; thus, the positive and negative electrodes 11a and 11b and the exterior body 51 can be effectively prevented from being rubbed against each other.

For example, the difference between the distance Lb (i.e., the distance between the pair of seal portions 62) and the width Wb of the negative electrode 11b is preferably 1.6 times or more and 6.0 times or less, further preferably 1.8 times or more and 5.0 times or less, still further preferably 2.0 times or more and 4.0 times or less as large as the total thickness t of the positive electrode 11a and the negative electrode 11b.

In other words, the distance Lb, the width Wb, and the thickness t preferably satisfy the relation of the following Formula 2.

[Formula 2]

$$\frac{Lb - Wb}{2t} \geq a \quad \text{(Formula 2)}$$

In the formula, a is 0.8 or more and 3.0 or less, preferably 0.9 or more and 2.5 or less, further preferably 1.0 or more and 2.0 or less.

FIG. 22C illustrates a cross section including the lead 12a and corresponds to a cross section of the battery 50, the positive electrode 11a, and the negative electrode 11b in the length direction. As illustrated in FIG. 22C, a space 73 is preferably provided between end portions of the positive electrode 11a and the negative electrode 11b in the length direction and the exterior body 51 in the folded portion 61.

FIG. 22D is a schematic cross-sectional view of the battery 50 in a state of being bent. FIG. 22D corresponds to a cross section along cutting line B1-B2 in FIG. 22A.

When the battery 50 is bent, a part of the exterior body 51 positioned on the outer side in bending is unbent and the other part positioned on the inner side changes its shape as it shrinks. More specifically, the part of the exterior body 51 positioned on the outer side in bending changes its shape such that the wave amplitude becomes smaller and the length of the wave period becomes larger. In contrast, the part of the exterior body 51 positioned on the inner side in bending changes its shape such that the wave amplitude becomes larger and the length of the wave period becomes smaller. When the exterior body 51 changes its shape in this manner, stress applied to the exterior body 51 due to bending is relieved, so that a material itself that forms the exterior body 51 does not need to expand and contract. As a result, the battery 50 can be bent with weak force without damage to the exterior body 51.

Furthermore, as illustrated in FIG. 22D, when the battery 50 is bent, the positions of the positive electrode 11a and the negative electrode 11b are shifted relatively. At this time, ends of the stacked positive electrodes 11a and negative electrodes 11b on the seal portion 63 side are fixed by the fixing member 17. Thus, the plurality of positive electrodes 11a and the plurality of negative electrodes 11b are more shifted at a position closer to the folded portion 61. Therefore, stress applied to the positive electrode 11a and the negative electrode 11b is relieved, and the positive electrode 11a and the negative electrode 11b themselves do not need to expand and contract. As a result, the battery 50 can be bent without damage to the positive electrode 11a and the negative electrode 11b.

Furthermore, the space 73 is provided between the end portions of the positive and negative electrodes 11a and 11b and the exterior body 51, whereby the relative positions of the positive electrode 11a and the negative electrode 11b can be shifted while the end portions of the positive electrode 11a and the negative electrode 11b located on an inner side when the battery 50 is bent do not contact the exterior body 51.

In the battery 50 illustrated in FIGS. 22A, 22B1, 22B2, 22C and 22D and FIGS. 23A and 23B, the exterior body, the positive electrode 11a, and the negative electrode 11b are less likely to be damaged and the battery characteristics are less likely to deteriorate even when the battery 50 is repeatedly bent and unbent. When the positive electrode active material described in the above embodiment is used for the positive electrode 11a included in the battery 50, a battery with more excellent cycle characteristics can be obtained.

Embodiment 4

In this embodiment, examples of electronic devices including the secondary battery of one embodiment of the present invention are described.

First, FIGS. 24A to 24G show examples of electronic devices including the bendable secondary battery described in Embodiment 3. Examples of an electronic device including a flexible secondary battery include television sets (also referred to as televisions or television receivers), monitors of computers or the like, digital cameras or digital video cameras, digital photo frames, mobile phones (also referred to as cellular phones or mobile phone devices), portable game machines, portable information terminals, audio reproducing devices, and large game machines such as pachinko machines.

In addition, a flexible secondary battery can be incorporated along a curved inside/outside wall surface of a house or a building or a curved interior/exterior surface of an automobile.

FIG. 24A illustrates an example of a mobile phone. A mobile phone 7400 is provided with a display portion 7402 incorporated in a housing 7401, an operation button 7403, an external connection port 7404, a speaker 7405, a microphone 7406, and the like. Note that the mobile phone 7400 includes a secondary battery 7407. When the secondary battery of one embodiment of the present invention is used as the secondary battery 7407, a lightweight mobile phone with a long lifetime can be provided.

FIG. 24B illustrates the mobile phone 7400 that is bent. When the whole mobile phone 7400 is curved by external force, the secondary battery 7407 included in the mobile phone 7400 is also curved. FIG. 24C illustrates the curved secondary battery 7407. The secondary battery 7407 is a thin storage battery. The secondary battery 7407 is curved and fixed. Note that the secondary battery 7407 includes a lead electrode 7408 electrically connected to a current collector 7409. The current collector 7409 is, for example, copper foil, and partly alloyed with gallium; thus, adhesion between the current collector 7409 and an active material layer in contact with the current collector 7409 is improved and the secondary battery 7407 can have high reliability even in a state of being bent.

FIG. 24D illustrates an example of a bangle display device. A portable display device 7100 includes a housing 7101, a display portion 7102, an operation button 7103, and a secondary battery 7104. FIG. 24E illustrates the bent secondary battery 7104. When the curved secondary battery 7104 is on a user's arm, the housing changes its form and the curvature of a part or the whole of the secondary battery 7104 is changed. Note that the radius of curvature of a curve at a point refers to the radius of the circular arc that best approximates the curve at that point. The reciprocal of the radius of curvature is curvature. Specifically, part or the whole of the housing or the main surface of the secondary battery 7104 is changed in the range of radius of curvature from 40 mm to 150 mm. When the radius of curvature at the main surface of the secondary battery 7104 is greater than or equal to 40 mm and less than or equal to 150 mm, the reliability can be kept high. When the secondary battery of one embodiment of the present invention is used as the secondary battery 7104, a lightweight portable display device with a long lifetime can be provided.

FIG. 24F illustrates an example of a watch-type portable information terminal. A portable information terminal 7200 includes a housing 7201, a display portion 7202, a band 7203, a buckle 7204, an operation button 7205, an input output terminal 7206, and the like.

The portable information terminal 7200 is capable of executing a variety of applications such as mobile phone calls, e-mailing, viewing and editing texts, music reproduction, Internet communication, and a computer game.

The display surface of the display portion 7202 is curved, and images can be displayed on the curved display surface. In addition, the display portion 7202 includes a touch sensor, and operation can be performed by touching the screen with a finger, a stylus, or the like. For example, by touching an icon 7207 displayed on the display portion 7202, application can be started.

With the operation button 7205, a variety of functions such as time setting, power on/off, on/off of wireless communication, setting and cancellation of a silent mode, and setting and cancellation of a power saving mode can be performed. For example, the functions of the operation button 7205 can be set freely by setting the operation system incorporated in the portable information terminal 7200.

The portable information terminal 7200 can employ near field communication that is a communication method based on an existing communication standard. For example, mutual communication between the portable information terminal 7200 and a headset capable of wireless communication can be performed, and thus hands-free calling is possible.

Moreover, the portable information terminal 7200 includes the input output terminal 7206, and data can be directly transmitted to and received from another information terminal via a connector. In addition, charging via the input output terminal 7206 is possible. Note that the charging operation may be performed by wireless power feeding without using the input output terminal 7206.

The display portion 7202 of the portable information terminal 7200 includes the secondary battery of one embodiment of the present invention. When the secondary battery of one embodiment of the present invention is used, a lightweight portable information terminal with a long lifetime can be provided. For example, the secondary battery 7104 illustrated in FIG. 24E that is in the state of being curved can be provided in the housing 7201. Alternatively, the secondary battery 7104 illustrated in FIG. 24E can be provided in the band 7203 such that it can be curved.

A portable information terminal 7200 preferably includes a sensor. As the sensor, for example a human body sensor such as a fingerprint sensor, a pulse sensor, or a temperature sensor, a touch sensor, a pressure sensitive sensor, an acceleration sensor, or the like is preferably mounted.

FIG. 24G illustrates an example of an armband display device. A display device 7300 includes a display portion 7304 and the secondary battery of one embodiment of the present invention. The display device 7300 can include a touch sensor in the display portion 7304 and can serve as a portable information terminal.

The display surface of the display portion 7304 is bent, and images can be displayed on the bent display surface. A display state of the display device 7300 can be changed by, for example, near field communication, which is a communication method based on an existing communication standard.

The display device 7300 includes an input output terminal, and data can be directly transmitted to and received from another information terminal via a connector. In addition, charging via the input output terminal is possible. Note that the charging operation may be performed by wireless power feeding without using the input output terminal.

When the secondary battery of one embodiment of the present invention is used as the secondary battery included in the display device 7300, a lightweight display device with a long lifetime can be provided.

In addition, FIG. 24H, FIGS. 25A to 25C, and FIG. 26 show examples of electronic devices including the secondary battery with excellent cycle characteristics described in the above embodiment.

When the secondary battery of one embodiment of the present invention is used as a secondary battery of a daily electronic device, a lightweight product with a long lifetime can be provided. As the daily electronic devices, an electric toothbrush, an electric shaver, electric beauty equipment, and the like are given. As secondary batteries of these products, in consideration of handling ease for users, small and lightweight stick type secondary batteries with high capacity are desired.

FIG. 24H is a perspective view of a device which is called a vaporizer. In FIG. 24H, a vaporizer 7500 includes an atomizer 7501 including a heating element, a secondary battery 7504 supplying power to the atomizer, and a cartridge 7502 including a liquid supply bottle, a sensor, and the like. To improve safety, a protection circuit which prevents overcharge and overdischarge of the secondary battery 7504 may be electrically connected to the secondary battery 7504. The secondary battery 7504 in FIG. 24H includes an output terminal for connecting to a charger. When the vaporizer 7500 is held by a user, the secondary battery 7504 becomes a tip portion; thus, it is preferable that the secondary battery 7504 have a short total length and be lightweight. With the secondary battery of one embodiment of the present invention which has high capacity and excellent cycle characteristics, the small and lightweight vaporizer 7500 which can be used for a long time for a long period can be provided.

Figure 25A:
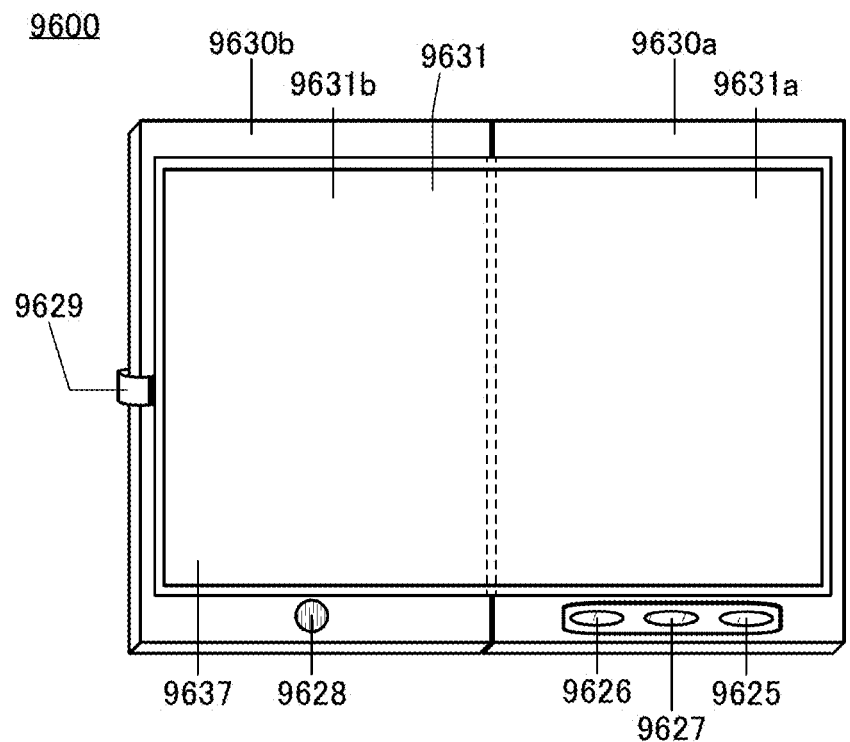
FIGS. 25A to 25C illustrate an example of an electronic device.
Figure 25B:
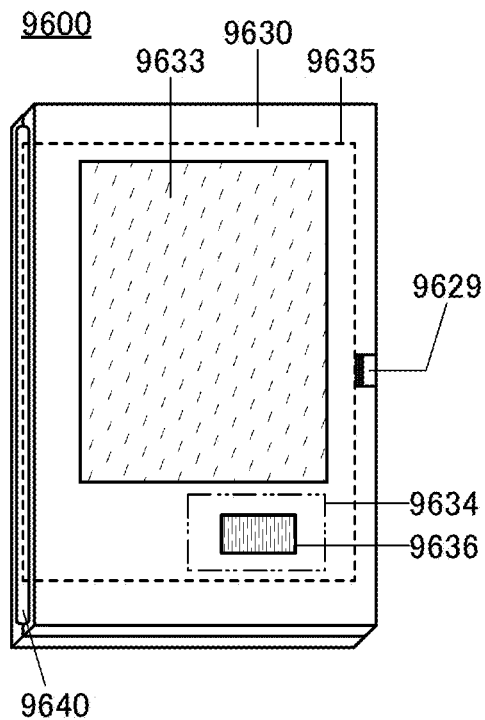

Next, FIGS. 25A and 25B illustrate an example of a foldable tablet terminal. A tablet terminal 9600 illustrated in FIGS. 25A and 25B includes a housing 9630*a*, a housing 9630*b*, a movable portion 9640 connecting the housings 9630*a* and 9630*b*, a display portion 9631 including a display portion 9631*a* and a display portion 9631*b*, a display mode changing switch 9626, a power switch 9627, a power saving mode changing switch 9625, a fastener 9629, and an operation switch 9628. A flexible panel is used for the display portion 9631, whereby a tablet terminal with a larger display portion can be provided. FIG. 25A illustrates the tablet terminal 9600 that is opened, and FIG. 25B illustrates the tablet terminal 9600 that is closed.

The tablet terminal 9600 includes a power storage unit 9635 inside the housings 9630*a* and 9630*b*. The power storage unit 9635 is provided across the housings 9630*a* and 9630*b*, passing through the movable portion 9640.

Part of the display portion 9631*a* can be a touch panel region and data can be input when a displayed operation key is touched. Although a structure in which a half region in the display portion 9631*a* has only a display function and the other half region has a touch panel function is shown as an example, the display portion 9631*a* is not limited to the structure. The whole region in the display portion 9631*a* may have a touch panel function. For example, the display portion 9631*a* can display keyboard buttons in the whole region to be a touch panel, and the display portion 9631*b* can be used as a display screen.

Like the display portion 9631*a*, part of the display portion 9631*b* can be a touch panel region. A switching button for showing/hiding a keyboard of the touch panel is touched with a finger, a stylus, or the like, so that keyboard buttons can be displayed on the display portion 9631b.

Touch input can be performed in the touch panel region and the touch panel region at the same time.

The display mode switch 9626 can switch the display between a portrait mode and a landscape mode, and between monochrome display and color display, for example. The power saving mode changing switch 9625 can control display luminance in accordance with the amount of external light in use of the tablet terminal 9600, which is measured with an optical sensor incorporated in the tablet terminal 9600. Another detection device including a sensor for detecting inclination, such as a gyroscope sensor or an acceleration sensor, may be incorporated in the tablet terminal, in addition to the optical sensor.

Although the display portion 9631a and the display portion 9631b have the same area in FIG. 25A, one embodiment of the present invention is not limited to this example. The display portion 9631a and the display portion 9631b may have different areas or different display quality. For example, one display panel may be capable of higher-definition display than the other display panel.

The tablet terminal is closed in FIG. 25B. The tablet terminal includes the housing 9630, a solar cell 9633, and a charge and discharge control circuit 9634 including a DCDC converter 9636. The power storage unit of one embodiment of the present invention is used as the power storage unit 9635.

The tablet terminal 9600 can be folded such that the housings 9630a and 9630b overlap with each other when not in use. Thus, the display portions 9631a and 9631b can be protected, which increases the durability of the tablet terminal 9600. With the power storage unit 9635 including the secondary battery of one embodiment of the present invention which has high capacity and excellent cycle characteristics, the tablet terminal 9600 which can be used for a long time for a long period can be provided.

The tablet terminal illustrated in FIGS. 25A and 25B can also have a function of displaying various kinds of data (e.g., a still image, a moving image, and a text image), a function of displaying a calendar, a date, or the time on the display portion, a touch-input function of operating or editing data displayed on the display portion by touch input, a function of controlling processing by various kinds of software (programs), and the like.

The solar cell 9633, which is attached on the surface of the tablet terminal, supplies electric power to a touch panel, a display portion, an image signal processor, and the like. Note that the solar cell 9633 can be provided on one or both surfaces of the housing 9630 and the power storage unit 9635 can be charged efficiently. The use of a lithium-ion battery as the power storage unit 9635 brings an advantage such as reduction in size.

Figure 25C:
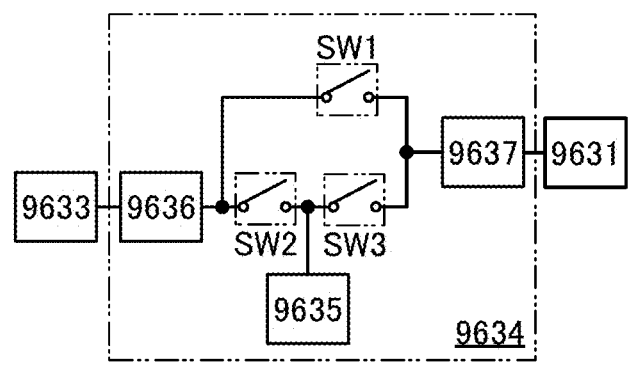

The structure and operation of the charge and discharge control circuit 9634 illustrated in FIG. 25B will be described with reference to a block diagram in FIG. 25C. The solar cell 9633, the power storage unit 9635, the DC-DC converter 9636, a converter 9637, switches SW1 to SW3, and the display portion 9631 are illustrated in FIG. 25C, and the power storage unit 9635, the DC-DC converter 9636, the converter 9637, and the switches SW1 to SW3 correspond to the charge and discharge control circuit 9634 in FIG. 25B.

First, an example of the operation in the case where power is generated by the solar cell 9633 using external light is described. The voltage of electric power generated by the solar cell is raised or lowered by the DCDC converter 9636 to a voltage for charging the power storage unit 9635. When the power from the solar cell 9633 is used for the operation of the display portion 9631, the switch SW1 is turned on and the voltage of the power is raised or lowered by the converter 9637 to a voltage needed for operating the display portion 9631. When display on the display portion 9631 is not performed, the switch SW1 is turned off and the switch SW2 is turned on, so that the power storage unit 9635 can be charged.

Note that the solar cell 9633 is described as an example of a power generation means; however, one embodiment of the present invention is not limited to this example. The power storage unit 9635 may be charged using another power generation means such as a piezoelectric element or a thermoelectric conversion element (Peltier element). For example, the power storage unit 9635 may be charged with a non-contact power transmission module that transmits and receives power wirelessly (without contact) to charge the battery or with a combination of other charging means.

Figure 26:
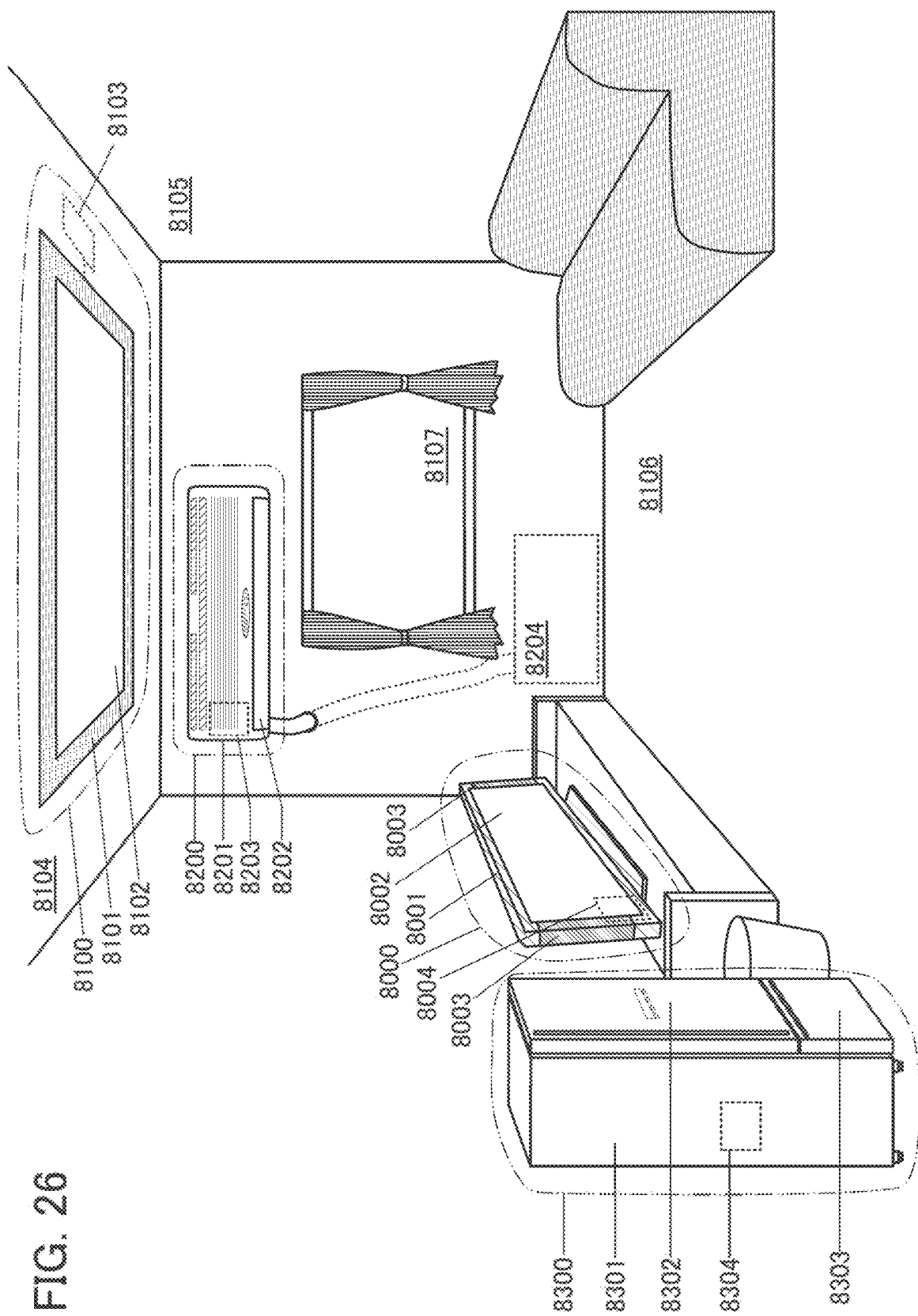
FIG. 26 illustrates examples of electronic devices.

FIG. 26 illustrates other examples of electronic devices. In FIG. 26, a display device 8000 is an example of an electronic device including a secondary battery 8004 of one embodiment of the present invention. Specifically, the display device 8000 corresponds to a display device for TV broadcast reception and includes a housing 8001, a display portion 8002, speaker portions 8003, the secondary battery 8004, and the like. The secondary battery 8004 of one embodiment of the present invention is provided in the housing 8001. The display device 8000 can receive electric power from a commercial power supply. Alternatively, the display device 8000 can use electric power stored in the secondary battery 8004. Thus, the display device 8000 can operate with the use of the secondary battery 8004 of one embodiment of the present invention as an uninterruptible power supply even when electric power cannot be supplied from a commercial power supply due to power failure or the like.

A semiconductor display device such as a liquid crystal display device, a light-emitting device in which a light-emitting element such as an organic EL element is provided in each pixel, an electrophoretic display device, a digital micromirror device (DMD), a plasma display panel (PDP), or a field emission display (FED) can be used for the display portion 8002.

Note that the display device includes, in its category, all of information display devices for personal computers, advertisement displays, and the like other than TV broadcast reception.

In FIG. 26, an installation lighting device 8100 is an example of an electronic device using a secondary battery 8103 of one embodiment of the present invention. Specifically, the lighting device 8100 includes a housing 8101, a light source 8102, the secondary battery 8103, and the like. Although FIG. 26 illustrates the case where the secondary battery 8103 is provided in a ceiling 8104 on which the housing 8101 and the light source 8102 are installed, the secondary battery 8103 may be provided in the housing 8101. The lighting device 8100 can receive electric power from a commercial power supply. Alternatively, the lighting device 8100 can use electric power stored in the secondary battery 8103. Thus, the lighting device 8100 can operate with the use of the secondary battery 8103 of one embodiment of the present invention as an uninterruptible power supply even when electric power cannot be supplied from a commercial power supply due to power failure or the like.

Note that although the installation lighting device 8100 provided in the ceiling 8104 is illustrated in FIG. 26 as an example, the secondary battery of one embodiment of the present invention can be used as an installation lighting device provided in, for example, a wall 8105, a floor 8106, a window 8107, or the like other than the ceiling 8104. Alternatively, the secondary battery can be used in a tabletop lighting device or the like.

As the light source 8102, an artificial light source which emits light artificially by using power can be used. Specifically, an incandescent lamp, a discharge lamp such as a fluorescent lamp, and a light-emitting element such as an LED or an organic EL element are given as examples of the artificial light source.

In FIG. 26, an air conditioner including an indoor unit 8200 and an outdoor unit 8204 is an example of an electronic device including a secondary battery 8203 of one embodiment of the present invention. Specifically, the indoor unit 8200 includes a housing 8201, an air outlet 8202, the secondary battery 8203, and the like. Although FIG. 26 illustrates the case where the secondary battery 8203 is provided in the indoor unit 8200, the secondary battery 8203 may be provided in the outdoor unit 8204. Alternatively, the secondary batteries 8203 may be provided in both the indoor unit 8200 and the outdoor unit 8204. The air conditioner can receive electric power from a commercial power supply. Alternatively, the air conditioner can use electric power stored in the secondary battery 8203. Particularly in the case where the secondary batteries 8203 are provided in both the indoor unit 8200 and the outdoor unit 8204, the air conditioner can operate with the use of the secondary battery 8203 of one embodiment of the present invention as an uninterruptible power supply even when electric power cannot be supplied from a commercial power supply due to power failure or the like.

Note that although the split-type air conditioner including the indoor unit and the outdoor unit is illustrated in FIG. 26 as an example, the secondary battery of one embodiment of the present invention can be used in an air conditioner in which the functions of an indoor unit and an outdoor unit are integrated in one housing.

In FIG. 26, an electric refrigerator-freezer 8300 is an example of an electronic device using a secondary battery 8304 of one embodiment of the present invention. Specifically, the electric refrigerator-freezer 8300 includes a housing 8301, a refrigerator door 8302, a freezer door 8303, the secondary battery 8304, and the like. The secondary battery 8304 is provided in the housing 8301 in FIG. 26. The electric refrigerator-freezer 8300 can receive electric power from a commercial power supply. Alternatively, the electric refrigerator-freezer 8300 can use electric power stored in the secondary battery 8304. Thus, the electric refrigerator-freezer 8300 can operate with the use of the secondary battery 8304 of one embodiment of the present invention as an uninterruptible power supply even when electric power cannot be supplied from a commercial power supply due to power failure or the like.

Note that among the electronic devices described above, a high-frequency heating apparatus such as a microwave oven and an electronic device such as an electric rice cooker require high power in a short time. The tripping of a circuit breaker of a commercial power source in use of electronic devices can be prevented by using the secondary battery of one embodiment of the present invention as an auxiliary power source for supplying power which cannot be supplied enough by a commercial power source.

In addition, in a time period when electronic devices are not used, particularly when the proportion of the amount of power which is actually used to the total amount of power which can be supplied from a commercial power source (such a proportion referred to as a usage rate of power) is low, power can be stored in the secondary battery, whereby the usage rate of power can be reduced in a time period when the electronic devices are used. For example, in the case of the electric refrigerator-freezer 8300, power can be stored in the secondary battery 8304 in night time when the temperature is low and the refrigerator door 8302 and the freezer door 8303 are not often opened and closed. On the other hand, in daytime when the temperature is high and the refrigerator door 8302 and the freezer door 8303 are frequently opened and closed, the secondary battery 8304 is used as an auxiliary power source; thus, the usage rate of power in daytime can be reduced.

According to one embodiment of the present invention, the secondary battery can have excellent cycle characteristics and improve reliability. Furthermore, in accordance with one embodiment of the present invention, a secondary battery with high capacity can be obtained; thus, the secondary battery itself can be made more compact and lightweight as a result of improved characteristics of the secondary battery. Thus, the secondary battery of one embodiment of the present invention is used in the electronic device described in this embodiment, whereby a more lightweight electronic device with a longer lifetime can be obtained. This embodiment can be implemented in appropriate combination with any of the other embodiments.

Embodiment 5

In this embodiment, examples of vehicles including the secondary battery of one embodiment of the present invention are described.

The use of secondary batteries in vehicles enables production of next-generation clean energy vehicles such as hybrid electric vehicles (HEVs), electric vehicles (EVs), and plug-in hybrid electric vehicles (PHEVs).

Figure 27A:
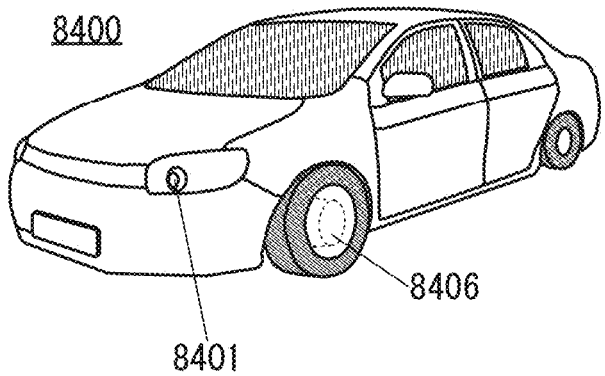
FIGS. 27A to 27C illustrate examples of electronic devices.
Figure 27B:
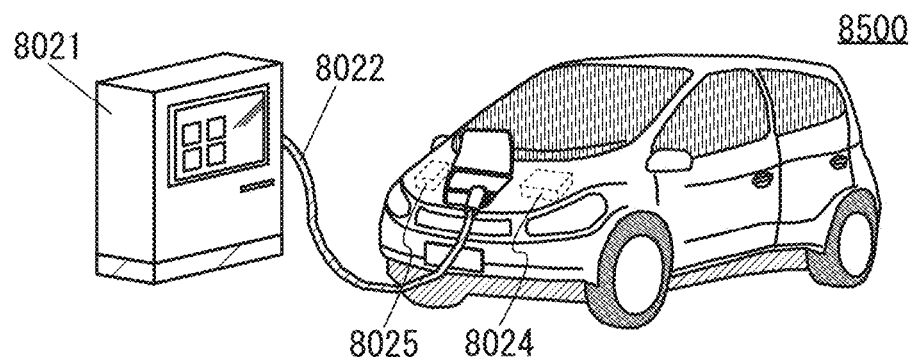
Figure 27C:
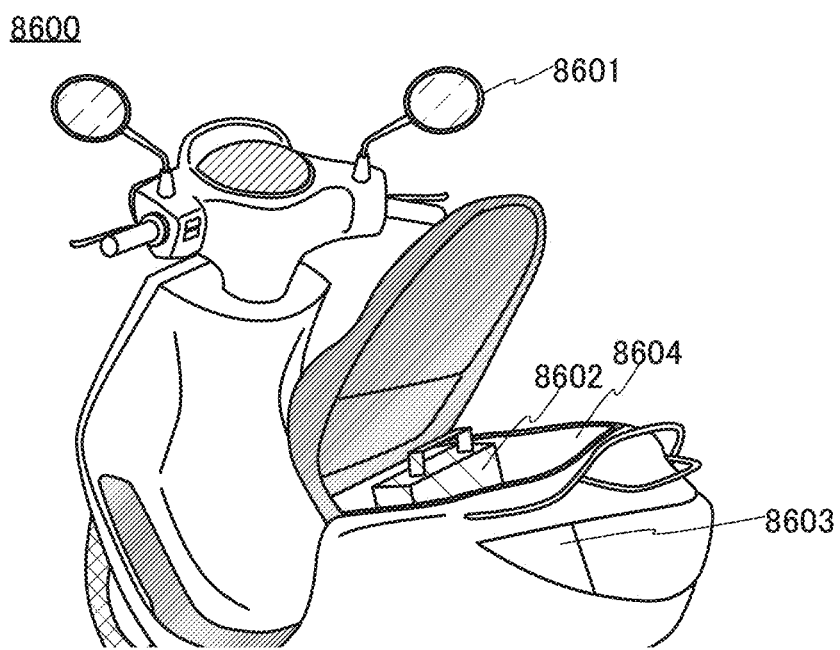

FIGS. 27A to 27C each illustrate an example of a vehicle using the secondary battery of one embodiment of the present invention. An automobile 8400 illustrated in FIG. 27A is an electric vehicle that runs on the power of an electric motor. Alternatively, the automobile 8400 is a hybrid electric vehicle capable of driving appropriately using either an electric motor or an engine. One embodiment of the present invention can provide a high-mileage vehicle. The automobile 8400 includes the secondary battery. As the secondary battery, the modules of the secondary batteries illustrated in FIGS. 12C and 12D may be arranged to be used in a floor portion in the automobile. Alternatively, a battery pack in which a plurality of secondary batteries each of which is illustrated in FIGS. 17A to 17C are combined may be placed in a floor portion in the automobile. The secondary battery is used not only for driving an electric motor 8406, but also for supplying electric power to a light-emitting device such as a headlight 8401 or a room light (not illustrated).

The secondary battery can also supply electric power to a display device of a speedometer, a tachometer, or the like included in the automobile 8400. Furthermore, the secondary battery can supply electric power to a semiconductor device included in the automobile 8400, such as a navigation system.

FIG. 27B illustrates an automobile 8500 including the secondary battery. The automobile 8500 can be charged when the secondary battery is supplied with electric power through external charging equipment by a plug-in system, a contactless power feeding system, or the like. In FIG. 27B, secondary batteries 8024 and 8025 included in the automobile 8500 is charged with the use of a ground-based charging apparatus 8021 through a cable 8022. In charging, a given method such as CHAdeMO (registered trademark) or Combined Charging System may be employed as a charging method, the standard of a connector, or the like as appropriate. The ground-based charging apparatus 8021 may be a charging station provided in a commerce facility or a power source in a house. With the use of a plug-in technique, the secondary battery 8024 included in the automobile 8500 can be charged by being supplied with electric power from the outside, for example. The charging can be performed by converting AC electric power into DC electric power through a converter such as an AC-DC converter.

Furthermore, although not illustrated, the vehicle may include a power receiving device so that it can be charged by being supplied with electric power from an above-ground power transmitting device in a contactless manner. In the case of the contactless power feeding system, by fitting a power transmitting device in a road or an exterior wall, charging can be performed not only when the electric vehicle is stopped but also when driven. In addition, the contactless power feeding system may be utilized to perform transmission and reception of electric power between vehicles. A solar cell may be provided in the exterior of the automobile to charge the secondary battery when the automobile stops or moves. To supply electric power in such a contactless manner, an electromagnetic induction method or a magnetic resonance method can be used.

FIG. 27C shows an example of a motorcycle using the secondary battery of one embodiment of the present invention. A motor scooter 8600 illustrated in FIG. 27C includes a secondary battery 8602, side mirrors 8601, and indicators 8603. The secondary battery 8602 can supply electric power to the indicators 8603.

Furthermore, in the motor scooter 8600 illustrated in FIG. 27C, the secondary battery 8602 can be held in a storage unit under seat 8604. The secondary battery 8602 can be held in the storage unit under seat 8604 even with a small size. The secondary battery 8602 is detachable; thus, the secondary battery 8602 is carried indoors when it is charged, and is stored before the motorcycle is driven.

In accordance with one embodiment of the present invention, the secondary battery can have improved cycle characteristics and the capacity of the secondary battery can be increased. Thus, the secondary battery itself can be made more compact and lightweight. The compact and lightweight secondary battery contributes to a reduction in the weight of a vehicle, and thus increases the driving radius. Furthermore, the secondary battery included in the vehicle can be used as a power source for supplying electric power to products other than the vehicle. In such a case, the use of a commercial power source can be avoided at peak time of electric power demand, for example. If the use of a commercial power source can be avoided at peak time of electric power demand, the avoidance can contribute to energy saving and a reduction in carbon dioxide emissions. Moreover, if the cycle characteristics are excellent, the secondary battery can be used for a long period; thus, the use amount of rare metals such as cobalt can be reduced.

This embodiment can be implemented in appropriate combination with the other embodiments.

Example 1

In this example, the positive electrode active materials which are embodiments of the present invention are formed, and the observation results of the positive electrode active materials by STEM, the results of TEM images subjected to fast Fourier transform, and the analysis results obtained by energy dispersive X-ray spectroscopy (EDX) are described. In addition, the evaluation results of characteristics of secondary batteries containing the positive electrode active materials are described.

[Formation of Positive Electrode Active Material]
<<Sample 01>>

In this example, a positive electrode active material of Sample 01, which contains lithium cobaltate as a composite oxide of lithium and a first transition metal contained in a first region, lithium titanate as an oxide of a second transition metal contained in a second region, and magnesium oxide as an oxide of a representative element contained in a third region, was formed.

In this example, lithium cobalt oxide particles (C-20F, produced by NIPPON CHEMICAL INDUSTRIAL CO., LTD.) were used as a starting material. Thus, in this example, Step 12 and Step 13 described in Embodiment 1 were omitted. Note that the above-described lithium cobalt oxide particles each have a particle diameter of approximately 20 µm, and contain fluorine, magnesium, calcium, sodium, silicon, sulfur, and phosphorus in a region which can be analyzed by XPS.

Next, as Step 14, the lithium cobalt oxide particles containing magnesium and fluorine were coated with a material containing titanium by a sol-gel method. Specifically, TTIP was dissolved in isopropanol, and an isopropanol solution of TTIP was formed. Then, the lithium cobalt oxide particles were mixed into the solution so that TTIP to lithium cobalt oxide containing magnesium and fluorine was 0.01 ml/g.

The above mixed solution was stirred with a magnetic stirrer for four hours, at 25° C., and at a humidity of 90% RH. Through the process, water in an atmosphere and TTIP caused hydrolysis and polycondensation reaction, and a layer containing titanium was formed on the surface of the lithium cobalt oxide particle containing magnesium and fluorine.

The mixed solution which had been subjected to the above process was filtered to collect the residue. As a filter for filtration, Kiriyama filter paper (No. 4) was used.

The collected residue was dried in a vacuum at 70° C. for one hour.

Next, the lithium cobalt oxide particles coated with the material containing titanium was heated. With a muffle furnace, the heating was performed under the following conditions: the flow rate of dry air was 10 L/min; the temperature was 800° C. (the temperature rising rate was 200° C./h); and the retention time was two hours. The dew point of the dry air is preferably lower than or equal to −109° C.

Then, the heated particles were cooled to room temperature. The time of decreasing temperature from the retention temperature to room temperature was 10 hours to 15 hours. After that, crushing treatment was performed. In the crushing treatment, the particles were made to pass through a sieve. The sieve has an aperture width of 53 µm.

Lastly, the cooled particles were collected, and the positive electrode active material of Sample 01 was obtained.
<<Sample 02>>

Sample 02 was formed as a comparative example by heating lithium cobalt oxide particles containing magnesium and fluorine without being coated with a material containing titanium.

Lithium cobalt oxide particles produced by NIPPON CHEMICAL INDUSTRIAL CO., LTD. (product name: C-20F) were used as the lithium cobalt oxide particles containing magnesium and fluorine.

The lithium cobalt oxide particles containing magnesium and fluorine were heated. The heating was performed under the following conditions: the temperature was 800° C. (the temperature rising rate was 200° C./h); the retention time was two hours; and the flow rate of oxygen was 10 L/min.

The heated particles were cooled and made to pass through a sieve like Sample 01 to obtain a positive electrode active material of Sample 02.

It is probable that Sample 02 is a positive electrode active material which contains lithium cobalt oxide inside and includes a region containing magnesium in a superficial portion.

<<Sample 03>>

Sample 03 was formed as a comparative example in the following manner: a region containing titanium was formed in lithium cobalt oxide particles which do not contain magnesium by a sol-gel method and then the lithium cobalt oxide particles were heated.

Lithium cobalt oxide particles produced by NIPPON CHEMICAL INDUSTRIAL CO., LTD. (product name: C-10N) were used. In the lithium cobalt oxide particles, magnesium is not detected and fluorine is detected at approximately 1 atomic % by XPS.

A region containing titanium was formed by a sol-gel method in the lithium cobalt oxide particles, and the lithium cobalt oxide particles were dried, heated, cooled, and made to pass through a sieve, like Sample 01. The obtained lithium cobalt oxide particles were used as a positive electrode active material of Sample 03.

It is probable that Sample 03 is a positive electrode active material which contains lithium cobalt oxide inside and includes a region containing titanium in a superficial portion.

<<Sample 04>>

For Sample 04, as a comparative example, lithium cobalt oxide particles were used as it is without being heated.

Lithium cobalt oxide particles produced by NIPPON CHEMICAL INDUSTRIAL CO., LTD. (product name: C-10N) were used.

Sample 04 is a positive electrode active material which does not have a coating layer.

<<Sample 05>>

For Sample 05, as a comparative example, lithium cobalt oxide particles containing magnesium and fluorine were used as it is without being heated.

Lithium cobalt oxide particles produced by NIPPON CHEMICAL INDUSTRIAL CO., LTD. (product name: C-20F) were used as the lithium cobalt oxide particles containing magnesium and fluorine. That is, Sample 05 was used as the same as the starting material of Sample 01.

Table 1 shows the conditions of Sample 01 to Sample 05.

TABLE 1

| | Conditions |
|---|---|
| Sample 01 | $LiCoO_2$ + Mg + F, coated with a material containing Ti, heated |
| Sample 02 | $LiCoO_2$ + Mg + F, heated |
| Sample 03 | $LiCoO_2$, coated with a material containing Ti, heated |
| Sample 04 | $LiCoO_2$, not heated |
| Sample 05 | $LiCoO_2$ + Mg + F, not heated |

[STEM]

Figure 28:
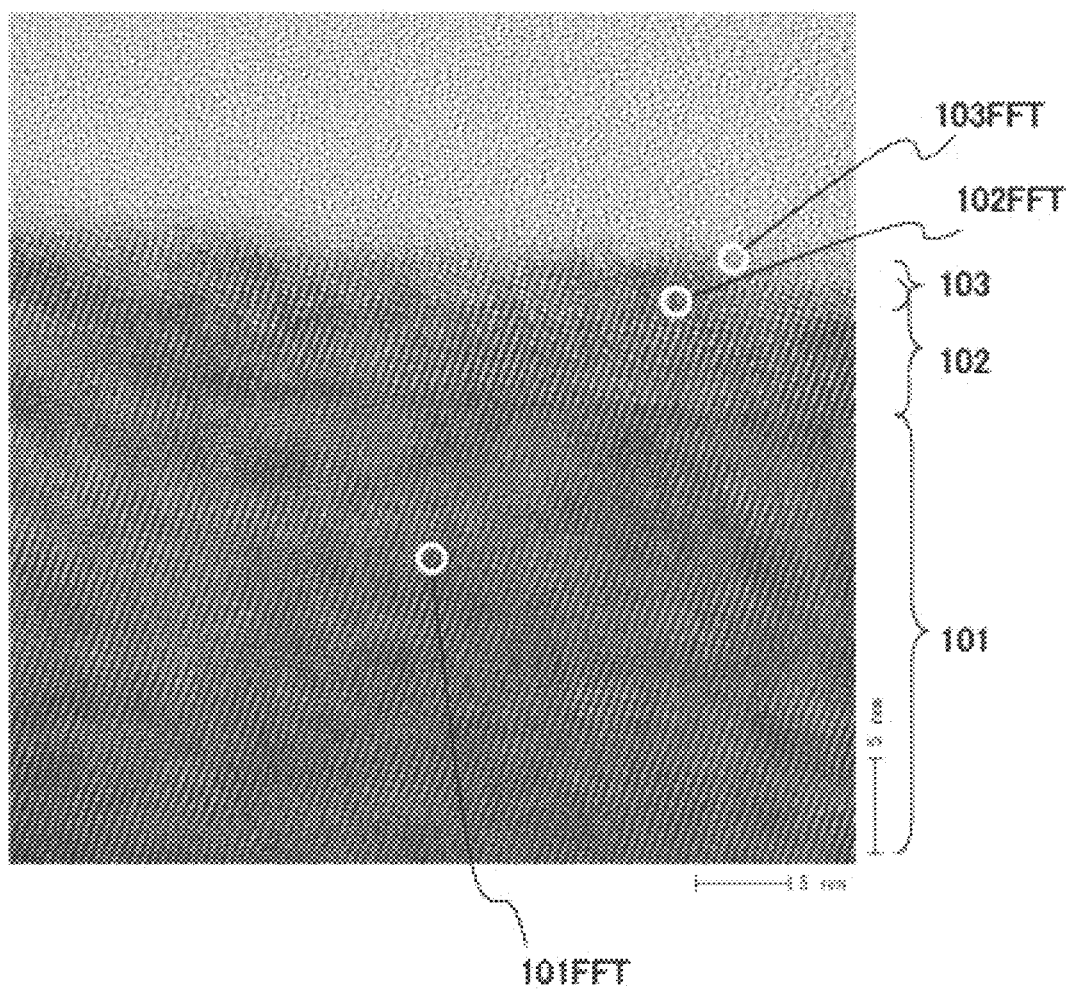
FIG. 28 is a transmission electron microscope image of a positive electrode active material in Example 1.

The obtained positive electrode active material of Sample 01 was observed by an electron microscope (JEM-ARM200F, manufactured by JEOL Ltd.) under the condition where the acceleration voltage was 200 kV. FIG. 28 shows the obtained electron microscope image. As shown in FIG. 28, the positive electrode active material probably includes three different regions: the first region 101; the second region 102; and the third region 103. The third region 103 is observed as a region brighter than the first region 101 and the second region 102. Furthermore, crystal orientations of the first region 101 and the second region 102 are partly aligned with each other, and crystal orientations of the second region 102 and the third region 103 are partly aligned with each other.

[STEM-FFT]

FIG. 29A1 shows a fast Fourier transform (FFT) image of a region 103FFT in the STEM image of FIG. 28. In FIG. 29A2, a center point O of FIG. 29A1 is shown by a cross, and bright points A, B, and C are each surrounded by a circle. Similarly, FIG. 29B1 shows an FFT image of a region 102FFT. In FIG. 29B2, a center point O of FIG. 29B1 is shown by a cross, and bright points A, B, and C are each surrounded by a circle. In addition, FIG. 29C1 shows an FFT image of a region 101FFT. In FIG. 29C2, a center point O of FIG. 29C1 is shown by a cross, and bright points A, B, and C are each surrounded by a circle.

In FIG. 29A2, a distance d between the bright point A and the center point O is 0.256 nm, a distance d between the bright point B and the center point O is 0.241 nm, and a distance d between the bright point C and the center point O is 0.209 nm. In addition, ∠COA is 121°, ∠COB is 52°, and ∠AOB is 69°. From these results, the region 103FFT probably contains magnesium oxide (MgO, cubic crystal).

Similarly, in FIG. 29B2, the distance d between the bright point A and the center point O is 0.238 nm, the distance d between the bright point B and the center point O is 0.225 nm, and the distance d between the bright point C and the center point O is 0.198 nm. In addition, ∠COA is 123°, ∠COB is 52°, and ∠AOB is 71°. From these results, the region 102FFT probably contains lithium titanate ($LiTiO_2$, cubic crystal).

In FIG. 29C2, the distance d between the bright point A and the center point O is 0.240 nm, the distance d between the bright point B and the center point O is 0.235 nm, and the distance d between the bright point C and the center point O is 0.196 nm. In addition, ∠COA is 126°, ∠COB is 52°, and ∠AOB is 74°. From these results, the region 101FFT probably contains lithium cobaltate ($LiCoO_2$, rhombohedral).

[EDX]

FIGS. 30A1, 30A2, 30B1, 30B2, 30C1, and 30C2 show a high-angle annular dark field scanning transmission electron microscopy (HAADF-STEM) image and element mapping images with EDX of the positive electrode active material of Sample 01. FIG. 30A1 shows a HAADF-STEM image, FIG. 30A2 shows a mapping image of oxygen atoms, FIG. 30B1 shows a mapping image of cobalt atoms, FIG. 30B2 shows a mapping image of fluorine atoms, FIG. 30C1 shows a mapping image of titanium atoms, and FIG. 30C2 shows a mapping image of magnesium atoms. Note that in EDX element mapping images in FIGS. 30A2, 30B1, 30B2, 30C1, and 30C2 and FIGS. 31A2, 31B1, 31B2, 31C1, and 31C2, a region where the number of elements is less than or equal to a lower limit of the detection is indicated in white, and as the number of elements is increased, the white region becomes black.

As shown in FIGS. 30A2 and 30B1, it is found that the oxygen atoms and the cobalt atoms are distributed in the whole of the positive electrode active material particle. In contrast, as shown in FIGS. 30B2, 30C1, and 30C2, it is found that the fluorine atoms, the titanium atoms, and the magnesium atoms are unevenly distributed in a region close to the surface of the positive electrode active material.

Next, FIGS. 31A1, 31A2, 31B1, 31B2, 31C1, and 31C2 show a HAADF-STEM image and element mapping images with EDX of the positive electrode active material of Sample 05, which is a comparative example. FIG. 31A1 shows a HAADF-STEM image, FIG. 31A2 shows a mapping image of oxygen atoms, FIG. 31B1 shows a mapping image of cobalt atoms, FIG. 31B2 shows a mapping image of fluorine atoms, FIG. 31C1 shows a mapping image of titanium atoms, and FIG. 31C2 shows a mapping image of magnesium atoms.

As shown in FIGS. 31B2 and 31C2, it is found that, even in Sample 05 which is not heated, a certain amount of magnesium and fluorine is unevenly distributed in the vicinity of the surface.

[EDX Line Analysis]

Figure 32:
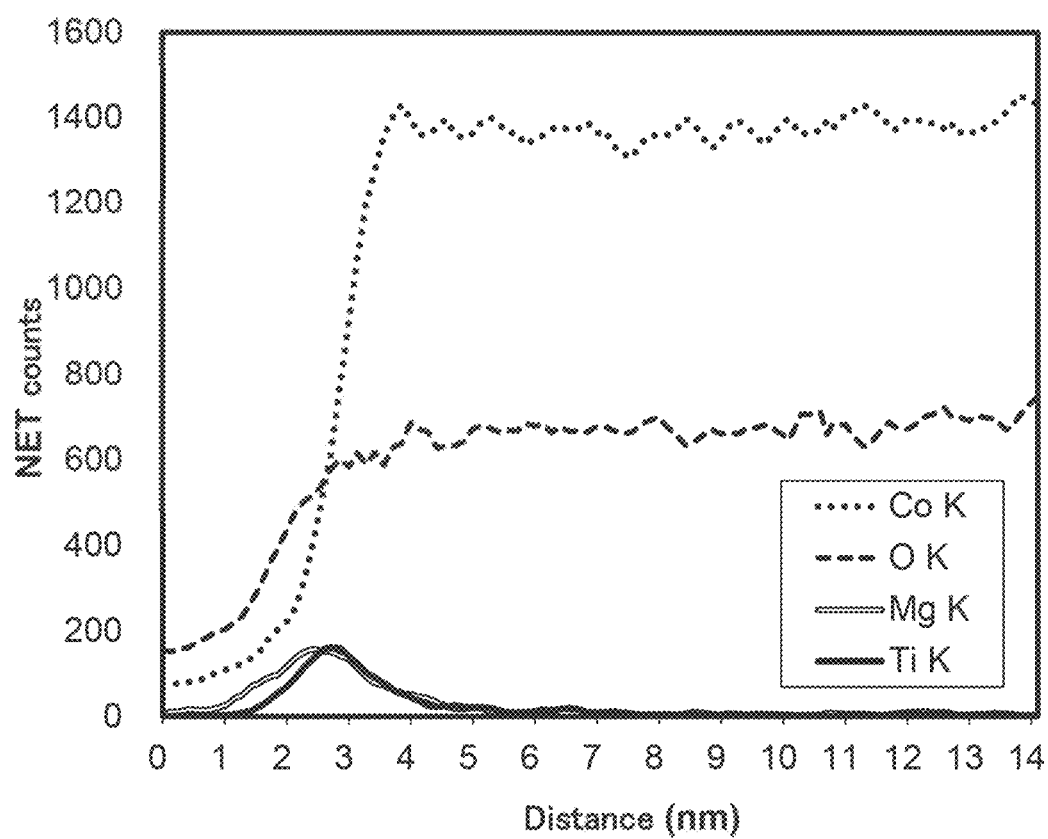
FIG. 32 is a graph showing TEM-EDX line analysis results of a positive electrode active material in Example 1.

FIG. 32 shows results of line analysis with TEM-EDX performed on a cross section of the vicinity of the surface of the positive electrode active material of Sample 01. FIG. 32 is a graph showing data detected on a line connecting the outside of the positive electrode active material of Sample 01 to the inside of the positive electrode active material, and a distance of 0 nm indicates the outside of the positive electrode active material and a distance of 14 nm indicates the inside of the particle. With EDX, the analysis region tends to be large, so that elements not only at a center of an electron beam irradiation region but also in a region around the center may be detected.

As shown in FIG. 32, it is found that there are peaks of magnesium and titanium in the vicinity of the surface of the positive electrode active material of Sample 01, the distribution of magnesium is closer to the surface than the distribution of titanium is. It is also found that the peak of magnesium is closer to the surface than the peak of titanium is. In addition, it is probable that cobalt and oxygen are present from the outermost surface of the positive electrode active material particle.

As shown in FIG. 32, fluorine is hardly detected. This is probably because fluorine, which is a light element, is difficult to detect with EDX.

From the above STEM images, FFT images, element mapping images with EDX, and EDX line analysis, it is found that Sample 01 is a positive electrode active material of one embodiment of the present invention, which includes the first region containing lithium cobaltate, the second region containing lithium, titanium, cobalt, and oxygen, and the third region containing magnesium and oxygen. It is found that, in Sample 01, part of the second region and part of the third region overlap.

In the graph of FIG. 32, the amount of detected oxygen is stable at a distance of 4 nm or more. Thus, in this example, the average value $O_{ave}$ of the amount of detected oxygen in the stable region is obtained, and a distance x of the measurement point at which the measurement value closest to 0.5 $O_{ave}$, the value of 50% of the average value $O_{ave}$, is obtained is assumed to be the surface of the positive electrode active material particle.

In this example, the average value $O_{ave}$ of the amount of detected oxygen in a range from a distance of 4 nm to a distance of 14 nm is 674.2. The x axis of the measurement point at which the measurement value closest to 337.1, which is 50% of 674.2, is obtained indicates a distance of 1.71 nm. Thus, in this example, a distance of 1.71 nm in the graph of FIG. 32 is assumed to be the surface of the positive electrode active material particle.

When the surface of the positive electrode active material particle is set at a distance of 1.71 nm in FIG. 32, the peak of magnesium and the peak of titanium are present at 0.72 nm and 1.00 nm, respectively, from the surface of the positive electrode active material particle.

The concentration of magnesium is higher than or equal to ⅕ of the peak from the surface of the positive electrode active material particle to a distance of 4.42 nm, that is, to a region at 2.71 nm from the surface. The measurement value of magnesium is less than ⅕ of the peak at a distance of 4.57 nm or more, that is, at a depth of 2.86 nm or more from the surface of the positive electrode active material particle. Thus, it is found that in Sample 01, a region from the surface to a depth of 2.71 nm is the third region.

Furthermore, the concentration of titanium is higher than or equal to ½ of the peak from a distance of 2.14 nm to a distance of 3.42 nm. Thus, it is found that a region from a depth of 0.43 nm to a depth of 1.71 nm from the surface of the positive electrode active material particle is the second region.

Next, evaluation results of charge and discharge characteristics of secondary batteries which are fabricated using the positive electrode active materials of Sample 01 to Sample 05 formed in the above manner are described.

[Fabrication of Secondary Batteries]

CR2032 coin-type secondary batteries (with a diameter of 20 mm and a height of 3.2 mm) were fabricated using the positive electrode active materials of Sample 01 to Sample 05 formed in the above manner.

A positive electrode formed by applying slurry in which a positive electrode active material (LCO), acetylene black (AB), and polyvinylidene fluoride (PVDF) were mixed at a weight ratio of 95:2.5:2.5 to a current collector was used.

A lithium metal was used for the counter electrode.

As an electrolyte contained in an electrolyte solution, 1 mol/L lithium hexafluorophosphate ($LiPF_6$) was used, and as the electrolyte solution, a solution in which ethylene carbonate (EC) and diethyl carbonate (DEC) at a volume ratio of 3:7 and vinylene carbonate ($V_C$) at a 2 weight % were mixed was used.

A positive electrode can and a negative electrode can were formed of stainless steel (SUS).

[Evaluation of Charge and Discharge Characteristics]

Next, charge and discharge characteristics of the secondary batteries of Sample 01 and Sample 05 formed in the above manner were evaluated. The measurement temperature was 25° C. Twenty cycles of charging and discharging were performed at 4.6 V (CCCV, 0.5 C, a cutoff current of 0.01 C) and 2.5 V (CC, 0.5 C), respectively. Here, 1 C was set to 137 mA/g, which was a current value per weight of the positive electrode active material.

Figure 33:
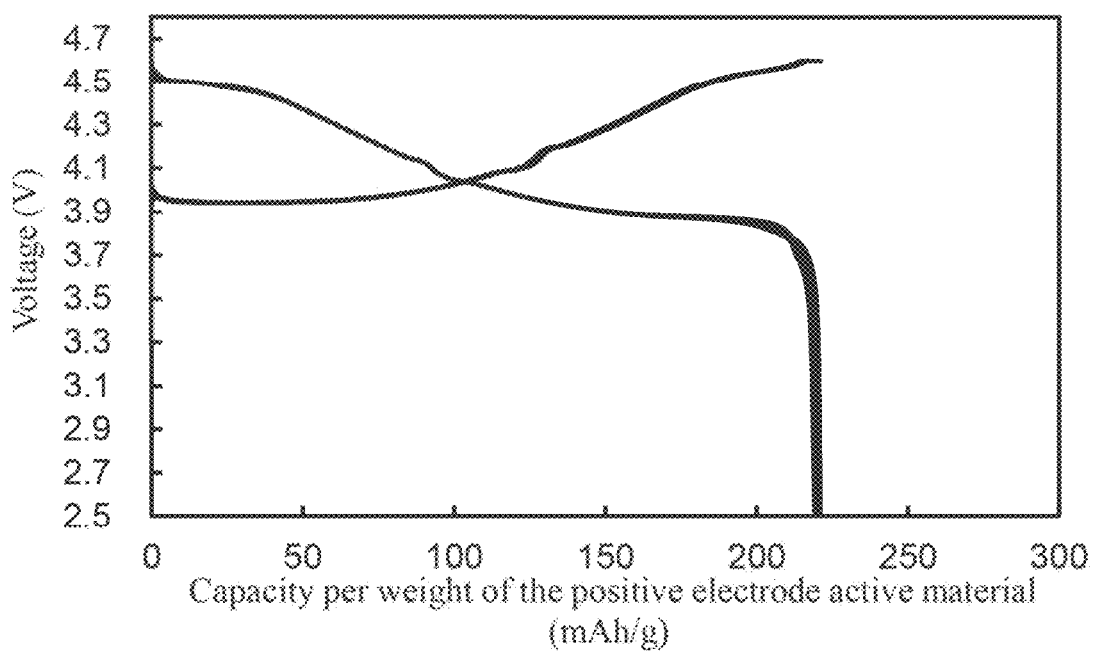
FIG. 33 is a graph showing charge and discharge characteristics of a secondary battery in Example 1.

FIG. 33 is a graph showing charge and discharge characteristics of the secondary battery using the positive electrode active material of Sample 01. FIG. 33 shows excellent charge and discharge characteristics with a wide plateau. In addition, results of 20 cycles of charging and discharging almost overlap, which means that the cycle characteristics are excellent.

Figure 34:
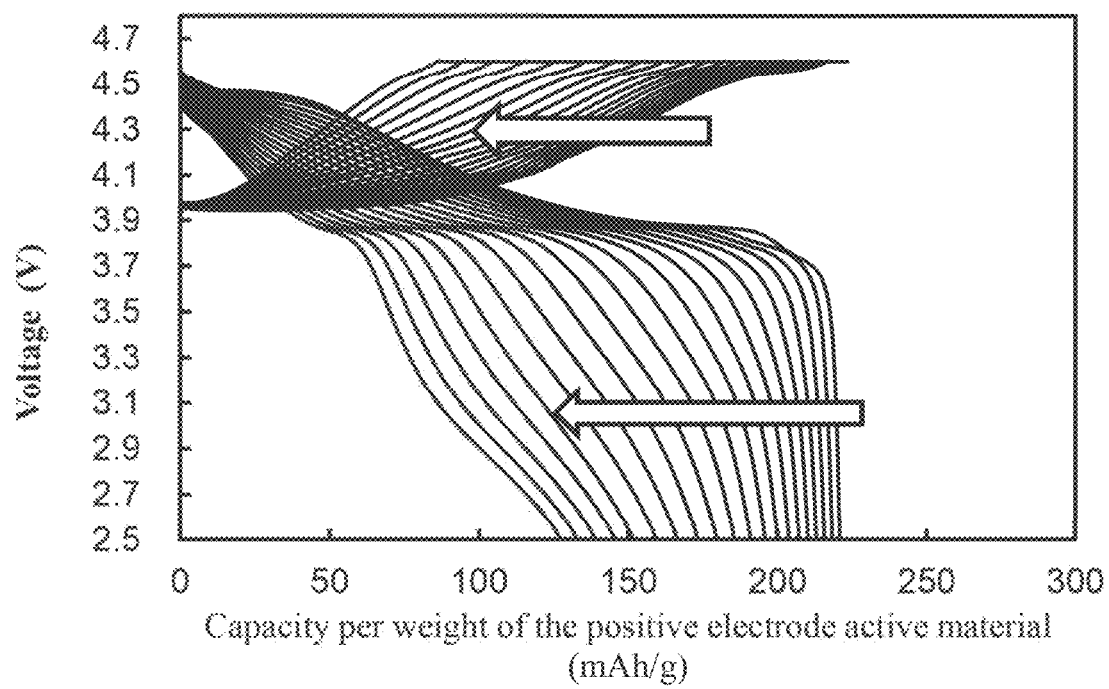
FIG. 34 is a graph showing charge and discharge characteristics of a secondary battery of a comparative example in Example 1.

FIG. 34 is a graph showing charge and discharge characteristics of the secondary battery of Sample 05, which is a comparative example. In the initial cycles, excellent charge and discharge characteristics are shown; however, as indicated by arrows in FIG. 34, charge capacity and discharge capacity decrease with an increase in cycles.

[Evaluation of Cycle Characteristics]

<<Charging at 4.4 V>>

The cycle characteristics of the secondary batteries of Sample 01 and Sample 05 charged at 4.4 V were evaluated. The measurement temperature was 25° C. The charging was performed at 4.4 V (CCCV, 0.5 C, a cutoff current of 0.01 C), and the discharging was performed at 2.5 V (CC, 0.5 C).

Figure 35:
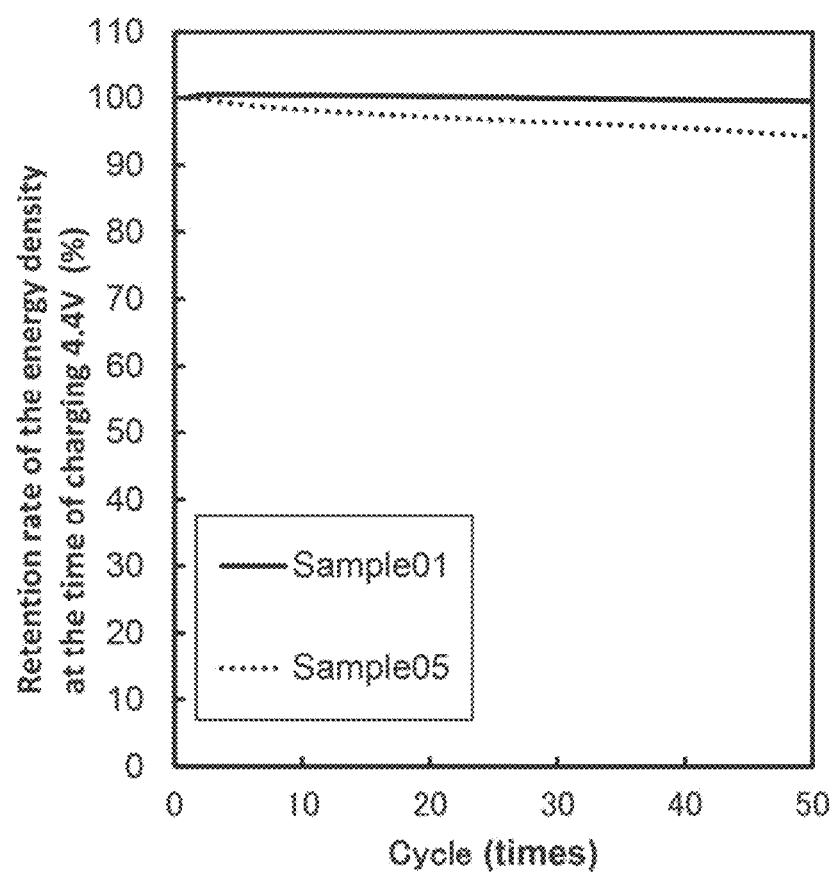
FIG. 35 is a graph showing cycle characteristics of a secondary battery in Example 1.

FIG. 35 is a graph showing the cycle characteristics of the secondary batteries charged at 4.4 V. In FIG. 35, a solid line and a dotted line indicate secondary batteries containing the positive electrode active materials of Sample 01 and Sample 05, respectively. As shown in FIG. 35, in the secondary battery containing Sample 01, an energy density retention rate is 99.5% even after 50 cycles of charging and discharging were performed, which shows extremely excellent cycle characteristics. In the secondary battery containing Sample 05, an energy density retention rate is 94.3% after 50 cycles were performed.

<<Charging at 4.6 V>>

The cycle characteristics of the secondary batteries of Sample 01 to Sample 04 charged at 4.6 V were evaluated. The measurement temperature was 25° C. The charging was performed to 4.6 V (CCCV, 0.5 C, a cutoff current of 0.01 C), and the discharging was performed to 2.5 V (CC, 0.5 C).

Figure 36:
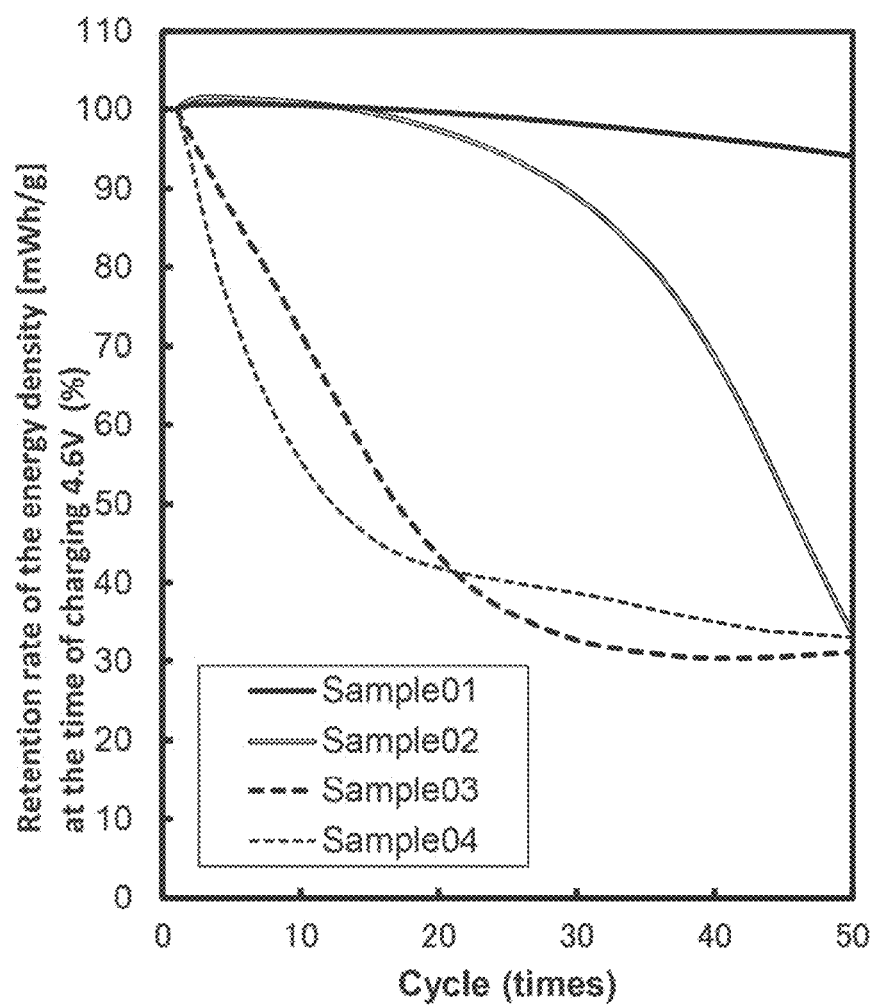
FIG. 36 is a graph showing cycle characteristics of a secondary battery in Example 1.

FIG. 36 is a graph showing the cycle characteristics charged at 4.6 V. As shown in FIG. 36, in the secondary battery containing Sample 01, which is the positive electrode active material of one embodiment of the present invention, an energy density retention rate is 94.1% even after 50 cycles of charging and discharging were performed at a high voltage of 4.6 V, which shows extremely excellent cycle characteristics. On the other hand, the secondary batteries containing the positive electrode active materials of Sample 02, Sample 03, and Sample 04, which are comparative examples, are inferior to that of Sample 01, and in Sample 04, for example, energy density retention rate is 33.2% after 50 cycles were performed.

As described above, it is found that the positive electrode active material with the structure of one embodiment of the present invention can achieve an advantageous effect when charging and discharging is performed at a voltage higher than 4.4 V.

Example 2

In this example, the positive electrode active materials which are embodiments of the present invention are formed, and results of analysis which is different from that in Example 1 are described. In addition, evaluation results of characteristics of secondary batteries containing the positive electrode active materials under conditions different from those in Example 1 are described.

In this example, a positive electrode active material which contains lithium cobaltate as a composite oxide of lithium and a first transition metal contained in a first region, lithium titanate as an oxide of a second transition metal contained in a second region, and magnesium oxide as an oxide of a representative element contained in a third region, was formed.

[Formation of Positive Electrode Active Material and Fabrication of Secondary Battery]

<<Sample 06 and Sample 07>>

In this example, lithium cobalt oxide particles (C-20F, produced by NIPPON CHEMICAL INDUSTRIAL CO., LTD.) were used as a starting material.

Next, as Step 14, the lithium cobalt oxide particles were coated with titanium oxide by a sol-gel method and dried. Step 14 was performed in a manner similar to that in Example 1 except that mixture was performed so that TTIP to lithium cobalt oxide was 0.004 ml/g. The lithium cobalt oxide particles which are coated with the titanium oxide and are not heated yet are referred to as Sample 06.

Next, Sample 06, which is the lithium cobalt oxide particles coated with the titanium oxide, was heated. With a muffle furnace, the heating was performed at 800° C. in an oxygen atmosphere under the following conditions: the retention time was two hours; and the flow rate of oxygen was 10 L/min.

Then, as in Example 1, the particles were cooled and collected to obtain the positive electrode active material. The heated positive electrode active material is referred to as Sample 07.

[TEM-EDX]

Sample 06 and Sample 07, in particular, cracks generated in the particles and the vicinity of the cracks were subjected to analysis with TEM-EDX.

First, results of TEM-EDX plane analysis of titanium are shown in FIGS. 37A, 37B1, 37B2, 37C1, 37C2, 37D1, 37D2, 37E1, and 37E2 and FIGS. 38A, 38B1, 38B2, 38C1, 38C2, 38D1, 38D2, 38E1, and 38E2.

FIGS. 37A, 37B1, 37B2, 37C1, 37C2, 37D1, 37D2, 37E1, and 37E2 show TEM-EDX analysis results of Sample 06 before heating. FIG. 37A is a cross-sectional TEM image showing the surfaces of the particles and the crack portions. FIG. 37B1 and FIG. 37B2 show a HAADF-STEM image and a Ti mapping image of a region including the surface of the particle that is denoted by a circle marked with "1" in FIG. 37A, respectively. Similarly, FIG. 37C1 and FIG. 37C2 show a HAADF-STEM image and a Ti mapping image of a region at a depth of approximately 20 nm from the surface in the crack portion that is denoted by a circle marked with "2" in FIG. 37A, respectively. FIG. 37D1 and FIG. 37D2 show a HAADF-STEM image and a Ti mapping image of a region at a depth of approximately 500 nm from the surface in the crack portion that is denoted by a circle marked with "3" in FIG. 37A, respectively. FIG. 37E1 and FIG. 37E2 show a HAADF-STEM image and a Ti mapping image of a region at a depth of approximately 1000 nm from the surface in the crack portion that is denoted by a circle marked with "4" in FIG. 37A, respectively. Note that in EDX element mapping images in FIGS. 37A, 37B1, 37B2, 37C1, 37C2, 37D1, 37D2, 37E1, and 37E2, FIGS. 38A, 38B1, 38B2, 38C1, 38C2, 38D1, 38D2, 38E1, and 38E2, FIGS. 39A, 39B1, 39B2, 39C1, 39C2, 39D1, 39D2, 39E1, and 39E2, and FIGS. 40A, 40B1, 40B2, 40C1, 40C2, 40D1, 40D2, 40E1, and 40E2, a region where the number of elements is less than or equal to a lower limit of the detection is indicated in white, and as the number of elements is increased, the white region becomes black.

FIGS. 38A, 38B1, 38B2, 38C1, 38C2, 38D1, 38D2, 38E1, and 38E2 show TEM-EDX analysis results of Sample 07 after heating. FIG. 38A is a cross-sectional TEM image showing the surfaces of the particles and the crack portions. FIG. 38B1 and FIG. 38B2 show a HAADF-STEM image and a Ti mapping image of a region including the surface of the particle that is denoted by a circle marked with "1" in FIG. 38A, respectively. Similarly, FIG. 38C1 and FIG. 38C2 show a HAADF-STEM image and a Ti mapping image of a region at a depth of approximately 20 nm from the surface in the crack portion that is denoted by a circle marked with "2" in FIG. 38A, respectively. FIG. 38D1 and FIG. 38D2 show a HAADF-STEM image and a Ti mapping image of a region at a depth of approximately 500 nm from the surface in the crack portion that is denoted by a circle marked with "3" in FIG. 38A, respectively. FIG. 38E1 and FIG. 38E2 show a HAADF-STEM image and a Ti mapping image of a region at a depth of approximately 1000 nm from the surface in the crack portion that is denoted by a circle marked with "4" in FIG. 38A, respectively.

As shown in FIGS. 37A, 37B1, 37B2, 37C1, 37C2, 37D1, 37D2, 37E1, and 37E2 and FIGS. 38A, 38B1, 38B2, 38C1, 38C2, 38D1, 38D2, 38E1, and 38E2, in Sample 06 before heating, segregation of titanium on the surfaces of the particles is observed; however, no segregation is observed in the crack portion. In contrast, in Sample 07 after heating, segregation of titanium is observed both on the surfaces of the particles and in the crack portion. That is, it is found that titanium is segregated at the surface of the crack portion by heating.

Next, results of TEM-EDX plane analysis of magnesium are shown in FIGS. 39A, 39B1, 39B2, 39C1, 39C2, 39D1, 39D2, 39E1, and 39E2, and FIGS. 40A, 40B1, 40B2, 40C1, 40C2, 40D1, 40D2, 40E1, and 40E2.

FIG. 39A is a cross-sectional TEM image of Sample 06, which is the same as FIG. 37A. FIGS. 39B1, 39C1, 39D1, and 39E1 are HAADF-STEM images, which are the same as FIGS. 37B1, 37C1, 37D1, and 37E1. FIG. 39B2 shows a Mg mapping image of a region which is the same as FIG. 39B1. FIG. 39C2 shows a Mg mapping image of a region which is the same as FIG. 39C1. FIG. 39D2 shows a Mg mapping image of a region which is the same as FIG. 39D1. FIG. 39E2 shows a Mg mapping image of a region which is the same as FIG. 39E1.

FIG. 40A is a cross-sectional TEM image of Sample 07, which is the same as FIG. 38A. FIGS. 40B1, 40C1, 40D1, and 40E1 are HAADF-STEM images, which are the same as FIGS. 38B1, 38C1, 38D1, and 38E1. FIG. 40B2 shows a Mg mapping image of a region which is the same as FIG. 40B1. FIG. 40C2 shows a Mg mapping image of a region which is the same as FIG. 40C1. FIG. 40D2 shows a Mg mapping image of a region which is the same as FIG. 40D1. FIG. 40E2 shows a Mg mapping image of a region which is the same as FIG. 40E1.

As shown in FIGS. 39A, 39B1, 39B2, 39C1, 39C2, 39D1, 39D2, 39E1, and 39E2, and FIGS. 40A, 40B1, 40B2, 40C1, 40C2, 40D1, 40D2, 40E1, and 40E2, in Sample 06 before heating, segregation of magnesium is not observed on the surfaces of the particles or in the crack portion. In contrast, in Sample 07 after heating, segregation of magnesium is observed both on the surfaces of the particles and in the crack portion.

Next, to quantify titanium and magnesium, EDX point analysis was performed on the regions indicated by circles marked with 1 to 6 in FIG. 37A and the regions indicated by circles marked with 1 to 6 in FIG. 38A. In each region, two points were measured.

Figure 41A:
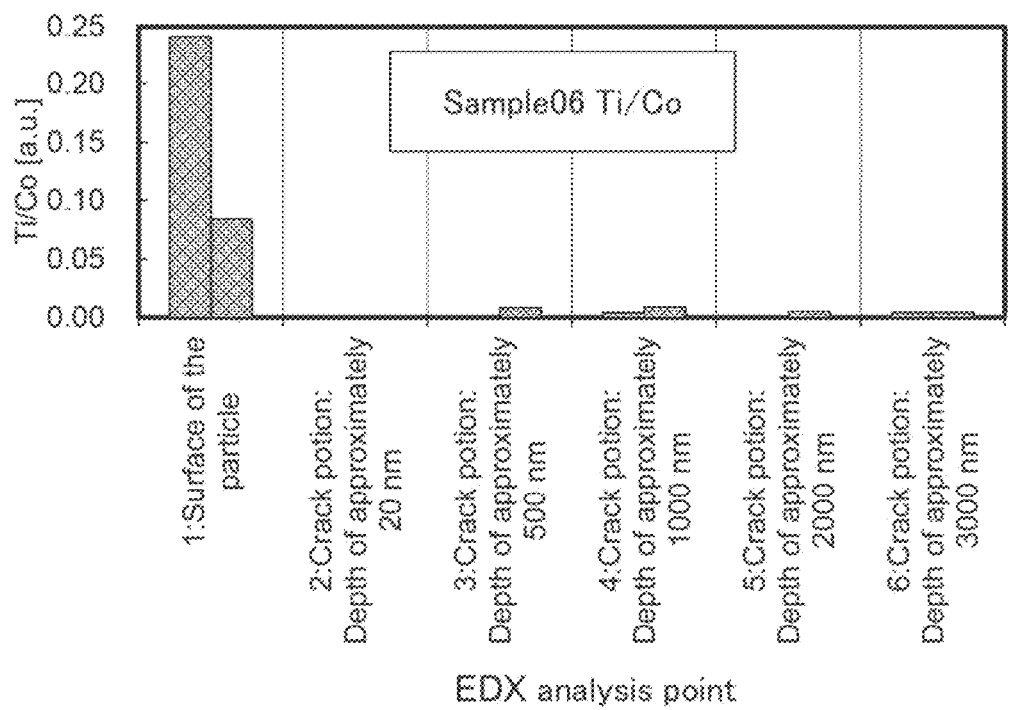
FIGS. 41A and 41B are each a graph showing EDX point analysis results in Example 2.
Figure 41B:
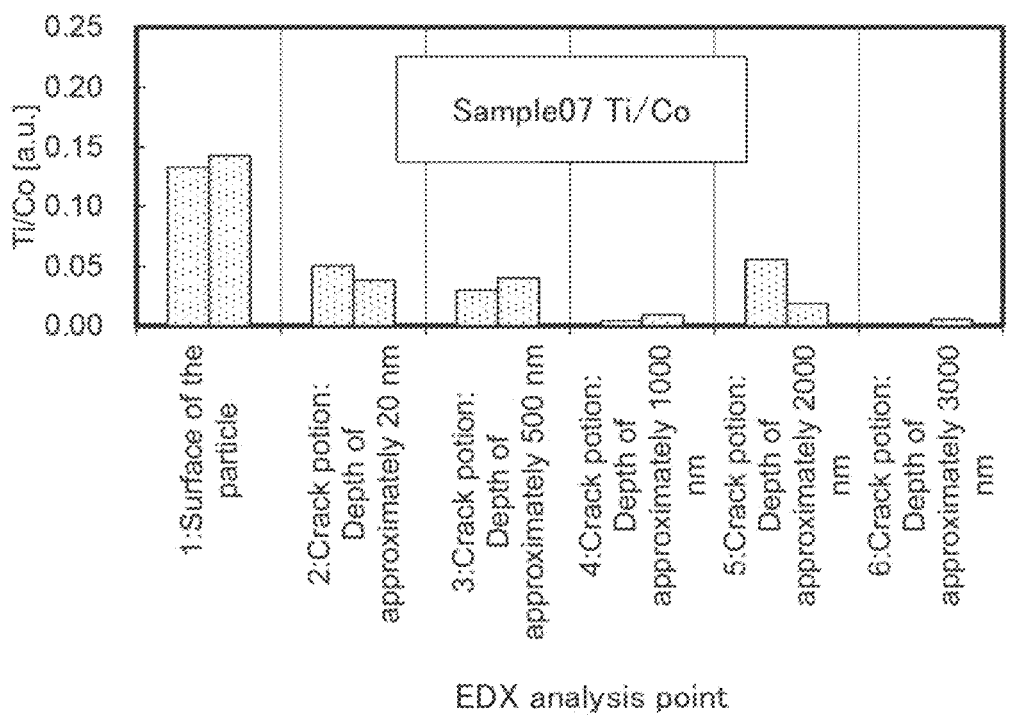

FIGS. 41A and 41B show results of EDX point analysis in an atomic ratio of titanium to cobalt. FIG. 41A shows results of Sample 06 before heating. Detection points 1 to 6 in FIG. 41A correspond to the regions indicated by circles marked with 1 to 6 in FIG. 37A. FIG. 41B shows results of Sample 07 after heating. Detection points 1 to 6 in FIG. 41B correspond to the regions indicated by circles marked with 1 to 6 in FIG. 38A.

As shown in FIGS. 41A and 41B, in the crack portion of Sample 06, Ti/Co is less than or equal to 0.01 in each measurement point; in contrast, in the crack portion of Sample 07, the amount of titanium is increased in many points, and there are measurement points where Ti/Co is greater than or equal to 0.05. Furthermore, Ti/Co on the surfaces of the particles of Sample 07 is between 0.10 and 0.18.

Figure 42A:
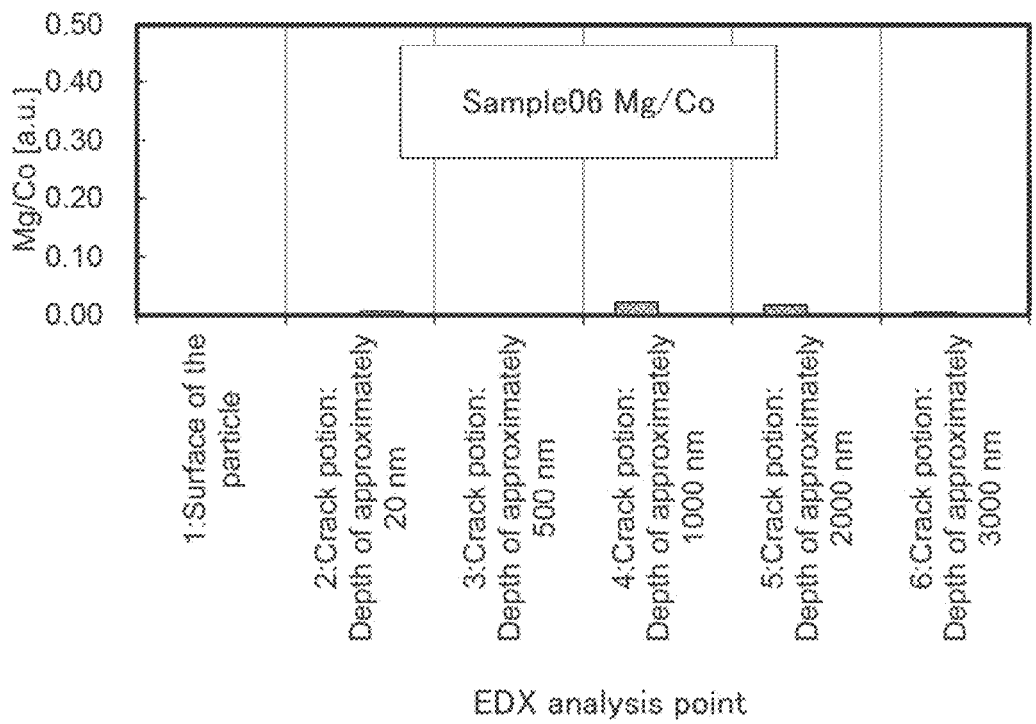
FIGS. 42A and 42B are each a graph showing EDX point analysis results in Example 2.
Figure 42B:
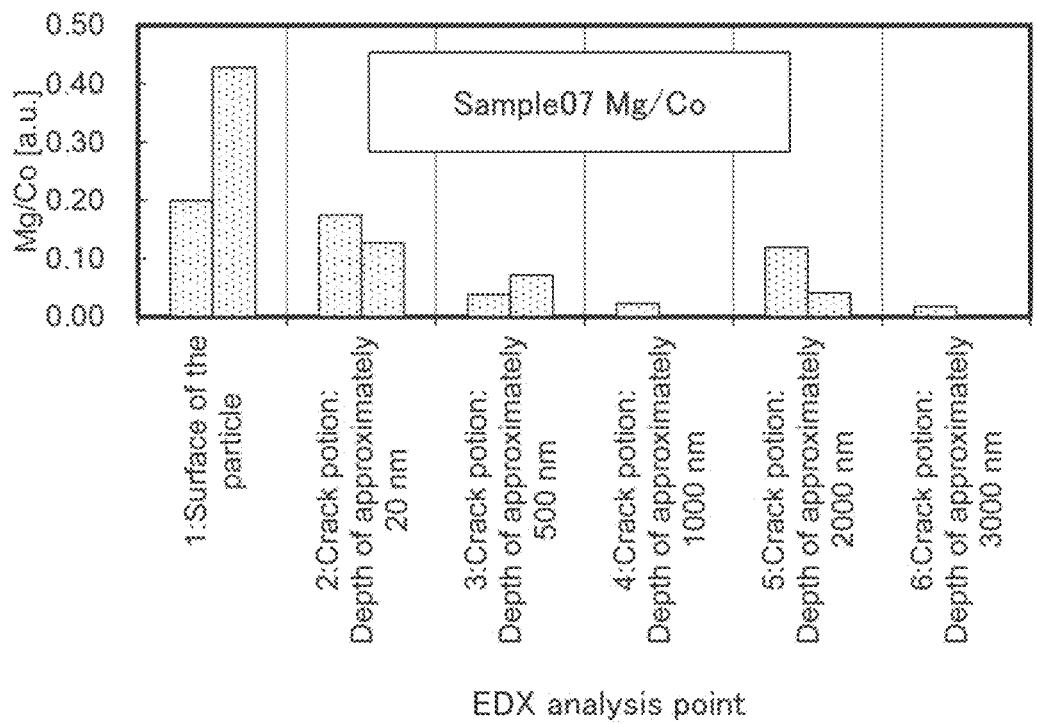

Next, FIGS. 42A and 42B show results of EDX point analysis in an atomic ratio of magnesium to cobalt. The detection points are the same as those in FIGS. 41A and 41B.

As shown in FIGS. 42A and 42B, in Sample 06, Mg/Co is less than or equal to 0.03 both on the surfaces of the particles and in the crack portion; in contrast, in Sample 07, there are many points where the amount of magnesium is increased both on the surfaces of the particles and in the crack portion. Furthermore, Mg/Co on the surfaces of the particles is between 0.15 and 0.50, and that in the crack portion is between 0 and 0.22.

Next, CR2032 coin-type secondary batteries were fabricated using the positive electrode active material of Sample 07 after heating. A positive electrode formed by applying slurry in which a positive electrode active material (LCO) of Sample 02, AB, and polyvinylidene fluoride (PVDF) were mixed at a weight ratio of 95:3:2 to a positive electrode current collector was used. As the positive electrode current collector, 20-μm-thick aluminum foil was used. The amount of positive electrode active material layer containing the positive electrode active material, AB, and PVDF was 7.6 mg/cm$^2$.

A lithium metal was used for the counter electrode.

An electrolyte solution formed in such a manner that 1 mol/L LiPF$_6$ was dissolved in a solution in which ethylene carbonate (EC) and diethyl carbonate (DEC) were mixed at a volume ratio of 3:7, and vinylene carbonate (VC) was added to the solution at a 2 wt % was used.

[Initial Characteristics, Rate Characteristics]

Initial characteristics and rate characteristics of the secondary battery using the positive electrode active material of Sample 07 formed in the above manner were measured.

In the measurement of the initial characteristics, charging was performed at CCCV, 0.2 C, 4.6 V, and a cutoff current of 0.05 C, and discharging was performed at CC, 0.2 C, and a cutoff voltage of 3.0 V. Here, 1 C was set to 160 mA/g, which was a current value per weight of the positive electrode active material. The measurement temperature was 25° C. Table 2 shows measurement results of initial characteristics.

TABLE 2

| Initial charge capacity [mAh/g] | Initial discharge capacity [mAh/g] | Initial charge and discharge efficiency [%] |
| --- | --- | --- |
| 221.2 | 217.5 | 98.3 |

The rate characteristics were measured after the initial characteristics were measured. The measurement was performed by changing a discharge rate in the following order: 0.2 C charge/0.2 C discharge; 0.2 C charge/0.5 C discharge; 0.2 C charge/1.0 C discharge; 0.2 C charge/2.0 C discharge; 0.2 C charge/3.0 C discharge; 0.2 C charge/4.0 C discharge; and 0.2 C charge/5.0 C discharge. Note that the conditions other than the discharge rate are the same as those of the measurement of the initial characteristics. The measurement temperature was 25° C.

Figure 43:
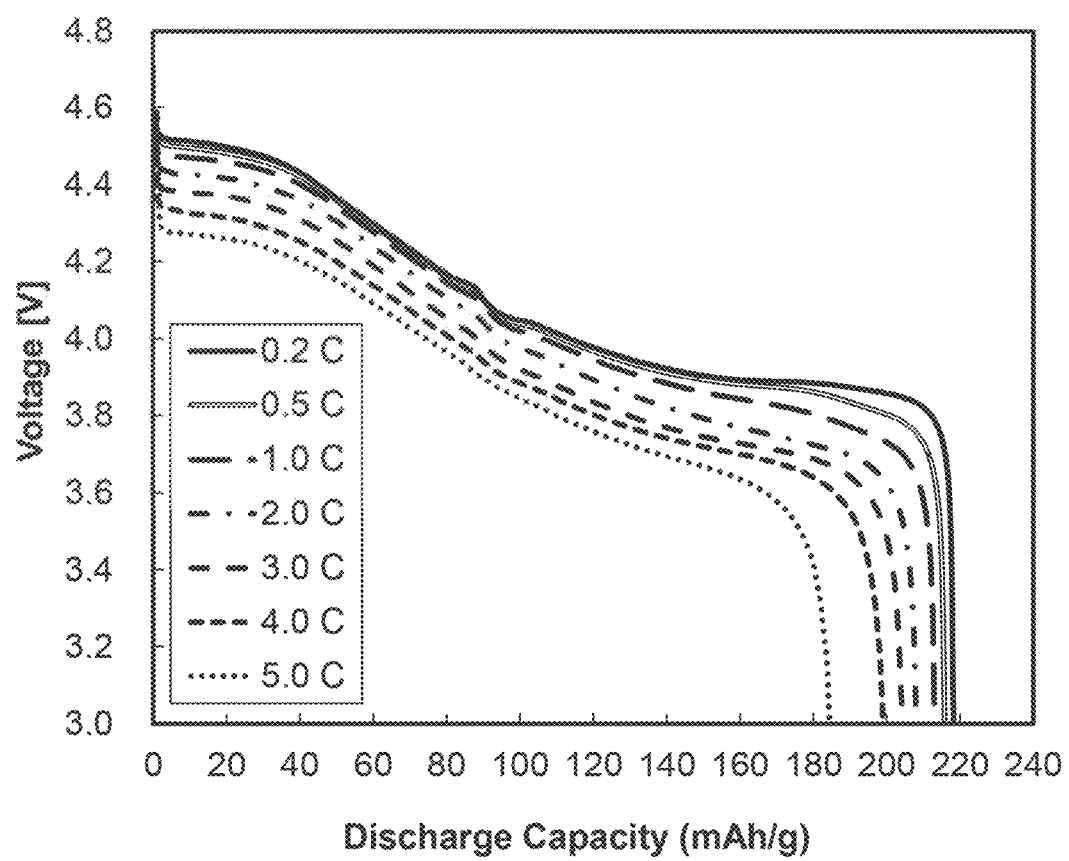
FIG. 43 is a graph showing rate characteristics of a secondary battery in Example 2.

Table 3 shows the measurement results of the initial characteristics and the rate characteristics. In addition, FIG. 43 shows discharge curves of the rates.

TABLE 3

| Rate [C] | Discharge capacity [mAh/g] | Discharge capacity retention rate [%] |
| --- | --- | --- |
| 0.2 | 218.2 | 100.0 |
| 0.5 | 215.8 | 98.9 |
| 1.0 | 213.1 | 97.7 |
| 2.0 | 207.9 | 95.3 |
| 3.0 | 204.0 | 93.5 |
| 4.0 | 198.8 | 91.1 |
| 5.0 | 184.3 | 84.5 |

[Temperature Characteristics]

Figure 44:
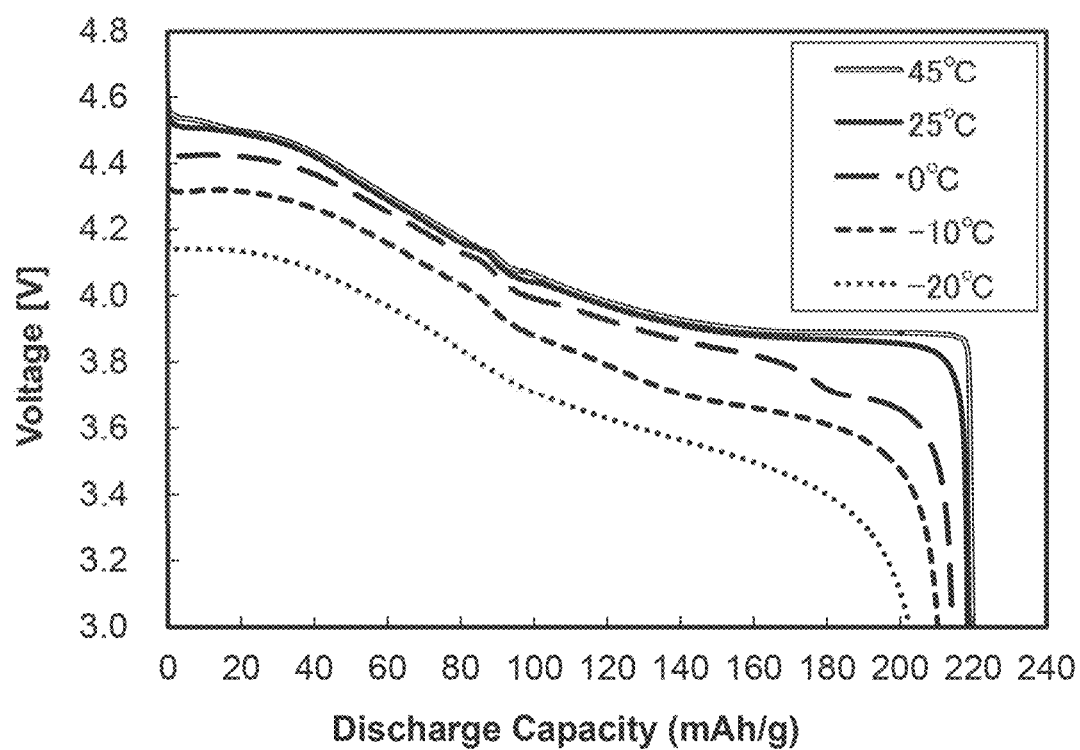
FIG. 44 is a graph showing temperature characteristics of a secondary battery in Example 2.

Next, a cell was fabricated under conditions similar to those of a cell for evaluating the rate characteristics except that the amount of positive electrode active material layer was 8.2 mg/cm$^2$, and the temperature characteristics were measured. Charging was performed at 25° C., CCCV, 0.2 C, 4.6 V, and a cutoff current of 0.05 C. Discharging was performed at 25° C., 0° C., −10° C., −20° C., and 45° C. in this order, CC, 0.2 C, and a cutoff voltage of 3.0 V. FIG. 44 shows measurement results of temperature characteristics.

[Cycle Characteristics]

Figure 45:
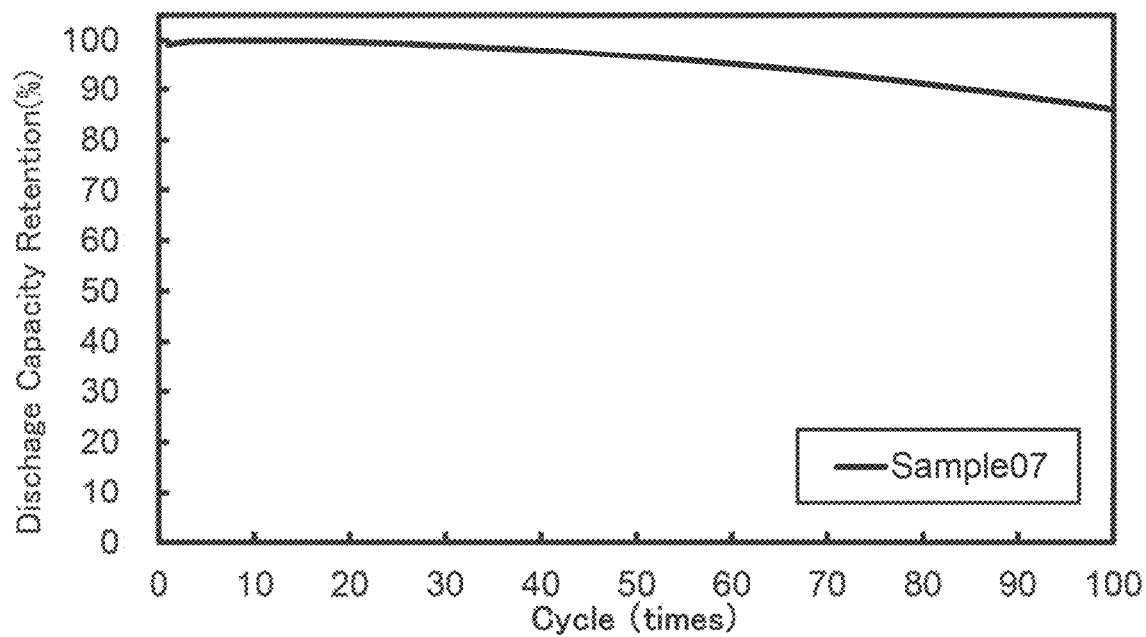
FIG. 45 is a graph showing cycle characteristics of a secondary battery in Example 2.

Next, a cell was fabricated under conditions similar to those of the cell for measuring the temperature characteristics, and the cycle characteristics were measured. In the measurement of the cycle characteristics, charging was performed at CCCV, 1.0 C, 4.55 V, and a cutoff current of 0.05 C, and discharging was performed at CC, 1.0 C, and a cutoff voltage of 3.0 V. The measurement temperature of the cycle characteristics was 45° C. and 100 cycles were measured. The discharge capacity retention rate after 100 cycles was 86%. FIG. 45 is a graph showing the discharge capacity retention rate of the measured cycle characteristics.

From the measurement results, the specific surface area of the positive electrode active material of Sample 07 was 0.13 m$^2$/g.

Furthermore, from the measurement results of particle size distribution of the positive electrode active material of Sample 07, the average particle diameter was 21.5 μm, 10% D was 13.1 μm, 50% D was 22.0 μm, and 90% D was 34.4 μm.

The tap density of the positive electrode active material of Sample 07 is 2.21 g/cm$^3$. The tap density was measured with MULTI TESTER MT-1000 (manufactured by SEISHIN ENTERPRISE Co., Ltd.).

As described above, it is found that the positive electrode active material of Sample 07 which is one embodiment of the present invention shows excellent initial charge and discharge capacity, rate characteristics, and cycle characteristics. In particular, the initial charge and discharge capacity is high, which is 98% or higher; thus, it is probable that a side reaction is inhibited. In addition, even at a high discharge rate of 2 C, an excellent capacity of 96.1% is shown using 0.2 C as a reference.

Example 3

In this example, a positive electrode active material including a region containing titanium and magnesium in a superficial portion was formed by changing the ratio of Li to the first transition metal of starting materials, and evaluation results of characteristics are shown.

[Formation of Positive Electrode Active Material]

In this example, positive electrode active materials of Samples 11 to 17, Samples 21 to 28, and Samples 31 to 40 in which cobalt was used as the first transition metal were prepared. Formation methods and conditions of these samples are as follows.

<<Samples 11 to 17>>

First, a source of lithium, a source of cobalt, a source of magnesium, and a source of fluorine, which are to be starting materials, were individually weighed. In this example, lithium carbonate, cobalt oxide, magnesium oxide, and lithium fluoride were used as the source of lithium, the source of cobalt, the source of magnesium, and the source of fluorine, respectively.

At that time, the starting materials of Sample 11 were weighed so that the ratio of Li to Co was 1.00. The starting materials of Sample 12 were weighed so that the ratio of Li to Co was 1.03. The starting materials of Sample 13 were weighed so that the ratio of Li to Co was 1.05. The starting materials of Sample 14 were weighed so that the ratio of Li to Co was 1.06. The starting materials of Sample 15 were weighed so that the ratio of Li to Co was 1.07. The starting materials of Sample 16 were weighed so that the ratio of Li to Co was 1.08. The starting materials of Sample 17 were weighed so that the ratio of Li to Co was 1.13.

In addition, the starting materials of each of Samples 11 to 17 were weighed so that, when the number of atoms of cobalt contained in the starting materials was set to 1, the number of atoms of magnesium was 0.01 and the number of atoms of fluorine was 0.02.

Next, the weighed starting materials were separately mixed with a ball mill for each sample.

Then, the mixed starting materials were baked. The baking was performed at 1000° C. for 10 hours under the following conditions: the temperature rising rate was 200° C./h; and the flow rate of dry air was 10 L/min.

Through the above process, particles of a composite oxide containing lithium, cobalt, fluorine, and magnesium were synthesized.

Next, TTIP was added to 2-propanol so that the amount of TTIP per weight of the positive electrode active material was 0.01 ml/g and then mixing was performed, so that a 2-propanol solution of tetra-i-propoxy titanium was formed.

To the 2-propanol solution of TTIP, the particles of a composite oxide containing lithium, cobalt, fluorine, and magnesium were added and then mixing was performed.

The above-described mixed solution was stirred with a magnetic stirrer for four hours, at 25° C., and at a humidity of 90% RH. Through the process, water in an atmosphere and TTIP caused hydrolysis and polycondensation reaction, and a layer containing titanium was formed on the surface of the lithium cobalt oxide particle containing magnesium and fluorine.

The mixed solution which had been subjected to the above process was filtered to collect the residue. As a filter for filtration, Kiriyama filter paper (No. 4) was used.

The collected residue was dried in a vacuum at 70° C. for one hour.

The dried particles were heated. The heating was performed in an oxygen atmosphere under the following conditions: the temperature was 800° C. (the temperature rising rate was 200° C./h); and the retention time was two hours.

The heated particles were cooled and subjected to crushing treatment. In the crushing treatment, the particles were made to pass through a sieve. The sieve has an aperture width of 53 μm.

The particles which were subjected to crushing treatment were used as the positive electrode active materials of Samples 11 to 17.

<<Samples 21 to 27>>

The starting materials of Samples 21 to 27 were the same as those of Samples 11 to 16. At that time, the starting materials of Sample 21 were weighed so that the ratio of Li to Co was 1.00. The starting materials of Sample 22 were weighed so that the ratio of Li to Co was 1.03. The starting materials of Sample 23 were weighed so that the ratio of Li to Co was 1.05. The starting materials of Sample 24 were weighed so that the ratio of Li to Co was 1.06. The starting materials of Sample 25 were weighed so that the ratio of Li to Co was 1.07. The starting materials of Sample 26 were weighed so that the ratio of Li to Co was 1.08. The starting materials of Sample 27 were weighed so that the ratio of Li to Co was 1.13.

Samples 21 to 27 were formed in manners similar to those of Samples 11 to 17 except that the concentration of TTIP in the 2-propanol solution was adjusted so that the amount of TTIP per weight of the positive electrode active material was 0.02 ml/g.

<<Sample 28>>

The ratio of Li to Co of the starting materials and the amount of TTIP of Sample 28 were the same as the ratio of Li to Co of the starting materials and the amount of TTIP of Sample 23. That is, in Sample 28, the starting materials were weighed so that the ratio of Li to Co was 1.05, and the amount of TTIP per weight of the positive electrode active material was 0.02 ml/g.

Note that in Sample 28, after the starting materials were mixed, baking was performed at 950° C.

Sample 28 was formed in a manner similar to that of Sample 23 except for the baking temperature.

It is probable that Samples 11 to 17 and Samples 21 to 28 are each a positive electrode active material which contains lithium cobaltate inside and includes a region containing titanium and magnesium in a superficial portion.

<<Samples 31 to 40>>

Samples 31 to 40 were formed as comparative examples, each of which did not include a region containing titanium.

The starting materials of Sample 31 were weighed so that the ratio of Li to Co was 1.00. The starting materials of Sample 32 were weighed so that the ratio of Li to Co was 1.01. The starting materials of Sample 33 were weighed so that the ratio of Li to Co was 1.02. The starting materials of Sample 34 were weighed so that the ratio of Li to Co was 1.03. The starting materials of Sample 35 were weighed so that the ratio of Li to Co was 1.035. The starting materials of Sample 36 were weighed so that the ratio of Li to Co was 1.04. The starting materials of Sample 37 were weighed so that the ratio of Li to Co was 1.051. The starting materials of Sample 38 were weighed so that the ratio of Li to Co was 1.061. The starting materials of Sample 39 were weighed so that the ratio of Li to Co was 1.081. The starting materials of Sample 40 were weighed so that the ratio of Li to Co was 1.130.

In addition, the starting materials of each of Samples 31 to 40 were weighed so that, when the number of atoms of cobalt contained in the starting materials was set to 1, the number of atoms of magnesium was 0.01 and the number of atoms of fluorine was 0.02.

Next, the weighed starting materials were separately mixed with a ball mill for each sample.

Then, the mixed starting materials were baked. The baking was performed at 1000° C. for 10 hours under the following conditions: the temperature rising rate was 200° C./h; and the flow rate of dry air was 10 L/min.

Through the above process, particles of a composite oxide containing lithium, cobalt, fluorine, and magnesium were synthesized.

The synthesized particles were cooled and then heated. The heating was performed in an oxygen atmosphere under the following conditions: the temperature was 800° C. (the temperature rising rate was 200° C./h); and the retention time was two hours.

The heated particles were cooled and subjected to crushing treatment. In the crushing treatment, the particles were made to pass through a sieve. The sieve has an aperture width of 53 μm.

The particles which were subjected to crushing treatment were used as the positive electrode active materials of Samples 31 to 40.

Table 4 shows the formation conditions of Samples 11 to 17, Samples 21 to 28, and Samples 31 to 40.

TABLE 4

| | Li/Co | TTIP | Baking temperature |
|---|---|---|---|
| Sample 11 | 1.00 | 0.01 ml/g | 1000° C. |
| Sample 12 | 1.03 | | |
| Sample 13 | 1.05 | | |
| Sample 14 | 1.06 | | |
| Sample 15 | 1.07 | | |
| Sample 16 | 1.08 | | |
| Sample 17 | 1.13 | | |
| Sample 21 | 1.00 | 0.02 ml/g | 1000° C. |
| Sample 22 | 1.03 | | |
| Sample 23 | 1.05 | | |
| Sample 24 | 1.06 | | |
| Sample 25 | 1.07 | | |
| Sample 26 | 1.08 | | |
| Sample 27 | 1.13 | | |
| Sample 28 | 1.05 | 0.02 ml/g | 950° C. |
| Sample 31 | 1.00 | — | 1000° C. |
| Sample 32 | 1.01 | | |
| Sample 33 | 1.02 | | |
| Sample 34 | 1.03 | | |
| Sample 35 | 1.035 | | |
| Sample 36 | 1.04 | | |
| Sample 37 | 1.051 | | |
| Sample 38 | 1.061 | | |
| Sample 39 | 1.081 | | |
| Sample 40 | 1.130 | | |

[XPS]

The positive electrode active materials of Samples 11 to 17, Samples 21 to 28, and Samples 31 to 40 were subjected to an XPS analysis. Table 5 shows results of the XPS analysis of Samples 11 to 17, Table 6 shows results of the XPS analysis of Samples 21 to 28, and Table 7 shows results of the XPS analysis of Samples 31 to 40. Tables 5 to 7 show a relative value of the concentration of each element under the condition where the concentration of cobalt is 1.

TABLE 5

Relative value under condition where concentration of Co is 1

|           | Li/Co | Li   | Co   | O    | C    | F    | Mg   | Ti   | Si   | Ca   | Na   | S    |
|-----------|-------|------|------|------|------|------|------|------|------|------|------|------|
| Sample 11 | 1.00  | 0.82 | 1.00 | 2.87 | 0.25 | 0.37 | 0.57 | 0.15 | 0.00 | 0.04 | 0.27 | 0.01 |
| Sample 12 | 1.03  | 0.69 | 1.00 | 2.84 | 0.93 | 0.63 | 0.63 | 0.14 | 0.00 | 0.05 | 0.04 | 0.00 |
| Sample 13 | 1.05  | 0.96 | 1.00 | 3.22 | 0.66 | 0.47 | 0.61 | 0.14 | 0.00 | 0.03 | 0.09 | 0.03 |
| Sample 14 | 1.06  | 1.04 | 1.00 | 3.13 | 0.34 | 0.77 | 0.77 | 0.15 | 0.00 | 0.05 | 0.34 | 0.04 |
| Sample 15 | 1.07  | 0.84 | 1.00 | 3.42 | 0.58 | 0.60 | 0.23 | 0.18 | 0.00 | 0.08 | 0.27 | 0.00 |
| Sample 16 | 1.08  | 1.08 | 1.00 | 3.10 | 0.66 | 0.59 | 0.04 | 0.16 | 0.00 | 0.03 | 0.16 | 0.02 |
| Sample 17 | 1.13  | 1.29 | 1.00 | 3.70 | 0.83 | 0.87 | 0.00 | 0.19 | 0.00 | 0.04 | 0.20 | 0.02 |

TABLE 6

Relative value under condition where concentration of Co is 1

|           | Li/Co | Li   | Co   | O    | C    | F    | Mg   | Ti   | Si   | Ca   | Na   | S    |
|-----------|-------|------|------|------|------|------|------|------|------|------|------|------|
| Sample 21 | 1.00  | 1.08 | 1.00 | 3.23 | 0.47 | 0.45 | 0.49 | 0.20 | 0.00 | 0.06 | 0.35 | 0.01 |
| Sample 22 | 1.03  | 0.73 | 1.00 | 3.05 | 1.06 | 0.70 | 0.59 | 0.17 | 0.00 | 0.03 | 0.09 | 0.00 |
| Sample 23 | 1.05  | 1.19 | 1.00 | 3.40 | 0.73 | 0.48 | 0.58 | 0.23 | 0.00 | 0.05 | 0.10 | 0.04 |
| Sample 24 | 1.06  | 1.10 | 1.00 | 3.44 | 0.33 | 0.92 | 0.91 | 0.25 | 0.00 | 0.05 | 0.30 | 0.04 |
| Sample 25 | 1.07  | 1.05 | 1.00 | 4.26 | 0.74 | 0.20 | 0.25 | 0.29 | 0.00 | 0.07 | 0.30 | 0.02 |
| Sample 26 | 1.08  | 1.12 | 1.00 | 3.32 | 0.74 | 0.52 | 0.14 | 0.21 | 0.00 | 0.05 | 0.15 | 0.00 |
| Sample 27 | 1.13  | 1.49 | 1.00 | 3.80 | 0.60 | 0.41 | 0.00 | 0.12 | 0.00 | 0.00 | 0.16 | 0.02 |
| Sample 28 | 1.05  | 0.99 | 1.00 | 3.11 | 0.72 | 0.86 | 0.56 | 0.18 | 0.00 | 0.05 | 0.12 | 0.02 |

TABLE 7

Relative value under condition where concentration of Co is 1

|           | Li/Co | Li   | Co   | O    | C    | F    | Mg   | Ca   | Na   |
|-----------|-------|------|------|------|------|------|------|------|------|
| Sample 31 | 1.00  | 0.51 | 1.00 | 2.45 | 0.69 | 0.08 | 0.27 | 0.03 | 0.08 |
| Sample 32 | 1.01  | 0.67 | 1.00 | 2.65 | 0.77 | 0.08 | 0.28 | 0.03 | 0.08 |
| Sample 33 | 1.02  | 0.53 | 1.00 | 2.51 | 0.66 | 0.09 | 0.27 | 0.02 | 0.06 |
| Sample 34 | 1.03  | 0.79 | 1.00 | 2.93 | 0.92 | 0.09 | 0.35 | 0.04 | 0.14 |
| Sample 35 | 1.04  | 0.65 | 1.00 | 2.33 | 0.48 | 0.11 | 0.32 | 0.03 | 0.11 |
| Sample 36 | 1.04  | 0.69 | 1.00 | 2.73 | 0.56 | 0.11 | 0.38 | 0.05 | 0.16 |
| Sample 37 | 1.05  | 0.67 | 1.00 | 3.04 | 0.64 | 0.09 | 0.35 | 0.04 | 0.21 |
| Sample 38 | 1.06  | 0.83 | 1.00 | 2.65 | 1.03 | 0.29 | 0.10 | 0.05 | 0.11 |
| Sample 39 | 1.08  | 0.80 | 1.00 | 2.79 | 1.04 | 0.26 | 0.03 | 0.08 | 0.10 |
| Sample 40 | 1.13  | 0.77 | 1.00 | 2.72 | 0.22 | 0.99 | 0.00 | 0.01 | 0.26 |

Figure 46A:
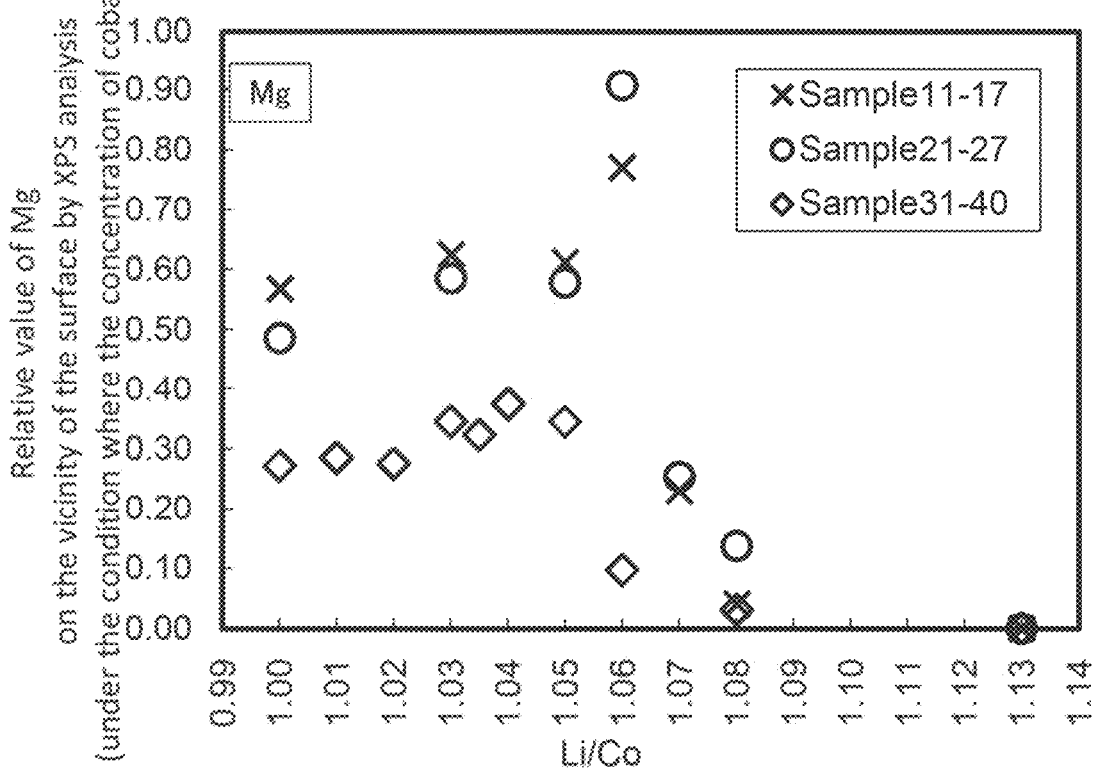
FIGS. 46A and 46B are each a graph showing XPS analysis results of a positive electrode active material in Example 3.
Figure 46B:
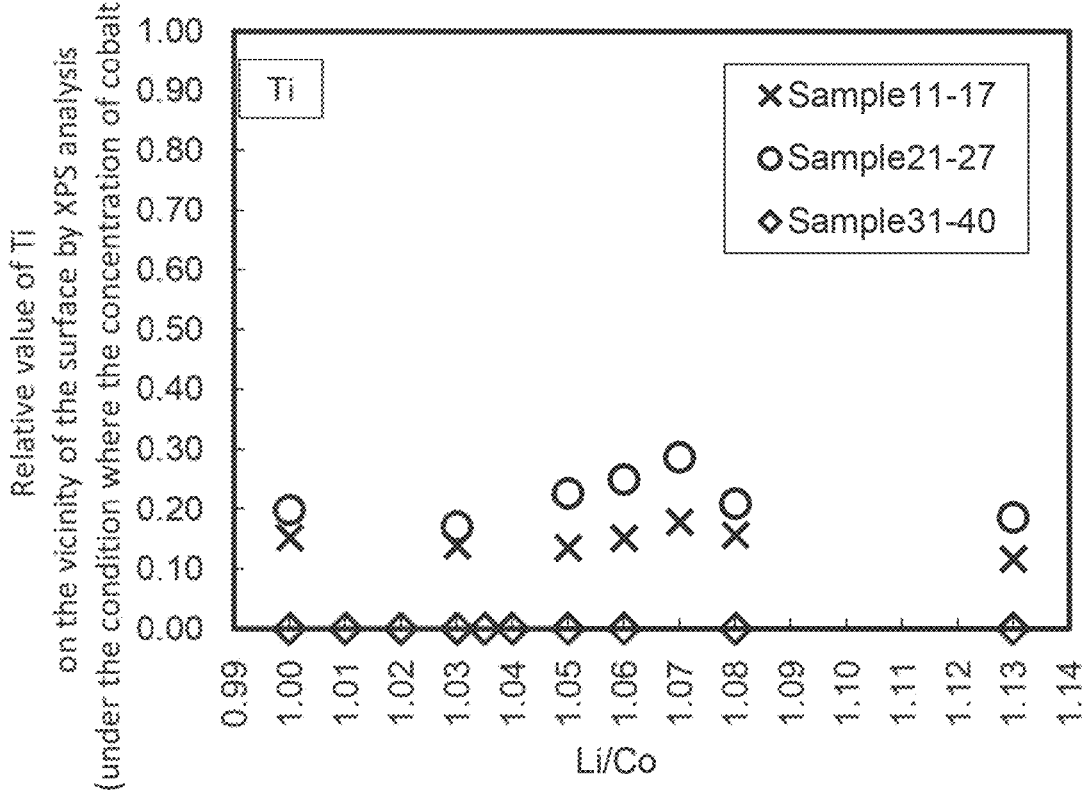

FIGS. 46A and 46B are graphs in which the relative value of magnesium and the relative value of titanium are extracted from the analysis results of Tables 5 to 7. FIG. 46A is a graph showing the ratio of Li to Co and the relative value of magnesium. FIG. 46B is a graph showing the ratio of Li to Co and the relative value of titanium.

From the analysis results of Samples 31 to 40 in FIG. 46A, it is found that, in the case where a coating layer containing titanium is not included, the concentration of magnesium is high in samples where the ratio of Li to Co is greater than or equal to 1.00 and less than or equal to 1.05. This is probably because magnesium contained in the starting materials is segregated in a range where the element concentration can be detected by XPS by heating. In contrast, in samples where the ratio of Li to Co is greater than or equal to 1.06, the concentration of magnesium is low; thus, it is probable that the segregation of magnesium does not easily occur when the amount of lithium is too large.

From the analysis results of Samples 11 to 16 and Samples 21 to 26 in FIG. 46A, it is found that the concentration of magnesium in a range where the element concentration can be detected by XPS is higher in the case where a region containing titanium is included in a superficial portion than in the case where the region containing titanium is not included.

Moreover, in the case where the ratio of Li to Co is 1.06, in samples where the region containing titanium is not included, the concentration of magnesium in a range where the element concentration can be detected by XPS is low; in contrast, in samples where the region containing titanium is included, the concentration of magnesium in a range where the element concentration can be detected by XPS is high. That is, when the region containing titanium is formed in the superficial portion, magnesium is sufficiently segregated even in the case where the ratio of Li to Co is high.

Note that even if the region containing titanium is included, the concentration of magnesium is lower in the case where the ratio of Li to Co is 1.07 than in the case where the ratio of Li to Co is 1.06. Furthermore, it is probable that, in the case where the ratio of Li to Co is greater than or equal to 1.08, the segregation of magnesium does not easily occur even if the region containing titanium is included.

[Evaluation of Cycle Characteristics]

<<Energy Density Retention Rate>>

Next, cycle characteristics were evaluated in a manner similar to that of Example 1 using positive electrode active materials of Samples 11 to 14, Sample 16, Samples 21 to 24, and Sample 26.

The shape of the secondary battery, the materials and the mixture ratios of the positive electrode active material, the conductive additive, and the binder in the positive electrode, the counter electrode, the electrolyte solution, the exterior body, the conditions of the cycle characteristics test, and the like are the same as those in Example 1.

Figure 47A:
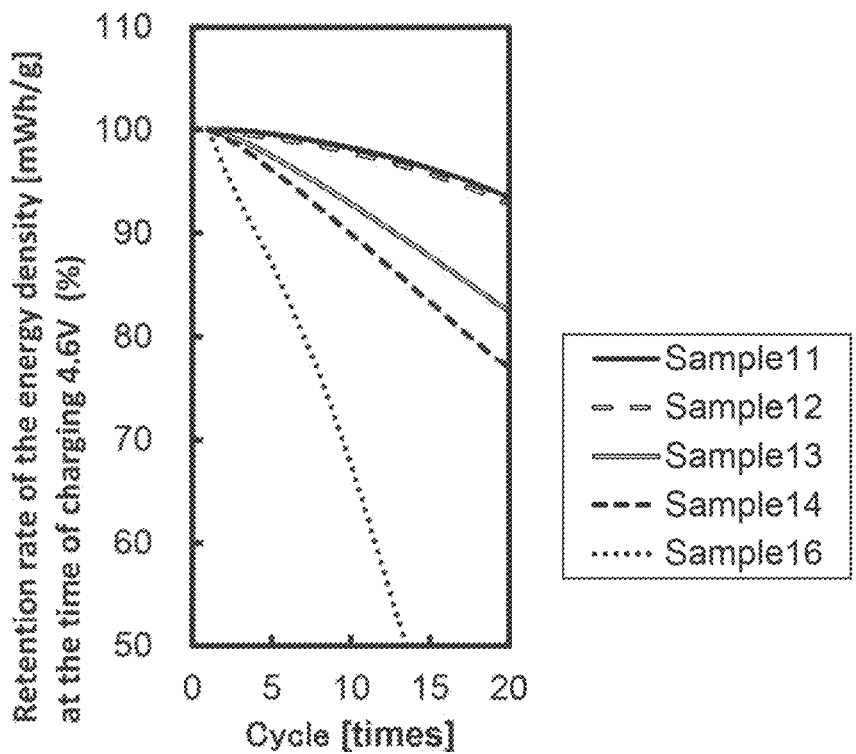
FIGS. 47A and 47B are each a graph showing cycle characteristics of a secondary battery containing a positive electrode active material in Example 3.
Figure 47B:
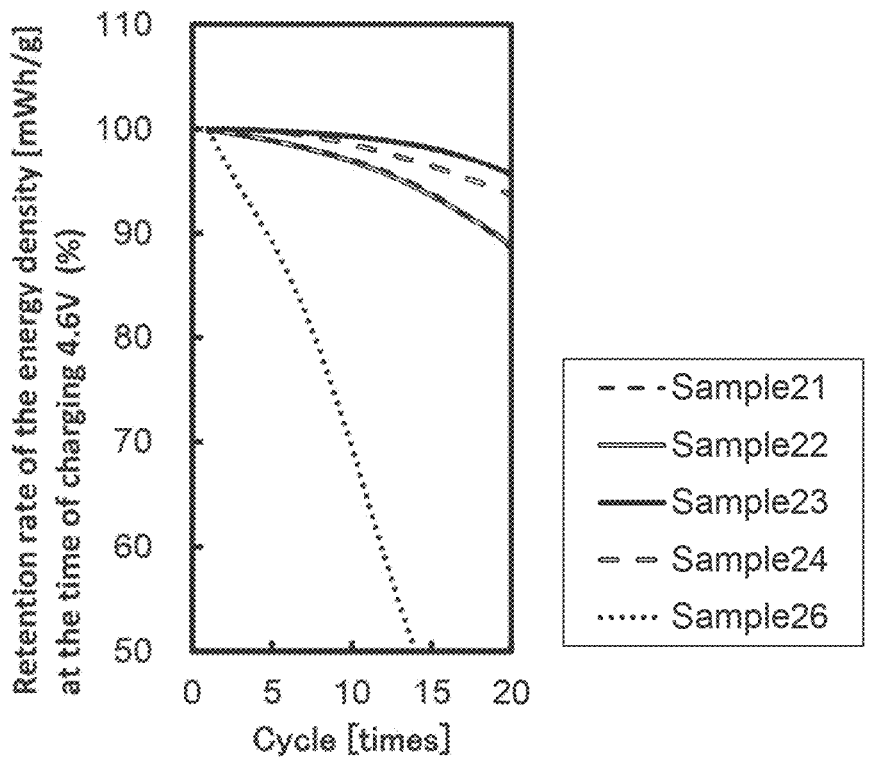

FIG. 47A is a graph showing the energy density retention rates and the number of charge and discharge cycles at the time of charging at 4.6 V of secondary batteries using the positive electrode active materials of Samples 11 to 14 and Sample 16 which were formed so that the amount of TTIP per weight of the positive electrode active material was 0.01 ml/g. FIG. 47B is a graph showing the energy density retention rates and the number of charge and discharge cycles at the time of charging at 4.6 V of secondary batteries using the positive electrode active materials of Samples 21 to 24 and Sample 26 which were formed so that the amount of TTIP per weight of the positive electrode active material was 0.02 ml/g.

As shown in FIG. 47A, in the case where TTIP is 0.01 ml/g, Samples 11 to 14, that is, the positive electrode active materials in which the ratio of Li to Co is greater than or equal to 1.00 and less than or equal to 1.06 have excellent cycle characteristics. In particular, Samples 11 and 12, that is, the positive electrode active materials in which the ratio of Li to Co is greater than or equal to 1.00 and less than or equal to 1.03 have extremely excellent cycle characteristics. In contrast, in Sample 16 in which the ratio of Li to Co is 1.08, the energy density retention rate decreases at a relatively early stage.

As shown in FIG. 47B, in the case where TTIP is 0.02 ml/g, Samples 21 to 24, that is, the positive electrode active materials in which the ratio of Li to Co is greater than or equal to 1.00 and less than or equal to 1.06 have excellent cycle characteristics. In particular, Samples 23 and 24, that is, the positive electrode active materials in which the ratio of Li to Co is greater than or equal to 1.05 and less than or equal to 1.06 have extremely excellent cycle characteristics.

Figure 48:
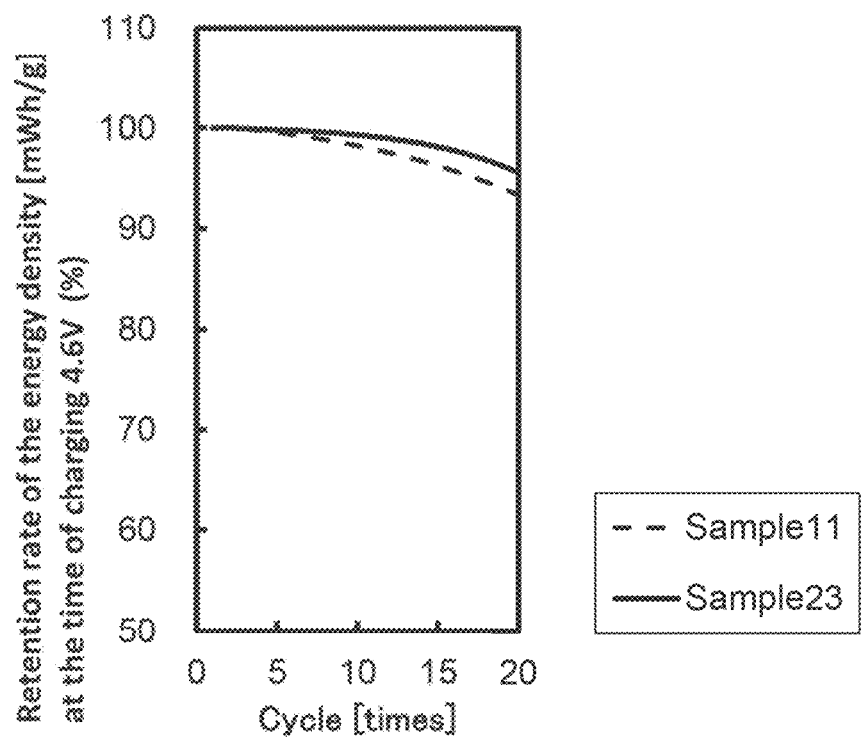
FIG. 48 is a graph showing cycle characteristics of a secondary battery containing a positive electrode active material in Example 3.

FIG. 48 is a graph showing comparison between Sample 11 having the most excellent cycle characteristics in Samples 11 to 15 and Sample 23 having the most excellent cycle characteristics in Samples 21 to 25.

As shown in FIG. 48, both Sample 11 and Sample 23 have excellent cycle characteristics; however, Sample 23 in which TTIP is 0.02 ml/g has more excellent cycle characteristics.

<<Discharge Capacity Retention Rate>>

Figure 49:
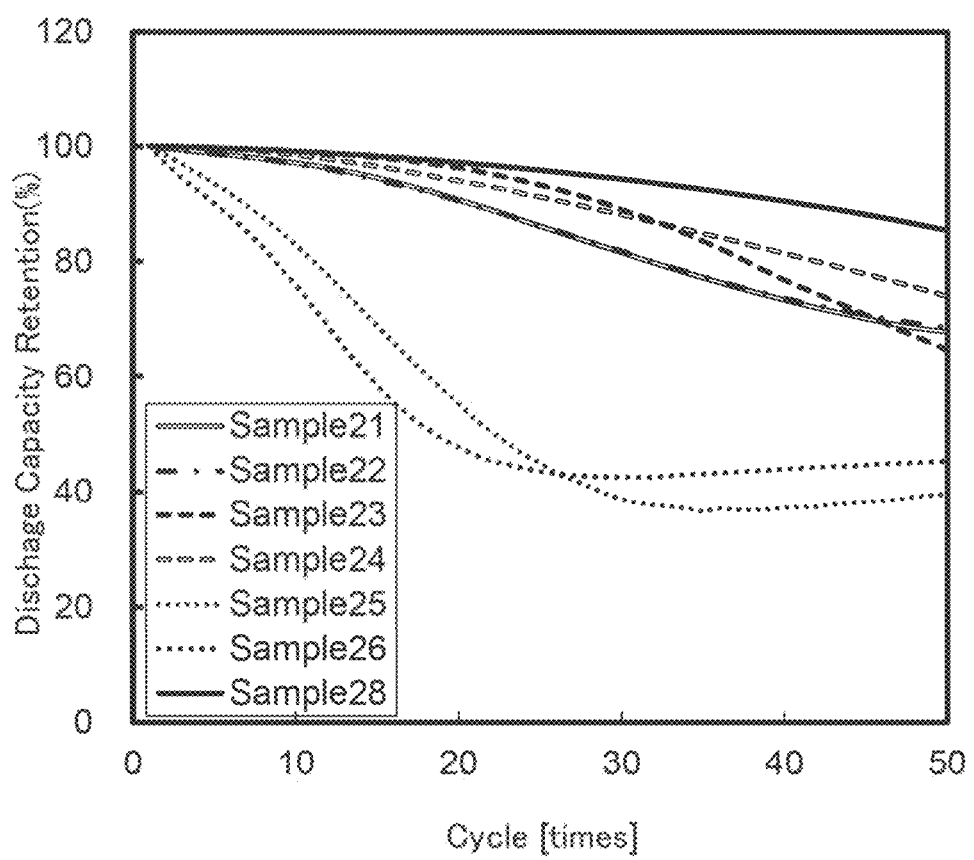
FIG. 49 is a graph showing cycle characteristics of a secondary battery containing a positive electrode active material in Example 3.

Next, FIG. 49 shows evaluation results of a discharge capacity retention rate, which is one of the cycle characteristics of each of Samples 21 to 26 and Sample 28.

The shape of the secondary battery, the material and the mixture ratio of the positive electrode active material, the conductive additive, and the binder in the positive electrode, the counter electrode, the electrolyte solution, the exterior body, the conditions of the cycle characteristics test, and the like of Samples 21 to 26 are the same as those in Example 1.

The secondary battery using Sample 28 was formed in a manner similar to those of the secondary batteries using Samples 21 to 26 except that PVDF was used as a binder and the positive electrode active material (LCO), AB, and PVDF were mixed such that the weight ratio of LCO to AB and PVDF was 95:3:2, and evaluated.

As shown in FIG. 49, Samples 21 to 24 and Sample 28 have excellent cycle characteristics. In particular, Sample 28 has extremely excellent cycle characteristics. In Sample 28, the discharge capacity retention rate after 50 cycles was higher than or equal to 85%.

In contrast, in Sample 25 and Sample 26 in which the ratios of Li to Co are 1.07 and 1.08, respectively, the discharge capacity retention rates decrease at a relatively early stage.

From the above results, it is found that in the case where TTIP per weight of the positive electrode active material is 0.02 ml/g, the ratio of Li to Co preferably has a range of greater than or equal to 1.00 and less than 1.07. Moreover, it is found that a sample in which the ratio of Li to Co has a range of greater than or equal to 1.05 and less than or equal to 1.06 has extremely excellent cycle characteristics.

Figure 50A:
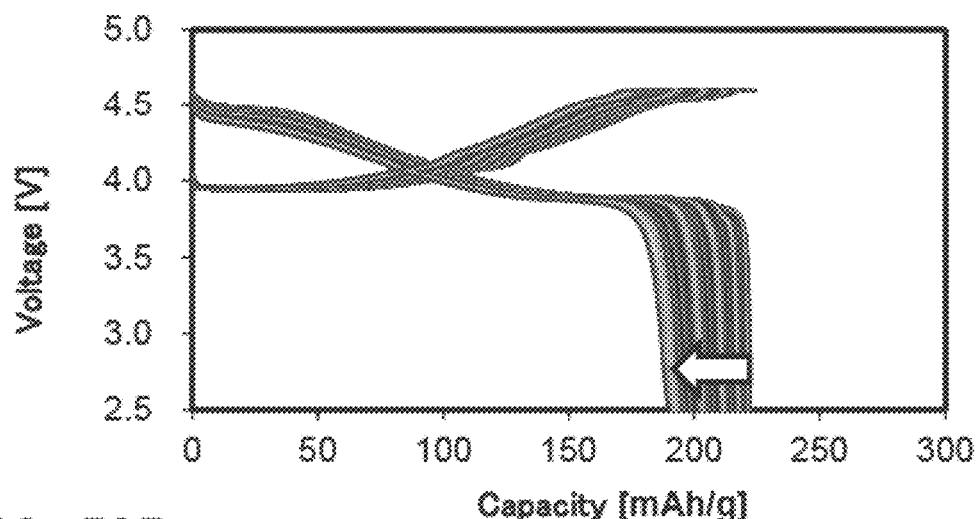
FIGS. 50A to 50C are each a graph showing charge and discharge characteristics of a secondary battery containing a positive electrode active material in Example 3.
Figure 50B:
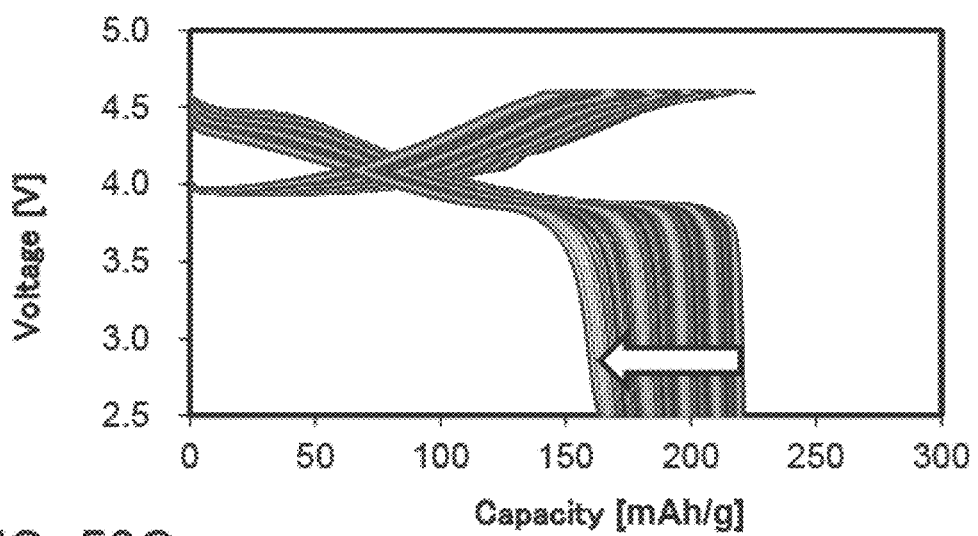
Figure 50C:
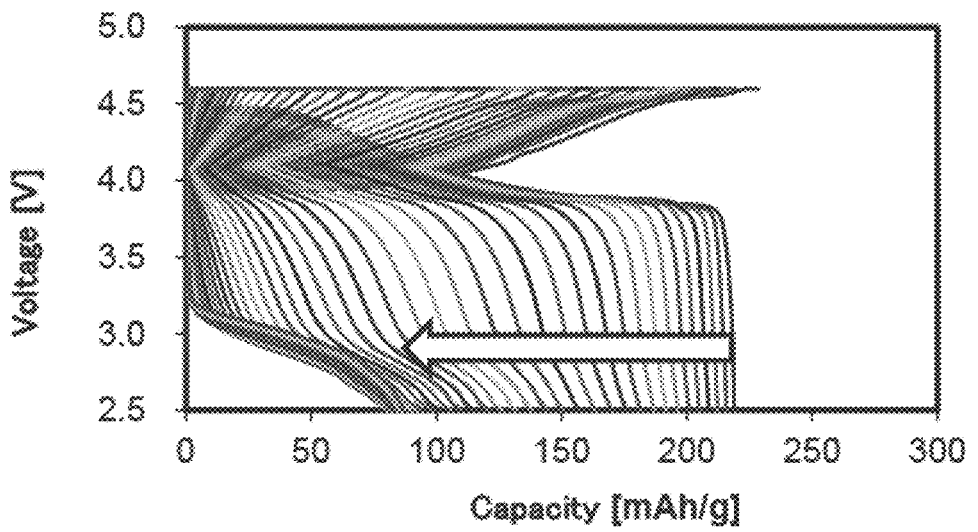

FIGS. 50A to 50C show charge and discharge curves of the secondary batteries using Sample 28, which has extremely excellent cycle characteristics in FIG. 49, Sample 24, and Sample 25, in which the degradation occurs at a relatively early stage.

FIG. 50A, FIG. 50B, and FIG. 50C show charge and discharge curves of the secondary batteries using Sample 28, Sample 24, and Sample 25, respectively. Each of the figures shows overlap of results of 50 cycles of charge and discharge. As indicated by an arrow in each figure, the charge and discharge capacity decreases from the first cycle to the fiftieth cycle.

As shown in FIGS. 50A and 50B, Sample 28 and Sample 24, which are positive electrode active materials of one embodiment of the present invention, have high charge and discharge capacity and excellent charge and discharge characteristics. In addition, it is found that a decrease in charge and discharge capacity of each of Sample 28 and Sample 24 in FIGS. 50A and 50B is significantly suppressed as compared with Sample 25 in FIG. 50C.

Example 4

In this example, SEM observation results and SEM-EDX analysis results of the positive electrode active material of Sample 24 formed in Example 2 are described.

Figure 51A:
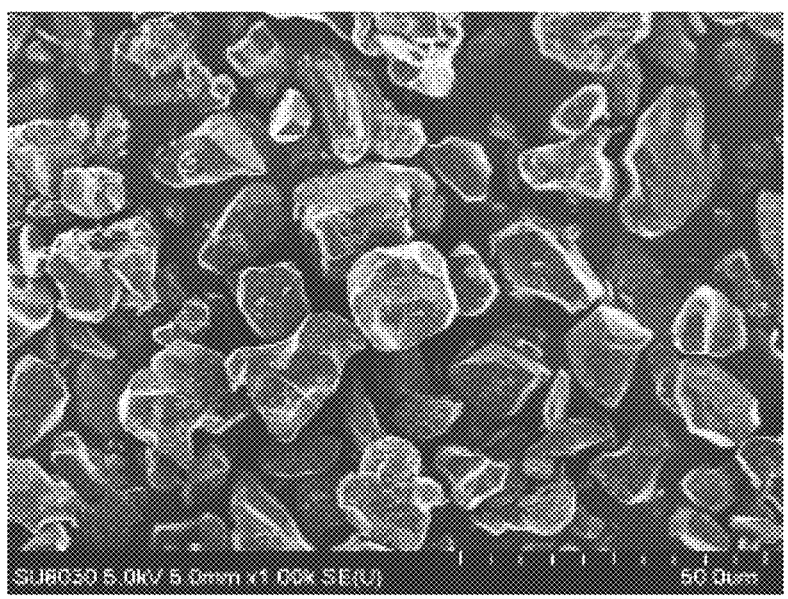
FIGS. 51A to 51C are SEM images of a positive electrode active material in Example 4.
Figure 51B:
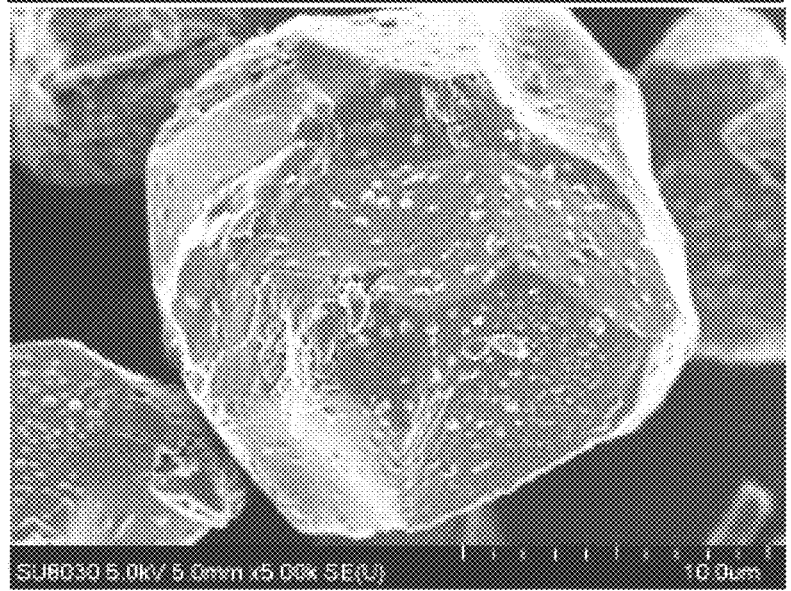
Figure 51C:
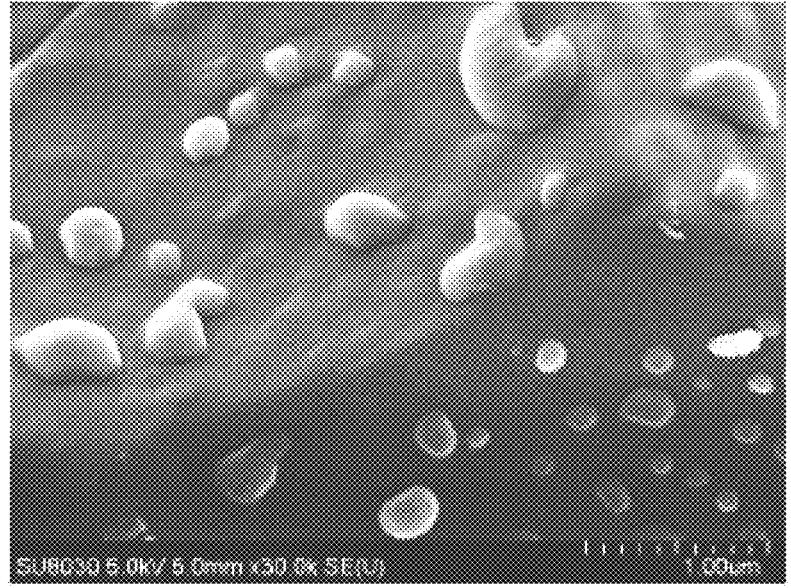

Sample 24 was formed so that Li/Co was 1.06 and TTIP per weight of the positive electrode active material was 0.02 ml/g. FIG. 51A shows a SEM image of Sample 24. FIGS. 51B and 51C each show an enlarged image of a part in FIG. 51A.

As shown in FIGS. 51A to 51C, there are a large number of projected regions in a superficial portion of the positive electrode active material.

Figures 1, 52A:
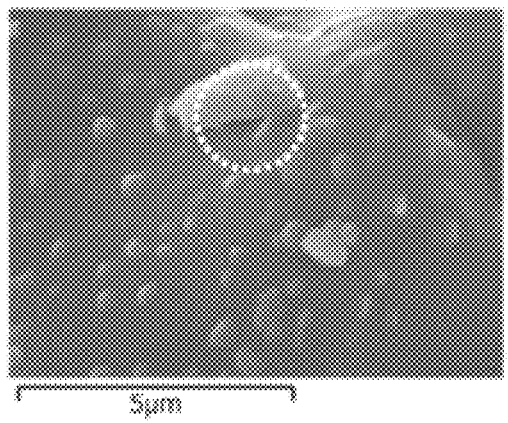
Figures 2, 52A:
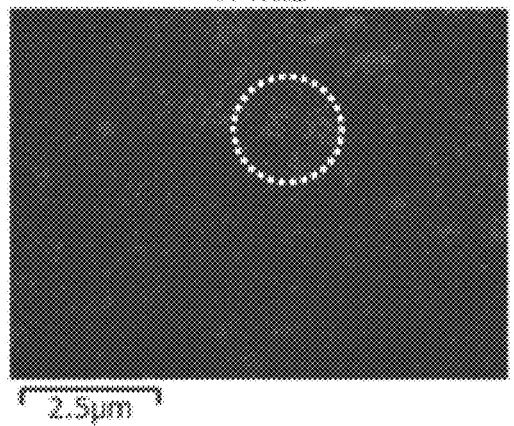
Figures 1, 52B:
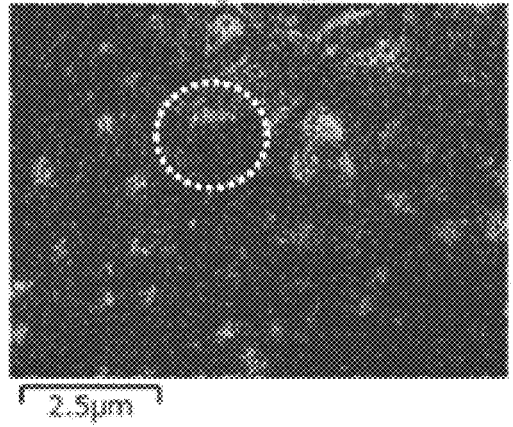
Figures 2, 52B:
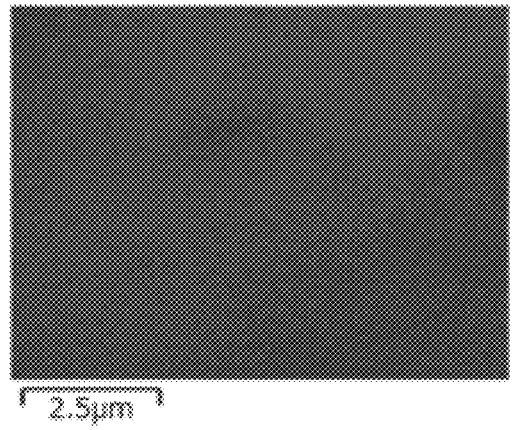
Figures 1, 52C:
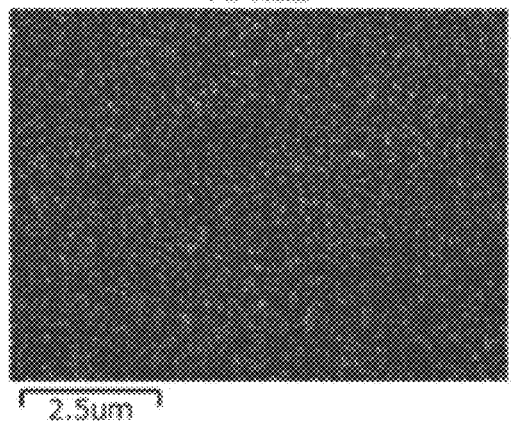
Figures 2, 52C:
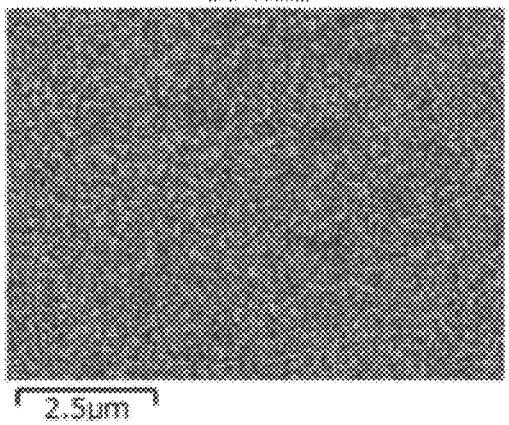

Next, FIGS. 52A-1, 52A-2, 52B-1, 52B-2, 52C-1, and 52C-2 show analysis results of the positive electrode active material of Sample 24 using SEM-EDX. FIG. 52A-1 shows a SEM image of a superficial portion of the positive electrode active material, FIG. 52A-2 shows a mapping image of titanium, FIG. 52B-1 shows a mapping image of magnesium, FIG. 52B-2 shows a mapping image of oxygen, FIG. 52C-1 shows a mapping image of aluminum, and FIG. 52C-2 shows a mapping image of cobalt. Note that in EDX element mapping images in FIGS. 52A-2, 52B-1, 52B-2, 52C-1, and 52C-2, a region where the number of elements is less than or equal to a lower limit of the detection is indicated in black, and as the number of elements is increased, the black region becomes white.

The same regions in FIGS. 52A-1, 52A-2, and 52B-1 are surrounded by dotted lines. When the regions surrounded by dotted lines are compared with each other, it is found that in the projected regions in the superficial portion of the positive electrode active material, titanium and magnesium are distributed.

Thus, it is found that Sample 24 is a positive electrode active material including the projected fourth region 104 containing titanium and magnesium over the third region 103.

As shown in Example 2, Sample 24 is one of the samples which show extremely excellent cycle characteristics. Thus, it is found that, even if the fourth region is provided in the superficial portion or when the fourth region is provided, the positive electrode active material with excellent cycle characteristics can be obtained.

From the above results of Examples 1 to 3, it is found that when the region containing titanium is formed in the superficial portion, the positive electrode active material with excellent cycle characteristics can be obtained. In addition, it is found that, when the ratio of Li to Co is increased to increase the particle diameter of the positive electrode active material, the cycle characteristics might be degraded; however, the region containing titanium is formed in the superficial portion, whereby the range of the ratio of Li to Co in which excellent cycle characteristics is obtained can be widened. Furthermore, it is found that even when the fourth region containing titanium and magnesium is provided in the superficial portion of the positive electrode active material, excellent cycle characteristics is obtained.

Example 5

In this example, an example of a method for producing a positive electrode active material coated with graphene oxide is shown, and observation results of the positive electrode active material produced by the method with an electron microscope are described.

Figure 53:
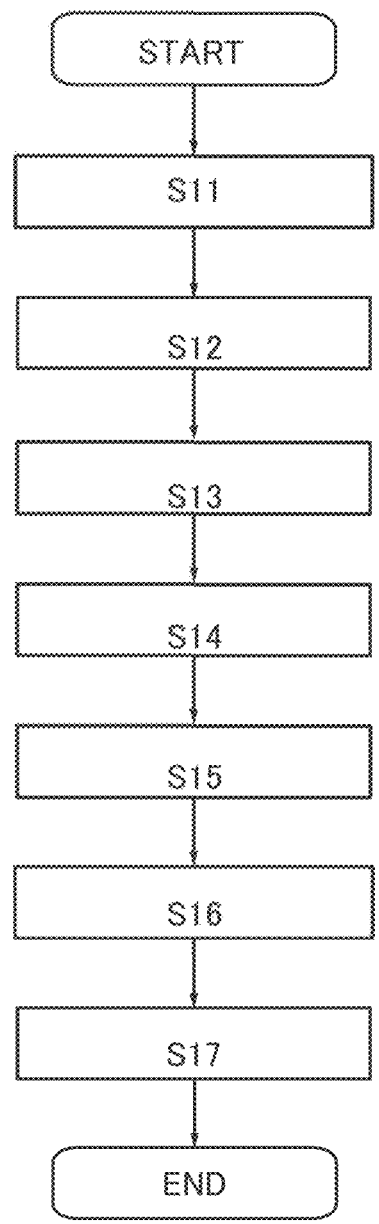
FIG. 53 is a process flow chart of Example 5.

As shown in a process flow chart in FIG. 53, a process for forming a coating film on a positive electrode active material includes the steps of: weighing graphene oxide (S11); mixing and stirring the graphene oxide and pure water (S12); controlling pH (S13); adding an active material (S14); completing a suspension (S15); spraying the suspension using a spray dry apparatus (S16); and collecting particles in a container (S17).

Note that in (S12), pure water is used as a dispersion medium; however, a dispersion medium is not particularly limited and ethanol or the like may be used. In addition, in (S14), the active material is a positive electrode active material.

Figure 54:
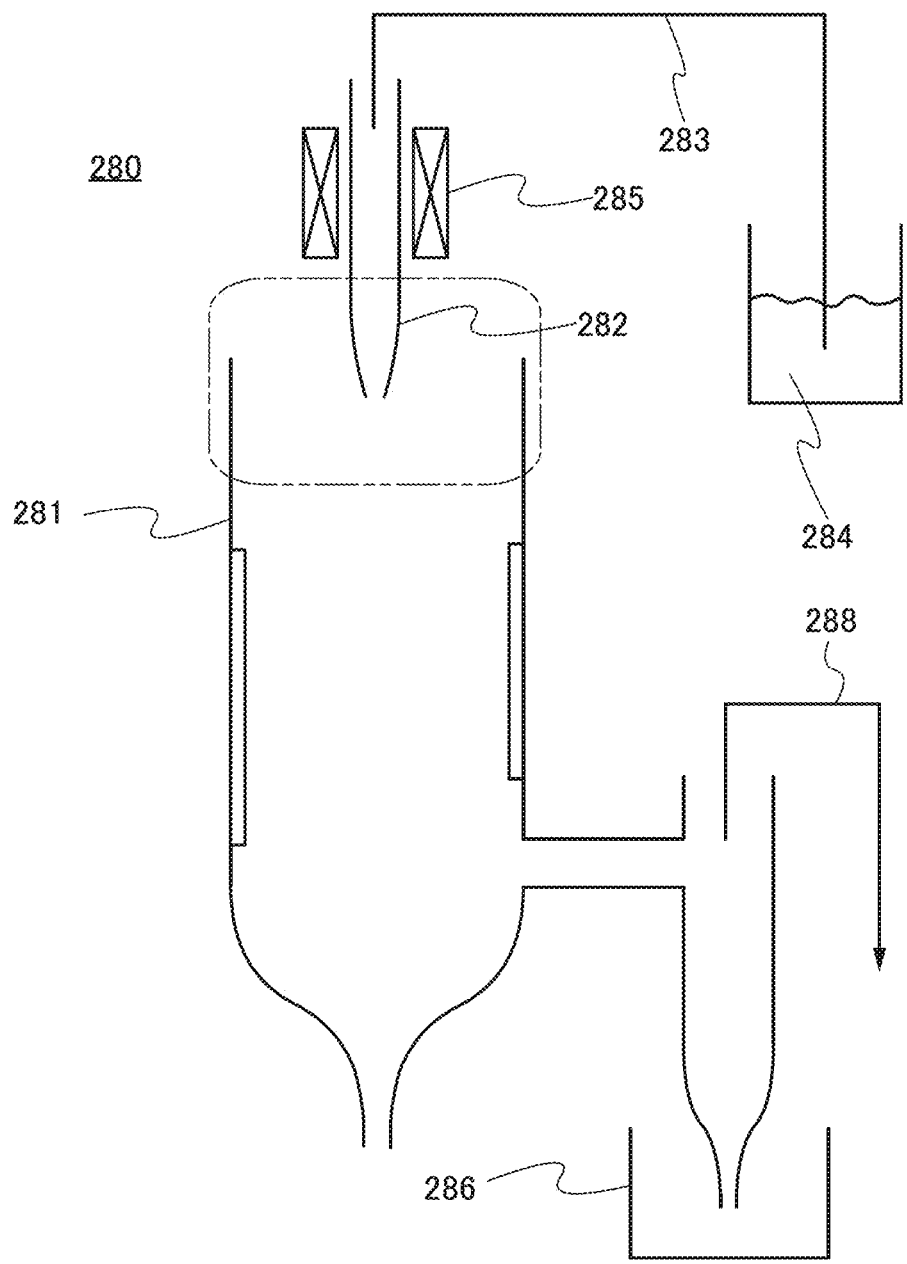
FIG. 54 illustrates a spray dry apparatus in Example 5.

FIG. 54 is a schematic view of a spray dry apparatus 280. The spray dry apparatus 280 includes a chamber 281 and a nozzle 282. A suspension 284 is supplied to the nozzle 282 through a tube 283. The suspension 284 is supplied from the nozzle 282 to the chamber 281 in the form of mist and dried in the chamber 281. The nozzle 282 may be heated with a heater 285. Here, a region of the chamber 281 which is close to the nozzle 282, for example, a region surrounded by dashed-two dotted line in FIG. 54, is also heated with the heater 285.

In the case of using a suspension containing a positive electrode active material and graphene oxide as the suspension 284, powder of the positive electrode active material coated with the graphene oxide is collected in a collection container 286 through the chamber 281.

The air in the chamber 281 may be suctioned by an aspirator or the like through a path indicated by an arrow 288.

An example of conditions for forming the coating film is shown below.

First, a suspension was formed by dispersing graphene oxide into a solvent.

Although in pure water, graphene oxide is highly dispersible, pure water might react with an active material added later, so that Li might be dissolved or an active material might be damaged to change the surface structure. Thus, the graphene oxide was dispersed into a solution such that the ratio between ethanol and pure water was 4:6.

Stirring to disperse the graphene oxide into a solution was performed under the following conditions: a stirrer and an ultrasonic wave generator were used; a rotation rate was 750 rpm; and irradiation time with ultrasonic waves was 2 minutes.

Then, a LiOH aqueous solution was dropped to adjust pH to be pH7 (25° C.).

The positive electrode active materials (in this example, lithium cobalt oxide particles produced by NIPPON CHEMICAL INDUSTRIAL CO., LTD. (product name: C-20F)) were added, and stirring was performed using a stirrer and an ultrasonic wave generator under the following conditions: a rotation rate was 750 rpm; and irradiation time with ultrasonic waves was 1 minute. Through the above process, the suspension was prepared. The above lithium cobalt oxide particles produced by NIPPON CHEMICAL INDUSTRIAL CO., LTD. (product name: C-20F) contain at least fluorine, magnesium, calcium, sodium, silicon, sulfur, and phosphorus, and each have a diameter of approximately 20 μm.

Next, the suspension was sprayed uniformly with a spray nozzle (having a nozzle diameter of 20 μm) of the spray dry apparatus to obtain powder. The inlet temperature was 160° C. and the outlet temperature was 40° C. as the hot-air temperature of the spray dry apparatus, and the $N_2$ gas flow rate was 10 L/min.

Figure 55:
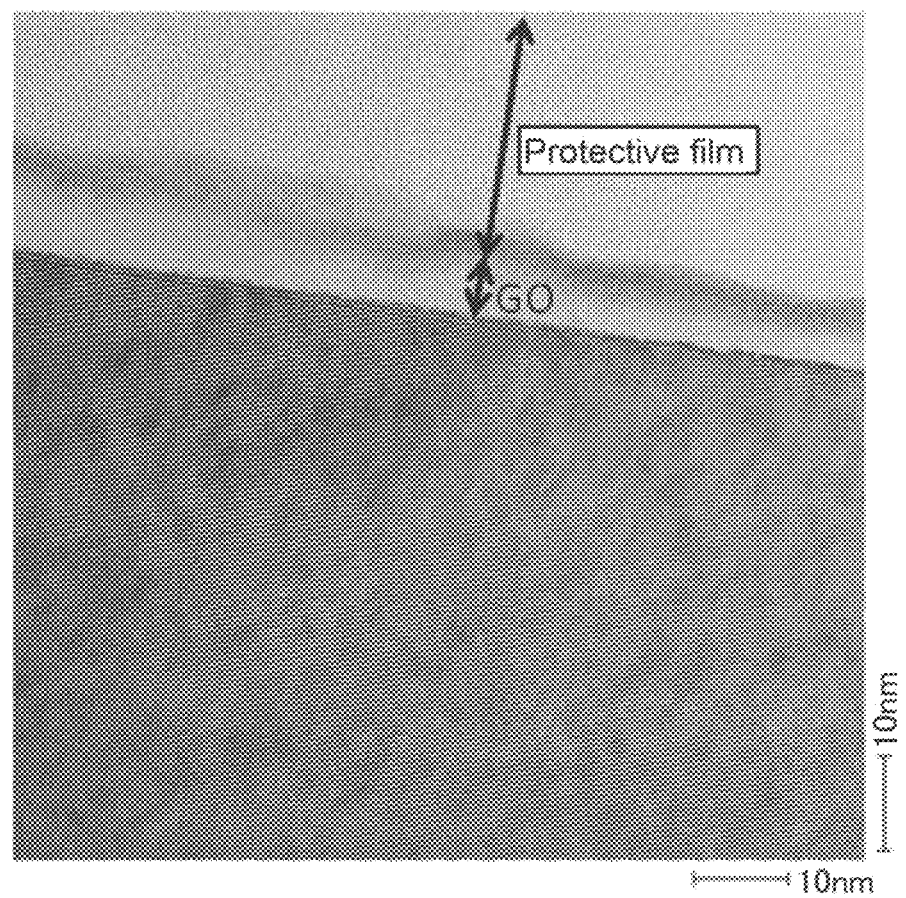
FIG. 55 is a TEM image showing one embodiment of the present invention in Example 5.
Figure 56:
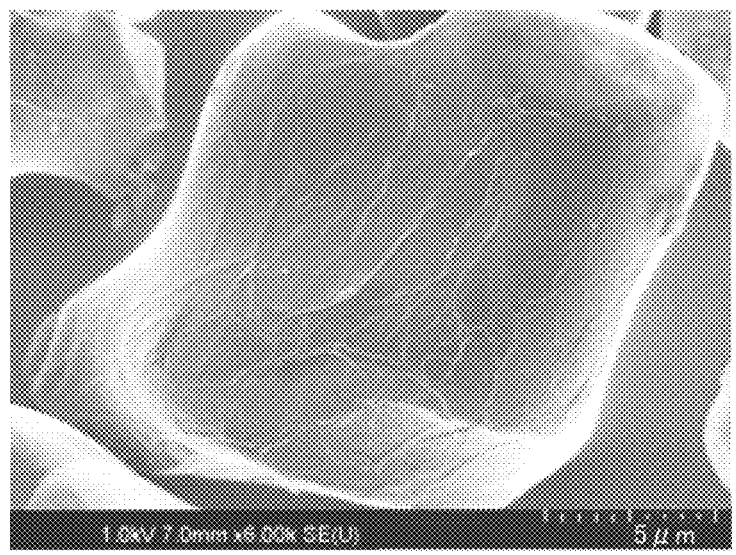
FIG. 56 is a SEM image showing one embodiment of the present invention in Example 5.
Figure 57:
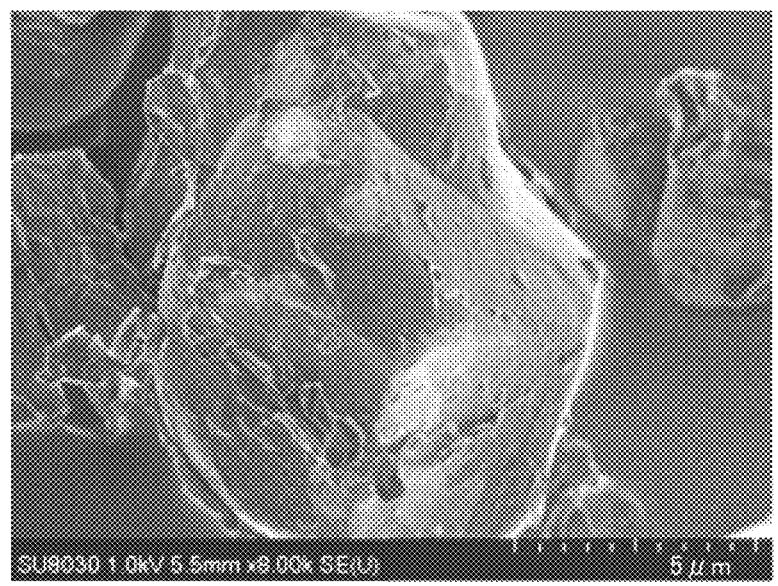
FIG. 57 is a SEM image showing a comparative example in Example 5.

FIG. 55 shows a cross-sectional TEM image of the obtained powder. In addition, FIG. 56 shows a SEM image of the obtained powder. When a positive electrode active material which was the same as the sprayed positive electrode active material (C-20F, produced by NIPPON CHEMICAL INDUSTRIAL CO., LTD.) was mixed with the graphene oxide with a planetary centrifugal mixer as a comparative example, coating was insufficient. FIG. 57 shows a SEM image of the comparative example.

It is found that, as compared with FIG. 57, the coating film is uniformly formed on the surface of the powder in FIG. 56.

Figure 58A:
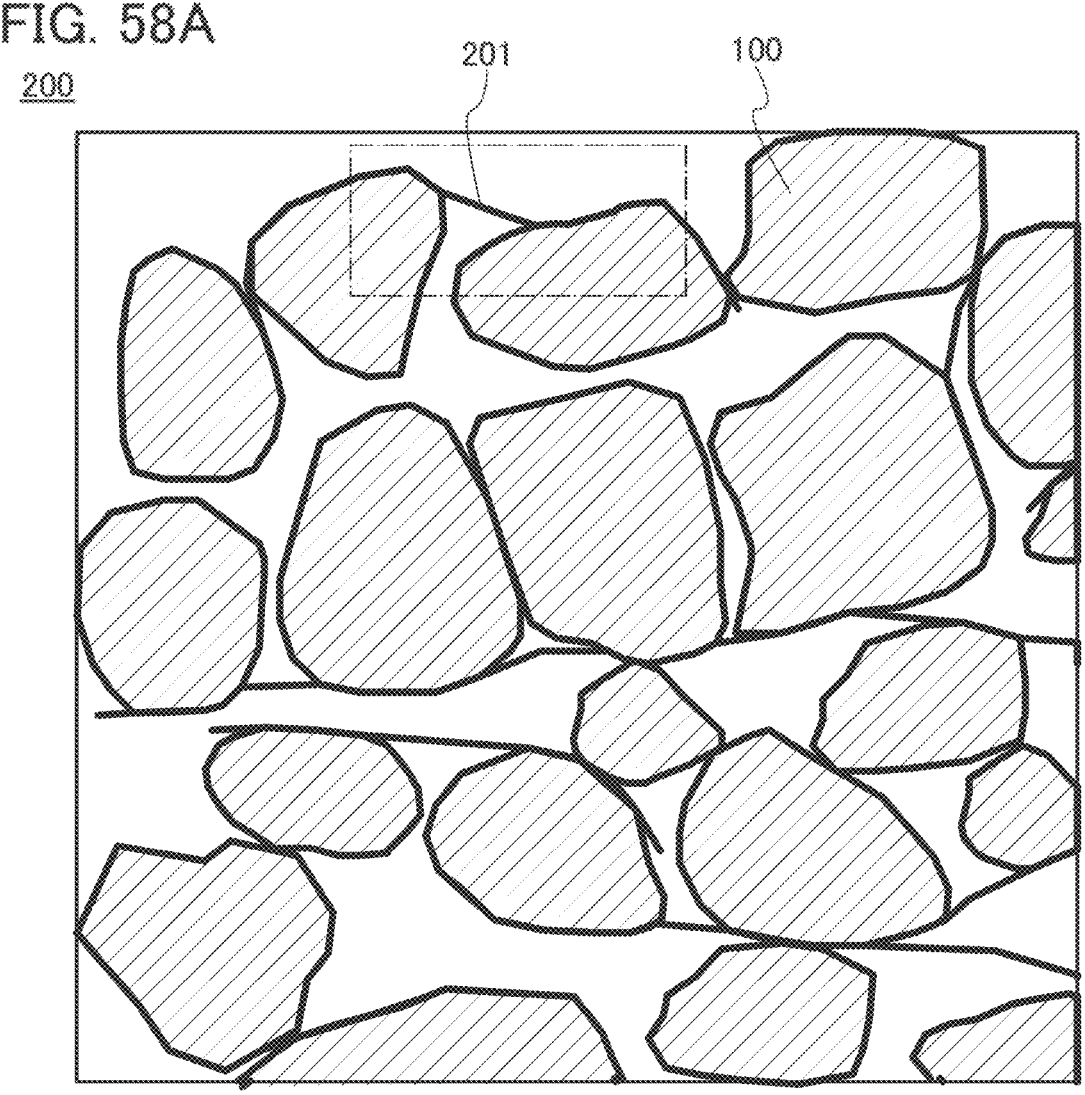
FIGS. 58A and 58B are cross-sectional views of an active material layer containing a graphene compound as a conductive additive in Example 5.
Figure 58B:
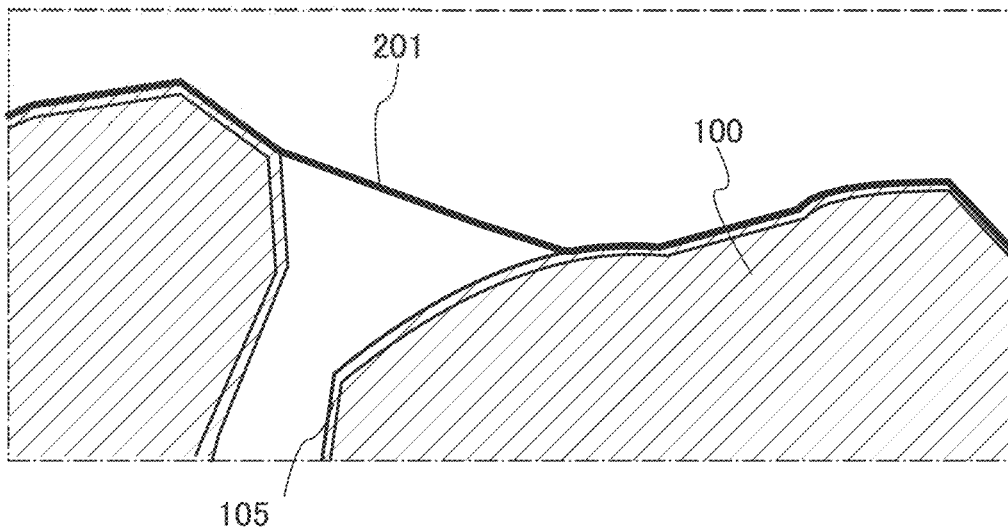

FIGS. 58A and 58B illustrate a cross-sectional structure example of an active material layer 200 which is coated with graphene oxide with a spray dry apparatus and includes a graphene compound as a conductive additive.

FIG. 58A is a longitudinal sectional view of the active material layer 200. The active material layer 200 includes positive electrode active material particles 100 coated with graphene oxide, a graphene compound 201 as a conductive additive, and a binder (not illustrated). Here, graphene or multilayer graphene may be used as the graphene compound 201, for example. The graphene compound 201 preferably has a sheet-like shape. The graphene compound 201 may have a sheet-like shape formed of a plurality of sheets of multilayer graphene and/or a plurality of sheets of graphene that partly overlap with each other.

In the longitudinal section of the active material layer 200, as illustrated in FIG. 58B, the positive electrode active material 100 coated with a coating film 105 formed of graphene oxide is in contact with the graphene compound 201. A plurality of graphene compounds 201 are formed in such a way as to be partly in contact with the positive electrode active material 100 coated with the coating film 105 and adhere to the coating film 105 of the adjacent positive electrode active material 100, so that the graphene compounds 201 are in contact with each of the positive electrode active material 100.

The graphene compound 201 and the coating film 105 are formed using carbon-based materials; thus, an excellent conductive path can be formed.

The coating film 105 is effective in protecting the crystal structure of the positive electrode active material 100 so as not to be in contact with the electrolyte solution and in forming the excellent conductive path.

REFERENCE NUMERALS

11a: positive electrode, 11b: negative electrode, 12a: lead, 12b: lead, 14: separator, 15a: bonding portion, 15b: bonding portion, 17: fixing member, 50: secondary battery, 51: exterior body, 61: folded portion, 62: seal portion, 63: seal portion, 71: crest line, 72: trough line, 73: space, 100: positive electrode active material, 101: first region, 101p: crystal plane, 102: second region, 102p: crystal plane, 103: third region, 103p: crystal plane, 104: fourth region, 105: coating film, 106: crack portion, 110: particle, 111: region, 112: layer containing titanium, 114: cobalt oxide layer, 120: particle, 121: region, 122: layer containing titanium, 124: cobalt oxide layer, 125: layer containing lithium titanate, 200: active material layer, 201: graphene compound, 280: spray dry apparatus, 281: chamber, 282: nozzle, 283: tube, 284: suspension, 285: heater, 286: collection container, 288: arrow, 300: coin-type secondary battery, 301: positive electrode can, 302: negative electrode can, 303: gasket, 304: positive electrode, 305: positive electrode current collector, 306: positive electrode active material layer, 307: negative electrode, 308: negative electrode current collector, 309: negative electrode active material layer, 310: separator, 500: laminated secondary battery, 501: positive electrode current collector, 502: positive electrode active material layer, 503: positive electrode, 504: negative electrode current collector, 505: negative electrode active material layer, 506: negative electrode, 507: separator, 508: electrolyte solution, 509: exterior body, 510: positive electrode lead electrode, 511: negative electrode lead electrode, 600: cylindrical secondary battery, 601: positive electrode cap, 602: battery can, 603: positive electrode terminal, 604: positive electrode, 605: separator, 606: negative electrode, 607: negative electrode terminal, 608: insulating plate, 609: insulating plate, 611: PTC element, 612: safety valve mechanism, 613: conductive plate, 614: conductive plate, 615: module, 616: wiring, 617: temperature control device, 900: circuit board, 910: label, 911: terminal, 912: circuit, 913: secondary battery, 914: antenna, 915: antenna, 916: layer, 917: layer, 918: antenna, 920: display device, 921: sensor, 922: terminal, 930: housing, 930a: housing, 930b: housing, 931: negative electrode, 932: positive electrode, 933: separator, 950: wound body, 951: terminal, 952: terminal, 980: laminated secondary battery, 981: film, 982: film, 993: wound body, 994: negative electrode, 995: positive electrode, 996: separator, 997: lead electrode, 998: lead electrode, 7100: portable display device, 7101: housing, 7102: display portion, 7103: operation button, 7104: secondary battery, 7200: portable information terminal, 7201: housing, 7202: display portion, 7203: band, 7204: buckle, 7205: operation button, 7206: input output terminal, 7207: icon, 7300: display device, 7304: display portion, 7400: mobile phone, 7401: housing, 7402: display portion, 7403: operation button, 7404: external connection port, 7405: speaker, 7406: microphone, 7407: secondary battery, 7408: lead electrode, 7409: current collector, 7500: vaporizer, 7501: atomizer, 7502: cartridge, 7504: secondary battery, 8000: display device, 8001: housing, 8002: display portion, 8003: speaker portion, 8004: secondary battery, 8021: ground-based charging apparatus, 8022: cable, 8024: secondary battery, 8100: lighting device, 8101: housing, 8102: light source, 8103: secondary battery, 8104: ceiling, 8105: wall, 8106: floor, 8107: window, 8200: indoor unit, 8201: housing, 8202: air outlet, 8203: secondary battery, 8204: outdoor unit, 8300: electric refrigerator-freezer, 8301: housing, 8302: refrigerator door, 8303: freezer door, 8304: secondary battery, 8400: automobile, 8401: headlight, 8406: electric motor, 8500: automobile, 8600: motor scooter, 8601: side mirror, 8602: secondary battery, 8603: indicator, 8604: storage unit under seat, 9600: tablet terminal, 9625: power saving mode changing switch, 9626: display mode changing switch, 9627: power switch, 9628: operation switch, 9629: fastener, 9630: housing, 9630a: housing, 9630b: housing, 9631: display portion, 9631a: display portion, 9631b: display portion, 9633: solar cell, 9634: charge and discharge control circuit, 9635: power storage unit, 9636: DCDC converter, 9637: converter, 9640: movable portion.

This application is based on Japanese Patent Application Serial No. 2016-133997 filed with Japan Patent Office on Jul. 6, 2016, Japanese Patent Application Serial No. 2016-133143 filed with Japan Patent Office on Jul. 5, 2016, Japanese Patent Application Serial No. 2017-002831 filed with Japan Patent Office on Jan. 11, 2017, Japanese Patent Application Serial No. 2017-030693 filed with Japan Patent Office on Feb. 22, 2017, Japanese Patent Application Serial No. 2017-084321 filed with Japan Patent Office on Apr. 21, 2017, and Japanese Patent Application Serial No. 2017-119272 filed with Japan Patent Office on Jun. 19, 2017 the entire contents of which are hereby incorporated by reference.

The invention claimed is:

1. A method of manufacturing a lithium-ion secondary battery, the lithium-ion secondary battery comprising a positive electrode, a negative electrode and an electrolyte solution, the positive electrode comprising a positive electrode active material, the method comprising the steps of:
  coating a composite oxide with a material containing titanium, the composite oxide comprising lithium, cobalt, magnesium, and fluorine; and
  heating the composite oxide,
  wherein at least some of one or both of the titanium and the magnesium is segregated in a crack portion of the positive electrode active material by the step of heating.

2. The method of manufacturing a lithium-ion secondary battery according to claim 1, wherein the step of heating is performed at a temperature 500° C. or higher and 1200° C. or lower.

3. The method of manufacturing a lithium-ion secondary battery according to claim 1, wherein the step of heating is performed in an atmosphere containing oxygen.

4. The method of manufacturing a lithium-ion secondary battery according to claim 1, wherein the step of coating with the material containing titanium is performed by a sol-gel method.

5. The method of manufacturing a lithium-ion secondary battery according to claim 1, wherein at least some of the fluorine is segregated in the crack portion by the step of heating.

6. The method of manufacturing a lithium-ion secondary battery according to claim 1, wherein a distribution of the magnesium and a distribution of the titanium are overlapped with each other by the step of heating.

7. The method of manufacturing a lithium-ion secondary battery according to claim 1, wherein, in line analysis of energy dispersive X-ray spectrometry, a distribution of the magnesium and a distribution of the titanium are overlapped with each other by the step of heating.

8. A method of manufacturing a lithium-ion secondary battery, the lithium-ion secondary battery comprising a positive electrode, a negative electrode and an electrolyte solution, the positive electrode comprising a positive electrode active material, the method comprising the steps of:
coating a composite oxide with a material containing titanium, the composite oxide comprising lithium, cobalt, magnesium, and fluorine; and
heating the composite oxide,
wherein at least some of one or both of the titanium and the magnesium is segregated in a crystal defect of the positive electrode active material by the step of heating.

9. The method of manufacturing a lithium-ion secondary battery according to claim 8, wherein the step of heating is performed at a temperature 500° C. or higher and 1200° C. or lower.

10. The method of manufacturing a lithium-ion secondary battery according to claim 8, wherein the step of heating is performed in an atmosphere containing oxygen.

11. The method of manufacturing a lithium-ion secondary battery according to claim 8, wherein the step of coating with the material containing titanium is performed by a sol-gel method.

12. The method of manufacturing a lithium-ion secondary battery according to claim 8, wherein at least some of the fluorine is segregated in the crystal defect by the step of heating.

13. The method of manufacturing a lithium-ion secondary battery according to claim 8, wherein a distribution of the magnesium and a distribution of the titanium are overlapped with each other by the step of heating.

14. The method of manufacturing a lithium-ion secondary battery according to claim 8, wherein, in line analysis of energy dispersive X-ray spectrometry, a distribution of the magnesium and a distribution of the titanium are overlapped with each other by the step of heating.

15. A method of manufacturing a lithium-ion secondary battery, the lithium-ion secondary battery comprising a positive electrode, a negative electrode and an electrolyte solution, the positive electrode comprising a positive electrode active material, the method comprising the steps of:
coating a composite oxide with a material containing titanium, the composite oxide comprising lithium, cobalt, magnesium, and fluorine; and
heating the composite oxide,
wherein a region including at least some of the titanium and at least some of the magnesium is formed in a crack portion of the positive electrode active material by the step of heating, and
wherein the crack portion is repaired by an existence of the region.

16. The method of manufacturing a lithium-ion secondary battery according to claim 15, wherein the step of heating is performed at a temperature 500° C. or higher and 1200° C. or lower.

17. The method of manufacturing a lithium-ion secondary battery according to claim 15, wherein the step of heating is performed in an atmosphere containing oxygen.

18. The method of manufacturing a lithium-ion secondary battery according to claim 15, wherein the step of coating with the material containing titanium is performed by a sol-gel method.

19. The method of manufacturing a lithium-ion secondary battery according to claim 15, wherein at least some of the fluorine is segregated in the crack portion by the step of heating.

20. The method of manufacturing a lithium-ion secondary battery according to claim 15, wherein a distribution of the magnesium and a distribution of the titanium are overlapped with each other by the step of heating.

21. The method of manufacturing a lithium-ion secondary battery according to claim 15, wherein, in line analysis of energy dispersive X-ray spectrometry, a distribution of the magnesium and a distribution of the titanium are overlapped with each other by the step of heating.

22. A method of manufacturing a lithium-ion secondary battery, the lithium-ion secondary battery comprising a positive electrode, a negative electrode and an electrolyte solution, the positive electrode comprising a positive electrode active material, the method comprising the steps of:
coating a composite oxide with a material containing titanium, the composite oxide comprising lithium, cobalt, magnesium, and fluorine; and
heating the composite oxide,
wherein at least some of the magnesium and at least some of the fluorine are segregated in a superficial portion of the positive electrode active material by the step of heating, and
wherein the titanium is diffused into an inside of the positive electrode active material by the step of heating.

23. The method of manufacturing a lithium-ion secondary battery according to claim 22, wherein the step of heating is performed at a temperature 500° C. or higher and 1200° C. or lower.

24. The method of manufacturing a lithium-ion secondary battery according to claim 22, wherein the step of heating is performed at a temperature 800° C. or higher and 1000° C. or lower.

25. The method of manufacturing a lithium-ion secondary battery according to claim 22, wherein the step of heating is performed in an atmosphere containing oxygen.

26. The method of manufacturing a lithium-ion secondary battery according to claim 22, wherein the step of coating with the material containing titanium is performed by a sol-gel method.

27. The method of manufacturing a lithium-ion secondary battery according to claim 22, wherein a distribution of the magnesium and a distribution of the titanium are overlapped with each other by the step of heating.

28. The method of manufacturing a lithium-ion secondary battery according to claim 22, wherein, in line analysis of energy dispersive X-ray spectrometry, a distribution of the magnesium and a distribution of the titanium are overlapped with each other by the step of heating.

29. The method of manufacturing a lithium-ion secondary battery according to claim 22, wherein the composite oxide is prepared by using a source of lithium, a source of cobalt, a source of magnesium, and a source of fluorine, where a ratio of a number of atoms of lithium in the source of lithium to a number of atoms of cobalt in the source of cobalt is greater than or equal to 1.00 and less than 1.07.

30. The method of manufacturing a lithium-ion secondary battery according to claim 22, wherein the composite oxide is prepared by using a source of lithium, a source of cobalt, a source of magnesium, and a source of fluorine, where a ratio between a number of atoms of magnesium in the source of magnesium and a number of atoms of fluorine in the source of fluorine is Mg:F=1:x, where $1.5 \leq x \leq 4$.

* * * * *